(12) United States Patent
Lotya

(10) Patent No.: US 11,551,051 B2
(45) Date of Patent: *Jan. 10, 2023

(54) COUPLING FRAMES FOR SMARTCARDS WITH VARIOUS MODULE OPENING SHAPES

(71) Applicant: AMATECH GROUP LIMITED, Spiddal (IE)

(72) Inventor: Mustafa Lotya, Celbridge (IE)

(73) Assignee: AMATECH GROUP LIMIIED, County Galway (IE)

( * ) Notice: Subject to any disclaimer, the term of this patent is extended or adjusted under 35 U.S.C. 154(b) by 155 days.

This patent is subject to a terminal disclaimer.

(21) Appl. No.: 16/923,038

(22) Filed: Jul. 7, 2020

(65) Prior Publication Data
US 2021/0192311 A1   Jun. 24, 2021

Related U.S. Application Data

(63) Continuation-in-part of application No. 16/742,903, filed on Jan. 14, 2020, which is a continuation-in-part
(Continued)

(51) Int. Cl.
G06K 19/077 (2006.01)
G06K 19/04 (2006.01)

(52) U.S. Cl.
CPC ..... G06K 19/07769 (2013.01); G06K 19/041 (2013.01); G06K 19/07705 (2013.01); G06K 19/07722 (2013.01); G06K 19/07747 (2013.01)

(58) Field of Classification Search
CPC ........... G06K 19/07769; G06K 19/041; G06K 19/07705; G06K 19/07722; G06K 19/07747
See application file for complete search history.

(56) References Cited

U.S. PATENT DOCUMENTS 5,084,699 A   1/1992   DeMichele
D341,092 S   11/1993   Wild
(Continued)

FOREIGN PATENT DOCUMENTS

DE   19632115   12/1997
DE   4142392 C2 *  10/2003   ....... G06K 19/07739
(Continued)

OTHER PUBLICATIONS

Use of Slits of Defined Width in Metal Layers Within ID-1 Cards, as Reactive Couplers for Nearfield Passive RFID at 13.56 MHz; Ackland, Lotya, Finn and Stamenov; 2016 IEEE International Conference on RFID (RFID); 978-1-4673-8807-8/16/$31.00 © 2016 IEEE; 4 pages.

*Primary Examiner* — Christle I Marshall
(74) *Attorney, Agent, or Firm* — McAndrews, Held & Malloy, Ltd.

(57) ABSTRACT

Coupling frames (CF) for smartcards (SC) having contactless capability. Openings (MO) for transponder chip modules (TCM) may have various non-rectangular shapes. Slits in the coupling frames may have various shapes, and may extend from anywhere in the opening to anywhere on the periphery (outer edge) of the coupling frame. The slit may be filled. A slit area of the coupling frame may be reinforced. The coupling frame may be one or more metal layers in the card. The slits of two coupling frames may have different shapes than one another. The coupling frame may constitute the entire card body. The coupling frame may be smaller than the overall card body.

15 Claims, 72 Drawing Sheets

Related U.S. Application Data of application No. 16/246,495, filed on Jan. 13, 2019, now Pat. No. 10,824,931, and a continuation-in-part of application No. 16/199,271, filed on Nov. 26, 2018, now Pat. No. 10,599,972, said application No. 16/246,495 is a continuation-in-part of application No. 15/969,816, filed on May 3, 2018, now Pat. No. 10,518,518, said application No. 16/199,271 is a continuation-in-part of application No. 15/969,816, filed on May 3, 2018, now Pat. No. 10,518,518, said application No. 16/246,495 is a continuation-in-part of application No. 15/939,282, filed on Mar. 29, 2018, now Pat. No. 10,552,722, said application No. 15/969,816 is a continuation-in-part of application No. 15/939,281, filed on Mar. 29, 2018, now Pat. No. 10,733,494, said application No. 16/199,271 is a continuation-in-part of application No. 15/662,305, filed on Jul. 28, 2017, now Pat. No. 10,193,211, said application No. 15/939,282 is a continuation-in-part of application No. 15/358,138, filed on Nov. 22, 2016, now Pat. No. 9,960,476, said application No. 15/939,281 is a continuation-in-part of application No. 15/358,138, filed on Nov. 22, 2016, now Pat. No. 9,960,476, which is a continuation-in-part of application No. 15/197,795, filed on Jun. 30, 2016, now Pat. No. 9,812,782, and a continuation-in-part of application No. 15/072,356, filed on Mar. 17, 2016, now Pat. No. 9,836,684, which is a continuation-in-part of application No. 14/862,119, filed on Sep. 22, 2015, now Pat. No. 9,697,459, and a continuation-in-part of application No. 14/619,177, filed on Feb. 11, 2015, now abandoned, said application No. 15/197,795 is a continuation-in-part of application No. 14/551,376, filed on Nov. 24, 2014, now Pat. No. 9,390,364, said application No. 14/619,177 is a continuation-in-part of application No. 14/523,993, filed on Oct. 27, 2014, now abandoned, said application No. 15/072,356 is a continuation-in-part of application No. 14/492,113, filed on Sep. 22, 2014, now Pat. No. 9,798,968, and a continuation-in-part of application No. 14/465,815, filed on Aug. 21, 2014, now Pat. No. 9,475,086, said application No. 14/492,113 is a continuation-in-part of application No. 14/465,815, filed on Aug. 21, 2014, now Pat. No. 9,475,086, which is a continuation-in-part of application No. 14/281,876, filed on May 19, 2014, now Pat. No. 9,272,370, said application No. 14/492,113 is a continuation-in-part of application No. 14/281,876, filed on May 19, 2014, now Pat. No. 9,272,370, and a continuation-in-part of application No. 13/744,686, filed on Jan. 18, 2013, now abandoned.

(60) Provisional application No. 62/035,430, filed on Aug. 10, 2014, provisional application No. 61/955,325, filed on Mar. 19, 2014, provisional application No. 61/950,020, filed on Mar. 8, 2014.

(56) References Cited

U.S. PATENT DOCUMENTS

| | | |
|---|---|---|
| 5,281,855 A | 1/1994 | Hadden et al. |
| 5,581,065 A | 12/1996 | Nishikawa et al. |
| D378,064 S | 2/1997 | Wild |
| D404,319 S | 1/1999 | Deleskiewicz |
| 5,955,723 A | 9/1999 | Reiner |
| 5,982,624 A | 11/1999 | Onoda et al. |
| 6,018,299 A | 1/2000 | Eberhardt |
| D423,374 S | 4/2000 | Deleskiewicz |
| 6,107,920 A | 8/2000 | Eberhardt et al. |
| 6,147,605 A | 11/2000 | Vega et al. |
| 6,233,818 B1 | 5/2001 | Finn et al. |
| 6,265,977 B1 | 7/2001 | Vega et al. |
| 6,369,334 B1 | 4/2002 | Lauffer |
| 6,378,774 B1 | 4/2002 | Emori et al. |
| 6,452,563 B1 | 9/2002 | Porte |
| 6,491,782 B1 | 12/2002 | Jaynes |
| 6,581,839 B1 | 6/2003 | Lasch et al. |
| 6,611,199 B1 | 8/2003 | Geiszler et al. |
| 6,634,564 B2 | 10/2003 | Kuramochi |
| 6,698,089 B2 | 3/2004 | Finn et al. |
| 6,749,123 B2 | 6/2004 | Lasch et al. |
| 6,764,014 B2 | 7/2004 | Lasch et al. |
| 6,986,465 B2 | 1/2006 | Kiekhaefer |
| 7,183,987 B2 | 2/2007 | Akiho et al. |
| 7,306,158 B2 | 12/2007 | Berardi et al. |
| 7,377,443 B2 | 5/2008 | Lasch et al. |
| 7,440,771 B2 | 10/2008 | Purk |
| 7,494,057 B2 | 2/2009 | Lasch et al. |
| 7,530,491 B2 | 5/2009 | Lasch et al. |
| 7,544,266 B2 | 6/2009 | Herring et al. |
| 7,588,184 B2 | 9/2009 | Gandel et al. |
| 7,607,583 B2 | 10/2009 | Berardi et al. |
| 7,701,350 B2 | 4/2010 | Sakama et al. |
| 7,721,956 B2 | 5/2010 | Williams et al. |
| 7,757,957 B2 | 7/2010 | Cranston et al. |
| 7,819,310 B2 | 10/2010 | Lasch et al. |
| 7,823,777 B2 | 11/2010 | Varga et al. |
| 7,837,116 B2 | 11/2010 | Morrill Webb et al. |
| 7,934,646 B2 | 5/2011 | Yang |
| 8,033,457 B2 | 10/2011 | Varga et al. |
| 8,066,190 B2 | 11/2011 | Faenza, Jr. |
| 8,079,514 B2 | 12/2011 | Lasch et al. |
| 8,100,337 B2 | 1/2012 | Artigue et al. |
| 8,130,166 B2 | 3/2012 | Ayala et al. |
| 8,141,787 B2 | 3/2012 | Savry |
| 8,186,582 B2 | 5/2012 | Varga et al. |
| 8,186,598 B2 | 5/2012 | Faenza, Jr. |
| 8,191,788 B2 | 6/2012 | Morrill-Webb et al. |
| 8,261,997 B2 | 9/2012 | Gebhart |
| 8,360,312 B2 | 1/2013 | Varga et al. |
| 8,366,009 B2 | 2/2013 | Finn et al. |
| 8,378,911 B2 | 2/2013 | Eray et al. |
| 8,393,547 B2 | 3/2013 | Kiekhaefer |
| 8,474,726 B2 | 7/2013 | Finn |
| 8,523,062 B2 | 9/2013 | Varga et al. |
| D693,264 S | 11/2013 | Rabassa |
| 8,608,080 B2 | 12/2013 | Finn |
| 8,608,082 B2 | 12/2013 | Le Garrec et al. |
| 8,672,232 B2 | 3/2014 | Herslow |
| 8,789,762 B2 | 7/2014 | Finn et al. |
| 8,991,712 B2 | 3/2015 | Finn et al. |
| 9,000,619 B2 | 4/2015 | Kato et al. |
| D729,074 S | 5/2015 | Boulangeot |
| 8,976,075 B2 | 5/2015 | Kato et al. |
| 9,033,250 B2 | 5/2015 | Finn et al. |
| 9,112,272 B2 | 8/2015 | Finn et al. |
| 9,147,068 B1 | 9/2015 | Haddad et al. |
| 9,165,240 B2 | 10/2015 | Finn et al. |
| 9,195,932 B2 | 11/2015 | Finn et al. |
| 9,203,157 B2 | 12/2015 | Kato et al. |
| 9,272,370 B2 | 3/2016 | Finn et al. |
| 9,390,364 B2 | 7/2016 | Finn et al. |
| 9,449,269 B2 | 9/2016 | Finn et al. |
| 9,475,086 B2 | 10/2016 | Finn et al. |
| 9,489,613 B2 | 11/2016 | Finn et al. |
| 9,564,678 B2 | 2/2017 | Kato et al. |
| 9,622,359 B2 | 4/2017 | Finn et al. |
| 9,633,304 B2 | 4/2017 | Finn et al. |
| 9,634,391 B2 | 4/2017 | Finn et al. |
| 9,697,459 B2 | 7/2017 | Finn et al. |
| 9,721,200 B2 | 8/2017 | Slow et al. |
| 9,760,816 B1 | 9/2017 | Williams et al. |
| 9,798,968 B2 | 10/2017 | Finn et al. |
| 9,812,782 B2 | 11/2017 | Finn et al. |
| 9,836,684 B2 | 12/2017 | Finn et al. |

(56) References Cited

U.S. PATENT DOCUMENTS

| | | |
|---|---|---|
| 9,852,369 B2 | 12/2017 | Ali |
| 9,881,247 B2 | 1/2018 | Le Garrec et al. |
| 9,960,476 B2 | 5/2018 | Finn et al. |
| 10,147,999 B2 | 12/2018 | Wang et al. |
| 10,518,518 B2 * | 12/2019 | Finn ................. G06K 19/07722 |
| 11,195,075 B2 * | 12/2021 | Coleman .......... G06K 19/07722 |
| 2003/0057288 A1 | 3/2003 | Salzgeber |
| 2005/0194453 A1 | 9/2005 | Conner et al. |
| 2006/0192674 A1 | 8/2006 | Roberta |
| 2006/0243811 A1 | 11/2006 | Koyama et al. |
| 2007/0164414 A1 | 7/2007 | Dokai et al. |
| 2009/0152362 A1 | 6/2009 | Ayala et al. |
| 2009/0159657 A1 | 6/2009 | Chen et al. |
| 2009/0169776 A1 | 7/2009 | Herslow |
| 2009/0294543 A1 | 12/2009 | Varga et al. |
| 2009/0315320 A1 | 12/2009 | Finn |
| 2010/0078329 A1 | 4/2010 | Mirsky et al. |
| 2010/0176205 A1 | 7/2010 | Patrice |
| 2011/0023289 A1 | 2/2011 | Finn |
| 2011/0090058 A1 | 4/2011 | Ikemoto |
| 2011/0140841 A1 | 6/2011 | Bona et al. |
| 2011/0163167 A1 | 7/2011 | Artigue et al. |
| 2011/0181486 A1 | 7/2011 | Kato |
| 2011/0186641 A1 | 8/2011 | Kato et al. |
| 2011/0189620 A1 | 8/2011 | Herslow |
| 2012/0018522 A1 | 1/2012 | Le Garrec et al. |
| 2012/0038445 A1 | 2/2012 | Finn |
| 2012/0074233 A1 | 5/2012 | Finn et al. |
| 2012/0112971 A1 | 5/2012 | Takiyama et al. |
| 2013/0126622 A1 | 5/2013 | Finn et al. |
| 2013/0146670 A1 | 6/2013 | Grieshofer et al. |
| 2013/0146671 A1 | 6/2013 | Grieshofer et al. |
| 2013/0168454 A1 | 7/2013 | Oh et al. |
| 2013/0271265 A1 | 10/2013 | Finn |
| 2013/0320095 A1 | 12/2013 | Blum |
| 2013/0332353 A1 | 12/2013 | Aidasani et al. |
| 2014/0014732 A1 | 1/2014 | Finn et al. |
| 2014/0021261 A1 | 1/2014 | Mosteller |
| 2014/0070009 A1 | 3/2014 | Zambrano |
| 2014/0091149 A1 | 4/2014 | Finn et al. |
| 2014/0102136 A1 | 4/2014 | Warren |
| 2014/0104133 A1 | 4/2014 | Finn et al. |
| 2014/0138443 A1 | 5/2014 | Blum |
| 2014/0144993 A1 | 5/2014 | Seo et al. |
| 2014/0152511 A1 | 6/2014 | Merlin et al. |
| 2014/0166762 A1 | 6/2014 | Herslow |
| 2014/0260424 A1 | 9/2014 | Warren |
| 2014/0263655 A1 | 9/2014 | Forster |
| 2014/0284386 A1 | 9/2014 | Finn et al. |
| 2014/0292477 A1 | 10/2014 | Ahmadloo |
| 2014/0361086 A1 | 12/2014 | Finn et al. |
| 2015/0021402 A1 | 1/2015 | Finn et al. |
| 2015/0021403 A1 | 1/2015 | Finn et al. |
| 2015/0129665 A1 | 5/2015 | Finn et al. |
| 2015/0136858 A1 | 5/2015 | Finn et al. |
| 2015/0180229 A1 | 6/2015 | Herslow |
| 2015/0235122 A1 | 8/2015 | Finn et al. |
| 2015/0269474 A1 | 9/2015 | Finn et al. |
| 2016/0269477 A1 | 9/2016 | L'Heureux et al. |
| 2016/0365644 A1 | 12/2016 | Finn et al. |
| 2017/0017871 A1 | 1/2017 | Finn et al. |
| 2017/0308785 A1 * | 10/2017 | Kim ................. G06K 19/07722 |
| 2018/0123221 A1 | 5/2018 | Finn et al. |
| 2018/0339503 A1 | 11/2018 | Finn et al. |
| 2018/0341846 A1 | 11/2018 | Finn et al. |
| 2018/0341847 A1 | 11/2018 | Finn et al. |
| 2019/0236434 A1 * | 8/2019 | Lowe ............... G06K 19/07792 |
| 2019/0384261 A1 | 12/2019 | Nam et al. |
| 2020/0257953 A1 * | 8/2020 | Lotya .................. H01Q 1/2225 |
| 2020/0364527 A1 * | 11/2020 | Coleman ............. G06K 19/063 |
| 2021/0150294 A1 * | 5/2021 | Finn ........................ B26F 1/00 |
| 2021/0232887 A1 * | 7/2021 | Ritter ............... G06K 19/07728 |

FOREIGN PATENT DOCUMENTS

| | | |
|---|---|---|
| EP | 0782214 | 7/1997 |
| EP | 1031939 | 8/2000 |
| EP | 1158601 | 11/2001 |
| EP | 0952542 | 10/2003 |
| EP | 0919950 | 4/2007 |
| EP | 2063489 | 5/2009 |
| EP | 2264645 | 12/2010 |
| EP | 1854222 | 6/2012 |
| EP | 2525304 | 11/2012 |
| EP | 2541471 | 2/2013 |
| EP | 2372840 | 9/2013 |
| FR | 2765010 | 6/1997 |
| JP | 11025244 | 1/1999 |
| JP | 11238103 | 8/1999 |
| JP | 2002344225 | 11/2002 |
| JP | 2005204038 | 7/2005 |
| WO | WO 1997026621 | 7/1997 |
| WO | WO 2008081224 | 7/2008 |
| WO | WO 2013034426 | 3/2013 |
| WO | WO 2013110625 | 8/2013 |
| WO | WO 2014016332 | 1/2014 |
| WO | WO 2014113765 | 7/2014 |
| WO | WO 2017090891 | 6/2017 |
| WO | WO 2017198842 | 11/2017 |
| WO | WO 2017007468 | 12/2017 |
| WO | WO-2021137923 A2 * | 7/2021 ............. G06K 19/02 |

* cited by examiner

Dual Interface (DI) Smart Card, and Readers

ISO 7816 an exemplary stackup of a metal foil smart card

TCM with secondary couping frame (SCF)
and laser-etched antenna structure (LES)

capacitive coupling enhanced (CCE) transponder chip module (TCM) having a coupling frame (CF) formed on the module tape (MT, CCT)

transponder chip module (TCM) with coupling frame (CF)

as shown in FIG. 3A a variation

Hybrid Metal Credit Card

Hybrid Metal Credit Card overlapping ends

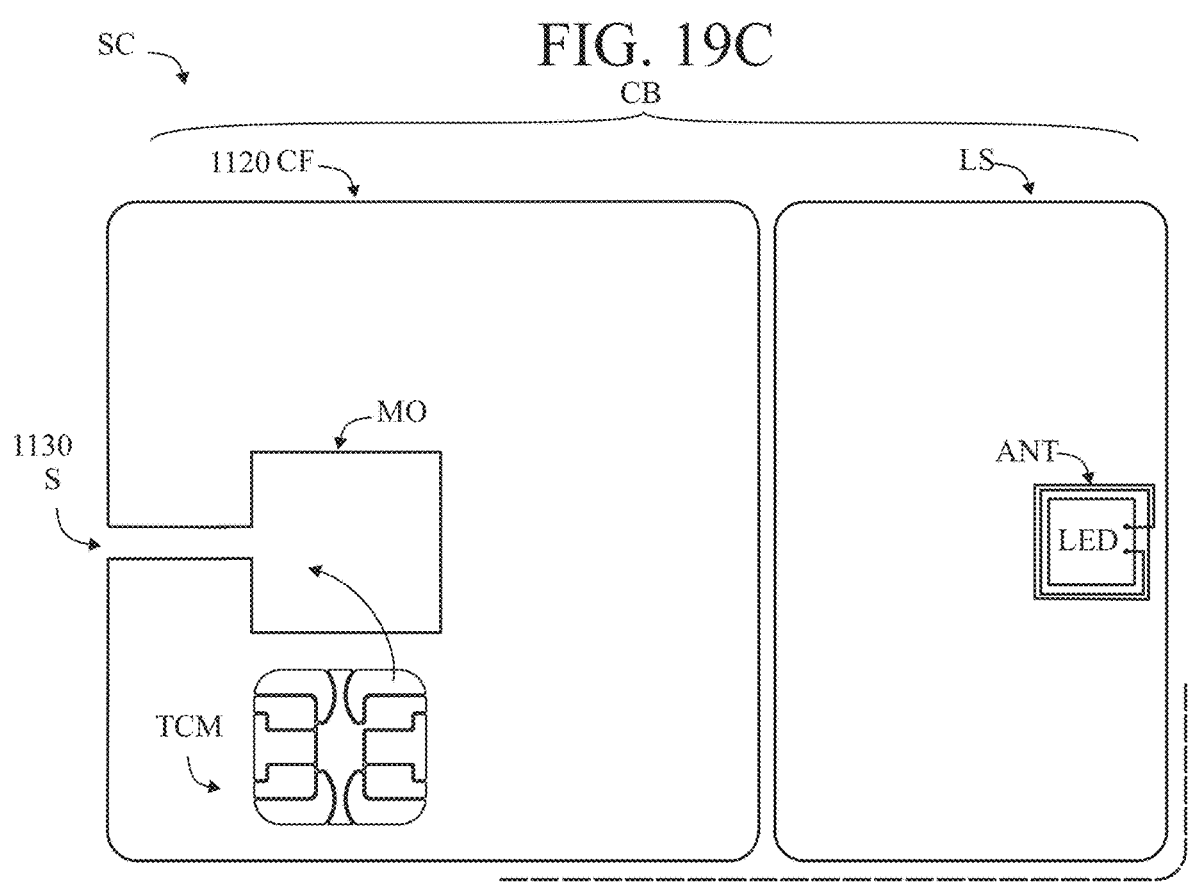

Payment Object in the form of
a charm with T-shaped slit one CF, one TCM, enabled one CF, one TCM, disabled CF of FIG. 21A rotated 20° clockwise one slit extending to opening for TCM multiple slits extending to opening for TCM smart card with multiple metal layers shielded laminated smartcard slit before coating slit after coating smart card with metal card body (MCB)

smart card with metal card body (MCB)

smart card with metal card body (MCB)

"Plastic-Metal-Plastic" Hybrid Cards two metal layers

WO 2019/173455

CF smaller than CB rectangular MO, rotated

MO with only 2 sides parallel

COUPLING FRAMES FOR SMARTCARDS WITH VARIOUS MODULE OPENING SHAPES

CROSS-REFERENCE(S) TO RELATED APPLICATIONS

This application claims filing date benefit (priority), as a nonprovisional or continuation-in-part from the following US provisional and nonprovisional patent applications, all of which are incorporated by reference herein:

This is a continuation-in-part of Ser. No. 16/742,903 filed 14 Jan. 2020.
  Ser. No. 16/742,903 is a continuation-in-part of Ser. No. 16/246,495 filed 13 Jan. 2019
  Ser. No. 16/246,495 is a continuation-in-part of Ser. No. 15/969,816 filed 3 May 2018
  Ser. No. 15/969,816 is a continuation-in-part of Ser. No. 15/939,281 filed 29 Mar. 2018
  Ser. No. 15/939,281 is continuation-in-part of Ser. No. 15/358,138 filed 22 Nov. 2016
  Ser. No. 15/358,138 is a continuation-in-part of Ser. No. 15/072,356 filed 17 Mar. 2016
  Ser. No. 15/072,356 is a continuation-in-part of Ser. No. 14/492,113 filed 22 Sep. 2014
  Ser. No. 14/492,113 is a continuation-in-part of Ser. No. 14/465,815 filed 21 Aug. 2014
  Ser. No. 14/492,113 is a continuation-in-part of Ser. No. 14/281,876 filed 19 May 2014
  Ser. No. 14/281,876 is a nonprovisional of 61/950,020 filed 8 Mar. 2014
  Ser. No. 14/492,113 is a continuation-in-part of Ser. No. 13/744,686 filed 18 Jan. 2013
  Ser. No. 15/072,356 is a continuation-in-part of Ser. No. 14/465,815 filed 21 Aug. 2014
  Ser. No. 14/465,815 is a nonprovisional of 62/035,430 filed 10 Aug. 2014
  Ser. No. 14/465,815 is a continuation-in-part of Ser. No. 14/281,876 filed 19 May 2014
  Ser. No. 14/281,876 is a nonprovisional of 61/950,020 filed 8 Mar. 2014
  Ser. No. 14/465,815 is a nonprovisional of 61/955,325 filed 19 Mar. 2014
  Ser. No. 16/246,495 is a continuation-in-part of Ser. No. 15/939,282 filed 29 Mar. 2018
  Ser. No. 15/939,282 is a continuation-in-part of Ser. No. 15/358,138 filed 22 Nov. 2016
  Ser. No. 15/358,138 is a continuation-in part of Ser. No. 15/197,795 filed 30 Jun. 2016
  Ser. No. 15/197,795 is a continuation-in part of Ser. No. 14/551,376 filed 24 Nov. 2014
  Ser. No. 16/742,903 is a continuation-in-part of Ser. No. 16/199,271 filed 26 Nov. 2018
  Ser. No. 16/199,271 is a continuation-in-part of Ser. No. 15/969,816 filed 3 May 2018
  Ser. No. 15/969,816 is a continuation-in-part of Ser. No. 15/939,281 filed 29 Mar. 2018
  Ser. No. 15/939,281 is continuation-in-part of Ser. No. 15/358,138 filed 22 Nov. 2016
  Ser. No. 15/358,138 is a continuation-in-part of Ser. No. 15/072,356 filed 17 Mar. 2016
  Ser. No. 15/072,356 is a continuation-in-part of Ser. No. 14/862,119 filed 22 Sep. 2015
  Ser. No. 15/072,356 is a continuation-in-part of Ser. No. 14/619,177 filed 11 Feb. 2015
  Ser. No. 14/619,177 is a continuation-in-part of Ser. No. 14/523,993 filed 27 Oct. 2014
  Ser. No. 16/199,271 is a continuation-in-part of Ser. No. 15/662,305 filed 28 Jul. 2017

TECHNICAL FIELD

This disclosure relates to smartcards (or payment cards, secure documents, access control cards, electronic tickets, small form factor tags, data carriers, mobile payment devices and the like), operating at least in a contactless mode (ISO 14443 and NFC/ISO 15693). The smartcard (or smart card) may comprise a card body (CB) made of plastic or metal or a combination thereof, and a transponder chip module (TCM) comprising a dual interface RFID chip and an antenna.

BACKGROUND

A dual interface (DI or DIF) smartcard (or smart card; SC) may generally comprise:
  an antenna module (AM), or transponder chip module (TCM), or RFID module,
  a card body (CB) having layers of plastic or metal, or combinations thereof, and
  a booster antenna (BA).

The antenna module "AM" may generally comprise a "DI" RFID chip (bare, unpackaged silicon die) or chip module (a die with leadframe, interposer, carrier or the like)—either of which may be referred to as "CM"—mounted to a module tape "MT". The RFID chip (CM) may be mounted on a module tape (MT), typically having 6 or 8 contact pads (CP) for interfacing with a contact reader in a contact mode (ISO 7816).

A module antenna "MA" may be disposed on the module tape MT for implementing a contactless interface, such as ISO 14443 and NFC/ISO 15693. Contact pads "CP" may be disposed on the module tape MT for implementing a contact interface, such as ISO 7816. The contact pads (CP) may or may not be perforated. The module tape MT may comprise a pattern of interconnects (conductive traces and pads) to which the RFID chip CM and contact pads CP may be connected.

The module antenna MA may be connected, indirectly, via some of the interconnects to the chip CM, or may be directly connected to bond pads BP on the RFID chip CM. The module antenna MA may comprise several turns of wire, such as 112 micron diameter insulated wire. Reference may be made to U.S. Pat. No. 6,378,774 (2002, Toppan), for example FIGS. 12A, B thereof. Alternatively, the module antenna (MA) may comprise a chemically-etched, planar module antenna MA with planar tracks surrounding the chip (CM). Reference may be made to U.S. Pat. No. 8,100,337 (2012, SPS), for example FIG. 3 thereof.

The antenna module "AM" may comprise a module antenna (MA) which has been formed from a wire wound coil which is arranged on or mounted to the module tape (MT), or may comprise a planar antenna structure (AS) which is etched (chemically etched or laser etched, from a foil on the module tape MT) to have a number of tracks separated by spaces. Generally, with laser etching, the spacing between tracks can be made smaller (such as 25 μm) than with chemical etching (such as 100 μm).

A module antenna (MA) connected to an RFID chip (CM) may be referred to as a "transponder". Generally, such a transponder is a "passive" transponder which does not have its own power source (e.g., battery), but rather which harvests power from an external reader (interrogator).

The activation distance of an antenna module (AM) having a chemically-etched module antenna (MA), without a booster antenna (BA) in the card body (CB), may be only a few millimeters. The activation distance of an antenna module (AM) having a laser-etched antenna structure (LES), without a booster antenna (BA) in the card body (CB) may be 15-20 mm. The activation distance of antenna module (AM) with a booster antenna (BA) in the card body (CB) is typically four centimeters to meet ISO and EMV standards.

Activation and read/write distances of at least a few centimeters (cm) are desirable. However, conventional antenna modules (AM) may require a booster antenna (BA) in a card body (CB) to achieve these distances. As disclosed herein, antenna modules (AM) incorporating a laser-etched antenna structure (LES) may be able to operate without a booster antenna (BA) in the card body (CB), and may be referred to as transponder chip modules (TCM). The transponder chip module (TCM) may be referred to as a transponder IC module.

The antenna module AM (or transponder chip module TCM) may be generally rectangular, having four sides, and measuring approximately 8 mm×11 mm for a 6 contact module and 11 mm×13 mm for an 8 contact module. Alternatively, the transponder chip module (TCM) may be round, elliptical, or other non-rectangular shape. When operating in a contactless mode, the transponder chip module (TCM) may be powered by RF from an external RFID reader, and may also communicate by RF with the external RFID reader. An "activation distance" may refer to a distance at which the transponder chip module TCM may harvest sufficient energy from the RFID reader to commence operation. Similarly, a "read/write distance" may refer to a distance at which the transponder chip module TCM may communicate reliably with the external RFID reader.

The card body CB—which may be referred to as a substrate, or an inlay substrate—may generally comprise one or more layers of material such as Polyvinyl Chloride (PVC), Polycarbonate (PC), PET-G (Polyethylene Terephtalate Glycol-modified), Copolyester (Tritan), Teslin™, synthetic paper, paper and the like.

The card body CB may be generally rectangular, measuring approximately 54 mm×86 mm (refer to ISO/JEC 7810), having a thickness of approximately 300 μm thick when referred to as an inlay substrate or 760 μm when referred to as a smartcard. The card body CB is typically significantly (such as 30 times) larger than the antenna module AM.

The booster antenna BA may generally comprise a relatively large winding which may be referred to as a card antenna CA component (or portion) having a number of turns disposed in a peripheral area of the card body CB, and a relatively small coupler coil (or coupler antenna) CC component (or portion) having a number of turns disposed at a coupling area of the card body CB corresponding to the location of the antenna module AM.

The card antenna CA and coupler coil CC may comprise wire mounted to (embedded in) the card body CB using an ultrasonic tool comprising a sonotrode and a capillary. See, for example U.S. Pat. Nos. 6,698,089 and 6,233,818. The wire may be non-insulated, insulated, or self-bonding wire, having an exemplary diameter in the range of approximately 50-112 μm.

Some examples of smartcards (SC) with booster antennas (BA) may be found in . . .
 U.S. Pat. No. 8,474,726 issued 2 Jul. 2013
 U.S. Pat. No. 8,366,009 issued 5 Feb. 2013
 U.S. Ser. No. 14/020,884 filed 8 Sep. 2013 (now US 20140091149 3 Apr. 2014)

Metallized smartcards may have a faceplate or layer of metal extending over nearly the entire area of the card (except for an opening for the antenna module (AM)), and some smartcards may be made largely of metal. The presence of such a metal layer or mass in the smartcard may tend to attenuate contactless communication (e.g., ISO 14443, ISO 15693) between the smartcard and an external reader. The contact pads themselves may also tend to attenuate contactless communication. Hence, metallized smartcards may often function in a contact mode (e.g., ISO 7816) only.

Foil composite cards and metal cards may be disclosed in . . .
 US 20090169776 (2009 Jul. 2; Herslow)
 US 20110189620 (2011 Aug. 4; Herslow)
 Shielding layers and the like may be disclosed in . . .
 U.S. Pat. No. 8,261,997 (2012 Sep. 11; Gebhart/NXP)
 EP1854222 (NXP)
 EP 02063489 (Tyco)
 U.S. Ser. No. 13/744,686 filed 18 Jan. 2013 (now US 20130126622, 23 May 2013) discloses offsetting shielding and enhancing coupling in metallized smart cards. As disclosed therein (FIG. 4A), a conductive "compensation loop" CL may be disposed behind the booster antenna BA, extending around the periphery of the card body CB. The compensation loop CL may be an open loop having two free ends, and a gap ("gap") therebetween. The compensation loop CL may be made of copper cladding.

Some other patents of interest may include . . .
 U.S. Pat. No. 8,393,547 issued 2013 Mar. 12 (Kiekhaefer et al.; Perfect Plastic)
 US 20140166762 published 2014 Jun. 19 (Herslow)
 Some terms used herein may include:
 "skin depth" relates to the "skin effect" which is the tendency of an alternating electric current (AC) to become distributed within a conductor such that the current density is largest near the surface of the conductor. A "skin depth", or minimum thickness for conducting current may be defined, for a given material at a given frequency. For example, at 13.56 MHz, the skin depth for copper may be approximately 18 μm (17.7047 μm).
 "transparency" refers to the ability of electromagnetic radiation to pass through a material. A threshold for non-transparency (or the ability to interact with RF) may be a fraction of the skin depth for the metal layer in question at a given frequency of interest.

For example, the non-transparency threshold for copper at 13.56 MHz, may be one-tenth of the skin depth, or approximately 1.7 μm.

Some Patents/Publications of Interest

Some of the following US patents and published patent applications may be related to some of the techniques (methods and apparatus) disclosed herein.

| US Patents and Publications | | |
| --- | --- | --- |
| 7494057 | 2009 Feb. 24 | Lasch et al. (AMEX) |
| 7530491 | 2009 May 12 | Lasch et al. (AMEX) |
| 7588184 | 2009 Sep. 15 | Gandel et al. (AMEX) |
| 7819310 | 2010 Oct. 26 | Lasch et al. (AMEX) |
| 7823777 | 2010 Nov. 2 | Varga et al. (AMEX) |
| 8033457 | 2011 Oct. 11 | Varga et al. (AMEX) |
| 8079514 | 2011 Dec. 20 | Lasch et al. (AMEX) |
| 8523062 | 2013 Sep. 3 | Varga et al. (AMEX) |
| 8186582 | 2012 May 29 | Varga et al. (AMEX) |

-continued

| US Patents and Publications | | |
|---|---|---|
| 7757957 | 2010 Jul. 20 | Cranston et al. (AMEX) |
| 8360312 | 2013 Jan. 29 | Varga et al. (AMEX) |
| 7721956 | 2010 May 25 | Williams et al. (AMEX) |
| 7440771 | 2008 Oct. 21 | Purk (AMEX) |
| 6764014 | 2004 Jul. 20 | Lasch et al. (AMEX) |
| 7377443 | 2008 May 27 | Lasch et al. (AMEX) |
| 7607583 | 2009 Oct. 27 | Berardi et al. (AMEX) |
| 7837116 | 2010 Nov. 23 | Morril Webb et al. (AMEX) |
| 8066190 | 2011 Nov. 29 | Faenza, Jr. (AMEX) |
| 8186598 | 2012 May 29 | Faenza, Jr. (AMEX) |
| 8191788 | 2012 Jun. 5 | Morrill-Webb et al. (AMEX) |
| 6581839 | 2003 Jun. 24 | Lasch et al. (AMEX) |
| 6749123 | 2004 Jun. 15 | Lasch et al. (AMEX) |
| 6986465 | 2006 Jan. 17 | Kiekhaefer (AMEX) |
| 7306158 | 2007 Dec. 11 | Berardi et al. (AMEX) |
| 20140144993 | 2014 May 29 | Seo et al (Biosmart) |
| 20130320095 | 2013 Dec. 5 | Blum (Black Card) |
| 20140138443 | 2014 May 22 | Blum (Black Card) |
| 20130320095 | 2013 Dec. 5 | Blum (Black Card) |
| 8672232 | 2014 Mar. 18 | Herslow (Composecure) |
| 20140021261 | 2014 Jan. 23 | Mosteller (CPI) |
| 20130168454 | 2013 Jul. 4 | Oh et al. (Hyundai) |
| 8393547 | 2013 Mar. 12 | Keikhaefer et al. (Perfect ..) |
| 20140070009 | 2014 Mar. 13 | Zambrano L. (Card Limited) |
| 20100078329 | 2010 Apr. 1 | Mirsky et al. |

Additionally, some of the following US and foreign patents and published patent applications may be related to some of the embodiments of the techniques disclosed herein.

| U.S. Pat. No. 9,564,678 | 2017 Feb. 7 | Kato et al. (Murata) |
|---|---|---|
| U.S. Pat. No. 6,452,563 | 2002 Sep. 17 | Porte (Gemplus) |
| U.S. Pat. No. 8,608,082 | 2013 Dec. 17 | La Garrec et al. (Oberthur) |
| EP 2372840 | 2013 Sep. 25 | Hashimoto (Panasonic) |

SUMMARY

Techniques (methods and apparatus) may be disclosed herein for improving coupling of smartcards (as an example of secure documents, and the like) with a contactless reader. This may be of particular interest in the milieu of metallized (or metal) smartcards.

Some other objects may include relaxing performance constraints on the booster antenna (BA) of the smart card (SC), including the possibility of eliminating the booster antenna (BA) altogether.

As disclosed in U.S. Pat. Nos. 9,798,968 and 9,475,086, a "coupling frame" may comprise a metal layer in a card body for a smartcard, or a metal card body for a smartcard, the metal layer (or metal card body) having an opening for receiving a transponder chip module, and a slit extending from an outer edge of the metal layer (or metal card body) to the opening. The coupling frame, particularly the slit thereof, may overlap at least a portion of a module antenna in the transponder chip module.

As disclosed herein, generally, a card body for a smartcard, particularly a smartcard having contactless capability, may comprise two metal layers separated by an insulting (or dielectric) layer. Each metal layer may be formed as a coupling frame—namely, having a slit and an opening. The slits may be arranged in different directions than one another, so that the slit of one coupling frame may be supported by an area without a slit of the other coupling frame.

A stackup of plastic and metal layers for laminating together to form a smartcard body may comprise, in the following order, a front plastic face card layer, a first metal coupling frame (CF-1) layer, an internal card dielectric layer (which may be adhesive), a metal second coupling frame (CF-2) layer, and a rear plastic face card layer. The coupling frame layers (CF-1, CF-2) and dielectric layer may first be laminated together as a "core" (or inlay), then subsequently the front and rear face card layers may be laminated to the core.

As may be disclosed herein, a conductive coupling frame (CF) may have two ends and may form an open loop or discontinuous metal layer, disposed surrounding and closely adjacent a transponder chip module (TCM), and substantially coplanar with an antenna structure (AS, CES, LES) in the transponder chip module (TCM). A metal card body (MCB) or a transaction card with a discontinuous metal layer having a slit (S) extending from a module opening (MO) to a periphery of the card body to function as a coupling frame (CF). The coupling frame (CF) may be thick enough to be non-transparent to RF at frequencies of interest. A switch may be provided to connect ends of the coupling frame (CF) across the slit (S). A reinforcing structure may be provided to stabilize a card body. The transponder chip module (TCM) may comprise a laser-etched antenna structure (LES), a chemical-etched antenna structure (CES) and a non-perforated contact pad (CP) arrangement. A coupling frame (CF) may be incorporated onto the module tape (MT) for a transponder chip module (TCM).

As disclosed herein, a smartcard (SC) may comprise an electrically-conductive layer, referred to herein as a "coupling frame" (CF) disposed in the card body (CB) around at least two sides (or 180°) of a transponder chip module (TCM) so as to be in close proximity with the module antenna (MA) in the transponder chip module (TCM). The coupling frame (CF) may at least partially surround the transponder chip module (TCM), such as surrounding two sides (or 180°) or three sides (or 270°) of the transponder chip module (TCM), particularly the antenna structure (AS) of the transponder chip module (TCM). This includes "at least" two sides and "at least" three sides. The coupling frame (CF) may nearly completely surround the transponder chip module (TCM), such as all four sides (or 360°) thereof, minus a slit (S). The slit (S) may be very small, such as 50 µm. (Such a small (50 µm) slit (S) may correspond to a fraction of a percent of the perimeter of the transponder chip module (TCM) or module opening (MO), or less than 1°.)

The module antenna (MA) may comprise an antenna structure (AS) which has been etched from a conductive layer or foil to have a conductor having two ends and arranged in a spiral pattern which has a number (such as 10-12) of turns (which may be referred to as "tracks"), separated by spaces. An end portion of an antenna structure (AS) may also comprise of a quarter, half or three quarter turn (fractions of turns).

A coupling frame (CF) surrounding all four sides (nearly 360°) of the transponder chip module (TCM) may be provided with a module opening (MO) for accommodating the transponder chip module (TCM), and may be provided with a slit (or slot, or cut-out, or gap) extending from the module opening (MO) to the perimeter of the coupling frame (CF). The slit ensures that the coupling frame (CF) is an "open loop" having two ends. A switch (SW) may be incorporated into the card body to connect the ends of the coupling frame (CF) together, so that it is not an open loop.

Generally, the coupling frame (CF) may comprise a conductive layer, a metallized layer, a metal layer or overlapping metal layers, each layer at least partially surrounding the transponder chip module (TCM) and (in aggregate, in the case of two or more conductive layers) covering at least a substantial area of the card body (CB) for coupling with an external contactless reader.

The coupling frame (CF) may comprise one or more discontinuous layers of conductive material in the form of a perforated metal mesh or a wireframe metal mesh, or other discontinuous surface (including embedded ribbon conductor) to avoid electrostatic discharge (ESD) problems.

A coupling frame (CF) with a cut-out (module opening MO) to accept the transponder chip module (TCM) may be positioned in or on the card body to partially surround at close proximity to a laser-etched antenna structure (LES) of the transponder chip module (TCM).

The coupling frames disclosed herein may be formed from layers of various metals (such as copper, aluminum (aluminium), brass, titanium, tungsten, stainless steel, silver, graphene, silver nanowires, conductive carbon ink), and may be in the form of ribbon cable, or the like, which could be hot stamped into a layer of the card.

The transponder chip module (TCM) may comprise an RFID (radio frequency identification) chip or chip module (either of which may be referred to as "CM") and an etched (typically planar) antenna structure formed as a flat rectangular spiral having a number (such as 10-12) of conductive tracks separated by spaces. Using laser etching, the spaces between adjacent tracks can be less than 100 μm, less than 75 μm, less than 50 μm and less than 25 μm. The tracks may typically have a width of 100 μm. Laser-etching an antenna structure or structures underneath and surrounding a chip (CM) mounted on a module tape (MT) may improve the overall electrical parameters of the antenna.

Laser etching of the antenna structure is an exemplary manufacture method. Any suitable method may be used for the module antenna, such as conventional chemical etching, Laser Direct Imaging, Selective Laser Induced Etching etc.

A coupling frame (CF), at least partially surrounding a transponder chip module (TCM) and residing substantially on the same plane as the laser-etched antenna structure (LES) in a card body, document or tag, without creating a closed circuit around the transponder chip module (TCM) by leaving at least one space or gap as an open circuit such as a cut-out, slit or slot in the coupling frame (CF), may further increase the amplitude of the resonance curve of the transponder chip module (TCM) with minimal frequency shift when interrogated by a reader. The activation distance of a transponder chip module (TCM) with a coupling frame (CF) may be substantially increased by at least a factor of 1.5, as opposed to the performance of a transponder chip module (TCM) without a coupling frame (CF). Activation distances of at least 2 cm, including up to 3 cm and up to 4 cm may be achieved using a transponder chip module (TCM) having a laser-etched antenna structure (LES) in conjunction with a coupling frame (CF) in (or comprising most of) the card body (CB).

Metal cards or composite metal cards in ISO card format (s), having a module opening (MO) for accommodating a transponder chip module (TCM) may be provided with a slit in the metal, in the manner of the coupling frame (CF) disclosed herein, to break the conductive path and create an open circuit (open loop) conductive structure surrounding the transponder chip module (TCM), thereby increasing the communication distance (e.g., activation distance, Read/Write distance, and the like) between an external reader and a smartcard with a transponder chip module (TCM). The slit can be filled or plugged with a non-conductive medium. The metal card or metal slug in a card body acting as the coupling frame can be made from materials such as copper, aluminum, tungsten, stainless steel, brass, titanium or a combination thereof.

Holographic metal foils, which may be transparent to high frequency electromagnetic waves and do not impair or influence the performance of a transponder chip module, may be implanted in a metal foil card because the thickness of the metal is significantly lower than the skin depth of the metal at a frequency of interest, such as 13.56 MHz, or more generally 10-30 MHz.

Security features, logos and embossed characters may be engraved, etched or stamped into a metal layer of suitable thickness to perform the function of a coupling frame (CF).

The disclosure herein may relate broadly to RFID transponders which are able to transmit data to and receive data from an external reader. Such transponders may generally fall into two categories—"active" and "passive". Active transponders have an internal power source, such as a battery. Passive transponders are powered by (harvest power from) the external reader.

Due to the lack of their own power source, several factors may influence the successful operation of a passive transponder, some of which are addressed herein. For example, the distance at which a passive transponder may be activated (powered up by) and communicate reliably (read/write) with the external reader may be very limited. Consequently, smart cards (SC) comprising passive transponders have typically required booster antennas (BA) in the card body (CB). In the main hereinafter, passive RFID transponders comprising (passive) transponder chip modules (TCM) are discussed, and unless otherwise specified, all embodiments are directed to passive RFID transponders and transponder chip modules (TCM). Passive RFID transponders and transponder chip modules (TCM) disposed in smart cards (SC) (including metal smart cards) and capable of operating in a contactless mode without requiring a booster antenna (BA) are disclosed herein.

As may be disclosed herein, generally, a conductive coupling frame (CF) may have two ends, may form an open loop, may be disposed surrounding and closely adjacent a transponder chip module (TCM), and may be substantially coplanar with an antenna structure (AS, LES) in the transponder chip module (TCM). A metal card body (MCB) may have a slit (S) extending from a module opening (MO) to a periphery of the card body to function as a coupling frame (CF). The coupling frame (CF) may be thick enough to be non-transparent (opaque) to RF at frequencies of interest. A switch may be provided to connect ends of the coupling frame (CF) across the slit (S). The transponder chip module (TCM) may comprise a laser-etched antenna structure (LES) and a non-perforated contact pad (CP) arrangement.

According to some examples disclosed herein, a smartcard (SC) may comprise: a metal layer (ML); and an opening (MO) in the metal layer for receiving a transponder chip module (TCM); characterized by: a discontinuity comprising a slit (S) or a non-conductive stripe (NCS), in the metal layer (ML), extending from the opening to a periphery of the metal layer (ML), whereby the metal layer (ML) comprises an open-loop coupling frame (CF) having two ends. The coupling frame may be disposed closely adjacent to the transponder chip module when the transponder chip module is disposed in the opening. A portion of the coupling frame (CF) may overlap a portion of an antenna structure (AS) in the transponder chip module (TCM). The coupling frame may extend over substantially the entire area of the smartcard. The metal layer may comprise a metal card body (MCB) of a metal smartcard.

The slit may extend completely through the metal layer. The slit may extend only partially through the metal layer, and remaining material of the metal layer below the slit has a thickness below a transparency threshold for the metal layer. The slit may have a width which is smaller than the opening. The slit may be at least partially filled with an electrically non-conducting material selected from the group consisting of polymer and epoxy resin, reinforced epoxy resin. A reinforcing structure (RS) disposed at a location of the slit (S) to reinforce the metal layer (ML).

The metal layer may be substantially coplanar with an antenna structure (AS) in the transponder chip module. The metal layer may comprise a material having a thickness greater than a transparency threshold for absorbing electromagnetic waves at a frequency of interest; may have a thickness greater than a skin depth for conducting electricity at a frequency of interest; may have a thickness greater than 1 μm; may have a thickness greater than 30 μm; and may have a thickness up to the total normal thickness of a smartcard. The metal layer may comprise a material selected from the group consisting of copper, aluminum (aluminium), brass, titanium, tungsten, stainless steel, silver, graphene, silver nanowires and conductive carbon ink. The metal layer may be disposed on a non-conductive layer by a process selected from the group consisting of silk screen printing and vapor deposition. The metal layer may comprise a mesh. The metal layer may comprise an engraving, embossing, or stamped feature/logo/ID which serves as a security feature for the smartcard.

A gap between an inner edge of the coupling frame and an outer feature of an antenna structure (AS) in the transponder chip module may be characterized by the gap is less than 300 μm. The gap may be approximately 50 μm.

The antenna structure (AS) in the transponder chip module may comprise a substantially planar, etched (chemically etched, or laser etched) structure having a number of tracks separated by spaces. The spaces between tracks may be less than 100 μm; less than 75 μm; less than 50 μm; less than 25 μm; and less than the width of a laser beam An activation distance for a transponder chip module disposed in the opening of the coupling frame may be at least 20 mm; at least 25 mm; at least 30 mm; at least 35 mm; up to 40 mm; and more than 40 mm.

A switch (SW) may be connected across ends of the coupling frame (CF). An LED may be connected across ends of the coupling frame (CF).

As may be disclosed herein, a coupling frame (CF) for a smartcard (SC) may comprise: a metal layer (ML) disposed in a card body (CB) of the smartcard and having two ends which are not connected with one another so that the metal layer (ML) forms an open loop coupling frame (CF) which is arranged to be closely adjacent and at least partially surround a transponder chip module (TCM) disposed in an opening (MO) in the metal layer (ML). The coupling frame may be substantially coplanar with an antenna structure (AS) in the transponder chip module. At least a portion of the coupling frame may overlap at least a portion of an antenna structure (AS) in the transponder chip module (TCM). The transponder chip module (TCM) may comprise an etched antenna structure (AS, LES). The module opening (MO) may be spaced from 50 μm to 300 μm from the etched antenna structure. The metal layer (ML) may have a thickness greater than a transparency threshold for a material of the metal layer (ML).

As may be disclosed herein, a method of enhancing coupling of a transponder chip module (TCM) with an external reader, wherein the transponder chip module is disposed in a card body (CB, MCB) of a smart card having a metal layer (ML) and comprises an antenna structure (AS), may be characterized by: forming the metal layer as a coupling frame (CF) closely adjacent to and surrounding the transponder chip module, wherein the coupling frame is formed as an open loop having two ends. The antenna structure may be formed by laser etching (resulting in a laser-etched antenna structure (LES)). The antenna structure (AS) may be a chemically-etched antenna structure. The coupling frame (CF) may be substantially coplanar with the antenna structure (AS). A gap between the two ends may be approximately 50 μm. The metal layer may have a thickness greater than a transparency threshold for a material of the metal layer.

In some of the descriptions contained herein, the module antenna (MA) or antenna structure (AS) in the transponder chip module (TCM) may be referred to as "laser-etched antenna structure (LES)", laser etching being one way of making the antenna structure (AS). Chemical etching is another way of making the antenna structure, resulting in a chemical-etched antenna structure (CES).

As may be disclosed herein, a smartcard (SC) may comprise a card body (CB, MCB) and a passive transponder chip module (TCM) disposed in the card body, may be characterized in that: an activation distance for the transponder chip module, without a booster antenna in the card body, is at least 2 cm, at least 3 cm or at least 4 cm.

The disclosure further relates to a coupling frame (CF) as a full metal card body partially surrounding a transponder chip module (TCM) with a slit, slot or gap to create an open circuit for capacitive coupling with a contactless reader. The coupling frame (CF) may have a window or stepped recess to accept the transponder chip module (TCM), and prepared through mechanical milling or laser ablation to leave a non-conductive area free behind the planar antenna of the transponder chip module (TCM), so as to avoid attenuation of the electromagnetic field. The opening or non-conductive area can be filled with a resin, colored polymer, magnetic particles, ferrite material or an active synthetic material which illuminates during an electronic transaction.

A metal card, or a single transaction card may comprise a discontinuous metal layer acting as a coupling frame, such as for example, titanium, stainless steel, brass, aluminum, etc.

A conductive coupling frame (CF) having two ends, forming an open loop having two ends or a discontinuous metal layer disposed surrounding and closely adjacent a transponder chip module (TCM, 610), and substantially coplanar with an antenna structure (AS, CES, LES) in the transponder chip module (TCM). A metal card body (MCB, CB) or a transaction card with a discontinuous metal layer having a slit (S) or a non-conductive strip (NCS, 1034) extending from a module opening (MO) to a periphery of the card body to function as a coupling frame (CF). The coupling frame (CF) may be thick enough to be non-transparent to RF at frequencies of interest. A switch (SW) may be provided to connect ends of the coupling frame (CF) across the slit (S, 630). A reinforcing structure (RS) may be provided to stabilize the coupling frame (CF) and card body (CB). The transponder chip module (TCM) may comprise an antenna structure which may be a laser-etched antenna structure (LES) or a chemical-etched antenna structure (CES), and may comprise and a non-perforated contact pad (CP) arrangement. A coupling frame (CF) may be incorporated onto the module tape (MT, CCT) for a transponder chip module (TCM).

As may be disclosed herein, a smartcard (SC) having at least a contactless interface, such as having a dual interface transponder chip module (TCM) with a chip (IC), a module antenna (MA) for the contactless interface, and contact pads (CP) for a contact interface. Metal layers (ML) may have openings (MO) for receiving the module, and slits (S) or nonconductive stripes (NCS) extending to the openings, thereby forming coupling frames (CF). A card body (CB) for the smartcard may comprise two such metal layers (front and rear coupling frames) separated by a layer of non-conductive (dielectric) material. A front face card layer and a rear face card layer may complete a multiple coupling frame stack-up for a smartcard. Various slit designs (configurations, geometries) are described and illustrated. The slit may be filled. The slit may be reinforced.

As may be disclosed herein, a smartcard may comprise: a transponder chip module comprising an RFID chip and an antenna; and a coupling frame; wherein the coupling frame comprises: a metal layer having a periphery (or outer edge); an opening (or inner edge) for receiving the transponder chip module; and a slit extending through the metal layer from the opening to the periphery; wherein at least a portion of the slit overlaps at least a portion of the antenna.

The slit (S) may be representative of any electrical discontinuity extending through the metal layer, including a nonconductive stripe. The opening may comprise a stepped recess The coupling frame may extend over substantially the entire area of the smartcard.

The metal layer may be a metal card body of a metal smartcard.

The metal layer may comprise a material selected from the group consisting of copper, aluminum, brass, titanium, tungsten, stainless steel, silver, graphene, silver nanowires and conductive carbon ink; a precious or high density metal selected from the group consisting of silver, titanium, tungsten or a high strength metal such as stainless steel; a metal alloy; and a non-precious metal plated with a precious metal.

The transponder chip module may be dual-interface, supporting both contactless and contact communication with external readers.

The slit may be filled to conceal the slit; the slit may be filled with a non-conductive material, including a material that illuminates when the smartcard is being interrogated by an external reader; the slit may be filled with a polymer, epoxy resin or similar material; the slit may be filled with a resin impregnated with metal beads, flakes or powder; and the slit may be filled to disguise the slit or to match or complement the visual decorative elements of the finished card.

The slit may be concealed by placement of a security hologram, logo or other feature At least one plastic layer may be disposed on at least one side of the metal layer with an adhesive layer therebetween; and in a laminating process, adhesive may flow into the slit, serving to stabilize the slit mechanically and prevent ingress of foreign particles and water into the slit.

A reinforcing insert (or structure or plate) may be disposed at (including around and covering) the location (area) of the slit in a recess (or thinned area) on an underside of the coupling frame. The reinforcing insert may extend beyond the slit; the reinforcing insert may bridge or straddle the slit; the reinforcing insert may comprise a non-conductive material; and the reinforcing insert may comprise a metal backing insert.

The card may be a solid metal card having a metal card body, and further comprising: a thinned (milled, recessed) area on the back of the card, at a location of and surrounding the slit; and a metal backing insert (MBI) corresponding in size to the thinned area (recess) on the back of the card body; wherein the MBI spans the slit and reinforces the card at the slit (thinned) area.

The thinned (slit) area may extend to the module opening (transponder area). The MBI may extend to the transponder area, and may have an opening and a slit. The slit may be oriented towards a center of the card body. The metal backing insert (MBI) may span the slit in the card body, and may be approximately half the thickness of the overall card. The metal backing insert (MBI) may cover the slit area and the transponder area, and the MBI may have a slit and no module opening. The metal card body may comprise two metal layers, a top layer having a slit, and a bottom layer having an open area (corresponding to the aforementioned milled-out area) for accepting the metal backing insert (MBI). A module cover module cover (MC) may be disposed on the back of the card. A module cover may be inserted into the opening. The metal card body and/or the MBI may be DLC black coated.

The coupling frame may have two slits, each extending from its inner edge to its outer edge, wherein the two slits are disposed on opposite sides of the opening.

The smartcard may further comprise: a second metal layer having an opening and a slit; wherein the slit of the second metal layer is offset from the slit of the metal layer.

The smartcard may further comprise: a front subassembly comprising a front clear overlay (plastic) layer and a front (plastic) printed core layer disposed on a front side of the card; and a rear subassembly comprising a rear printed core layer and a rear overlay disposed on a back side of the card.

The smartcard may be a hybrid metal card having a card body comprising metal, and the metal card body has one or more recesses in the front and/or rear face of the card, wherein: the recesses may be filled with implanted or laminated non-conductive filler materials such as ceramic, plastic, glass, wood, etc.

As may be disclosed herein, a smartcard may comprise: a transponder chip module comprising an RFID chip and an antenna; and a coupling frame; wherein the coupling frame comprises: a metal layer having a periphery (or outer edge); an opening (or inner edge) for receiving the transponder chip module; and a slit extending through the metal layer from the opening to the periphery; wherein the slit is characterized by at least one of: the slit is straight; the slit extends along any direction from the opening to the periphery; the slit extends from anywhere (or any position) on the inner edge (opening) to anywhere on the outer edge (periphery); the slit is disposed other than perpendicular to the outer edge (periphery); the slit is disposed diagonally with respect to the outer edge (periphery); and the slit is disposed at a 45° angle with respect to the outer edge (periphery).

At least a portion of the slit may overlap a at least a portion of the antenna.

As may be disclosed herein, a smartcard may comprise: a transponder chip module comprising an RFID chip and an antenna; and a coupling frame; wherein the coupling frame comprises: a metal layer having a periphery (or outer edge); an opening (or inner edge) for receiving the transponder chip module; and a slit extending through the metal layer from the opening to the periphery; wherein the slit is characterized by at least one of: at least a portion of the slit is other than straight; at least a portion of the slit is curved, or angled; at least a portion of the slit extends in a substantially non-linear path; at least a portion of the slit has a non-linear shape; at least a portion of the slit has a wave shape; at least a portion of the slit extends in a zigzag, sine-wave or S-bend path; at least a portion of the slit describes any shape, including spiral; at least a portion of the slit becomes wider or narrow along its length; at least a portion of the slit is L-shaped; at least a portion of the slit is T-shaped; at least a portion of the slit is stepped, with at least two 90° angles; the slit describes a path having 3×90° bends; and the slit describes a path having 4×90° bends.

As may be disclosed herein, generally, coupling frames (CF) are disclosed for smartcards (SC) having at least contactless capability, such as dual-interface (contact and contactless) cards. Openings (MO) for transponder chip modules (TCM) may have various non-rectangular shapes. Slits in the coupling frames may have various shapes, and may extend from anywhere in the opening to anywhere on the periphery (outer edge) of the coupling frame. The slit may be filled. A slit area of the coupling frame may be reinforced. The coupling frame may be one or more metal layers in the card. The coupling frame may constitute the entire card body. The coupling frame may be smaller than the overall card body.

As may be disclosed herein, a coupling frame for a smartcard may comprise: a metal layer having a periphery, an opening (MO) for receiving at least a portion of a transponder chip module (TCM), and a slit (S) extending from the opening to the periphery of the metal layer so that the metal layer functions as a coupling frame (CF); wherein: the metal layer extends from edge-to-edge of the smartcard; and the slit and opening are arranged so that the slit overlaps at least a portion of a module antenna (MA) of the transponder chip module. The slit may be straight, and may extend from any position of the opening, along any direction, to any position on the periphery. The opening may be a stepped recess.

The slit may have a non-straight shape.

The opening may have a non-rectangular shape.

The opening may have a rectangular shape, but may be "skewed" (rotated) so that not all four edges of the opening are parallel with the corresponding four sides of the periphery of the (rectangular) coupling frame. Such a skewed opening may need to be enlarged to accommodate a transponder chip module which is installed in its "normal" orientation, not skewed.

The slit may feature at least one of: the slit is filled to conceal the slit; the slit may be filled with a non-conductive material, including a material that illuminates when the smartcard is being interrogated by an external reader; the slit may be filled with a polymer, epoxy resin or similar material; and the slit may be filled to disguise the slit or to match or complement the visual decorative elements of the finished card.

The slit may be representative of any electrical discontinuity extending through the metal layer, including a non-conductive stripe.

The metal layer may constitute an entire metal card body (MCB) of a metal smartcard. The transponder chip module may be dual-interface (contact and contactless). The coupling frame may extend over substantially the entire area of the smartcard. The metal layer may feature at least one of: the metal layer comprises a material selected from the group consisting of copper, aluminum, brass, titanium, tungsten, stainless steel, silver, graphene, silver nanowires and conductive carbon ink; the metal layer comprises a precious or high density metal selected from the group consisting of silver, titanium, tungsten or a high strength metal such as stainless steel; the metal layer comprises a metal alloy; and the metal layer comprises a non-precious metal plated with a precious metal.

A reinforcing insert (or structure or plate) may be disposed at (including around and covering) the location (area) of the slit in a recess (or thinned area) on an underside of the coupling frame.

An LED may be connected to the coupling frame. With the coupling frame incorporated into a smartcard, the slit (S) and/or an area beneath and around the transponder chip module (TCM) may be filled with a material which allows light emitted by the LED to be visible to a user of the smartcard.

The coupling frame may be incorporated into a smartcard further comprising: a front subassembly comprising a front clear overlay (plastic) layer and a front (plastic) printed core layer disposed on a front side of the card; and a rear subassembly comprising a rear printed core layer and a rear overlay disposed on a back side of the card.

The coupling frame may be incorporated into a smartcard which is a hybrid metal card having a card body comprising metal, and the metal card body may have one or more recesses in the front and/or rear face of the card; and the recesses may be filled with implanted or laminated non-conductive filler materials such as ceramic, plastic, glass, wood, etc.

As may be disclosed herein, a smartcard may comprise: at least one metal layer having a periphery, an opening (MO) for receiving at least a portion of a transponder chip module (TCM), and a slit (S) extending from the opening to the periphery of the metal layer so that the metal layer functions as a coupling frame (CF); wherein: the slit and opening are arranged so that the slit overlaps at least a portion of a module antenna (MA) of the transponder chip module; and at least one of (i) the slit has a non-straight shape and (ii) the opening has a non-rectangular shape. There may be two metal layers (M1, M2), and the slit of one metal layer may have a shape which is different than the slit of the other metal layer. There may be two metal layers (M1, M2), and the opening of one metal layer may have a shape which is different than the opening of the other metal layer.

In their various embodiments, the invention(s) described herein may relate to industrial and commercial industries, such RFID applications, payment smartcards, electronic passports, identity cards, access control cards, wearable devices the like.

Other objects, features and advantages of the invention(s) disclosed herein may become apparent in light of the following illustrations and descriptions thereof.

Claims of U.S. Ser. No. 16/742,903 filed 14 Jan. 2020

The claims of U.S. Ser. No. 16/742,903 may have included the following:

1. A smartcard comprising:
    a transponder chip module comprising an RFID chip and an antenna; and
    a coupling frame;
    wherein the coupling frame comprises:
    a metal layer having a periphery (or outer edge);
    an opening (or inner edge) for receiving the transponder chip module; and
    a slit extending through the metal layer from the opening to the periphery;
    wherein at least a portion of the slit overlaps at least a portion of the antenna.
2. The smartcard of claim 1, wherein:
    the slit is representative of any electrical discontinuity extending through the metal layer, including a nonconductive stripe.

3. The smartcard of claim 1, wherein:
   the coupling frame extends over substantially the entire area of the smartcard.
4. The smartcard of claim 1, wherein:
   the metal layer comprises a metal card body of a metal smartcard.
5. The smartcard of claim 1, wherein:
   the opening comprises a stepped recess.
6. The smartcard of claim 1, wherein at least one of:
   the metal layer comprises a material selected from the group consisting of copper, aluminum, brass, titanium, tungsten, stainless steel, silver, graphene, silver nanowires and conductive carbon ink;
   the metal layer comprises a precious or high density metal selected from the group consisting of silver, titanium, tungsten or a high strength metal such as stainless steel;
   the metal layer comprises a metal alloy; and
   the metal layer comprises a non-precious metal plated with a precious metal.
7. The smartcard of claim 1, wherein:
   the transponder chip module is dual-interface, supporting both contactless and contact communication with external readers.
8. The smartcard of claim 1, wherein at least one of:
   the slit is filled to conceal the slit;
   the slit is filled with a non-conductive material, including a material that illuminates when the smartcard is being interrogated by an external reader;
   the slit is filled with a polymer, epoxy resin or similar material; and
   the slit is filled to disguise the slit or to match or complement the visual decorative elements of the finished card.
9. The smartcard of claim 1, further comprising:
   at least one plastic layer is disposed on at least one side of the metal layer with an adhesive layer therebetween; and
   in a laminating process, adhesive flows into the slit, serving to stabilize the slit mechanically and prevent ingress of foreign particles and water into the slit.
10. The smartcard of claim 1, wherein
    the slit is concealed by placement of a security hologram, logo or other feature
11. The smartcard of claim 1, further comprising:
    a reinforcing insert (or structure or plate) disposed at (including around and covering) the location (area) of the slit in a recess (or thinned area) on an underside of the coupling frame.
12. The smartcard of claim 11, wherein at least one of:
    the reinforcing insert extends beyond the slit;
    the reinforcing insert bridges or straddles the slit;
    the reinforcing insert comprises a non-conductive material; and
    the reinforcing insert comprises a metal backing insert.
13. The smartcard of claim 1, wherein the card is a solid metal card having a metal card body, and further comprising:
    a thinned (milled, recessed) area on the back of the card, at a location of and surrounding the slit; and
    a metal backing insert (MBI) corresponding in size to the thinned area (recess) on the back of the card body;
    wherein the MBI spans the slit and reinforces the card at the slit (thinned) area.
14. The smartcard of claim 1, wherein:
    the coupling frame has two slits, each extending from its inner edge to its outer edge;
    wherein the two slits are disposed on opposite sides of the opening.
15. The smartcard of claim 1, further comprising:
    a second metal layer having an opening and a slit;
    wherein the slit of the second metal layer is offset from the slit of the metal layer.
16. The smartcard of claim 1, further comprising:
    a front subassembly comprising a front clear overlay (plastic) layer and a front (plastic) printed core layer disposed on a front side of the card; and
    a rear subassembly comprising a rear printed core layer and a rear overlay disposed on a back side of the card.
17. The smartcard of claim 1, wherein:
    the smartcard is a hybrid metal card having a card body comprising metal, and the metal card body has one or more recesses in the front and/or rear face of the card;
    the recesses are filled with implanted or laminated non-conductive filler materials such as ceramic, plastic, glass, wood, etc.
18. A smartcard comprising:
    a transponder chip module comprising an RFID chip and an antenna; and
    a coupling frame;
    wherein the coupling frame comprises:
    a metal layer having a periphery (or outer edge);
    an opening (or inner edge) for receiving the transponder chip module; and
    a slit extending through the metal layer from the opening to the periphery;
    wherein the slit is characterized by at least one of:
    the slit is straight;
    the slit extends along any direction from the opening to the periphery;
    the slit extends from anywhere (or any position) on the inner edge (opening) to anywhere on the outer edge (periphery);
    the slit is disposed other than perpendicular to the outer edge (periphery);
    the slit is disposed diagonally with respect to the outer edge (periphery); and
    the slit is disposed at a 45° angle with respect to the outer edge (periphery).
19. The smartcard of claim 18, wherein:
    at least a portion of the slit overlaps a at least a portion of the antenna
20. A smartcard comprising:
    a transponder chip module comprising an RFID chip and an antenna; and
    a coupling frame;
    wherein the coupling frame comprises:
    a metal layer having a periphery (or outer edge);
    an opening (or inner edge) for receiving the transponder chip module; and
    a slit extending through the metal layer from the opening to the periphery;
    wherein the slit is characterized by at least one of:
    at least a portion of the slit is other than straight;
    at least a portion of the slit is curved, or angled;
    at least a portion of the slit extends in a substantially non-linear path;
    at least a portion of the slit has a non-linear shape;
    at least a portion of the slit has a wave shape;
    at least a portion of the slit extends in a zigzag, sine-wave or S-bend path;
    at least a portion of the slit describes any shape, including spiral;

at least a portion of the slit becomes wider or narrow along its length;

at least a portion of the slit is L-shaped;

at least a portion of the slit is T-shaped;

at least a portion of the slit is stepped, with at least two 90 angles;

the slit describes a path having 3×90° bends; and the slit describes a path having 4×90° bends.

BRIEF DESCRIPTION OF THE DRAWINGS

Reference will be made in detail to embodiments of the disclosure, non-limiting examples of which may be illustrated in the accompanying drawing figures (FIGs). The figures may generally be in the form of diagrams. Some elements in the figures may be exaggerated, others may be omitted, for illustrative clarity. Some figures may be in the form of diagrams.

Although the invention may be described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein. Some elements may be referred to with letters ("CM", "CF", "MT", "TCM", "LES", "CB", "MO", "S", and the like), rather than or in addition to numerals.

FIGS. 1-7 May Correspond with Figures in US 20140361086

FIG. 1 is a diagram, in cross-section, of a dual-interface smart card (SC) and readers.

FIG. 8 is a diagram, in perspective exploded view, illustrating a full metal card body (CB) with an opening (MO) for a transponder chip module (TCM), and a slit (S) extending from the opening (MO) to a periphery of the card body (CB).

FIG. 9 is a diagram, in plan view, illustrating a metal/plastic hybrid card body (CB) with an opening (MO) for a transponder chip module (TCM), with a metal slug (MS) and one or more plastic layers surrounding the metal slug (MS).

FIG. 10 is a diagram, in plan view, illustrating a metal card body CB) with an opening (MO) for a transponder chip module (TCM), and a non-conductive strip (NCS) extending from the opening (MO) to a periphery of the card body (CB).

FIG. 11 is a plan view of a transponder chip module (TCM) which has a coupling frame (CF) incorporated on its module tape (MT) or chip carrier tape (CCT).

FIGS. 12-40 May Correspond with Figures in Other Parent Applications

FIGS. 13A-1, 13A-2 are detailed views of the ends the coupling frame (CF) shown in FIG. 13A.

FIG. 17 is a diagram (plan view) of a coupling frame (CF) for an RFID device such as a smart card, having overlapping ends at the position of the slit.

FIG. 21 is an illustration of a payment object in the form of a metal charm that is designed to operate as a coupling frame in conjunction with a transponder chip module.

FIG. 28 is a partially exploded close-up diagrammatic view of a plastic-metal-plastic hybrid smartcard featuring a metal core having two coupling frames (CFs), one coupling frame (CF1) with slit (S) and module opening (MO) and the second coupling frame (CF2) with an extended slit (S2) as part of a lamination subassembly (SAS).

FIG. 29 is a partially exploded diagrammatic view of the layers of a plastic-metal-plastic hybrid smartcard featuring a metal core having two coupling frames (CFs) with slit (S) and module openings (MOs) as part of a lamination subassembly (SAS).

FIG. 30 is a cross sectional view of a metal layer (ML) with slit (S) which has been laminated to adjacent layers of a smartcard stack using adhesive layers, showing a magnified view of the region near the slit (S).

FIG. 31 (A,B,C) is a diagram, in cross-section (exploded, and partially perspective), of a smartcard showing a lay-up (or stacking) of layers for a smart card construction. Under that are two exploded perspective views of the smartcard. A transponder chip module (TCM) for inserting in openings (or recesses) in the layers of the smartcard is shown.

FIG. 32 (A,B,C) is a diagram, in cross-section (exploded, and partially perspective), of a smartcard showing a lay-up (or stacking) of layers for a smart card construction. Under that are two exploded perspective views of the smartcard. A transponder chip module (TCM) for inserting in openings (or recesses) in the layers of the smartcard is shown.

FIG. 33 (A,B,C) is a diagram, in cross-section (exploded, and partially perspective), of a smartcard showing a lay-up (or stacking) of layers for a smart card construction. Under that are two exploded perspective views of the smartcard. A transponder chip module (TCM) for inserting in openings (or recesses) in the layers of the smartcard is shown.

FIG. 36 shows an unloaded coupling frame tuned by the introduction of a capacitor across the slit.

FIG. 37 shows a coupling frame with the slit protruding from the window opening (cut-out) to the right perimeter edge and a capacitor connected across the slit at a tapping position.

FIG. 38 shows a coupling frame with a slit protruding from the window up (cut-out) to the right perimeter edge with a capacitor connected at the end of the slit.

FIG. 39 shows an ID-1 format coupling frame illustrating connection points for capacitor.

FIG. 40 shows an RFID device consisting of stack of ID-1 format coupling frames, with capacitor on one coupling frame.

FIGS. 1-40 were presented in Ser. No. 16/742,903 filed 14 Jan. 2020, and in other parent applications as may be noted hereinbelow ("FIGS. 1-40 may correspond with figure in some parent applications, as follows:"), with the exception of FIG. 1A which corresponds with FIG. 1A of US 20150136858

FIGS. 41-50 are "new" to this application, and may show various slit shapes which were described (but not shown) in some of the parent applications, the relevant text of which may be presented in the DETAILED DESCRIPTION (of FIGS. 1-40) set forth hereinbelow.

FIG. 41 is a diagram (plan view) of a coupling frame (CF) for a smartcard. A transponder chip module (TCM) is shown which will be disposed into a module opening (MO) in the coupling frame.

FIG. 48 is a diagram (perspective view, exploded) of a transaction card, corresponding with FIG. 35C of US 2019/0236434.

FIG. 50 is a diagram (plan view) of a smartcard (SC) having a coupling frame (CF) which is smaller than a card body (CB) of the smartcard (SC), according to an embodiment of the invention.

FIGS. 1-40 may correspond with figures in some parent applications, as follows:

FIGS. 1-7 may correspond with FIGS. 1-7 of US 20140361086

FIG. 1A may correspond with FIG. 1A of US 20150136858

FIG. 8 may correspond with FIG. 8 of US 20150021403
FIG. 9 may correspond with FIG. 9 of US 20150021403
FIG. 10 may correspond with FIG. 10 of US 20150021403
FIG. 11 may correspond with FIG. 11 of US 20150021403
FIGS. 11A,B may correspond with FIGS. 11C,D of US 20150021403
FIG. 12A may correspond with FIG. 5I of US 20150269474
FIG. 12B may correspond with FIG. 5J of US 20150269474
FIG. 13A may correspond with FIG. 3A of US 20150136858
FIGS. 13A-1,13A-2 may correspond with FIGS. 3A-1, 3A-2 of US 20150136858
FIG. 13B may correspond with FIG. 3D of US 20150136858 (FIG. 3D is missing from publication. See U.S. Pat. No. 9,390,364)
FIG. 13C may correspond with FIG. 3E of US 20150136858
FIG. 13D may correspond with FIG. 3F of US 20150136858
FIG. 14A may correspond with FIG. 10C of US 20160365644
FIG. 14B may correspond with FIG. 10D of US 20160365644
FIG. 15A may correspond with FIG. 2A of US 20160110639
FIG. 15B may correspond with FIG. 2B of US 20160110639
FIG. 16A may correspond with FIG. 3A of US 20160110639

FIG. 16B may correspond with FIG. 3B of US 20160110639

FIG. 16C may correspond with FIG. 3C of US 20160110639

FIG. 16D may correspond with FIG. 3D of US 20160110639

FIG. 17 may correspond with FIG. 4 of US 20160110639

FIG. 18A may correspond with FIG. 5A of US 20160110639

FIG. 19A may correspond with FIG. 11A of US 20160110639

(FIGS. 11A,B are missing from publication. See U.S. Pat. No. 9,697,459)

FIG. 19C may correspond with FIG. 11C of US 20160110639

FIG. 20A may correspond with FIG. 13A of US 20160110639

FIG. 21 may correspond with FIG. 16 of US 20160110639

FIG. 22A may correspond with FIG. 21A of US 20160110639

FIG. 22B may correspond with FIG. 21B of US 20160110639

FIG. 22C is new, and shows the coupling frame of FIG. 22A rotated 20°.

FIG. 23A may correspond with FIG. 15A of US 20170017871

FIG. 23B may correspond with FIG. 15B of US 20170017871

Figure 16A:
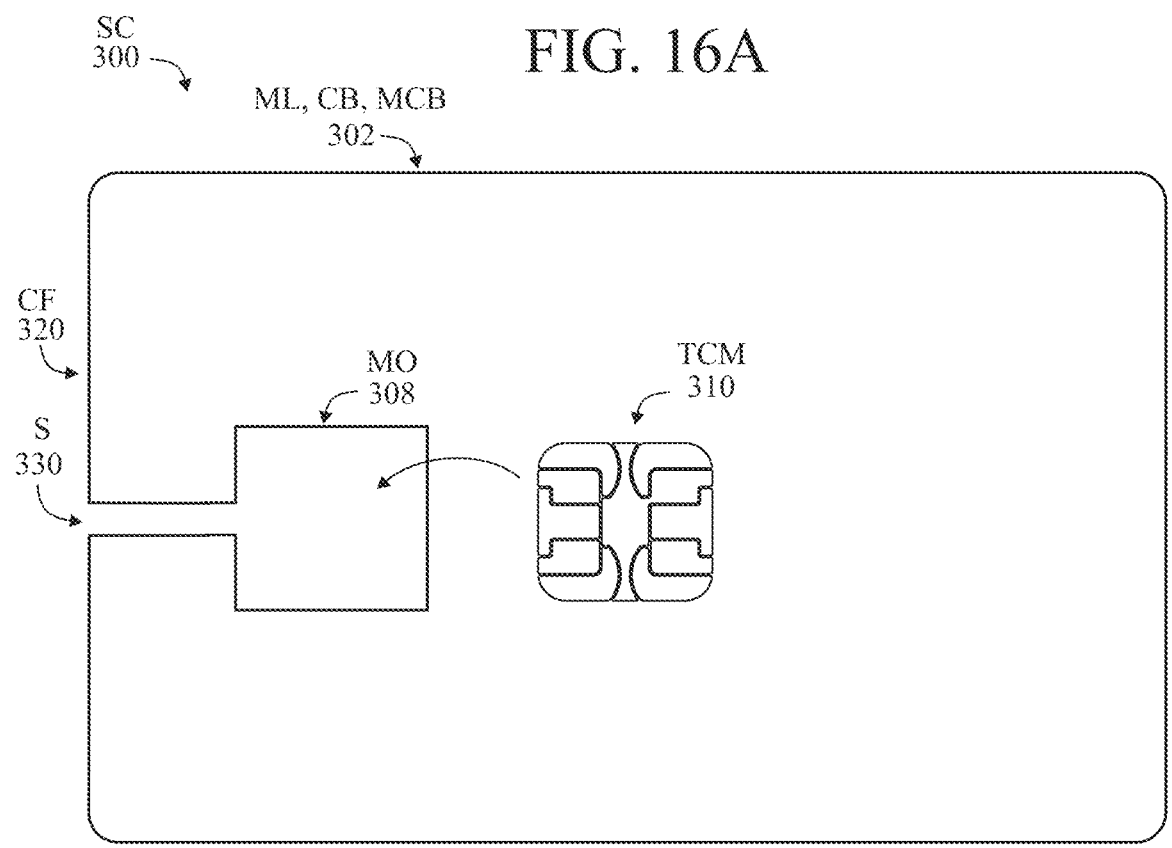
FIG. 16A is a diagrammatic view of a front surface of a smart card (SC) which may be a metal card or composite metal card having a slit(S) to function as a coupling frame (CF).
Figure 24A:
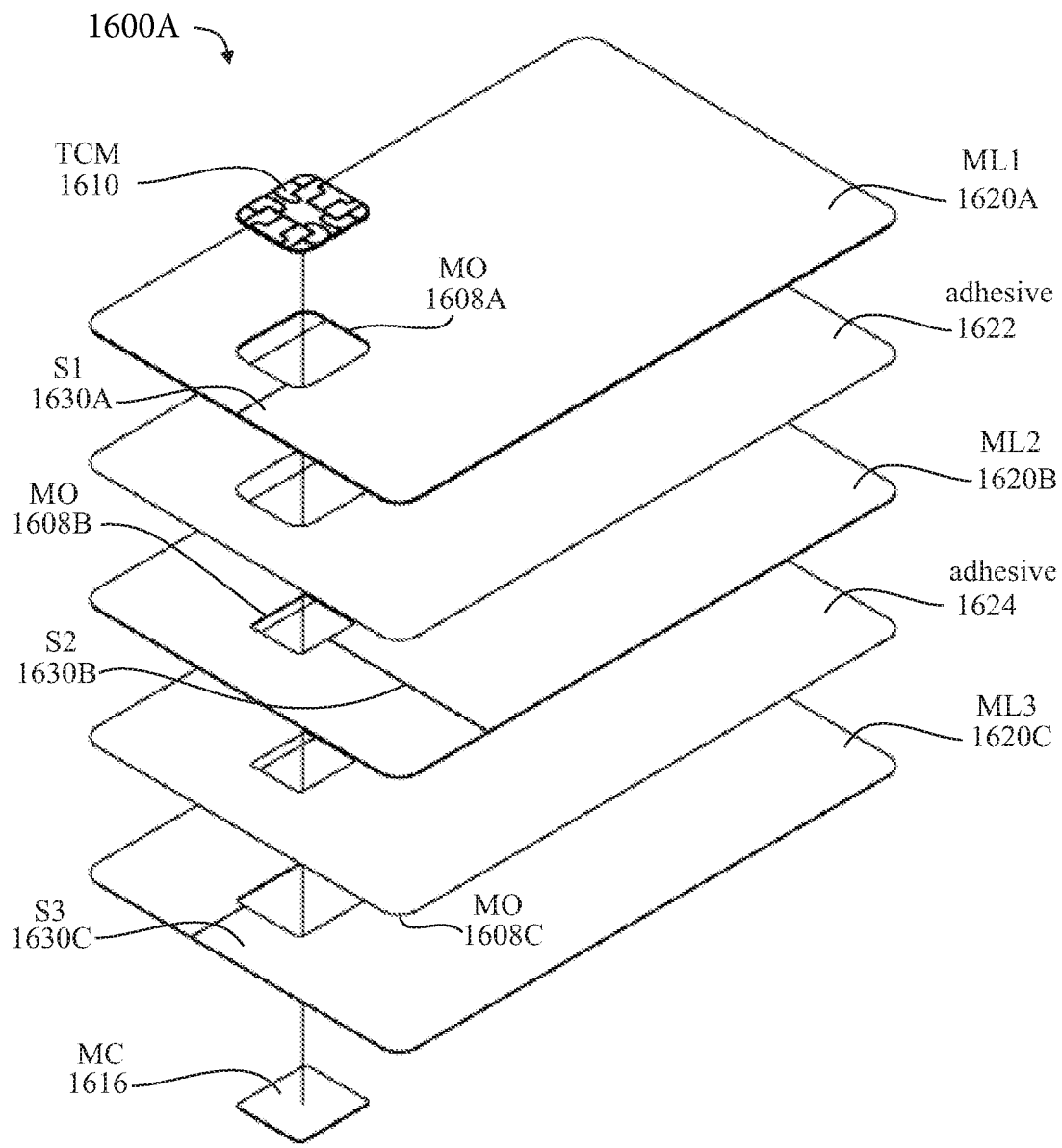
FIG. 24A is a diagram (exploded perspective view) of a metal laminated smartcard (RFID device).

FIG. 24A may correspond with FIG. 16A of US 20170017871

Figure 16B:
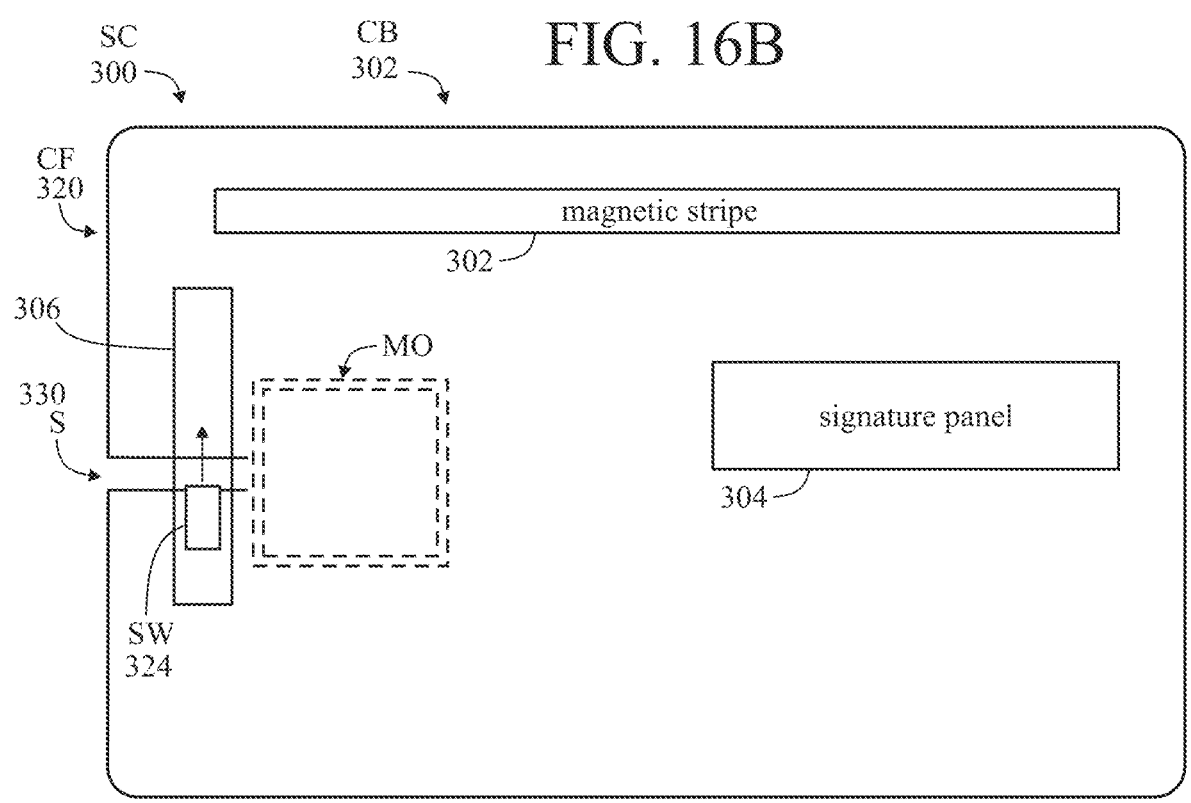
FIG. 16B is a plan view of the back side of the smart card shown in FIG. 3A, showing incorporating a switch to short out the slit (S) in the card body (CB).
Figure 24B:
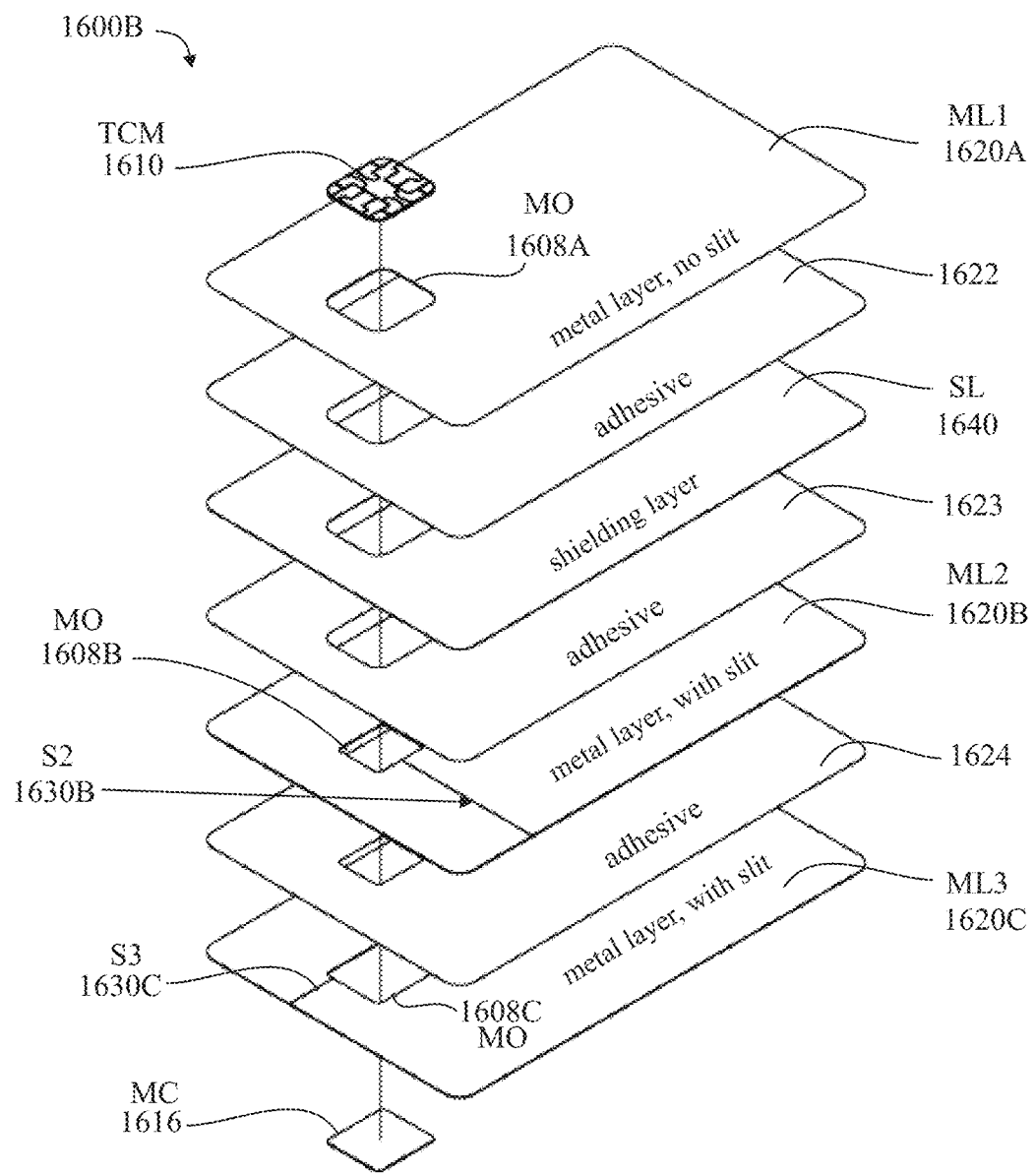
FIG. 24B is a diagram (exploded perspective view) of a shielded metal laminated

FIG. 24B may correspond with FIG. 16B of US 20170017871

Figure 18A:
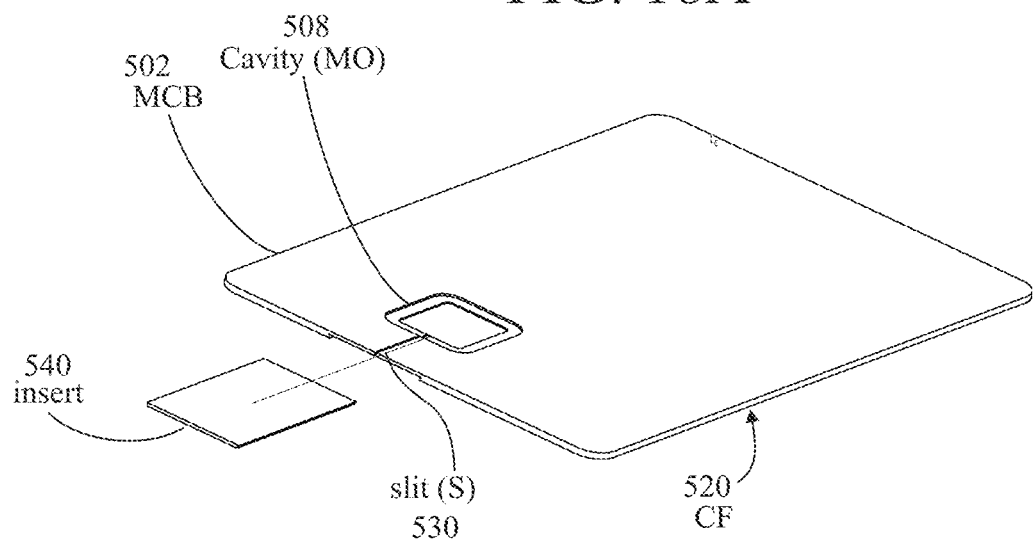
FIGS. 18A,B are two perspective views (front and back) of a metal card body MCB having a cavity (MO) for a transponder chip module (TCM, not shown), and a slit S extending from the cavity to an outer edge of the metal card body.
Figure 25A:
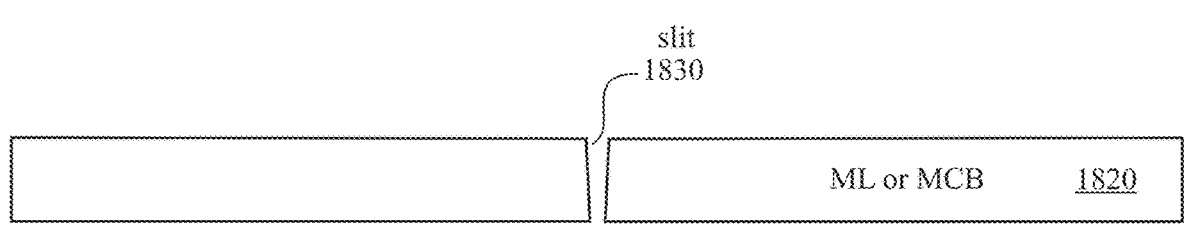
FIG. 25A is a diagrammatic view (cross-sectional view) of a metal layer or card body with a slit.

FIG. 25A may correspond with FIG. 18A of US 20170017871

Figure 18B:
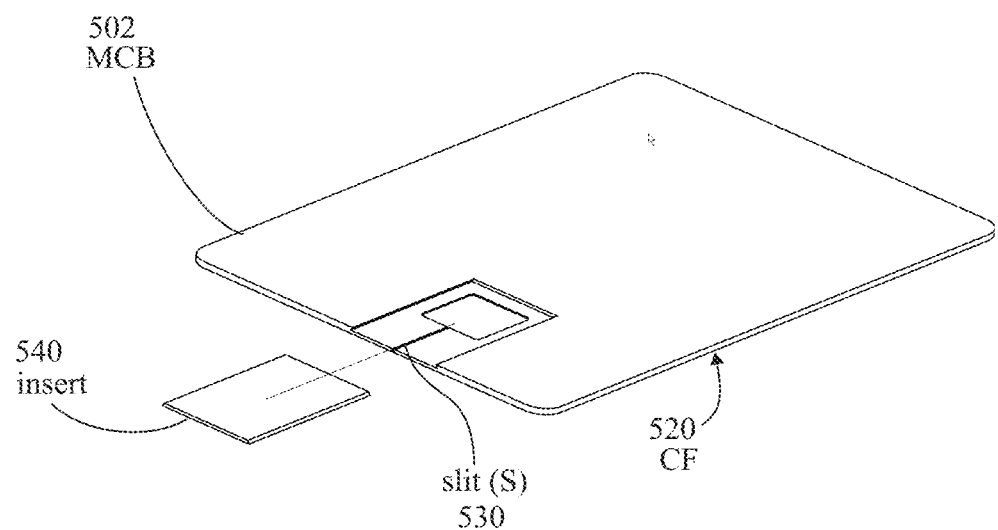
FIG. 18B may correspond with FIG. 5B of US 20160110639
Figure 25B:
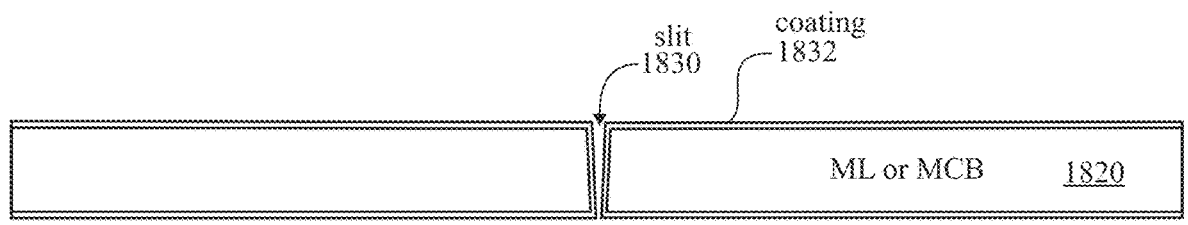
FIG. 25B is a diagrammatic view (cross-sectional view) of the metal layer or card body of FIG. 25A after coating.

FIG. 25B may correspond with FIG. 18B of US 20170017871

Figure 19A:
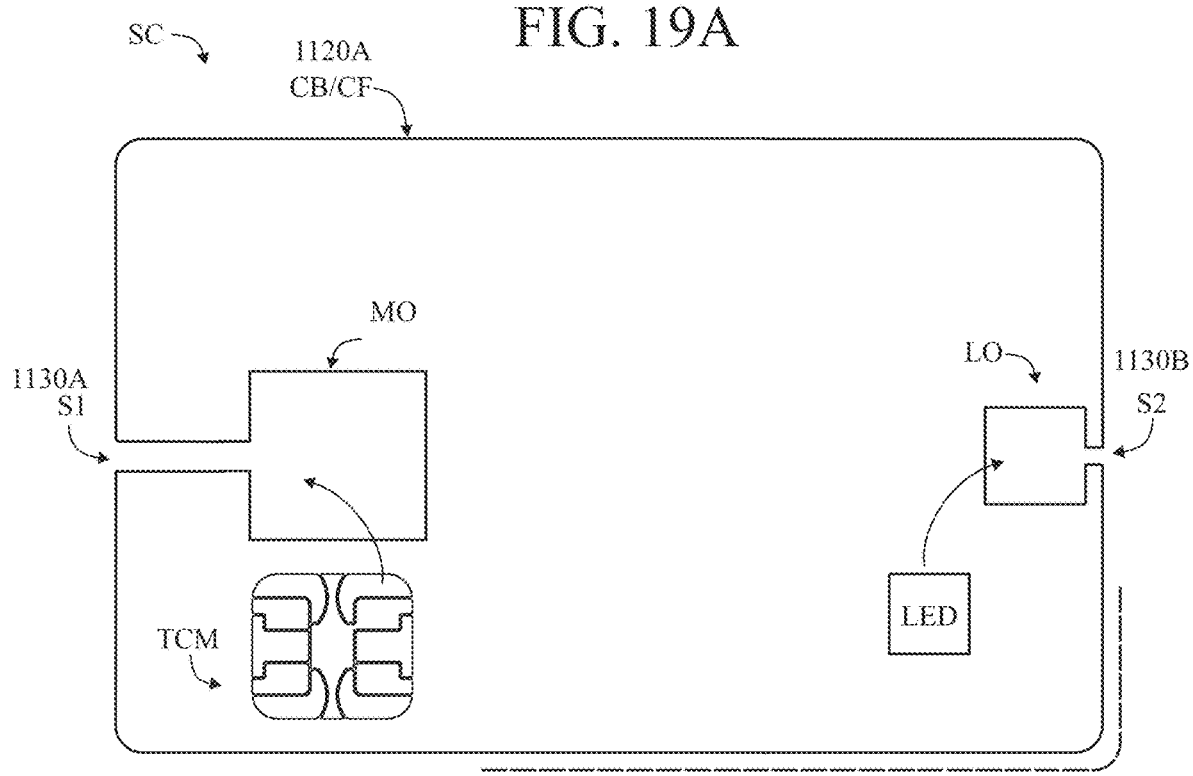
FIGS. 19A, B, C are diagrams (plan views) of smart cards (exemplary of payment objects) having a transponder chip module with a coupling frame for capacitively coupling with an external reader, and an LED (or LED module) in the same coupling frame (FIG. 19A), or in a separate coupling frame (FIG. 19B), or connected with an antenna (FIG. 19C).
Figure 26A:
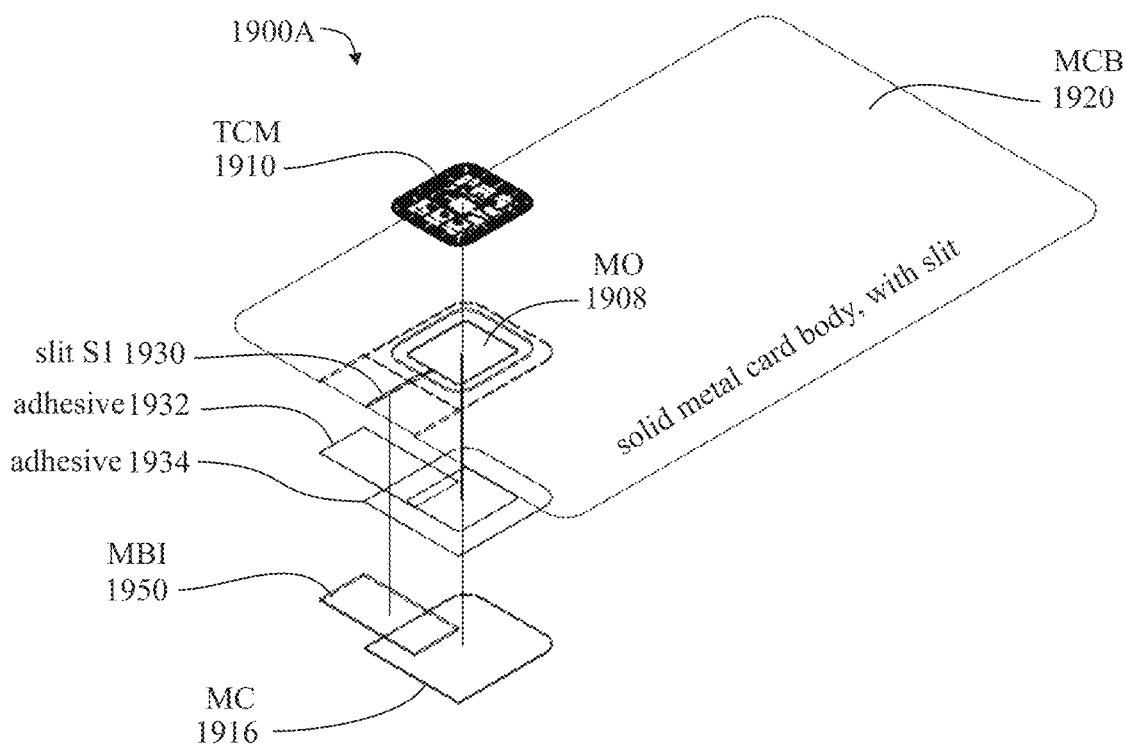
FIG. 26A is a diagrammatic view (perspective exploded view) of a solid metal card (RFID device).

FIG. 26A may correspond with FIG. 19A of US 20170017871

Figure 19B:
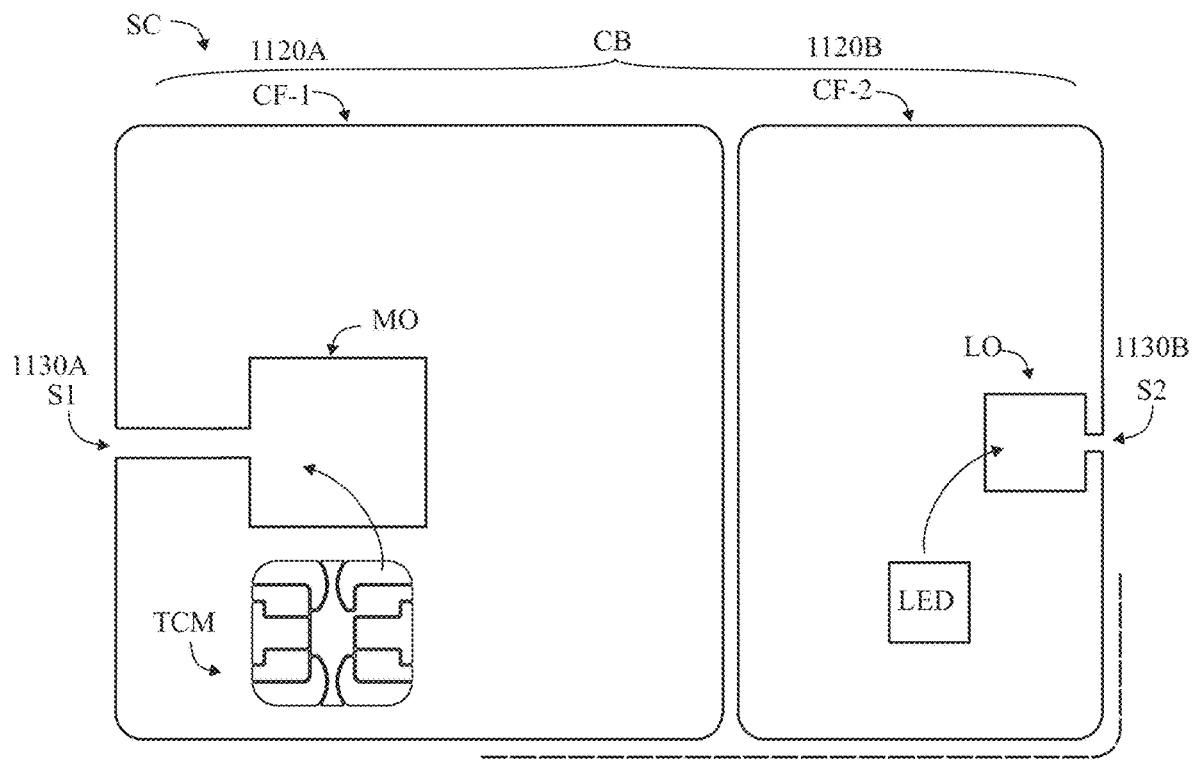
FIG. 19B may correspond with FIG. 11B of US 20160110639
Figure 26B:
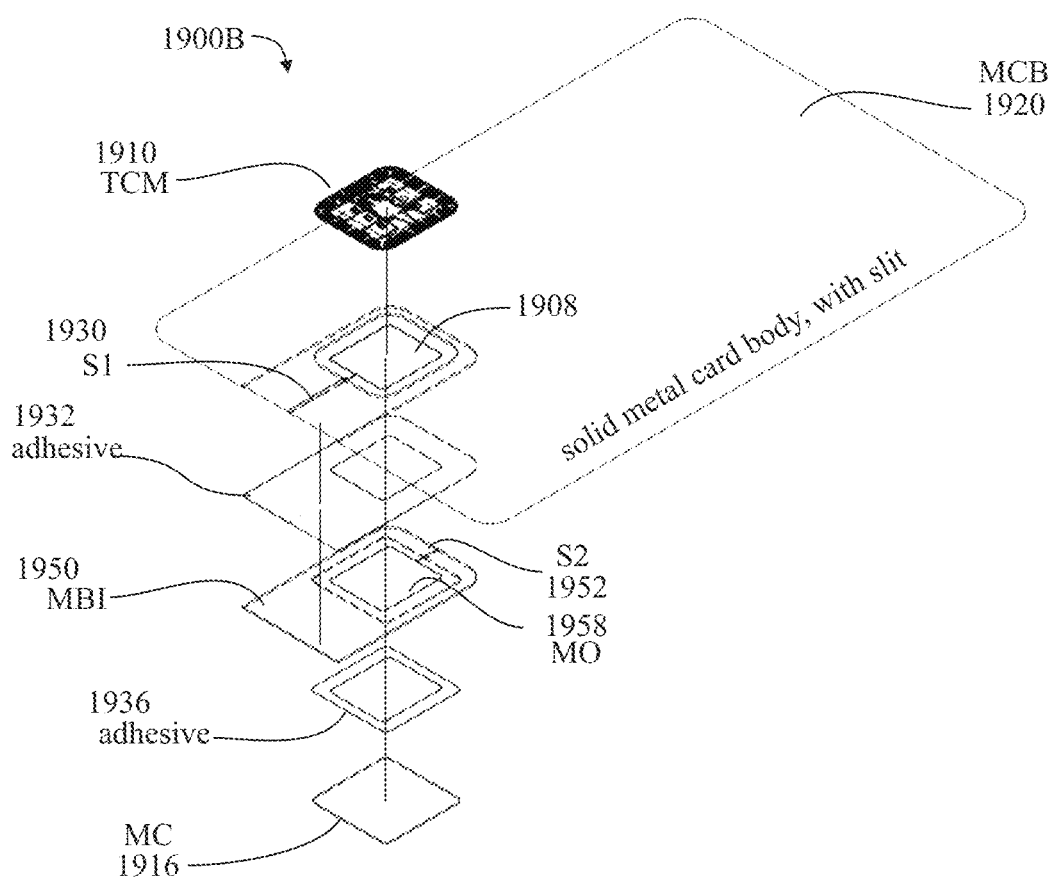
FIG. 26B is a diagrammatic view (perspective exploded view) of a solid metal card (RFID device).

FIG. 26B may correspond with FIG. 19B of US 20170017871

Figure 26C:
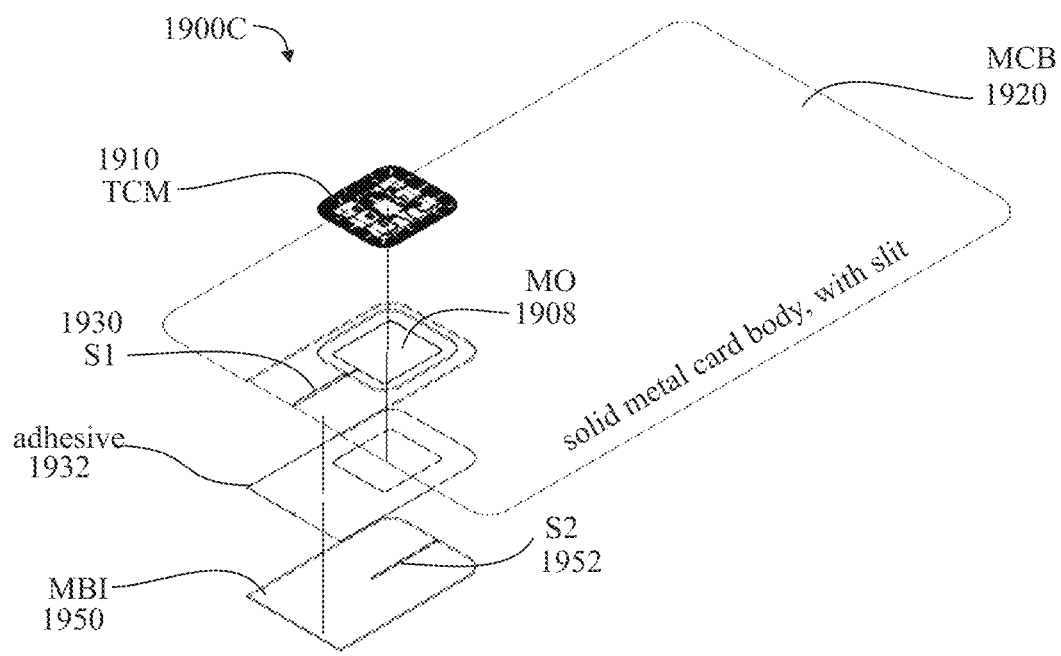
FIG. 26C is a diagrammatic view (perspective exploded view) of a solid metal card (RFID device).

FIG. 26C may correspond with FIG. 19C of US 20170017871

Figure 20A:
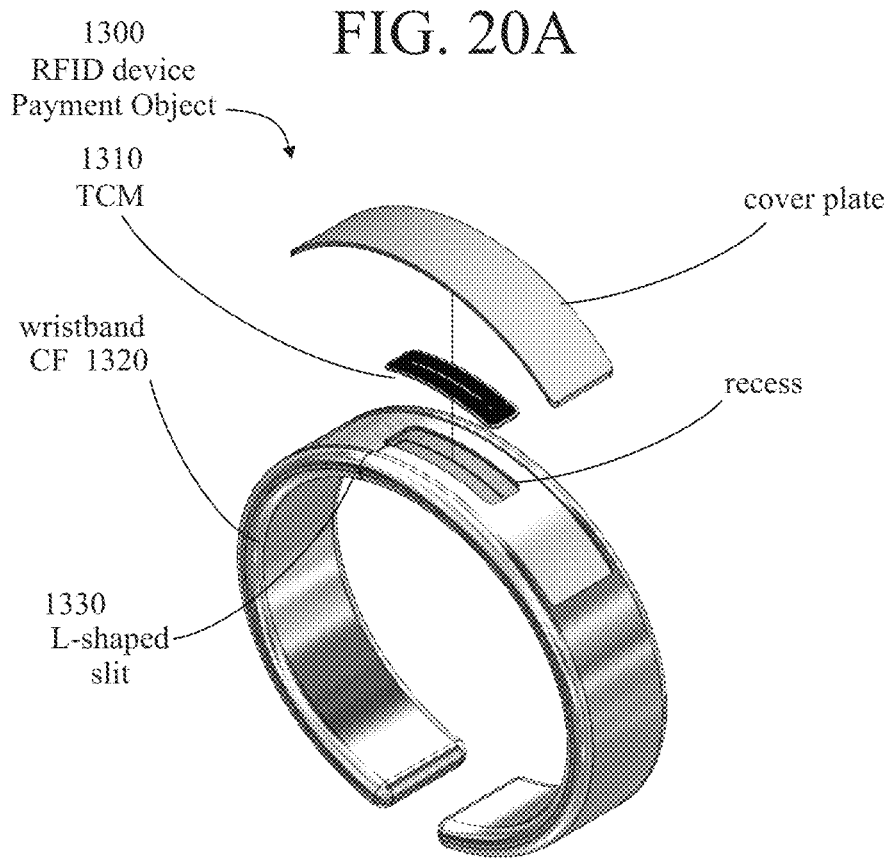
FIG. 20A (perspective view) and 20B (top plan view) shows a payment object in the form of a bracelet having a wristband with an L-shaped slit to function as a coupling frame.
Figure 27A:
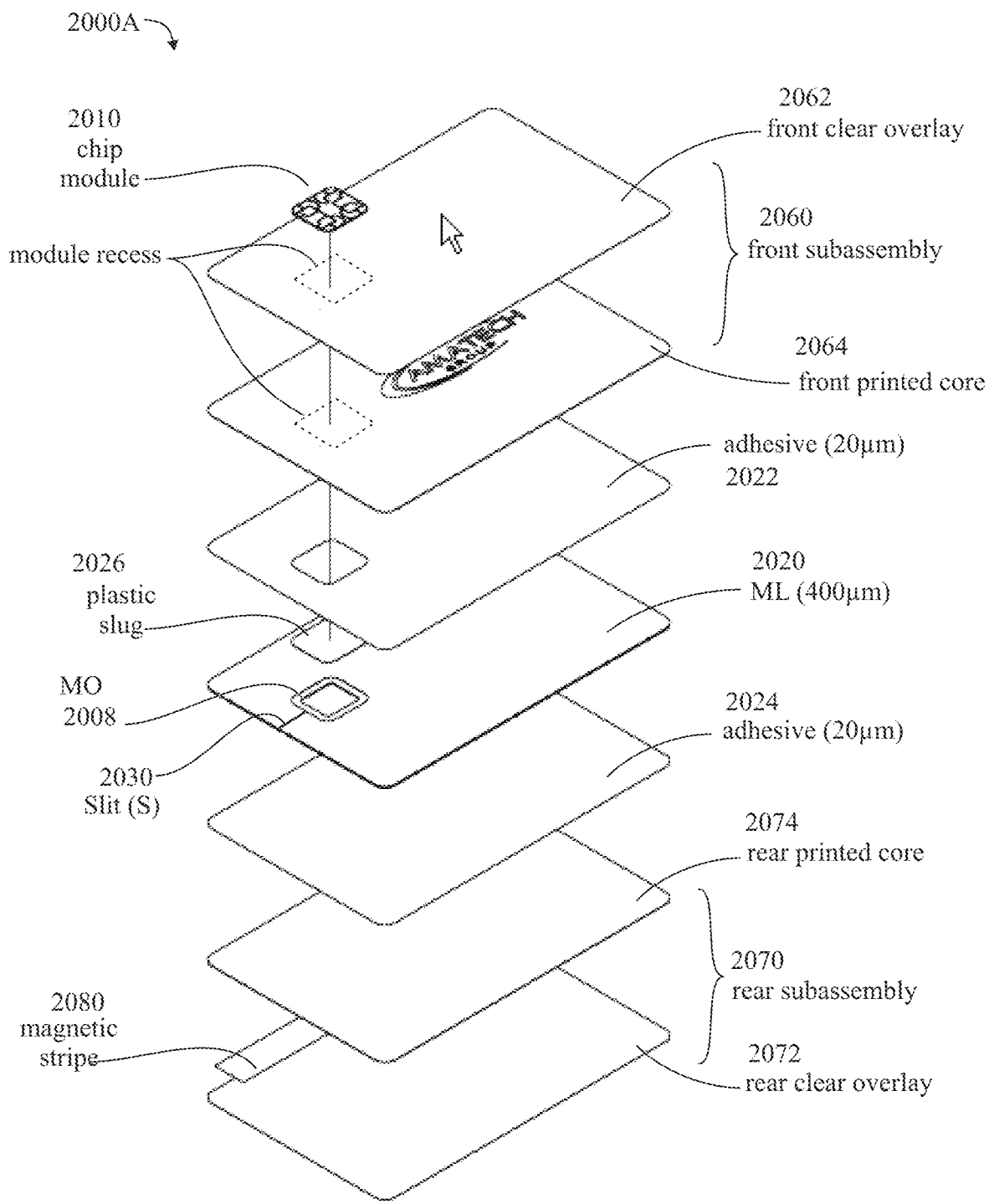
FIG. 27A is a diagram (exploded perspective view) of a DIF "Plastic-Metal-Plastic" Hybrid Card, before lamination. A chip module is shown for insertion into the card.

FIG. 27A may correspond with FIG. 20A of US 20170017871

Figure 20B:
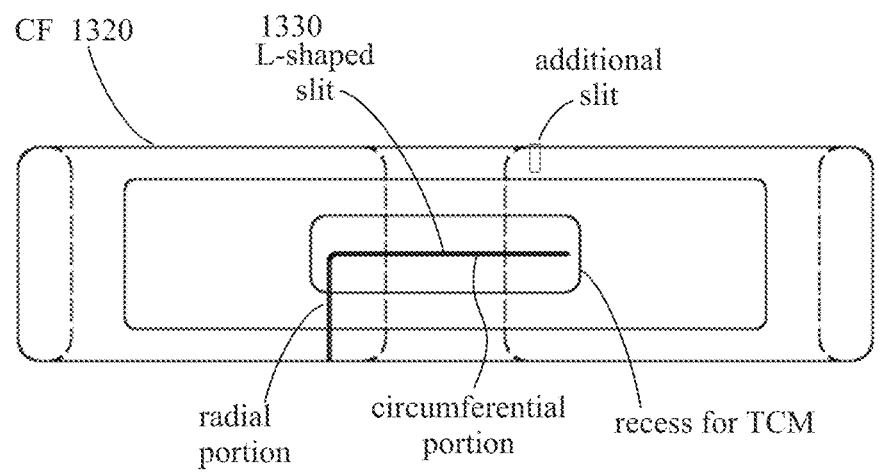
FIG. 20B may correspond with FIG. 13B of US 20160110639
Figure 27B:
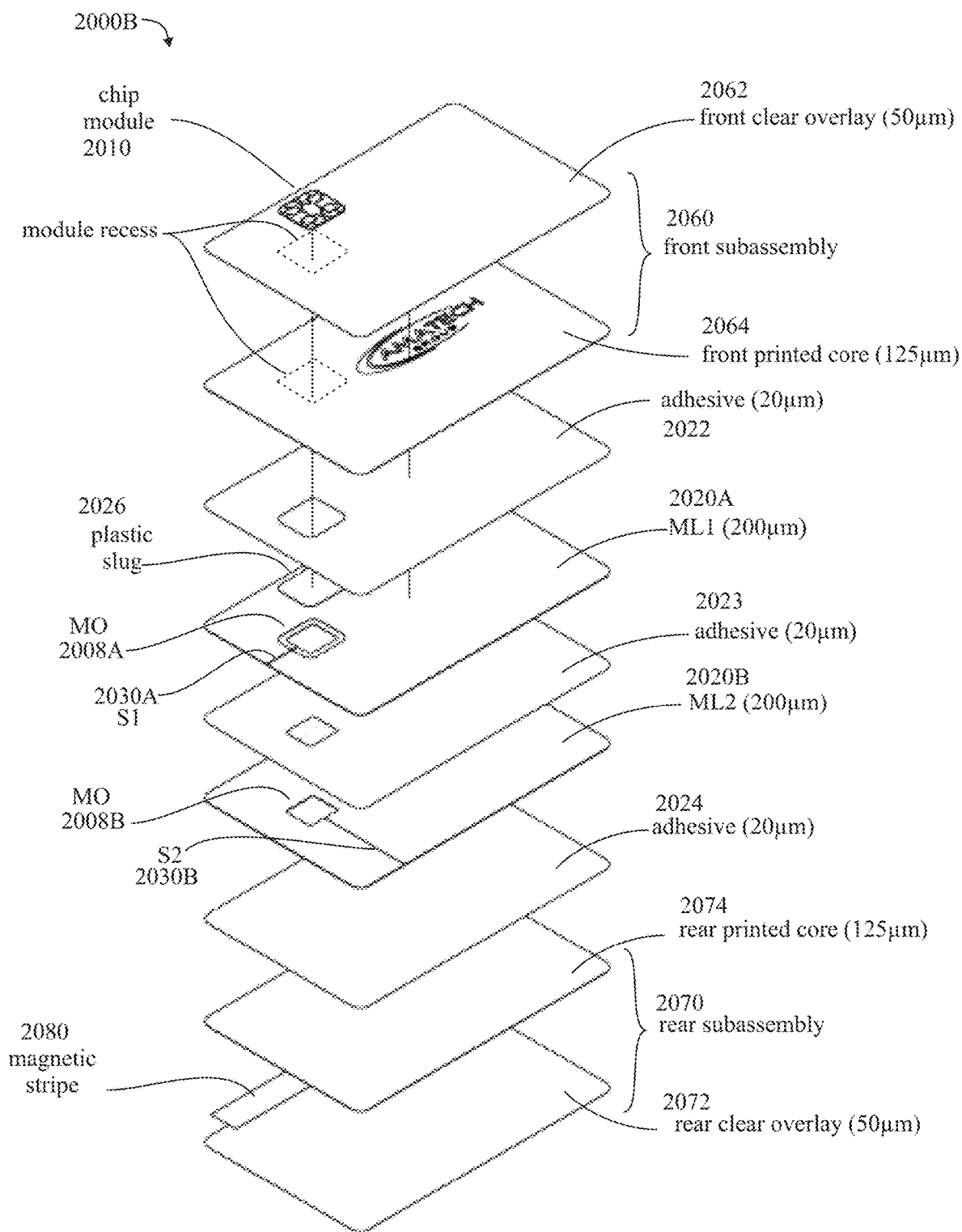
FIG. 27B is a diagram (exploded perspective view) of an alternate construction for a DIF "Plastic-Metal-Plastic" Hybrid Card, before lamination.

FIG. 27B may correspond with FIG. 20B of US 20170017871

Figure 5A:
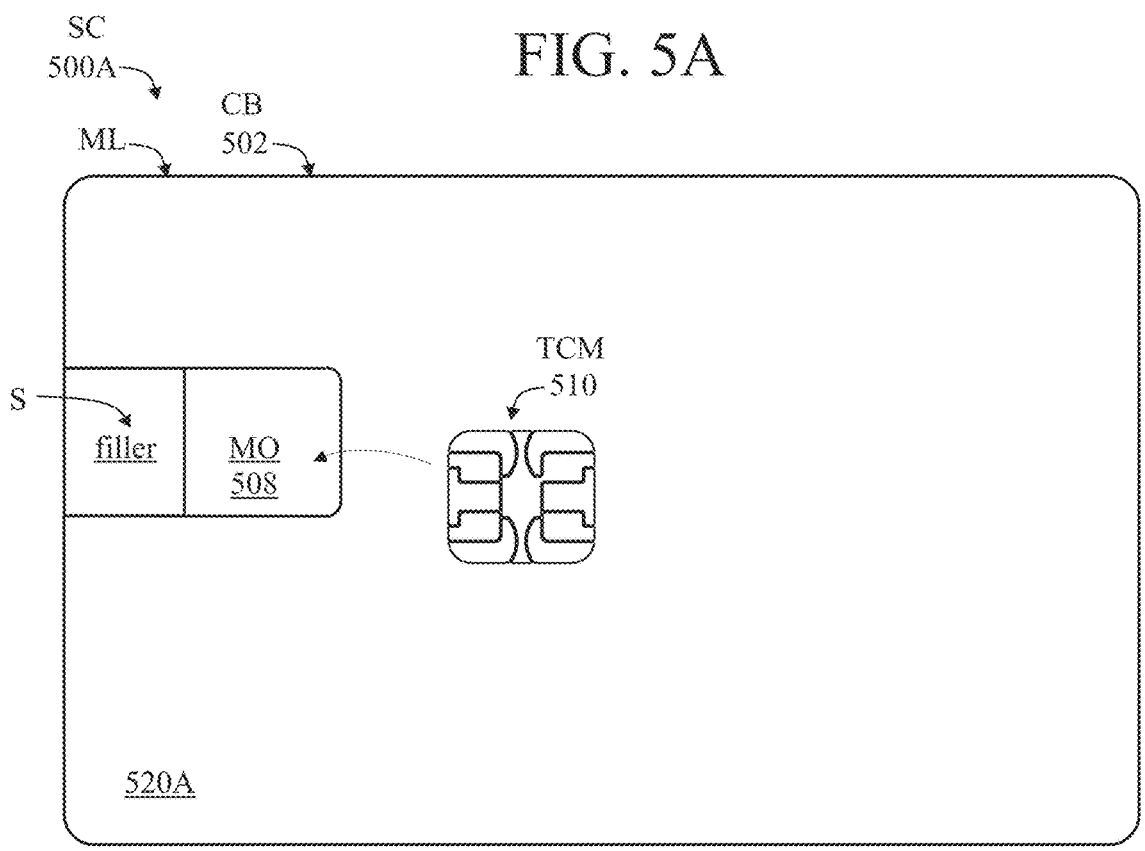
FIG. 5A is a diagram of a smartcard (SC) having a coupling frame (CF) extending from three sides of a module opening (MO) for a transponder chip module (TCM).
Figure 5B:
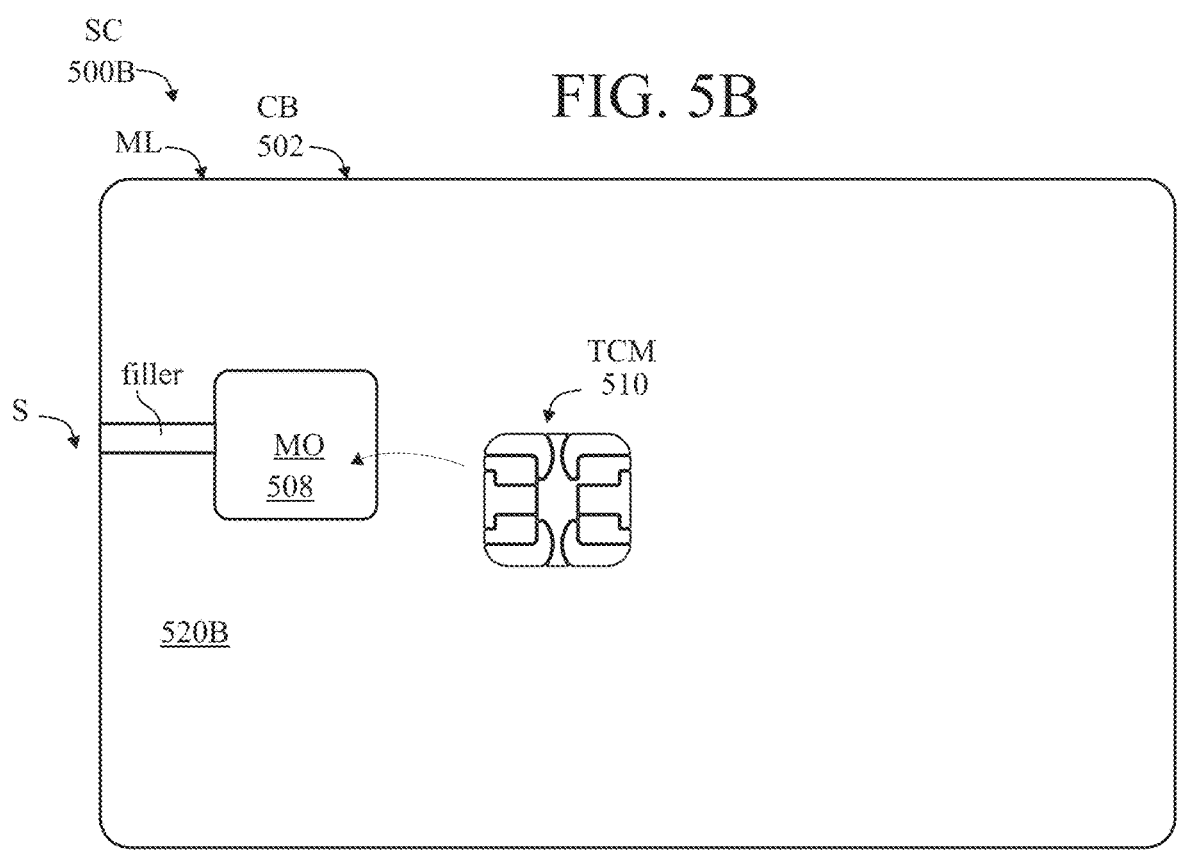
FIG. 5B is a diagram of a smartcard (SC) having a coupling frame (CF) extending from four sides of a module opening (MO) for a transponder chip module (TCM), showing a slit (S) extending from the module opening (MO) to a periphery of the coupling frame (CF).
Figure 28:
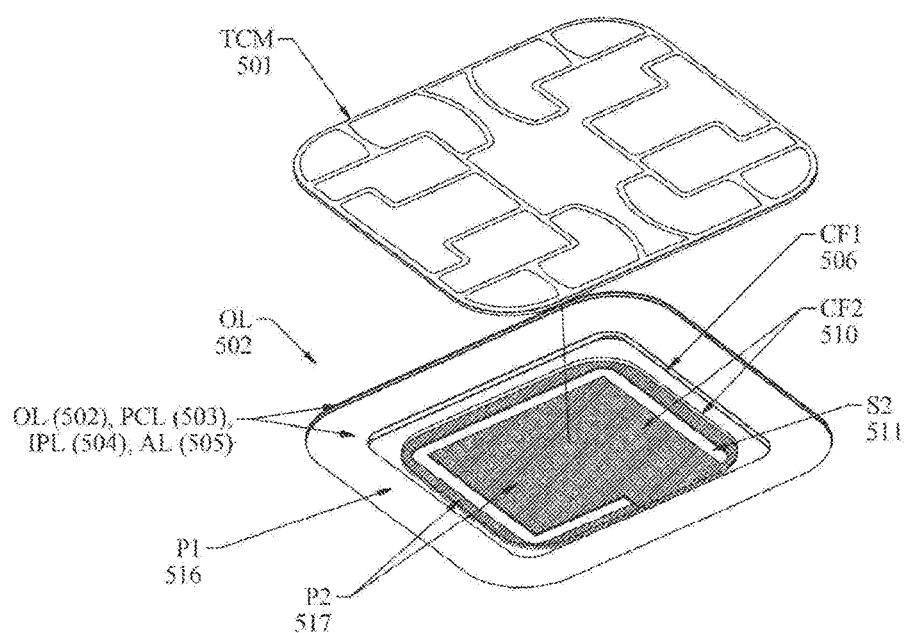

FIG. 28 may correspond with FIG. 5B of US 20180339503

Figure 6A:
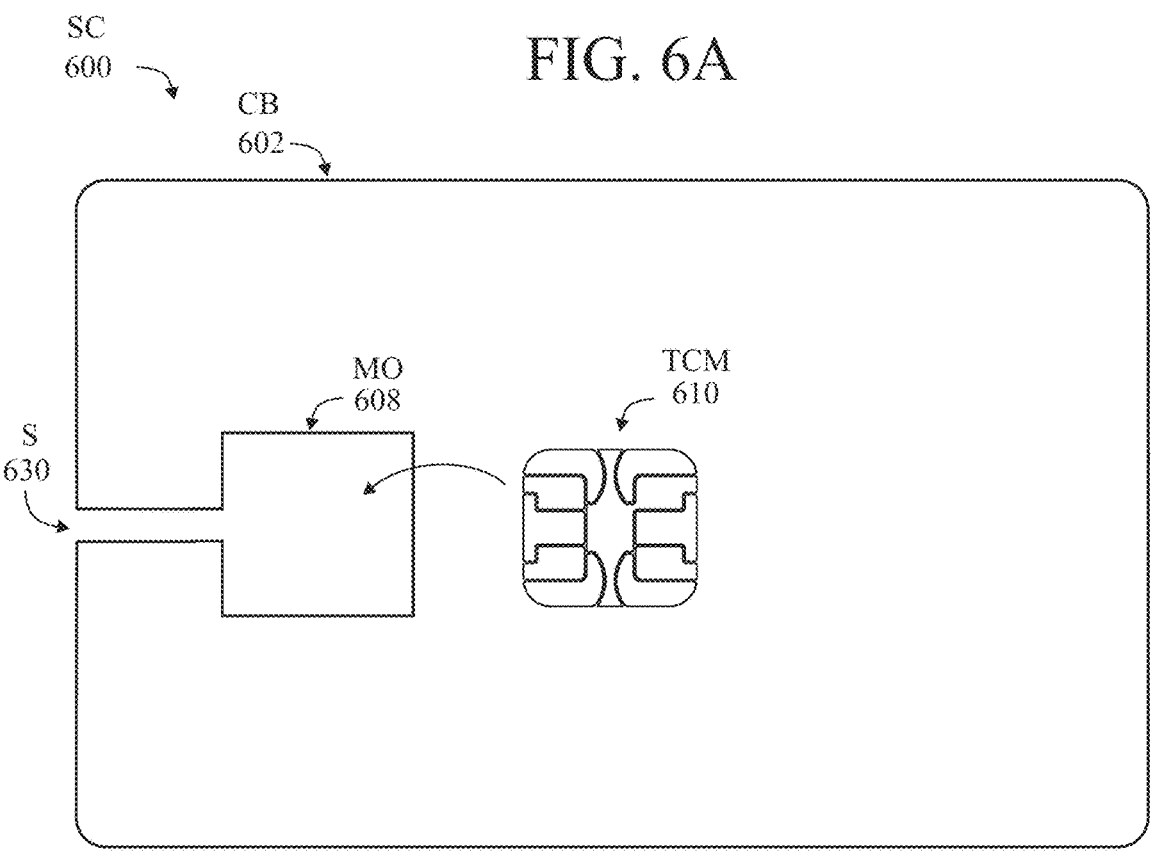
FIG. 6A is a diagrammatic view of a front surface of a metal card or composite metal card acting as a coupling frame (CF) with a slit, slot or gap in the metal to create an open loop closely adjacent to and substantially fully surrounding the transponder chip module (TCM).
Figure 6B:
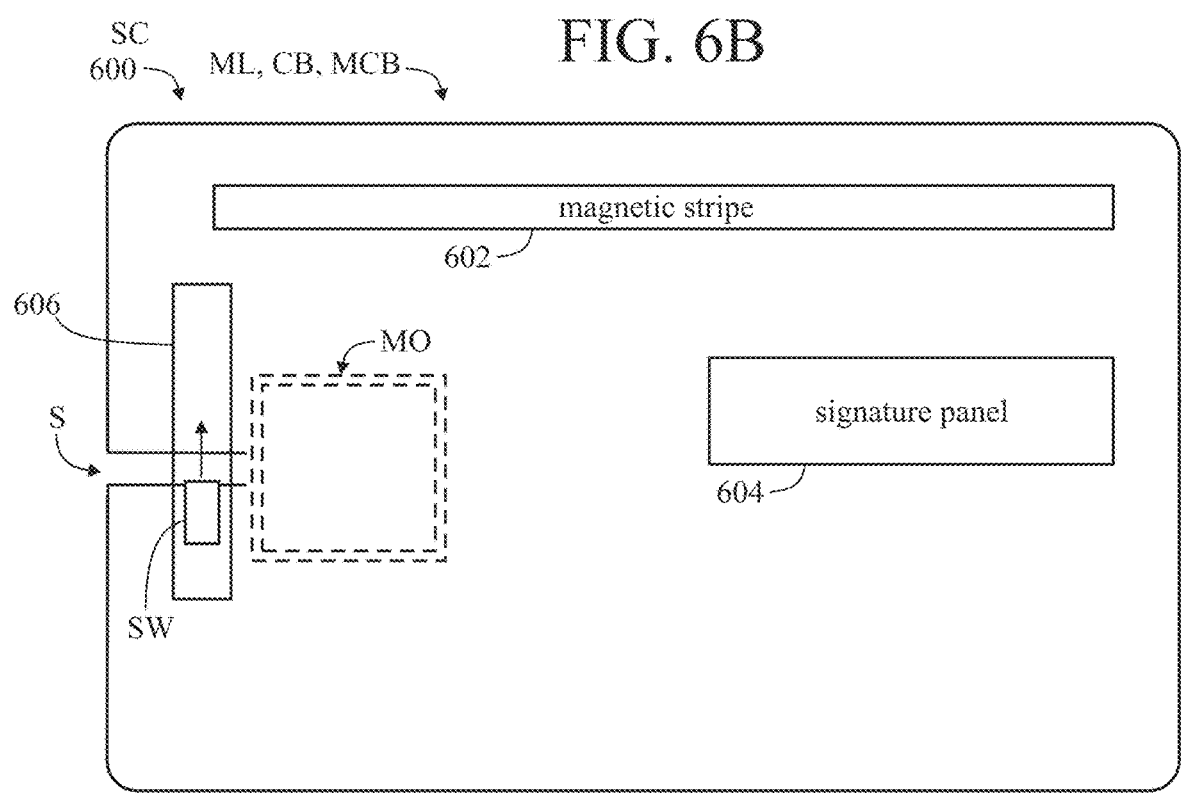
FIG. 6B is a diagrammatic view of a back surface of the metal card or composite metal card of FIG. 6A, showing incorporating a switch to short out the slit, slot or gap.
Figure 29:
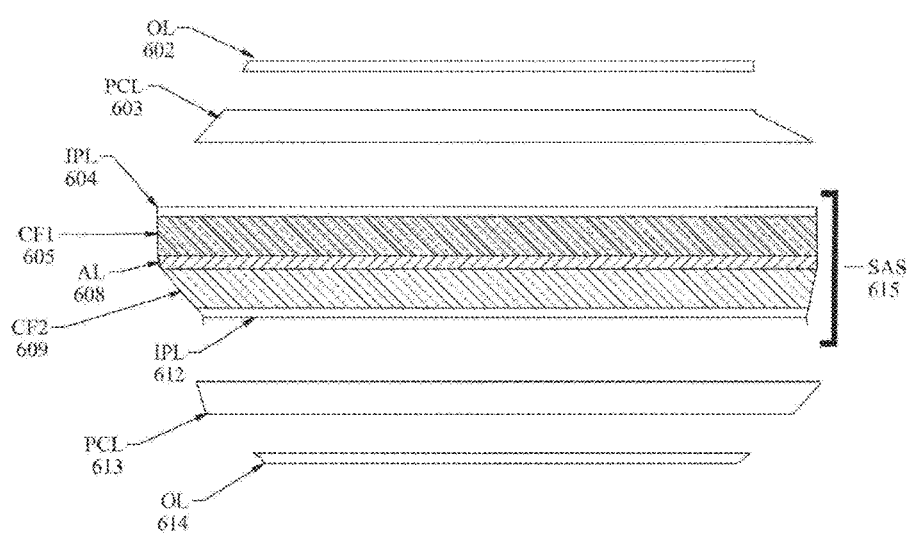

FIG. 29 may correspond with FIG. 6B of US 20180339503

Figure 30:
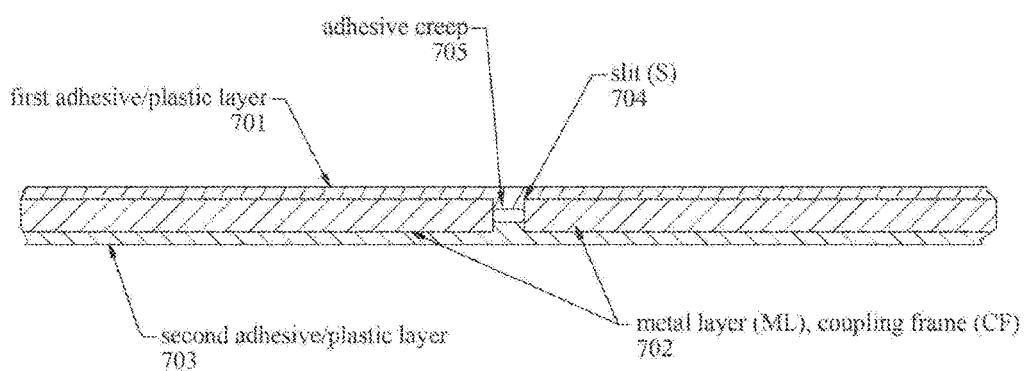

FIG. 30 may correspond with FIG. 7 of US 20180339503

Figure 31:
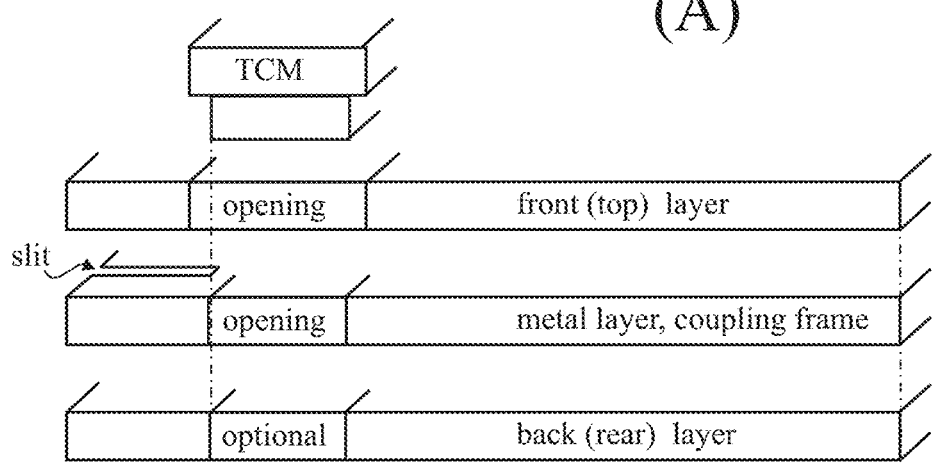
Figure 31:
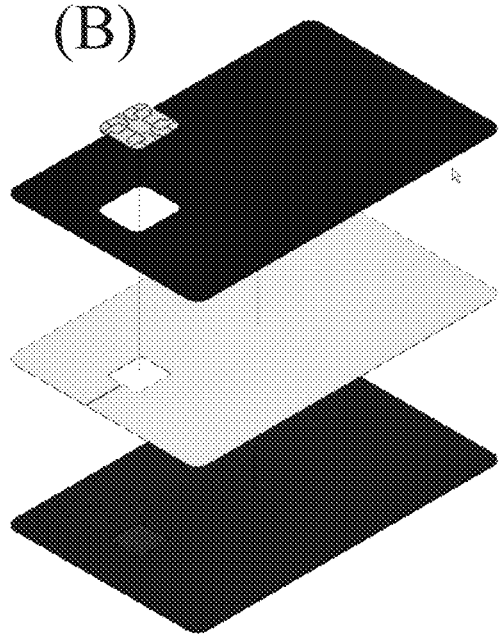
Figure 31:
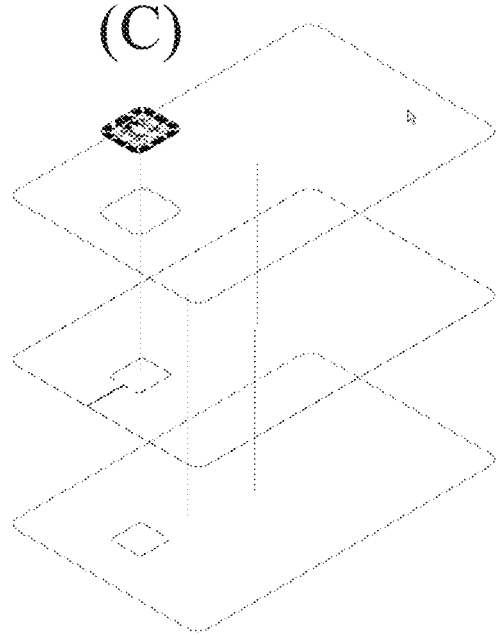

FIG. 31 (A,B,C) may correspond with FIG. 5 (A,B,C) of US 20170077589

Figure 32:
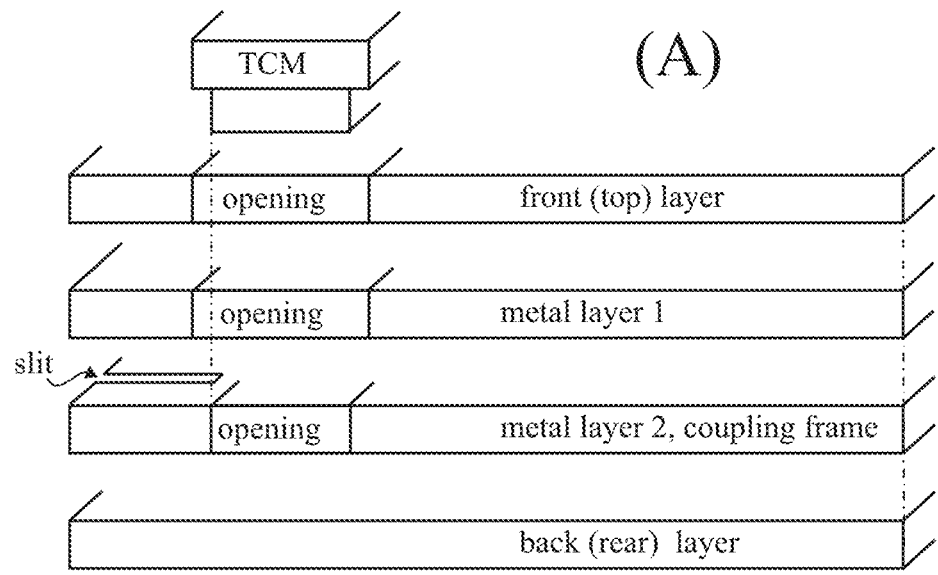
Figure 32:
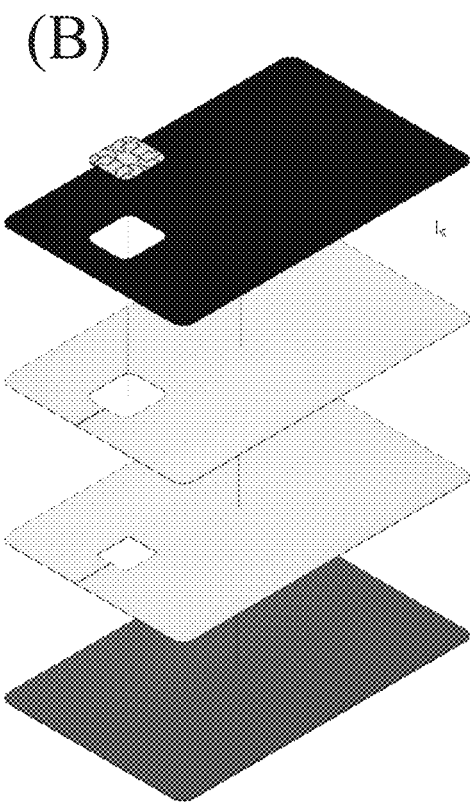
Figure 32:
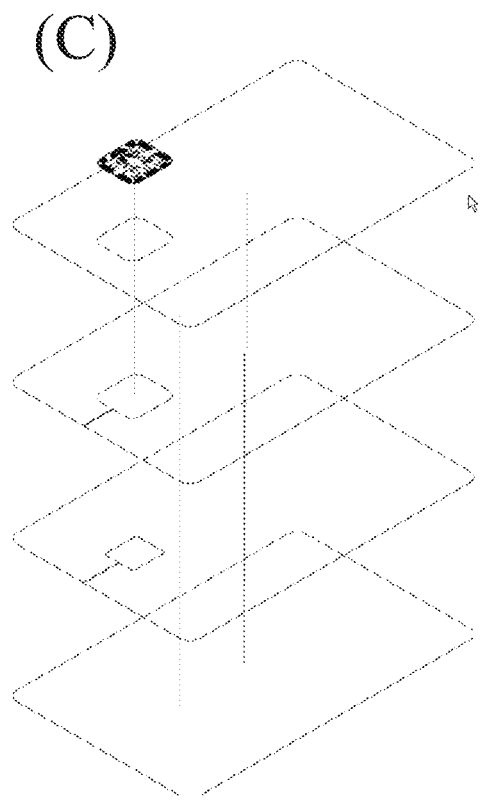

FIG. 32 (A,B,C) may correspond with FIG. 6 (A,B,C) of US 20170077589

Figure 33:
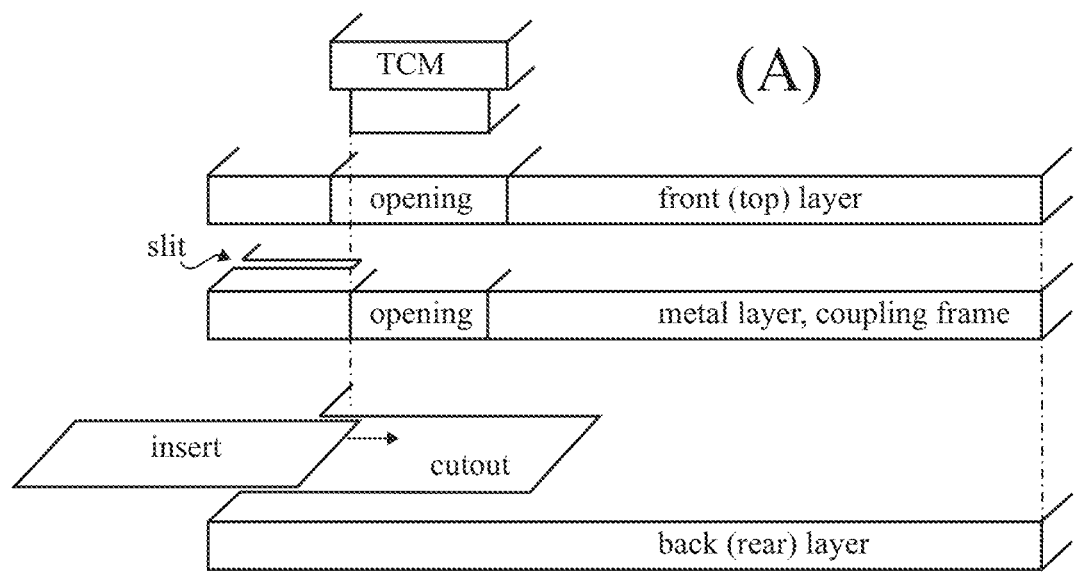
Figure 33:
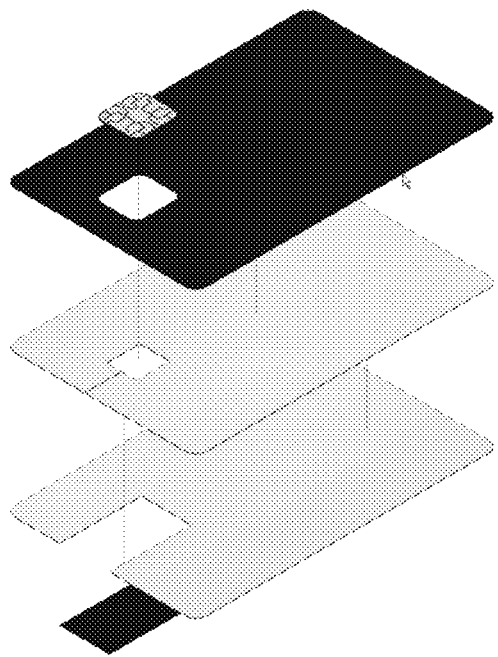
Figure 33:
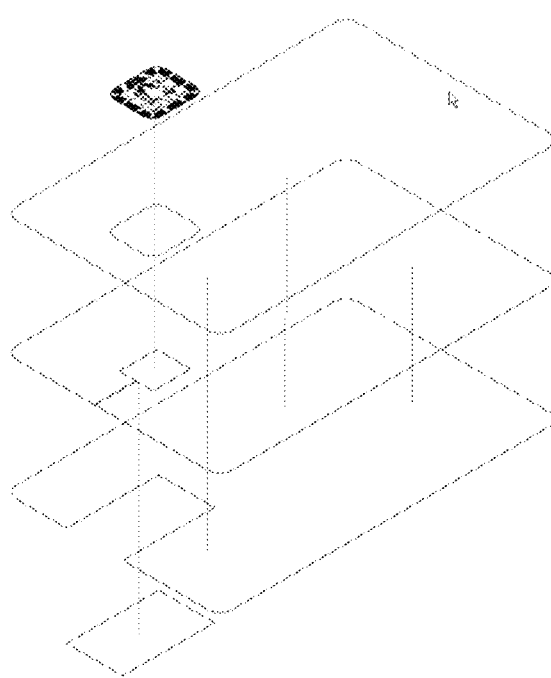

FIG. 33 (A,B,C) may correspond with FIG. 7 (A,B,C) of US 20170077589

Figure 34A:
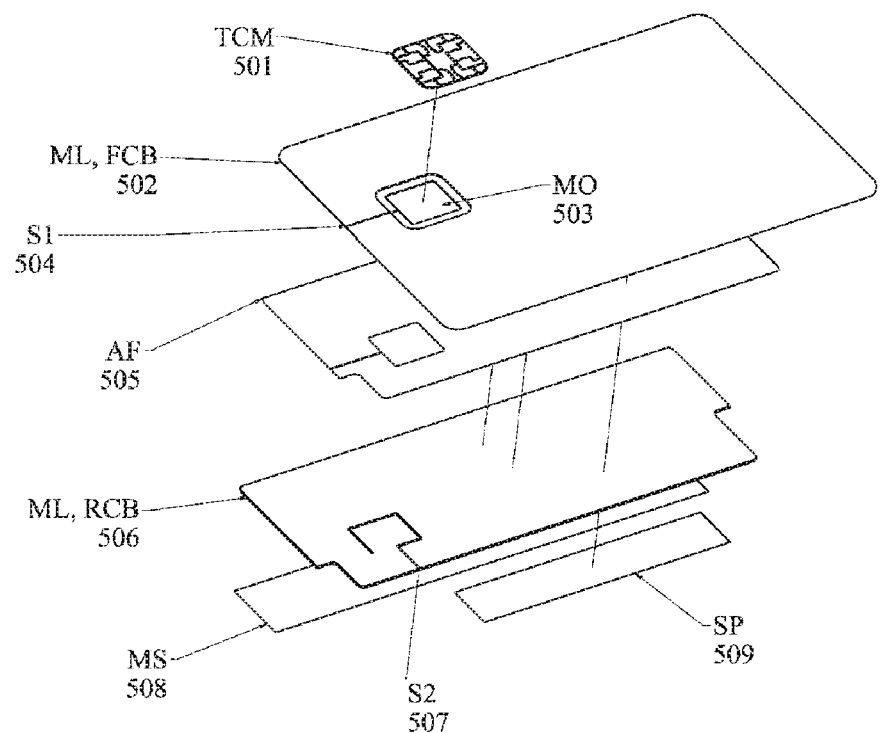
FIG. 34A is a diagram (perspective view) illustrating an assembly of a metal smart card composed primarily of two coupling frames (CF) with slits (S) which omits a module opening (MO) in the rear of the smart card.
Figure 34B:
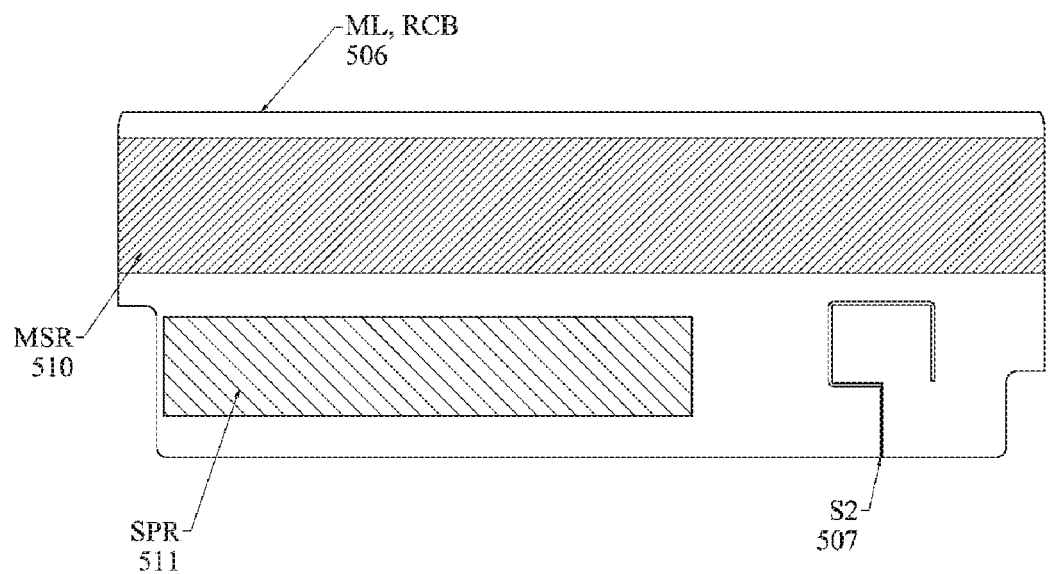
FIG. 34B is a diagram (rear view) illustrating the shape and features of the rear card body (RCB) featuring an extended slit (S) and recesses to accommodate a magnetic stripe (MS) and signature panel (SP).

FIGS. 34A,B may correspond with FIGS. 5A,B of US 20180341846

Figure 35A:
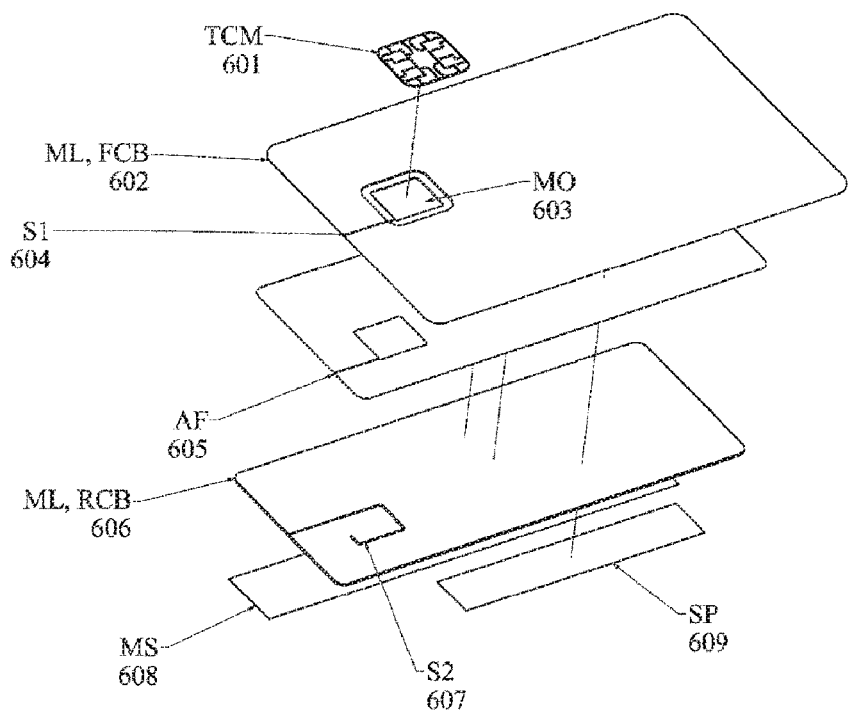
FIG. 35A is a diagram (perspective view) illustrating an assembly of a metal smart card composed primarily of two coupling frames (CF) with parallel slits (S) which omits a module opening (MO) in the rear of the smart card.
Figure 35B:
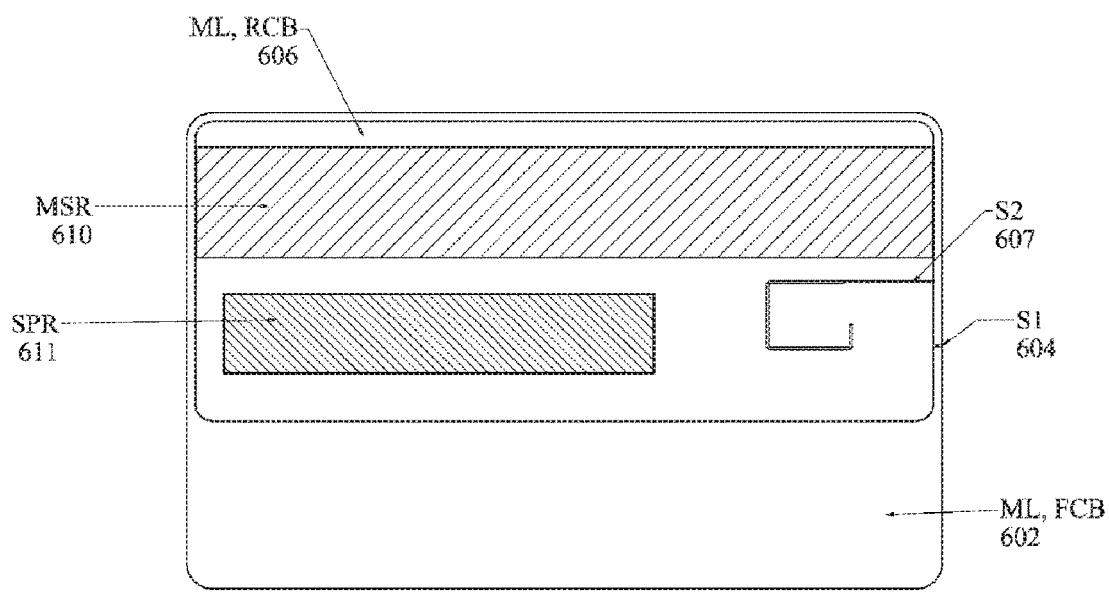
FIG. 35B is a diagram (rear view) of the rear of a metal smart card featuring a rear card body (RCB) panel containing an extended slit (S) and recesses to accommodate a magnetic stripe (MS) and signature panel (SP).

FIGS. 35A,B may correspond with FIGS. 6A,B of US 20180341846

Figure 36:
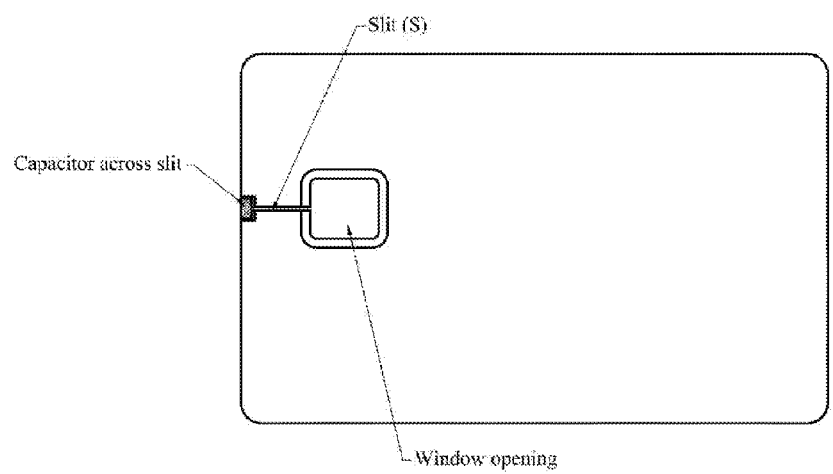

FIG. 36 may correspond with FIG. 23 of US 20180123221

Figure 37:
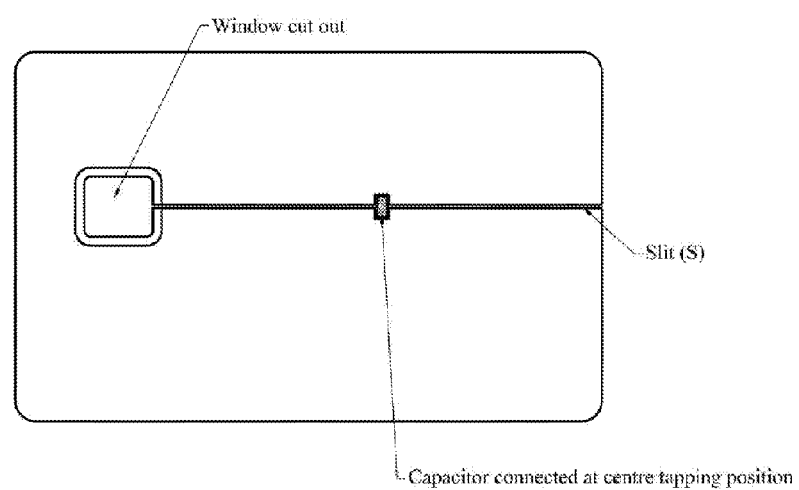

FIG. 37 may correspond with FIG. 24 of US 20180123221

Figure 38:
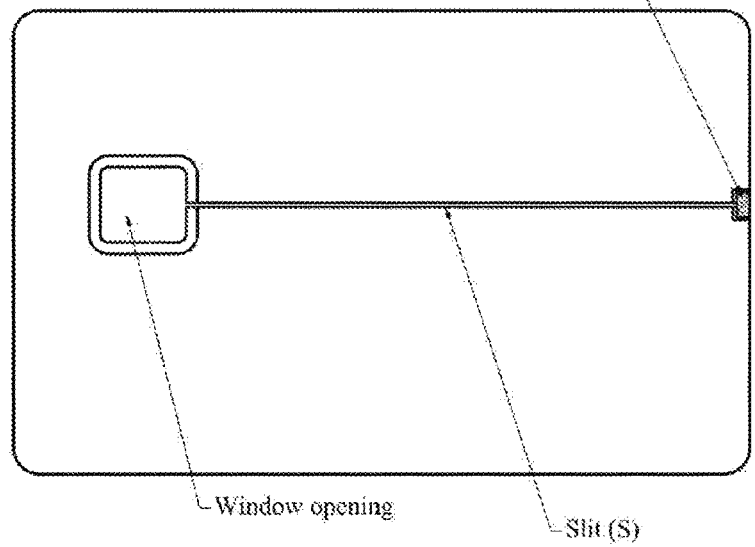

FIG. 38 may correspond with FIG. 25 of US 20180123221

Figure 39:
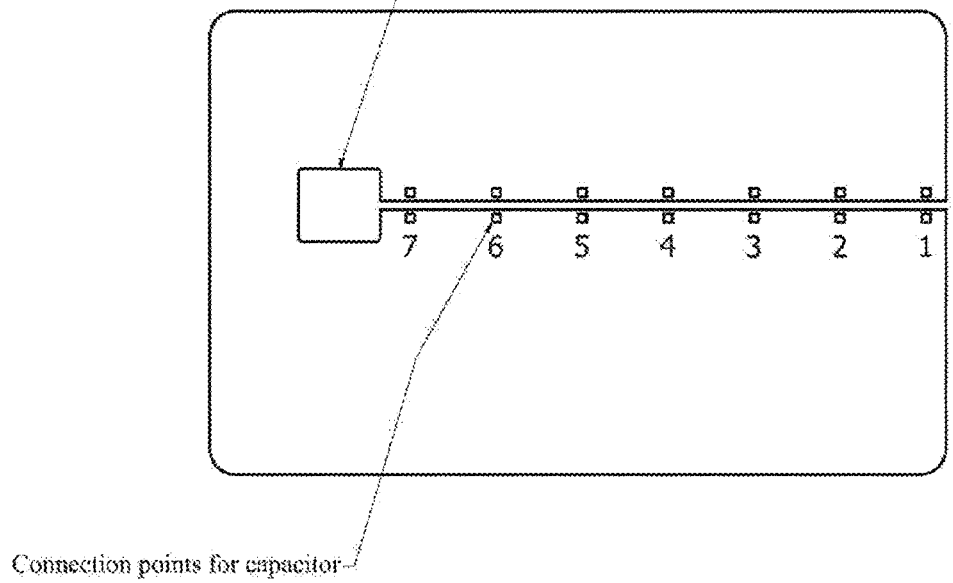

FIG. 39 may correspond with FIG. 26 of US 20180123221

Figure 40:
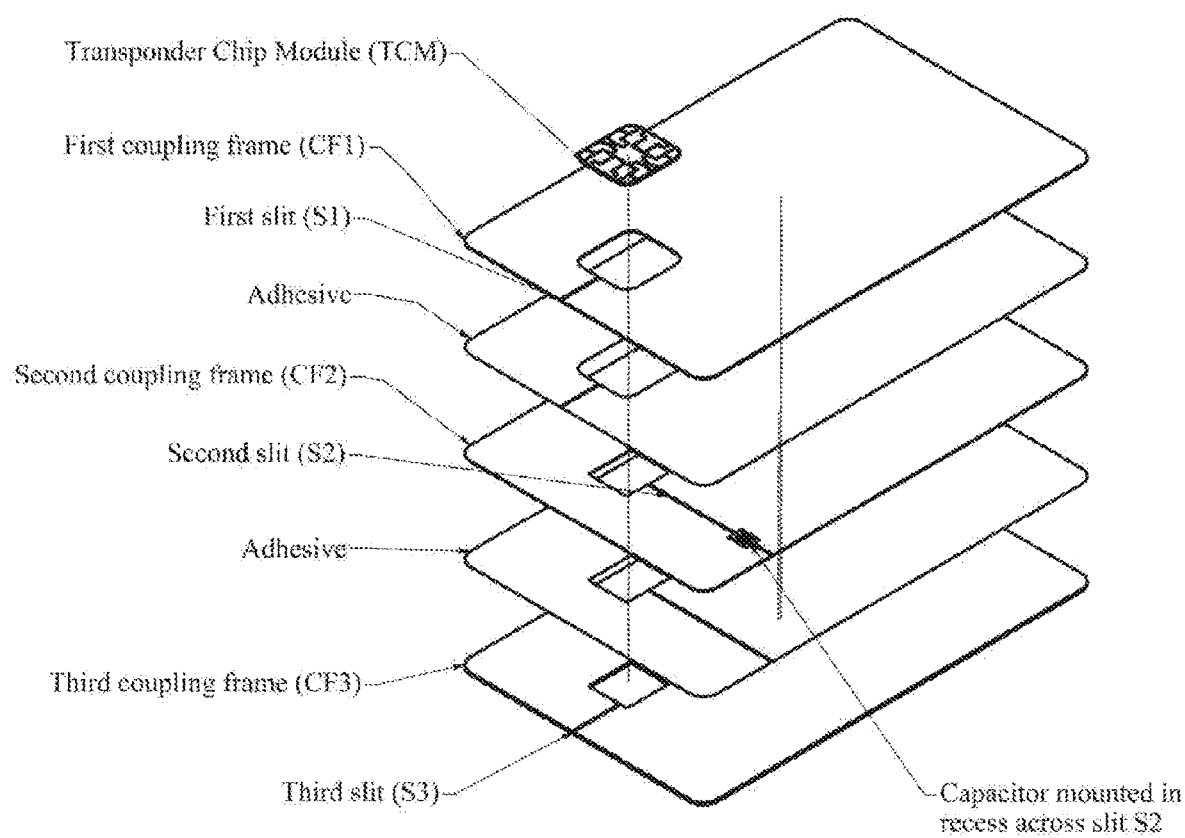

FIG. 40 may correspond with FIG. 27 of US 20180123221

DETAILED DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Reference may be made to disclosures of prior patents, publications and applications. Some text and drawings from those sources may be presented herein, but may be modified, edited or commented to blend more smoothly with the disclosure of the present application.

In the main hereinafter, RFID cards, electronic tags and secure documents in the form of pure contactless cards, dual interface cards, phone tags, electronic passports, national identity cards and electronic driver licenses may be discussed as exemplary of various features and embodiments of the invention(s) disclosed herein. As will be evident, many features and embodiments may be applicable to (readily incorporated in) other forms of smart cards, such as EMV payment cards, metal composite cards, metal hybrid cards, metal foil cards, access control cards and secure credential documents. As used herein, any one of the terms "transponder", "tag", "smart card", "data carrier", "wearable device" and the like, may be interpreted to refer to any other of the devices similar thereto which operate under ISO 14443 or similar RFID standard. The following standards are incorporated in their entirety by reference herein:

- ISO/IEC 14443 (Identification cards—Contactless integrated circuit cards—Proximity cards) is an international standard that defines proximity cards used for identification, and the transmission protocols for communicating with it.
- ISO/IEC 15693 is an ISO standard for vicinity cards, i.e. cards which can be read from a greater distance as compared to proximity cards.
- ISO/IEC 7816 is an international standard related to electronic identification cards with contacts, especially smart cards.
- EMV standards define the interaction at the physical, electrical, data and application levels between IC cards and IC card processing devices for financial transactions. There are standards based on ISO/IEC 7816 for contact cards, and standards based on ISO/IEC 14443 for contactless cards.

A typical data carrier described herein may comprise
(i) a transponder chip module (TCM) having an RFID chip (CM; or chip module) and a laser-etched antenna structure (AS, LES),
    it should be understood that the antenna structure (AS) may be laser-etched, or chemically-etched, and may be substantially planar having a number of tracks separated by spaces,
(ii) a card body (CB) (which may be referred to simply as a "card"), and
(iii) a coupling frame (CF) disposed in or on the card body (CB) to enhance coupling between the transponder chip module (TCM) and the antenna of an external RFID "reader".

When "chip module" is referred to herein, it should be taken to include "chip", and vice versa, unless explicitly otherwise stated.

When "transponder chip module" (TCM) is referred to herein, it should be taken to include "antenna module" (AM), and vice versa, unless explicitly otherwise stated. The transponder chip module (TCM) may also be referred to as a "transponder IC module".

The transponder chip module (TCM) may comprise non-perforated isolated metal features such as contact pads on the face-up side of the module tape (MT) and a laser-etched antenna structure or structures (LES) on the face-down side of the module tape (MT). Certain components on either side of the module tape (MT) may be chemically etched. An antenna structure incorporated directly on the chip may inductively couple with the laser-etched antenna structure.

Throughout the various embodiments disclosed herein, unless specifically noted otherwise (in other words, unless excluded), the element referred to as "CM" will most appropriately be a bare integrated circuit (IC) die (or RFID chip), rather than a chip module (a die with a carrier). In contrast therewith, some figures present examples that are specifically "chip modules" having IC chips (such as a "CM") mounted and connected to substrates. A "chip module" (die and carrier) with a laser-etched antenna structure (LES) and connected thereto may be referred to as a transponder chip module (TCM).

When "inlay substrate" is referred to herein, it should be taken to include "card body", and vice versa, as well as any other substrate for a secure document, unless explicitly otherwise stated.

The descriptions that follow are mostly in the context of dual interface (DI, DIF) smart cards, and relate mostly to the contactless operation thereof. Many of the teachings set forth herein may be applicable to pure contactless cards, tags, secure documents (e.g. electronic passports) and the like having only a contactless mode of operation. Generally, any dimensions set forth herein are approximate, and materials set forth herein are intended to be exemplary. Conventional abbreviations such as "cm" for centimeter", "mm" for millimeter, "µm" for micron, and "nm" for nanometer may be used.

Figure 1:
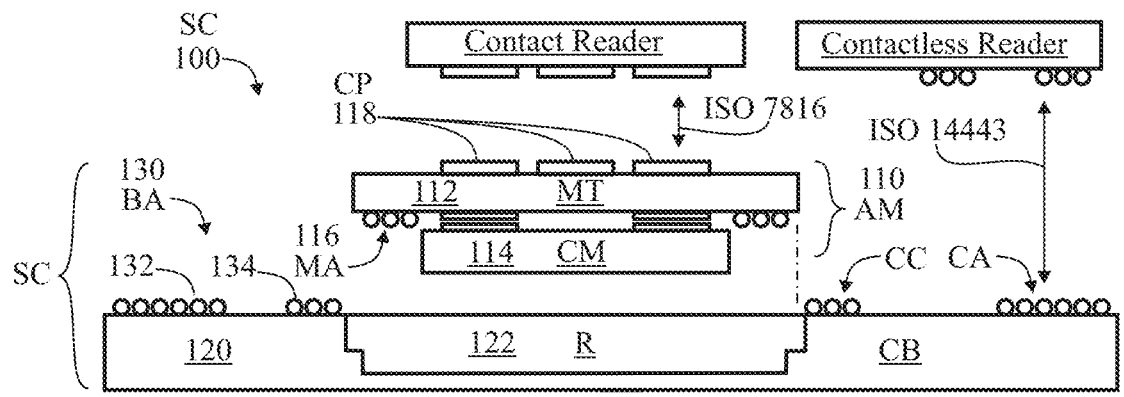

FIG. 1 illustrates a smart card SC 100 in cross-section, along with a contact reader and a contactless reader. An antenna module AM (or transponder chip module TCM) 110 may comprise a module tape (MT) 112, an RFID chip (CM) 114 disposed on one side (face-down) of the module tape MT along with a module antenna (MA) 116 and contact pads (CP) 118 disposed on the other (face-up) side of the module tape MT for interfacing with an external contact reader. The card body (CB) 120 comprises a substrate which may have a recess (R) 122 extending into one side thereof for receiving the antenna module AM. (The recess R may be stepped—such as wider at the surface of the card body CB—to accommodate the profile of the antenna module AM.) The booster antenna BA 130 may comprise turns (or traces) of wire (or other conductor) embedded in (or disposed on) the card body CB, and may comprise a number of components such as (i) a card antenna (CA) component 132 and (ii) a coupler coil (CC) component 134. It may be noted that, as a result of the recess R being stepped, a portion of the card body CB may extend under a portion of the antenna module AM, more particularly under the module antenna MA.

Figure 1A:
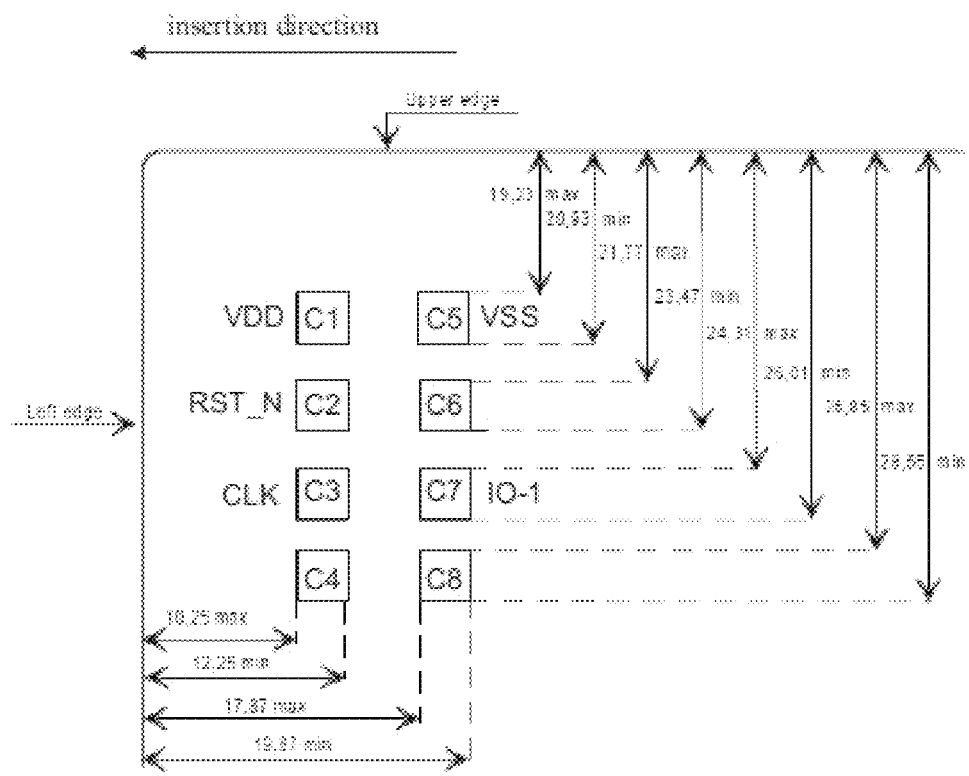
FIG. 1A is a diagram showing the ISO-7816 specification for contact pad layout. This corresponds with FIG. 1A of US 20150136858

FIG. 1A shows the ISO-7816 specification for contact pad layout, as was disclosed in US 20150136858 [0090] (This figure (and text) was not in parent Ser. No. 16/742,903, and is "introduced" herein.) As disclosed therein:

FIG. 1A shows the ISO-7816 specification for a contact pad array (CPA). Eight contact pads C1-C8 are shown, The contact pads C1-C8 are located on the front surface of a smartcard. The dimensions are referenced to the left and upper edges of the front surface of the card. For a 6-pad layout, the contact pads C4 and C8 may be omitted. The signal assignments for the contact pads are,

| | |
|---|---|
| C1 | VDD |
| C2 | RST_N |
| C3 | CLK |
| C4 | not used |
| C5 | VSS |
| C6 | not used |
| C7 | IO 1 |
| C8 | not used |

The arrow in FIG. 1A ("insertion direction") indicates the direction that a smart card would be inserted into a reader, with contact pads C1, C2, C3 and C4 entering the reader first, followed by contact pads C5, C6, C7 and C8. (A 6 pad module does not have contact pads C4 and C8.) The "insertion direction" (or "card insertion direction"), as used herein, may be defined as a direction parallel to a line drawn from C1 to C5, or from C2 to C6, or from C3 to C7 or from C4 to C8.

As additionally shown and discussed in US 20150136858
FIG. 1B is a diagram (plan view) of an 8-pad pattern for ISO-7816 contacts.
FIG. 1C is a diagram (plan view) of a 6-pad pattern for ISO-7816 contacts.
FIG. 1D is a diagram (plan view) of a smart card (SC).
FIG. 1B is a diagram of an exemplary contact pad array (CPA) comprising an 8-pad pattern for ISO 7816 contact pads (CP), and illustrates that an 8-pad layout may measure approximately 11.4 mm×12.6 mm. With a 2 mm space around the contact pad array (CPA), the overall size (or the size of a recess R in a card body CB for receiving an antenna module AM) may be 11.8 mm×13.0 mm.
FIG. 1C is a diagram of an exemplary contact pad array (CPA) comprising an exemplary 6-pad pattern for ISO 7816 contact pads (CP), and illustrates that a 6-pad layout may measure approximately 8.0 mm×10.6 mm. With a 2 mm space around the contact pad array (CPA), the overall size (or the size of a recess R in a card body CB for receiving an antenna module AM) may be approximately 8.4 mm×11.0 mm.
FIG. 1D is a diagram showing conventional dimensions of a smart card (SC) having an ID-1 format, according to ISO/IEC 7810. The card body (CB) measures 53.98 mm×85.60 mm. A transponder chip module (TCM) is shown for insertion in the card body (CB). This figure illustrates the usual "form factor" for chip modules (in this case, a transponder chip module TCM), and their location in the smart card (SC).

Metal Foils

Metal foils, metallic coatings, segments of metal foil or metal particles may be deposited on or embedded in the inlay (or card body CB) to alter the electrical characteristics of the RFID device or smartcard. A metal foil layer in the card body construction may helps to meet the ISO and EMV communication standards for RFID devices or smart cards in terms of read write distance, baud rate, Q-factor bandwidth, etc. The metal foil can be any pure metal such as aluminum or copper or an alloy. The metal foils, metallic coatings, segments of metal foil or metal particles should have a thickness less than the skin depth of the metal or material being used in order to prevent the formation of eddy currents in the metal or metallic structure that will attenuate the RF electromagnetic field. The use of thicknesses substantially less than the skin depth of the metal or material being used will increase the electrical resistance of the structure to alternating current flows (impedance) thereby preventing unwanted or excessive attenuation of the RF electromagnetic field. Other electrical conductors such as metal nanoparticles, metal nanowires or carbon-based conductors like graphite or exfoliated graphite can be used to construct electrically conductive networks that are hereby included under the definition of a metal foil or metallic structure.

Holographic metal foils may be glued or laminated to both sides of the booster antenna BA inlay (card body CB). The holographic metal foils may not significantly attenuate the electromagnetic field, in other words the holographic metal foils may be largely transparent to the RF field. The holographic metal foils can be used to mask (visually hide) the presence of the booster antenna BA. In addition, the holographic metal foils when placed either side (above, below) of the booster antenna BA can generate capacitance which may help improve the communication performance of the smart card with the reader (FIG. 1).

As disclosed in U.S. Ser. No. 14/173,815 filed 6 Feb. 2014, continuation of U.S. Ser. No. 14/020,884 filed 8 Sep. 2013 (now US 20140091149, 3 Apr. 2014), holographic metal foils may be glued or laminated to a card body with a booster antenna BA inlay (card body CB) or an inlay with a antenna connected to an RFID chip. The holographic metal foils may not significantly attenuate the electromagnetic field, in other words the holographic metal foils may be largely transparent to the RF field if their metal layer thickness may be approximately 30 nm.

The holographic metal foils can be used to mask (visually hide) the presence of a booster antenna BA in a card body. In addition, holographic metal foils when placed either side (above, below) of a booster antenna BA in a card body may generate capacitance which may help improve the communication performance of the smartcard with the reader.

Metal foils may comprise a conductive material (such as aluminum on PVC), having a sheet resistance which is very low, on the order of only a few Ohms, which normally should block the electromagnetic field (such as between the booster antenna BA and an external reader, or between the booster antenna BA and the antenna module AM), but a mitigating factor may be the thickness of the aluminum (or other material), being thin enough to allow the electromagnetic field to pass through.

Metal foils from CFC (www.cfcintl.com) and Crown (www.crownrollleaf.com) are transparent to high frequency electromagnetic waves because the thickness of the metal layer, approximately 30 nm, is significantly lower the skin depth of the metal at 13.56 MHz.

An example of metal foil smartcard will be discussed. The smartcards may comprise a card body (CB). The card body may comprise one or more layers having metal foil. The smartcards may comprise a transponder chip module (TCM), without a booster antenna. The transponder chip module may comprise a dual interface (contact and contactless) chip. The transponder chip module may comprise an antenna which is laser-etched from a metal layer (foil or cladding). The card body may be milled to have a window opening (W) to accept the transponder chip module.

Figure 2A:
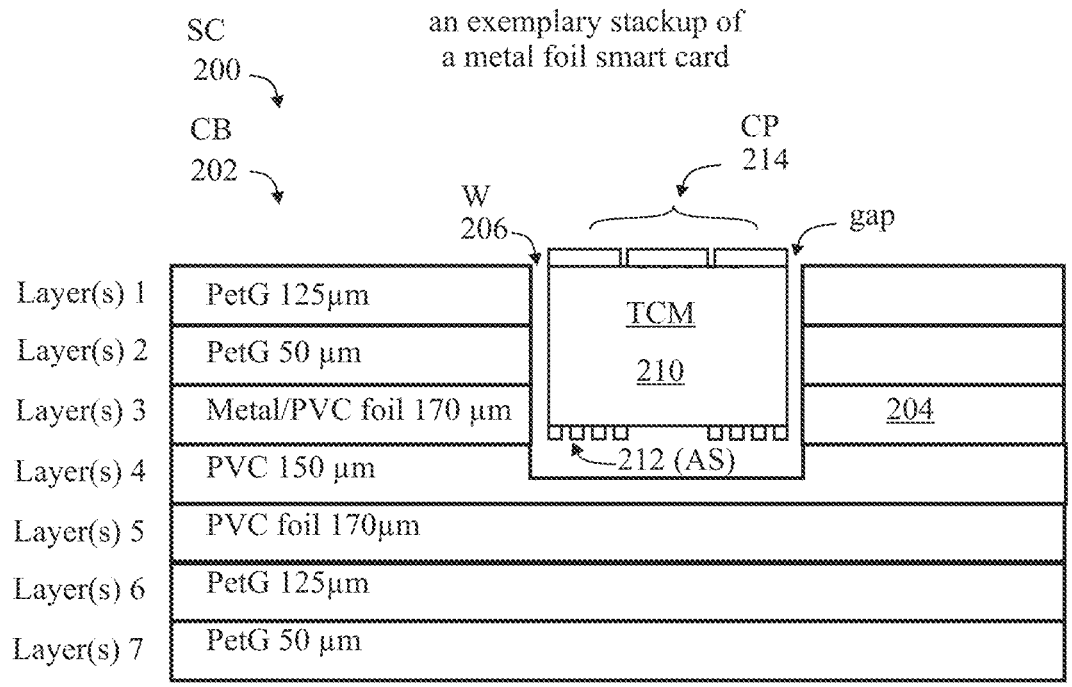
FIG. 2A is a diagram, in cross-section, of an exemplary stack-up of a metal foil smartcard.

FIG. 2A is a cross-section of an exemplary stack-up of a metal foil smartcard (SC) 200. The card body (CB) 202 may comprise some of the following layers . . .

Layer(s) 1 may comprise PET-G: 125 µm transparent
Layer(s) 2 may comprise PET-G: 50 µm transparent
Layer(s) 3 (element 204) may comprise Metal/PVC foil: 170 µm (CFC foil)
  the metal may be a thin film having a thickness of approximately 30 nm (0.03 µm)
Layer(s) 4 may comprise PVC 150 µm
Layer(s) 5 may comprise PVC foil: 170 µm (CFC foil)
Layer(s) 6 may comprise PET-G: 125 µm
Layer(s) 7 may comprise PET-G: 50 µm The window opening (W) 206 in the card body (CB) is at least as large as the transponder chip module (TCM) 210, to accept installation of the transponder chip module (TCM). The window opening (W) may be referred to as a module opening (MO). The transponder chip module (TCM) may include an antenna structure (AS) 212 which is laser-etched from a conductive layer (foil or cladding), such as double-sided epoxy glass tape. The antenna may be substantially coplanar with the metal film in Layer 3. Contact pads (CP) 214 are disposed on the top (as viewed) surface of the transponder chip module (TCM).

The window opening (W) may be
  up to 10% larger than the transponder chip module, or
  approximately 10% larger than the transponder chip module, or
  greater than 10% larger than the transponder chip module.

The stack height, not laminated, may be approximately 840 μm.

The stack height, laminated, may be approximately 800 μm.

The metal thickness (in Layer 3) may be approximately 30 nm.

The antenna may be substantially coplanar with the metal in Layer 3.

The read/write distance, with a laser etched antenna structure (LES) in the transponder chip module (TCM) and without a booster antenna (BA) in the card body (CB) may be approximately 1.5 cm.

With an exemplary stack-up described above, and variations thereof, and the antenna structure (AS) disposed substantially coplanar with the metal film (foil), and with an enlarged window opening, read/write distances in excess of 1.5 cm may be achieved, without requiring a booster antenna in the card body.

The performance of a transponder chip module (TCM) in terms of activation distance with an arrangement of contact pads, connection bridges or isolated metal features on its face-up side and a laser-etched antenna structure (LES) connected to an RFID chip (CM) on its face-down side may not be adversely influenced (affected) by the presence of a holographic metal foil in a card body. When the transponder chip module (TCM) is implanted in a milled cavity in a card body (CB), the holographic metal foil laminated to the card body may surround the transponder chip module on all sides and may not adversely influence (affect) its RF performance. The thickness of the metal on the foil is a relevant factor.

Metal Layers (ML)

Metal foils such as in FIG. 2A are typically thin, and may be too thin and may be so thin (below a transparency threshold) that electromagnetic waves pass through the metallized layer without absorption.

Figure 2B:
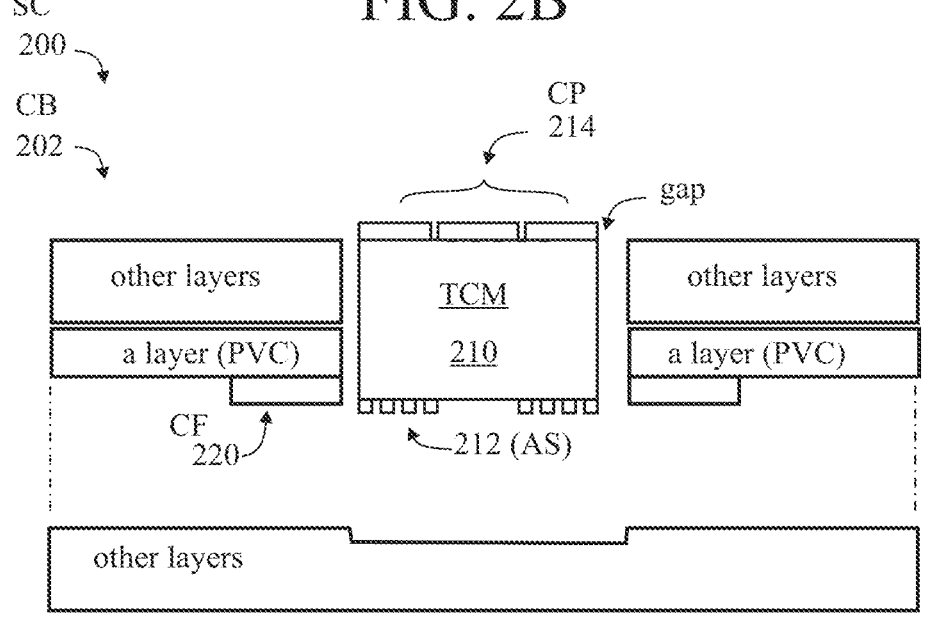
FIG. 2B is a diagram, in cross-section, of an exemplary stack-up of a plastic card body with a transponder chip module (TCM) and a coupling frame (CF) on the same plane as the laser-etched antenna.

A metal layer (ML) for a coupling frame (CF), such as in FIG. 2B should be thick enough to conduct electricity and absorb an electromagnetic wave at a frequency of interest and enhance coupling between the transponder chip module (TCM) and an external reader (such as in FIG. 1). The coupling frame (CF) may be closely adjacent to, but not completely encircle (substantially surround), the transponder chip module (TCM), and may extend from adjacent the transponder chip module (TCM) to one or more outer edges of the metal layer (ML), which may be substantially coincident with the outer edges of the card body (CB).

The transponder chip module (TCM) may have a laser-etched (versus chemically etched, or versus wire-wound) antenna structure (LES) serving as a planar antenna structure with feature sizes (such as spaces between tracks) of approximately 25 μm, which may be achieved by laser etching. (Chemical etching may be limited to feature sizes on the order of 100 μm).

Laser-Etched Antenna Structures (LES)

U.S. Ser. No. 14/281,876 filed 19 May 2014 discloses LASER ABLATING STRUCTURES FOR ANTENNA MODULES FOR DUAL INTERFACE SMARTCARDS. Laser etching antenna structures for RFID antenna modules (AM) and combining laser etching and chemical etching are disclosed. Limiting the thickness of the contact pads (CP) to less than the skin depth (18 μm) of the conductive material (copper) used for the contact pads (CP). Multiple antenna structures (AS1, AS2) in an antenna module (AM), and incorporating LEDs into the antenna module (AM) or smartcard (SC) are also disclosed.

The antenna (or antenna structure AS) may be laser etched from a copper layer (cladding or foil), which may have a thickness less than the skin depth of copper (~18 μm), forming a number of tracks separated by a distance approximately equal to the width of the laser beam, such as approximately 25 μm. Subsequent to laser etching, the antenna structure may be plated, which may reduce the distance between tracks to approximately 20 μm (for example). This may result in increased performance of the antenna structure, and the overall antenna module AM (or transponder chip module (TCM)), and reduce performance constraints on the performance of a booster antenna (BA) in the card body (CB) of the smartcard (SC).

U.S. Ser. No. 14/281,876 also discloses, at FIG. 2M, a contact pad area of an antenna module (AM) situated in an elliptical punched out area ("punching area") of a module tape (MT) and areas of conductive foil located outside of (external to) the contact pads (CP) and patterned as connection bridges (CBR), or for logo/branding. FIG. 2M shows a contact pad array area disposed in a rectangular punch out area of a layer of a module tape MT. Remaining foil on the contact side of the module tape MT may be patterned to have one or more connection bridges (CBR). The remaining foil may be in an elliptical area surrounding the contact pad area.

U.S. 61/950,020 filed 8 Mar. 2014 discloses the following:

FIG. 28 is a diagram showing a contact pad area of a conventional antenna module (AM) situated in an elliptical punched out area ("punching area") of a module tape (MT).

FIG. 29 is a diagram showing a contact pad area of an antenna module (AM) situated in an elliptical punched out area ("punching area") of a module tape (MT) and areas of conductive foil located outside of (external to) the contact pads (CP) and patterned as connection bridges, or for logo/branding.

FIG. 30 is a diagram showing a contact pad area of an antenna module (AM) situated in an elliptical punched out area ("punching area") of a module tape (MT) and areas of conductive foil located outside of (external to) the contact pads (CP) and patterned as connection bridges, or for logo/branding. Some of the connection bridges may be split, or bifurcated, to function as two connection bridges.

FIG. 28 shows an example of an area which has been punched out of a layer of a module tape MT to accept a dual interface (DI) antenna module AM having an antenna (not shown) and contact pads CP. This may be exemplary of a 6-contact pad configuration. The contact pads CP are located in a contact pad array area. Details of the contact pads are omitted, for illustrative clarity. The punch out area allows the contact pads CP of the antenna module AM to be exposed so that they can be contacted by an external contact reader (FIG. 1).

The contact pad array area. may be rectangular, having a size of 10.6 mm×8 mm.

The punched out area may be oval (elliptical), having a major axis of 15.5 mm and a minor axis of 10.5 mm.

Note that the opening (punch area) has a geometry (oval, elliptical) which is substantially dissimilar to that of the contact pad array area (rectangular).

Note that the opening in the module tape MT has an aspect ratio (major axis:minor axis) of 15.5:10.5=1.5. This is approximately 15% greater than in the example of FIG. 27.

Note that the elliptical opening in the module tape has an area of approximately 128 mm². Note that the pad array has an areas of approximately 85 mm². The area of the elliptical opening is approximately 50% larger than the contact pad array area.

Reference may be made to U.S. Ser. No. 13/744,686 filed 18 Jan. 2013 (published US 20130126622, 22 May 2013) which discloses having a window opening in a module tape which is significantly larger than the contact pad area. See, for example, FIG. 2A therein.

FIG. 29 shows a contact pad array area disposed in a rectangular punch out area of a layer of a module tape MT, in the manner of FIG. 27. Remaining foil on the contact side of the module tape MT may be patterned to have one or more connection bridges. The remaining foil may be in an elliptical area surrounding the contact pad area, in the manner of FIG. 28.

Figure 21:
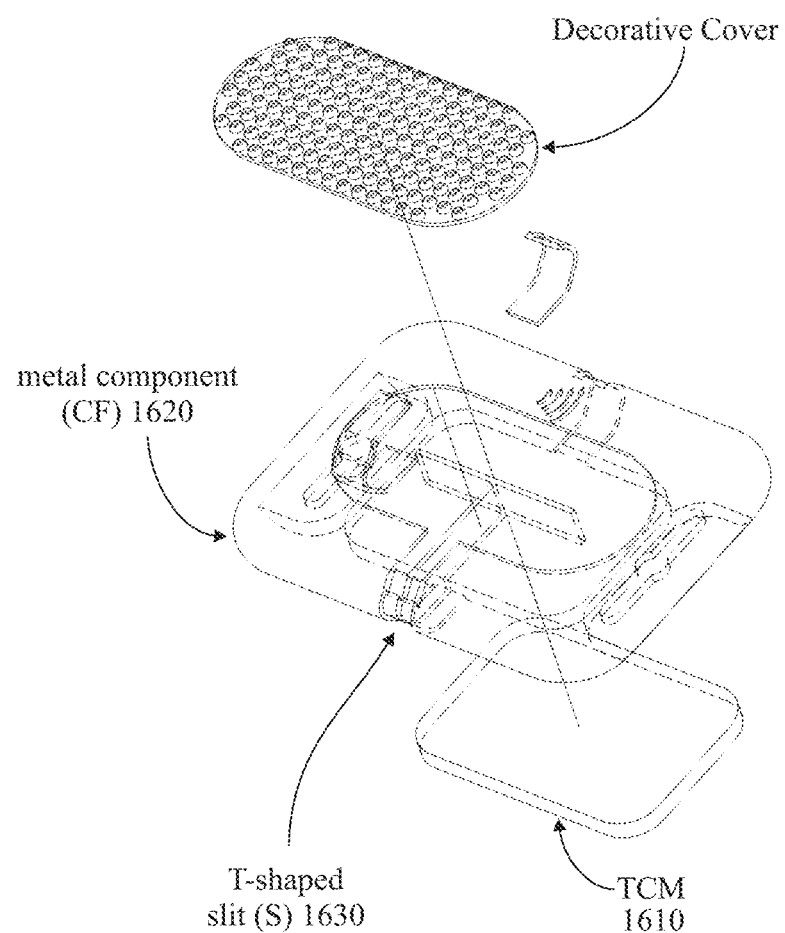

Some embodiments of connection bridges may be found in FIGS. 21, 21A, 21B, 21C, 21D, 21E. In the example of FIG. 21E, the connection bridge CBR-1 appears to be substantially entirely outside of the contact pad array (or area).

Four areas of conductive foil, on the contact side of the module tape MT, outside of the ISO 7816-2 area for contact pads are shown. The two areas shown at the top and bottom of the contact pad array area are labeled "connection bridge". The two areas shown to the left and right of the contact pad array area are labeled "logo/branding".

The areas labeled "connection bridge" may have logo/branding. The areas labeled "logo/branding" may function as connection bridges.

The module antenna MA (or multiple module antennas) and chip module CM may be located on the other side ("chip side") of the module tape, and may be interconnected to positions, shown as dark dots, with one another by connections to the underside of one or more of the connection bridges (or logo/branding areas). These connections (two shown) may be entirely outside of the contact array area. (In FIG. 21E, one of the connections is within the contact array area.) (FIG. 21 is illustrative of making a connection from a components on the chip side of the module tape, through a hole in the module tape, to the underside of a connection bridge CBR on the contact pad side of the module tape MT.)

FIG. 30 is similar to FIG. 29, showing an antenna module AM disposed in a rectangular punch out area of a layer of a card body CB, and remaining foil in an elliptical area surrounding the contact pad area patterned to have one or more connection bridges.

In this example, the contact bridges (labeled "contact bridge") are split (or bifurcated), so that there are two contact bridges instead of one (and four, instead of two). This increase in the number of connection bridges may facilitate connecting multiple module antennas, or multiple module antenna segments, with a chip module and with each other. The dark dots on the bottom two connection bridges are representative of connections of components (such as module antenna(s), chip module) on the other side ("chip side") of the module tape MT to the undersides of the connection bridges.

Coupling Frames (CF)

A metal surface or a conductive surface of suitable thickness and dimension acting as a coupling frame (CF) can replace (or obviate the need for) a booster antenna (BA) in a dual interface smartcard (SC). The coupling frame in a card body (CB), tag, document or the like, may act as a capacitive coupling antenna, concentrating the electromagnetic field around the transponder chip module (TCM) which may have a laser-etched antenna structure (LES).

It should be understood that the concepts associated with the coupling frame (and slotted metal layer in a card body), disclosed herein may provide performance benefits with other than laser-etched antenna structures (LES).

The performance of a laser-etched antenna structure (LES) in a transponder chip module (TCM) may be enhanced by surrounding the antenna structure (AS) with a metal frame (MF), or coupling frame (CF), in the card body (CB) of the smart card (SC).

Generally, a dual interface smart card may comprise:
a transponder chip module (TCM) having an antenna structure (AS);
a card body (CB) comprising multiple layers; and
at least one metal layer (ML) or metallized (metalized) layer forming an open loop coupling frame (CF) at least partially surrounding the transponder chip module (TCM).

FIG. 2B shows, generally, a smart card (SC) 200 having a card body (CB) 202. The card body (CB) may comprise several layers laminated together. A coupling frame (CF) 220 is shown disposed in (or on) a given layer ("a layer") so as to be adjacent to, or surround the transponder chip module (TCM). The transponder chip module (TCM) 210 may comprise a laser-etched antenna structure (LES) 212.

The antenna structure (AS) may be formed by laser etching, having a number of (such as 10 or 12) tracks which are disposed substantially planar with one another on a module tape (MT) or other suitable substrate, in a generally rectangular spiral pattern. The spacing between tracks may be on the order of 25 µm, or less (such as 20 µm, after plating). The metal frame (or layer), forming an open loop coupling frame (CF), may be substantially coplanar with the antenna structure (AS), and may be disposed adjacent at least one, at least two or at least three sides of the transponder chip module (TCM). The coupling frame (CF) may nearly encircle the transponder chip module (TCM), being formed as an open loop, having two ends, or as a loop having at least two segments (and corresponding at least four ends). The metal frame (MF) may comprise a copper foil or cladding, may be laminated to a layer of the card body (CB) of the smart card (SC), and may have a thickness of approximately 12, 18 or 35 µm. The coupling frame (CF) may tend to concentrate the electromagnetic flux, acting (by way of analogy) as a coupler coil (CC, 134). In some embodiments, more than one coupling frame, or portions (CF1, CF2 . . . CFn) of an overall coupling frame (CF) may be disposed concentrically around the transponder chip module (TCM).

The coupling frame (CF) may be referred to as a metal frame (MF), and vice-versa. A metal layer (ML), or indeed an entire metal card body (MCB) may be modified to act as a coupling frame (CF).

Figure 2C:
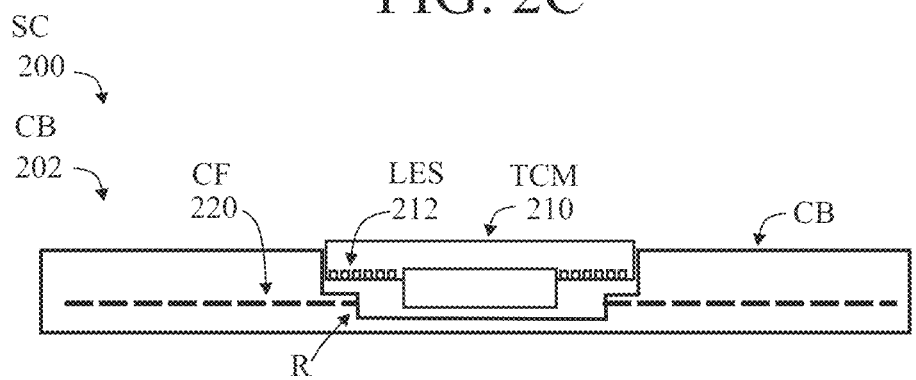
FIG. 2C is a diagram, in cross-section, showing a transponder chip module (TCM) disposed in the card body (CB) of a smartcard (SC) wherein the coupling frame (CF) overlaps the laser-etched antenna structure (LES) in the transponder chip module (TCM).

FIG. 2C shows an example of a smartcard (SC) 200 with a coupling frame (CF) 220 incorporated into its card body (CB) 202 which has a stepped recess (R). A transponder chip module (TCM) 210 has a laser-etched antenna structure (LES) 212, an outer portion of which may overhang an inner portion of the coupling frame (CF). The coupling frame (CF) has an opening (MO) 208 for receiving the transponder chip module (TCM) 210. The dashed line indicates, schematically, either a metal layer in a stackup of a card body, or a substantially entirely metal card body (CB). When "metal layer" is referred to herein, it may refer to such a metal card body.

Figure 2D:
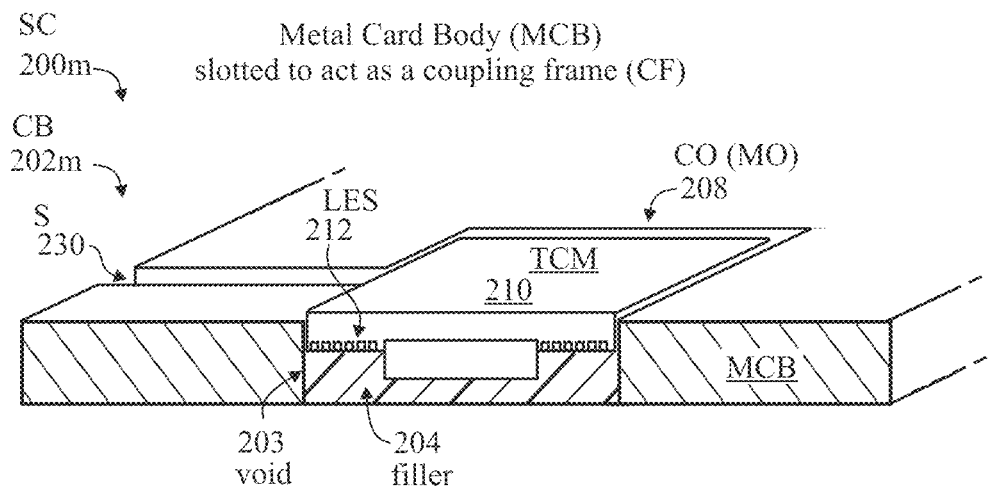
FIG. 2D is a diagram, partially in perspective and partially in cross-section, showing a transponder chip module (TCM) disposed in the card body (CB) of metal smartcard (SC), or metal card (MC), wherein substantially the entire card body (CB) comprises metal, and may be referred to as a metal card body (MCB).

FIG. 2D shows a transponder chip module (TCM) 210 disposed in the card body (CB) 202m of a metal smartcard (SC) 200m, or metal card (MC), wherein substantially the entire card body (e.g., 760 μm thick) comprises metal, and may be referred to as a metal card body (MCB). For such a metal card (MC), there has to be a non-conductive area behind the transponder chip module (TCM). The transponder chip module (TCM) resides in an opening (MO) 208, in the metal card body (MCB) 202 which may also be referred to as a module opening (MO). The opening (MO), may be prepared by mechanical milling, or laser ablation, and may be at least the size of the laser etched antenna structure (LES) 212, and may be stepped (for an example of a stepped recess/opening, see FIG. 2C) so that a portion of the metal card body (MCB) overlaps (underneath, as viewed) an outer portion of the laser-etched antenna structure (LES).

Throughout the embodiments disclosed herein, antenna structures (AS) which are other than laser-etched may be substituted for the laser-etched antenna structure (LES), if they can be made to exhibit sufficient performance, such as by having appropriate track width and spacing between tracks. These parameters are discussed elsewhere in this document.

For a metal card (MC), the back (bottom, as viewed) of the metal card body (MCB) should be open (free of metal, non-conductive) to avoid attenuation of the electromagnetic field. In other words, the opening (CO, or MO) should extend completely through the card body. This leaves a void 203 behind (below, as viewed) the transponder chip module (TCM) which may be filled with an epoxy or resin ("filler") 204. The void can be filled with a resin or with an active synthetic material ("filler") which illuminates during an electronic transaction (e.g., whilst being interrogated by an external reader). The void beneath the transponder chip module (TCM) could be a series of perforations, a slit or annulus that permits communication of the transponder chip module with the reader.

A slit (or slot, or gap, or band) (S) 230 may be provided through the metal card body (MCB) so that it can function as a coupling frame (CF) for capacitive coupling with a contactless reader.

A card body (CB) with a coupling frame (CF), or a metal card body (MCB) modified (such as with a slit) to act as a coupling frame (CF) may be provided as an interim product, into which a transponder chip module (TCM) may later be installed.

Some Embodiments of a Coupling Frame (CF)

Investigations into Designs and Configurations of a Coupling Frame (CF)

A substantial improvement in the activation distance of the Transponder IC Module (with a laser-etched antenna structure (LES)) may be achieved by placing a coupling frame (isolated conductor) around the transponder chip module (TCM), so long as the frame does not fully surround the module.

In an experimental set-up, tungsten plates were disposed around 3 sides of the module, which increased the activation distance from 18 mm to approximately 40 mm. The tungsten plates extended past the card body area. The coupling frame (CF) should be designed to fit within a standard card body area (54 mm×86 mm).

For purposes of this document, "activation distance" and "read/write distance" may be used interchangeably, an increase in one tending to manifest itself in a corresponding increase in the other.

This phenomenon (increased activation distance) has also been shown to work with 35 μm thick electrodeposited copper sheets, aluminum (aluminium), stainless steel, tungsten and ferrite material (magnetic particles) and is likely to work with any metal with a high enough conductivity.

Some investigations of this phenomenon and the effect on the transponder chip module (TCM) were made with a variety of frame designs and configurations positioned around the transponder chip module (TCM), but contained within the standard card body (CB) area.

For testing, a module size similar in dimensions to an 8 contact module, transponder chip module (TCM) with a laser-etched antenna structure (LES) was used, with dimensions of: 12.6 mm×11.4 mm. 35 μm electrodeposited copper was used as the material for the coupling frame (CF). The coupling frame (CF) was disposed closely adjacent to the perimeter of the transponder chip module (TCM). An RFID reader operating at 13.56 MHz was used to measure the activation distance. The "baseline" activation distance for the transponder chip module (TCM) itself was determined to be approximately 18 mm.

Figure 3A:
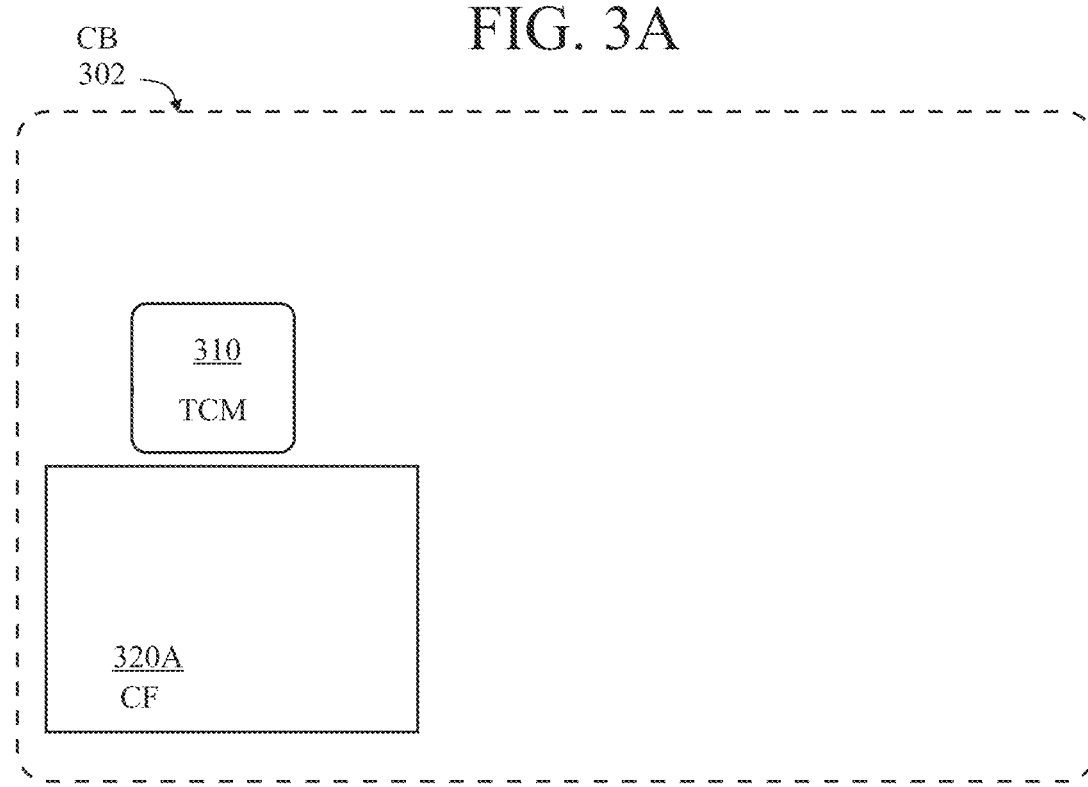
FIG. 3A is a diagram, in plan view, showing a coupling frame (CF) adjacent (partially surrounding) one side (or 90°) of a transponder chip module (TCM).

FIG. 3A shows a coupling frame (CF) 320A disposed on one side of a transponder chip module (TCM) 310 in a card body (CB) 302. Here, the coupling frame (CF) is disposed on only one side (lower, as viewed) of the transponder chip module (TCM), and extends from the lower (as viewed) edge of the transponder chip module (TCM) towards the lower edge of the card body (CB). The coupling frame (CF) also extends towards the left (as viewed) edge of the card body (CB). The coupling frame (CF) is larger (in area) than the transponder chip module (TCM), and may cover about 15% of the overall card area. (The percentages set forth herein are approximate.) An activation distance of 21 mm was achieved.

Figure 3B:
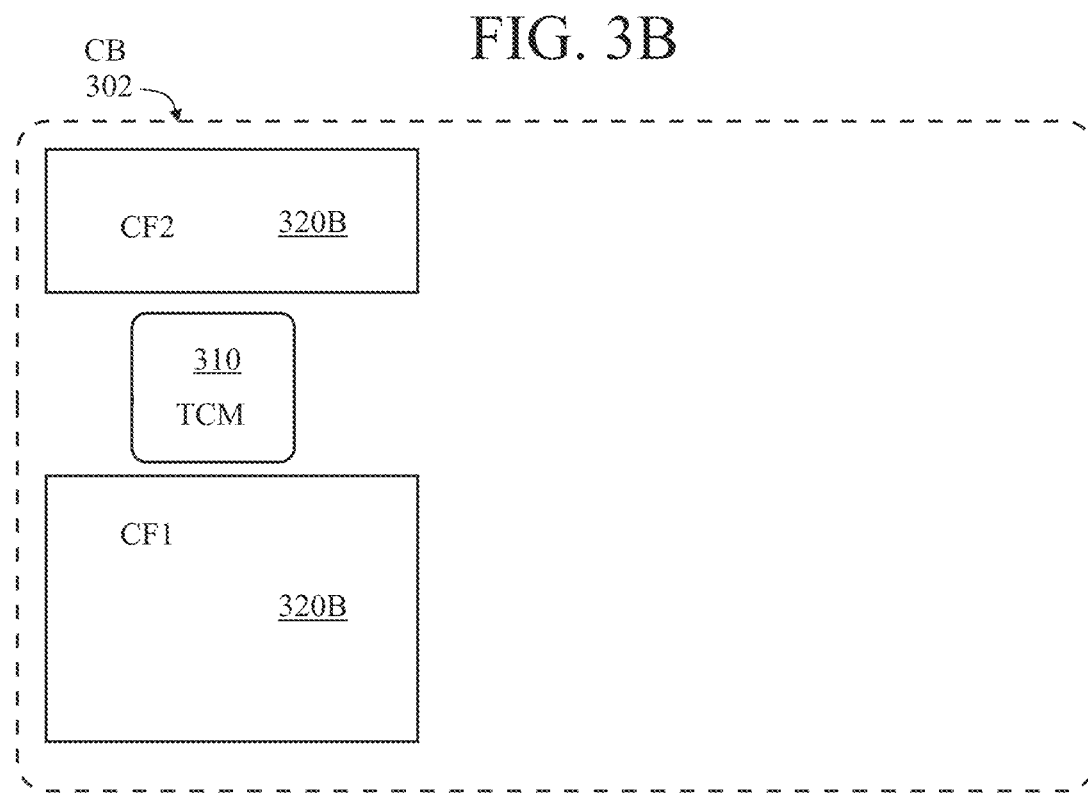
FIG. 3B is a diagram, in plan view, showing a coupling frame (CF) adjacent (partially surrounding) two opposite sides (or 90°+90°) of a transponder chip module (TCM).

FIG. 3B shows a coupling frame (CF) 320B disposed on two (opposite) sides of a transponder chip module (TCM) 310 in a card body (CB) 302. Here, the coupling frame (CF) comprises two separate portions—a first portion (CF1) disposed below the transponder chip module (TCM), similar to the previous embodiment (FIG. 3A), and a second portion (CF2) disposed above the transponder chip module (TCM). In this example, the two portions (CF1, CF2) of the overall coupling frame (CF) are not connected with one another, and surround two opposite sides of the transponder chip module (TCM) and, in aggregate cover about 25% of the overall card area. An activation distance of 25 mm was achieved.

Figure 3C:
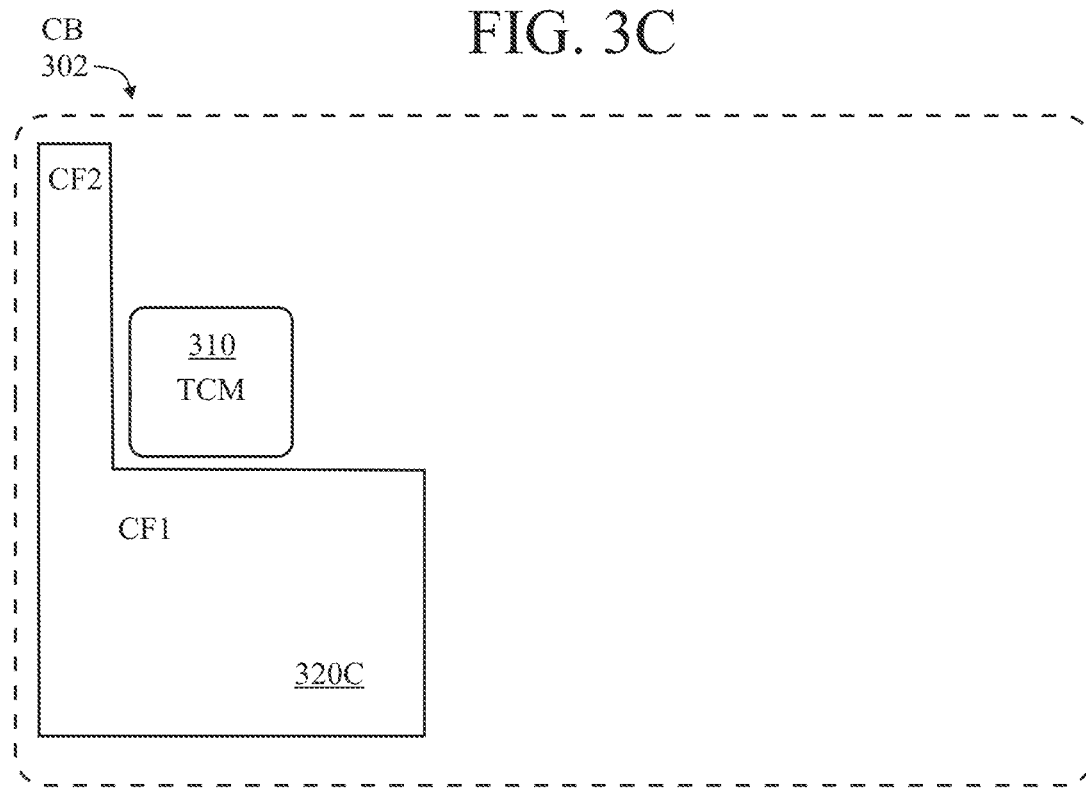
FIG. 3C is a diagram, in plan view, showing a coupling frame (CF) adjacent (partially surrounding) two adjacent sides (or 180°) of a transponder chip module (TCM).

FIG. 3C shows a coupling frame (CF) 320C disposed on two (adjacent) sides of a transponder chip module (TCM) 310 in a card body (CB) 302. Here, the coupling frame (CF) comprises a first portion (CF1) disposed below the transponder chip module (TCM), similar to the previous embodiment (FIG. 3B), and a second portion disposed to the left (as viewed) of the transponder chip module (TCM). The two portions are contiguous with one another, and surround two adjacent sides of the transponder chip module (TCM). An activation distance of 24 mm was achieved.

Note that, in most of the examples set forth here, the transponder chip module (TCM) is rectangular, having four sides. If the transponder chip module (TCM) were circular or elliptical, for example, rather than a coupling frame (CF) being disposed closely adjacent to and surrounding two or three or four "sides" of the transponder chip module (TCM), the coverage of the coupling frame (CF), vis-à-vis the transponder chip module (TCM) may be expressed in degrees, from 0° to 360°—for example, surrounding two sides or 180° of the transponder chip module (TCM), surrounding three sides or approximately 270° of the transponder chip module (TCM), surrounding four sides or approximately 360° of the transponder chip module (TCM).

Figure 3D:
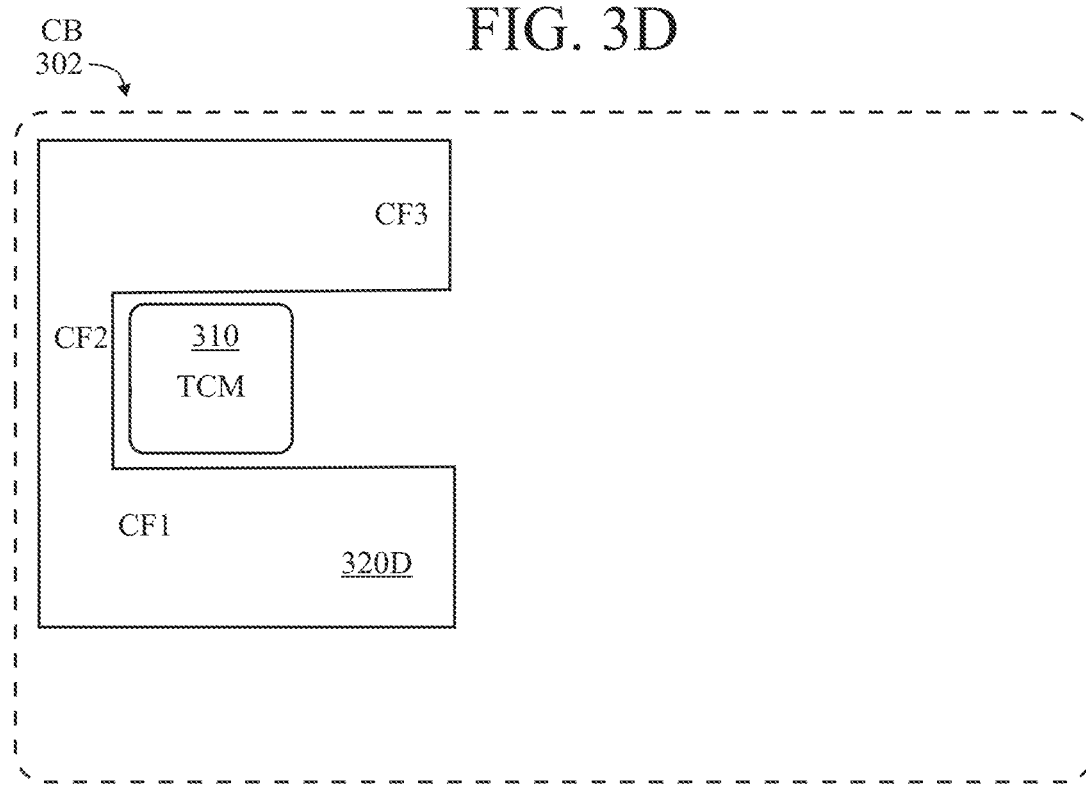
FIGS. 3D, 3E, 3F, 3G, 3H are diagrams, in plan view, showing a coupling frame (CF) adjacent (partially surrounding) three sides (or 270°) of a transponder chip module (TCM).

FIG. 3D shows a coupling frame (CF) 320D disposed on three sides (bottom, top, left) of a transponder chip module (TCM) 310 in a card body (CB) 302. Here, the coupling frame (CF) comprises a first portion (CF1) disposed below the transponder chip module (TCM), a second portion (CF2) disposed to the left (as viewed) of the TCM, and a third portion (CF3) disposed above (as viewed) the transponder chip module (TCM). The three portions (CF1, CF2, CF3) are contiguous with one another, and surround three sides (or 270°) of the transponder chip module (TCM). The third portion (CF3) is shown extending nearly to the top edge of the card body (CB). The second portion (CF2) is shown extending nearly to the left edge of the card body (CB). The first portion (CF1) is shown extending towards, bur not nearly to, the bottom edge of the card body (CB). The interior edges of the three portions (CF1, CF2, CF3) are disposed closely adjacent the outer edges of the transponder chip module (TCM), and the antenna structure (AS) or laser-etched antenna structure (LES) in the transponder chip module (TCM). An activation distance of 28 mm was achieved.

Figure 3E:
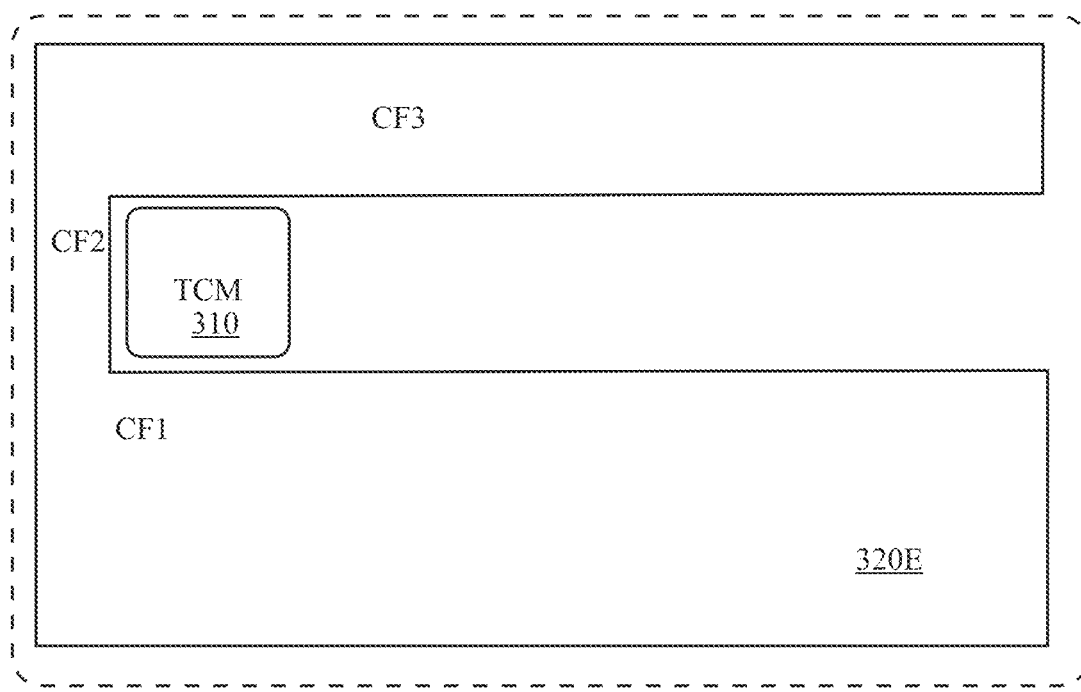

FIG. 3E shows a coupling frame (CF) 320E disposed on three sides (bottom, top, left) of a transponder chip module (TCM) 310 in a card body (CB) 302. Here, the coupling frame comprises a first portion (CF1) disposed below the transponder chip module (TCM), a second portion (CF2) disposed to the left (as viewed) of the transponder chip module (TCM), and a third portion (CF3) disposed above (as viewed) the transponder chip module (TCM). The three portions (CF1, CF2, CF3) are contiguous with one another, and surround three sides (or 270°) of the transponder chip module (TCM). The first and third portions extend substantially to the lower and upper (as viewed) edges of the card body (CB). The second portion (CF2) extends substantially to the left (as viewed) edge of the card body (CB). The first and third portions also extend substantially to the right (as viewed) edge of the card. This coupling frame (CF) surrounds three sides (or 270°) of the transponder chip module (TCM), and may cover a substantial portion (such as more than approximately 80%) of the card. An activation distance of 30 mm was achieved.

Figure 3F:
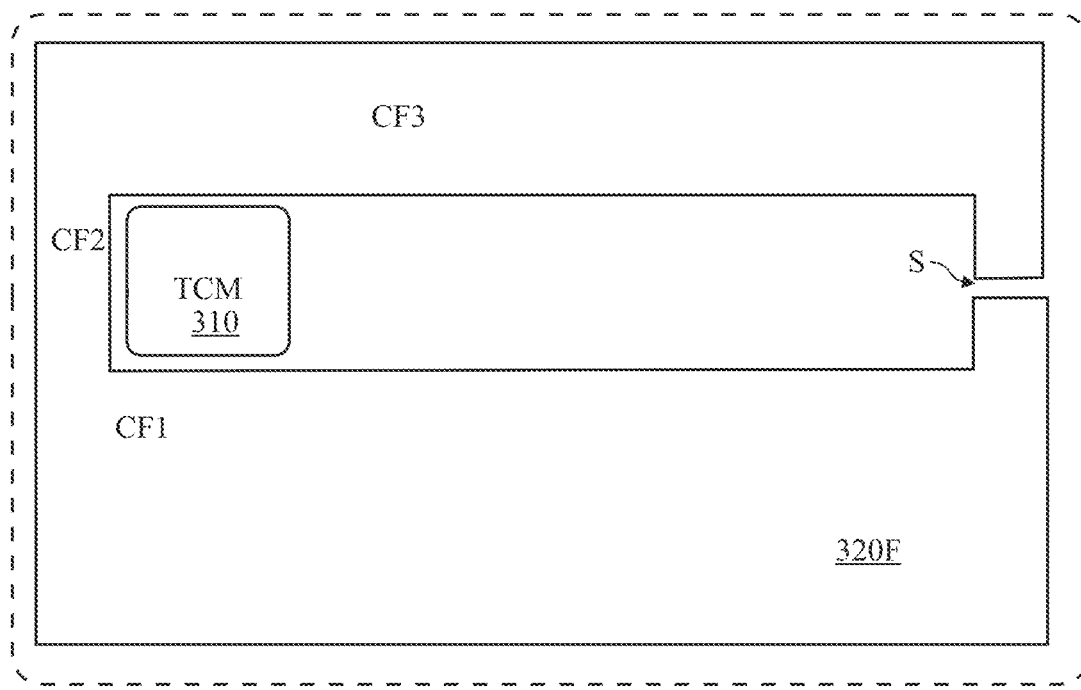

FIG. 3F shows a coupling frame (CF) 320F disposed on three sides (bottom, top, left) of a transponder chip module (TCM) 310 in a card body (CB) 302. Here, the coupling frame (CF) comprises a first portion (CF1) disposed below the transponder chip module (TCM), a second portion (CF2) disposed to the left (as viewed) of the transponder chip module (TCM), and a third portion (CF3) disposed above (as viewed) the transponder chip module (TCM). The three portions are contiguous with one another, and surround three sides (or 270°) of the transponder chip module (TCM). The first and third portions extend substantially to the lower and upper (as viewed) edges of the card. The second portion (CF2) extends substantially to the left (as viewed) edge of the card body (CB). The first and third portions also extend substantially to the right (as viewed) edge of the card body (CB). An end (right, as viewed) of the first portion (CF1) extends upward near the right edge of the card body (CB), and an end (right, as viewed) of the third portion (CF3) extends downward near the right edge of the card body (CB). There is a slit (or slot, or gap; S) between the opposing upward and downward extending of the first portion (CF1) and the third portion (CF3), respectively. This coupling frame (CF) surrounds three sides of the transponder chip module (TCM), and may cover a substantial portion (such as more than approximately 82%) of the card body (CB). An activation distance of 32 mm was achieved.

Figure 3G:
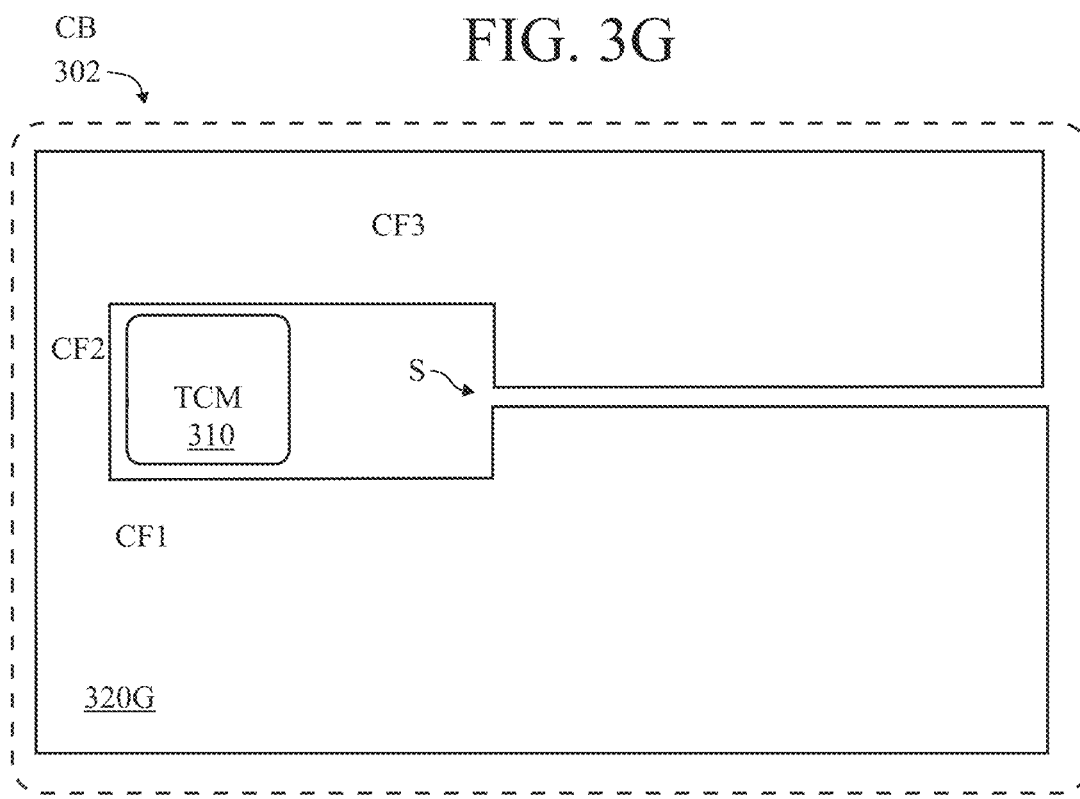

FIG. 3G shows a coupling frame (CF) 320G disposed on three sides (bottom, top, left) of a transponder chip module (TCM) 310 in a card body (CB) 302. Here, the coupling frame (CF) comprises a first portion (CF1) disposed below the transponder chip module (TCM), a second portion (CF2) disposed to the left (as viewed) of the transponder chip module (TCM), and a third portion (CF3) disposed above (as viewed) the transponder chip module (TCM). The three portions (CF1, CF2, CF3) are contiguous with one another, and surround three sides (or 270°) of the transponder chip module (TCM). The first and third portions extend substantially to the lower and upper (as viewed) edges of the card body (CB). The second portion extends substantially to the left (as viewed) edge of the card body (CB). The first and third portions also extend substantially to the right (as viewed) edge of the card. An end portion (right, as viewed) of the first portion (CF1) extends upward from near the right edge of the card body (CB) to about halfway across the card body (CB), and an end portion (right, as viewed) of the third portion (CF3) extends downward from near the right edge of the card body (CB) to about halfway across the card body (CB). These upward and downward extending portions extend from the right edge of the card body (CB) approximately halfway across the card body (CB) to the transponder chip module (TCM). There is a slit (or slot, or gap; S) 330 between the opposing end portions of the first portion (CF1) and the third portion (CF3). The coupling frame (CF) has an opening (MO) 308 for receiving the transponder chip module (TCM), surrounds three sides (or 270°) of the transponder chip module (TCM), and may cover a substantial portion (such as more than approximately 85%) of the card body (CB). An activation distance of 34 mm was achieved.

Figure 3H:
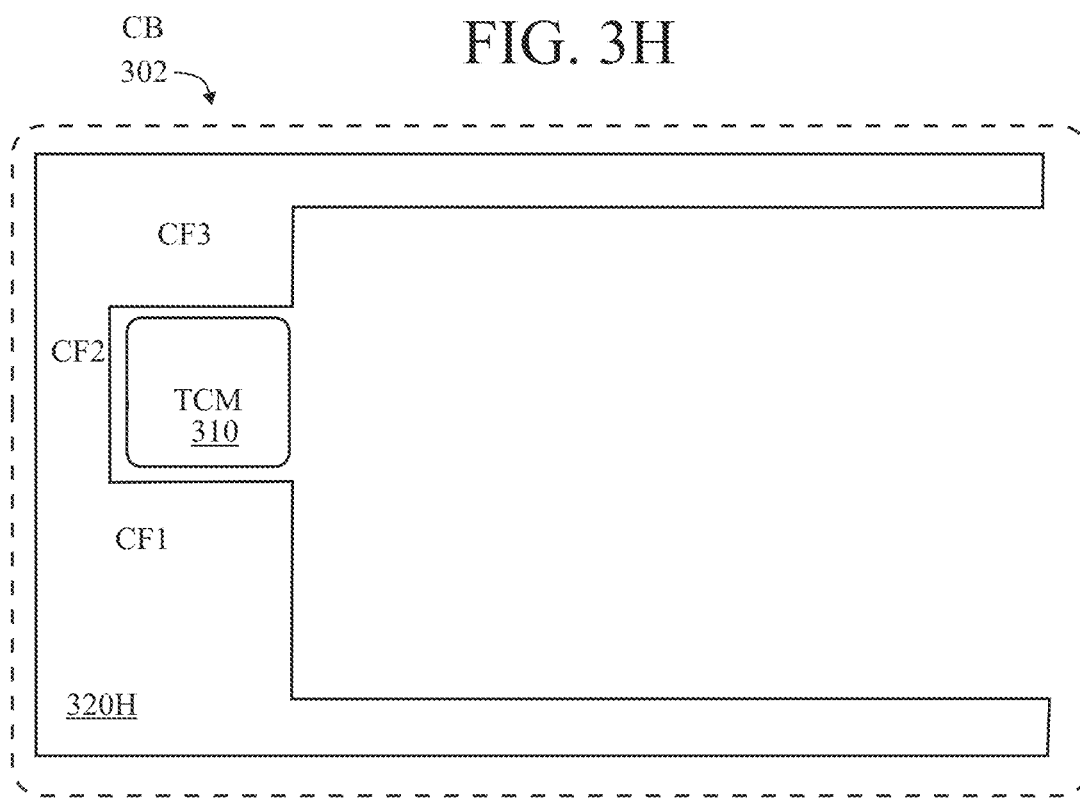

FIG. 3H shows a coupling frame (CF) 320H disposed on three sides (bottom, top, left) of a transponder chip module (TCM) 310 in a card body (CB) 302. Here, the coupling frame (CF) comprises a first portion (CF1) disposed below the transponder chip module (TCM), a second portion (CF2) disposed to the left (as viewed) of the transponder chip module (TCM), and a third portion (CF3) disposed above (as viewed) the transponder chip module (TCM). The three portions (CF1, CF2, CF3) are contiguous with one another, and surround three sides (or 270°) of the transponder chip module (TCM). The first and third portions extend substantially to the lower and upper (as viewed) edges of the card body (CB). The second portion extends substantially to the left (as viewed) edge of the card body (CB). The first and third portions also extend to the right (as viewed) edge of the card body (CB), but this extension of the first and third portions is narrower than that shown in FIG. 3G. This coupling frame (CF) surrounds three sides (or 270°) of the transponder chip module (TCM), and may cover a portion (such as approximately 30%) of the card body (CB). An activation distance of 28 mm was achieved.

Some experiments were conducted, using a version of the coupling frame (CF) adjacent three sides (or 270°) of the transponder chip module (TCM), such as in FIG. 3D, and varying the separation between the inside edge(s) of the coupling frame (CF) and the outer edge(s) of the transponder chip module (TCM). Results indicated that decreasing the separation resulted in increased activation distance.

It bears mention that the actual spacing (or separation, or gap) of interest may be the distance between the inside edge of the coupling frame (CF) and the outer track of the antenna structure (LES) of the transponder chip module (TCM) which extends nearly to the outer edge(s) of the overall transponder chip module (TCM). In some configurations (which were not tested), the gap may be reduced almost to zero and, with a stepped recess in the card body (CB), the coupling frame (CF) may actually slightly overlap outer tracks of the laser-etched antenna structure (LES) separated by an adhesive layer (approximately 30 µm) which acts as a dielectric medium. See FIG. 2C.

Some experiments were conducted, using different thickness (35 µm, 12 µm) coupling frames (CF), and there was no noticeable difference in activation distance.

Some experiments were conducted, using a tungsten plate for the coupling frame (CF), surrounding two adjacent sides of the transponder chip module (TCM). Results were favourable.

Some Conclusions and Comments

Best results may occur when the coupling frame (CF) is disposed around at least three sides of the transponder chip module (TCM).

Surface area of coupling frame (CF) may have an impact on performance, with larger area resulting in increased activation distance.

Extending the coupling frame (CF) entirely (rather than partially) across the width of the card body (CB), without openings in the metal layer (ML) forming the coupling frame (CF), may significantly improve (increase) activation distance, which may indicate that an enlarged metallic area around the transponder chip module (TCM) provided by the coupling frame (CF) improves the capacitive coupling with the reader.

Separation of (or, gap between) the coupling frame (CF) from (and) the transponder chip module (TCM) may have a significant impact, with reduced separation (smaller gap) resulting in increased activation distance.

The thickness of the coupling frame (CF) does not appear to have any impact on the coupling frame's performance.

Conductive materials other than copper may be used as a material for the conducting frame (CF).

The activation distance of an 8-contact (8 contact pads) transponder chip module (TCM) used in trials was 18 mm without the coupling frame (CF). With the coupling frame (CF), the activation distance was increased by approximately 10 mm, or more than 50%, to approximately 28 mm.

The coupling frame (CF) may extend into the embossing area (lower half) of the card body (CB), and when sized back to avoid the embossing area, there may be a negatively effect on the performance of the coupling frame (CF). However this may be overcome by reshaping the coupling frame (CF), or rotating it, so that the coupling frame (CF) no longer encroaches upon the embossing area.

When the transponder chip module (TCM) is surrounded (partially, or nearly completely) by the coupling frame (CF), an improvement (increase) may be observed in the activation distance, compared to when no coupling frame (CF) is present. Based on this observation, it may be possible to improve the performance of a metal (such as stainless steel) card body design (which may have a layer of stainless steel covering nearly an entire layer of the card body), by making a slit or a gap in the steel card body to break the continuous "loop" of metal around the transponder chip module (TCM). This is shown, for example, FIGS. 5B and 6A.

With a coupling frame (CF) in the card body (CB), surrounding the transponder chip module (TCM), and with the antenna structure (LES) disposed substantially coplanar with the coupling frame (CF), read/write distances of at least 2 cm (including at least 3 cm, potentially including at least 4 cm) may be achieved, without requiring a booster antenna (BA) in the card body (CB).

Coupling frames (CFs) can be made from foil metals, thickness from 9-100 µm or from bulk metal with thickness up to the total normal thickness of a smartcard (760 µm). The metal can be any metal or alloy, for example copper, aluminum, brass, steel, tungsten, titanium. The metal foil may be of any origin, e.g. electrodeposited or roll annealed. The coupling frames (CF) may be made by electroless deposition on a substrate followed by electroplating.

The coupling frame (CF) can be formed from a metal insert or slug placed in the card body (CB) to increase weight of the card. The metal insert may acts as a coupling frame when used with an appropriate laser etched antenna structure (LES).

The coupling frame (CF) can be formed from a conductive material deposited on a substrate. For example, conductive carbon paste silk screen printed onto paper or silver particulate ink silk screen printed onto PET (with subsequent annealing to allow formation of a conductive film). Alternatively, the coupling frame (CF) can be formed from vapor deposited or sputter coated metals (e.g. aluminum) on plastic coated substrates.

The coupling frame (CF) may be formed from a loop of wire. The loop of wire may be embedded in a plastic substrate.

The coupling frame may overlap part of the laser etched antenna structure (LES) and may be brought into close proximity with the LES in order to increase the electromagnetic coupling between these components and hence increase the performance of the smartcard. (Overlap of the coupling frame CF over the antenna of the transponder chip module (TCM) may result from or may require that there is a stepped recess in the card body CB) for receiving the transponder chip module TCM).

The laser-etched antenna structure (LES) on the transponder chip module may be co-planar with the coupling fame (CF), with a gap therebetween of 50-300 µm. However, the laser-etched antenna structure (LES) could also be overlapping the coupling frame in a stepped recess. If the coupling frame (CF) is overlapping the laser-etched antenna structure (LES), the distance (vertical offset) between the tracks of the laser-etched antenna structure (LES) tracks and the coupling frame (CF) should have a minimum distance of approximately 30 µm, with a dielectric material therebetween such as adhesive tape (Tesa) or resin holding or fixing the antenna module (AM) or transponder chip module (TCM) in place. The adhesive tape may comprise a hotmelt adhesive manufactured by Tesa.

The coupling frame (CF) (or metal layer ML) may host (be provided with, may comprise) an engraving, embossing, or stamped feature/logo/ID which serves as a security feature for the smartcard. This feature may or may not be visible on the card surface after lamination of the card stack-up. This feature may be visible on X-ray, CT or other scanning equipment such as that used at security screening points (e.g. in airports). This feature may permit identification of the card and be used to validate the authenticity of a given card. Features on the transponder chip module (TCM) or coupling frame (CF) may authenticate the components against pirate imitations.

Some Additional Embodiments of Coupling Frames (CF)

Figure 4A:
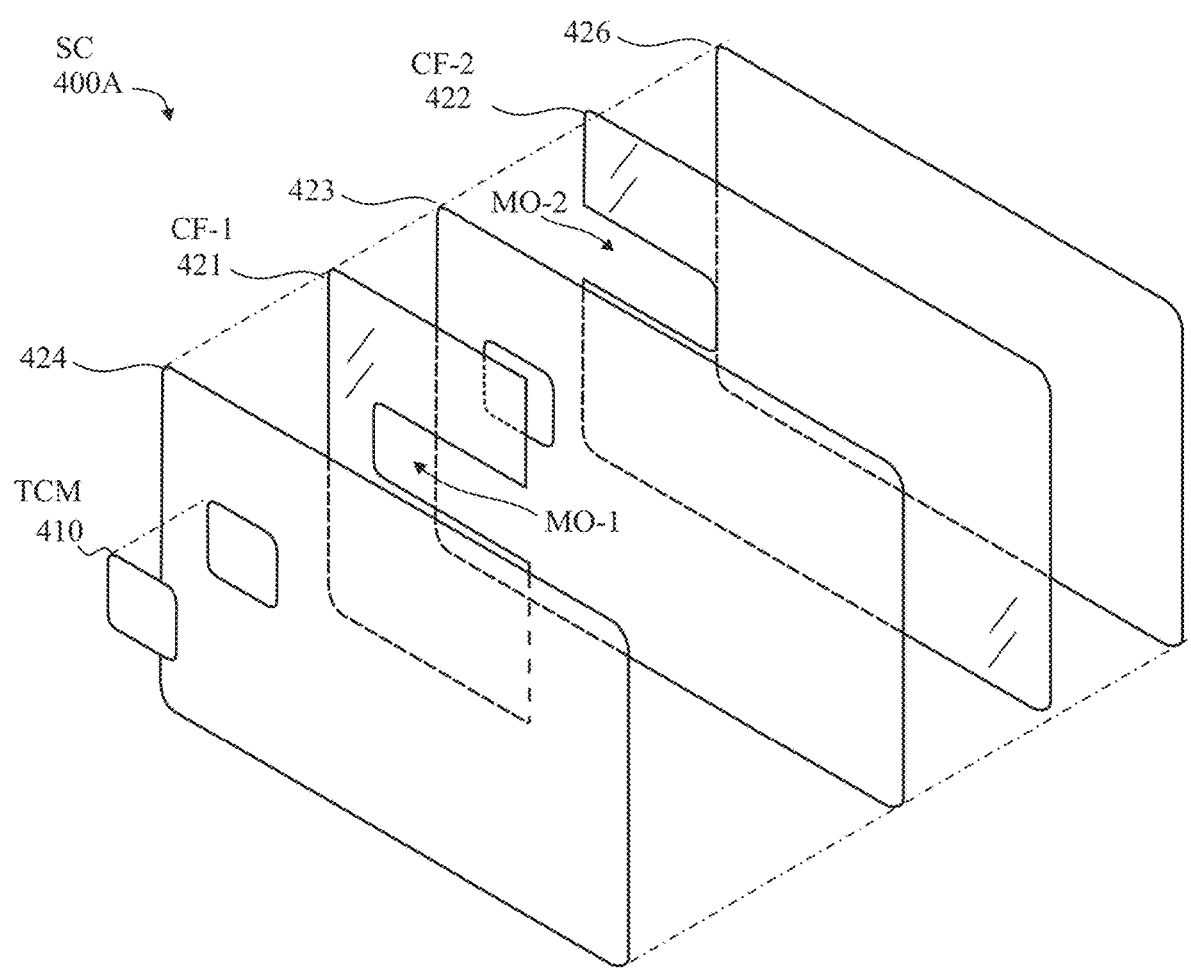
FIG. 4A is an exploded view of a smartcard (SC) having two coupling frames (CF) on two different layers.

FIG. 4A illustrates an embodiment of a smartcard 400A having a multiple coupling frame stack-up. Here, there are two coupling frames (CF-1, CF-2) 421, 422 in different layers of the card body (CB), separated by a layer 423 of non-conductive material (such as PVC). The stack-up comprises a front face card layer 424, a first coupling frame (CF-1) 421, an internal card dielectric layer 423, a second coupling frame (CF-2) 422 and a rear face card layer 426. The first coupling frame (CF-1) surrounds the top, left and bottom edges of the transponder chip module (TCM) 410, and extends to the top, left and bottom edges of the card body (CB), and has a module opening (MO-1). The second coupling frame (CF-2) surrounds the top, right and bottom edges transponder chip module (TCM), and extends to the top, right and bottom edges of the card, and has a module opening (MO-2). In aggregate, the first and second coupling frames (which may be referred to as "420") cover nearly the entire surface of the card body 402 (less the area of the transponder chip module TCM). An activation distance of 40 mm was achieved.

The coupling frames 421, 422 illustrated in FIG. 4A may be exemplary of any of the coupling frames disclosed herein. Or, stated otherwise, may be "replaced" by some of the other coupling frames disclosed herein, including selected features thereof.

Although illustrated with "extended" module openings forming what may be considered to be very wide "slits", each of the coupling frames 421, 422 may be formed with a narrow slit (S) smaller than the module opening (MO), such as shown and described with respect to FIGS. 2D, 4B, 4C, 4I, 5B, 6A, 8, 9, 10. Refer also to FIGS. 3F,G. Compare FIG. 5A which shows a slit (S, 530) which is as wide as the module opening (MO, 508).

The coupling frames 421, 422 may be formed to overlap at least a portion of the module antenna (MA, LES), such as shown and described with respect to FIG. 2C. Compare FIG. 11F (CF overlaps PA in a TCM). It may be desirable that the slit of the coupling frame overlaps the module antenna.

In response to an exciting RF field (such as from an external reader), eddy currents may be concentrated at edges of the metal layer forming the coupling frame, particularly adjacent to the slit, and this may enhance coupling between the coupling frame and the module antenna.

Although coupling frame 421 is illustrated as extending only partially across the width of the card, the coupling frame 422 is illustrated extending fully across the width of the card. The coupling frame 421 may also extend fully across the width of the card.

As shown in FIG. 4A, the slit (opening) of the coupling frame 421 extends from the module opening towards the right edge (as viewed) of the card, and the slit (opening) of the coupling frame 422 extends from the module opening to the left edge (as viewed) of the card. This illustrates that the slits of the two coupling frames may be arranged in different directions (or orientations) than one another (extending in different directions from their respective module openings), so that the slit of one coupling frame may be supported by an area without a slit of the other coupling frame.

The slit (S) may compromise the mechanical integrity of the coupling frame (CF), making it less resistant to twisting. And, if a very small slit (S) is used, it is important to keep the ends of the coupling frame (CF) from touching one another. Incorporating a reinforcing structure (RS, 832) is described with reference to FIG. 8. Arranging (or orienting) the slits of multiple, stacked coupling frames differently than one another may provide similar reinforcement, without the need for an additional reinforcing structure.

As mentioned above, the coupling frame may be disposed closely adjacent to the transponder chip module when the transponder chip module is disposed in the opening. A portion of the coupling frame (CF) may overlap a portion of an antenna structure (AS) in the transponder chip module (TCM). The coupling frames may each extend over substantially the entire area of the smartcard.

Figure 4B:
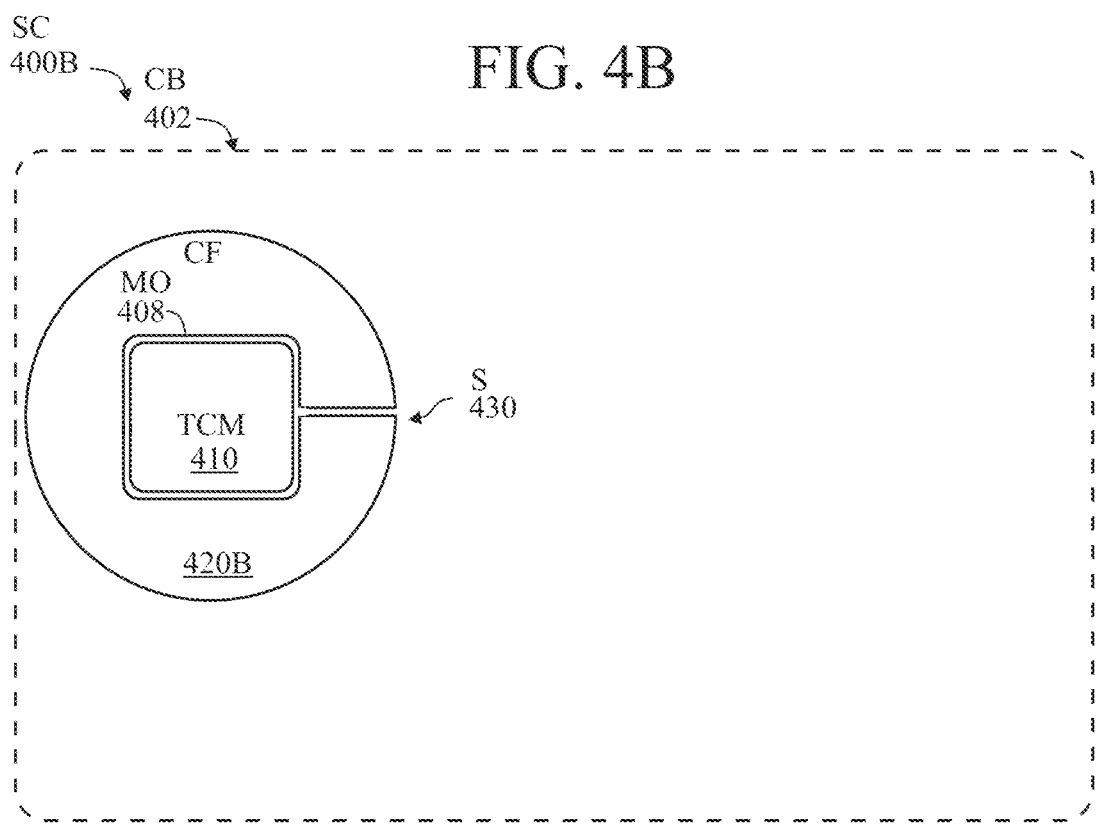
FIGS. 4B, 4C are diagrams in plan view, showing a coupling frame (CF) closely adjacent, and substantially surrounding four sides (or nearly 360°) of a transponder chip module (TCM).

FIG. 4B illustrates an embodiment of a smartcard 400B having a coupling frame (CF) 420B in the form of a ring having a circular outer periphery and a rectangular module opening (MO) in the metal layer (ML) of the coupling frame (CF) whereat the transponder chip module (TCM) 410 may be disposed. Here, the coupling frame (CF) nearly completely surrounds the transponder chip module (TCM), except for a slit (S) 430. The slit (S) is shown on the right side of the transponder chip module (TCM), but could extend from any side thereof (more accurately, from any position in the module opening (MO 408). The slit (S), or gap between the opposed ends of the coupling frame (CF), is important so that the coupling frame (CF) is not a closed loop, but rather is an open loop. The slit (S) extends from the module opening (MO) to the periphery (outer edge) of the coupling frame (CF), and may be very narrow (small width). The coupling frame (CF) in this example is a few times larger than the transponder chip module (TCM), and may cover approximately 15% of the card body (CB) 402. An activation distance of 33 mm was achieved.

The slit (S) may be much smaller than the module opening (MO). The module opening (MO) is approximately 10×10 mm, depending on the size of the transponder chip module (TCM). The 50 μm size (width) for the slit (S) is approximate, and exemplary. A 50 μm wide slit (S) would be approximately 0.5% of the size of the module opening (MO). The slit may be less than 50% of the size of the module opening (MO), including less than 25%, less than 10%, less than 5% and less than 1% of the size of the module opening (MO). The slit (S) may be filled with a non-conductive material. If the width of the slit (S) is equal to the size of the transponder chip module (TCM), the coupling frame (CF) would be adjacent three sides of the transponder chip module (TCM), as in FIG. 3D, for example. The slit (S) may be formed by laser etching, which is suitable for forming a very narrow (e.g., 50 μm) slit in some materials. Other materials are not amenable to laser etching, and may require conventional mechanical processes to form a wider slit, or slot.

The slit (S) may extend in any direction, from anywhere on the module opening (MO) to the periphery of the metal layer (ML) of the coupling frame (CF), so that the coupling frame (CF) is an open loop, having two ends (or end portions). And, the slit (S) may extend only partially through the metal layer (ML) of the coupling frame (CF), leaving only a very thin layer of metal which is transparent to electromagnetic waves below the slit.

Figure 4C:
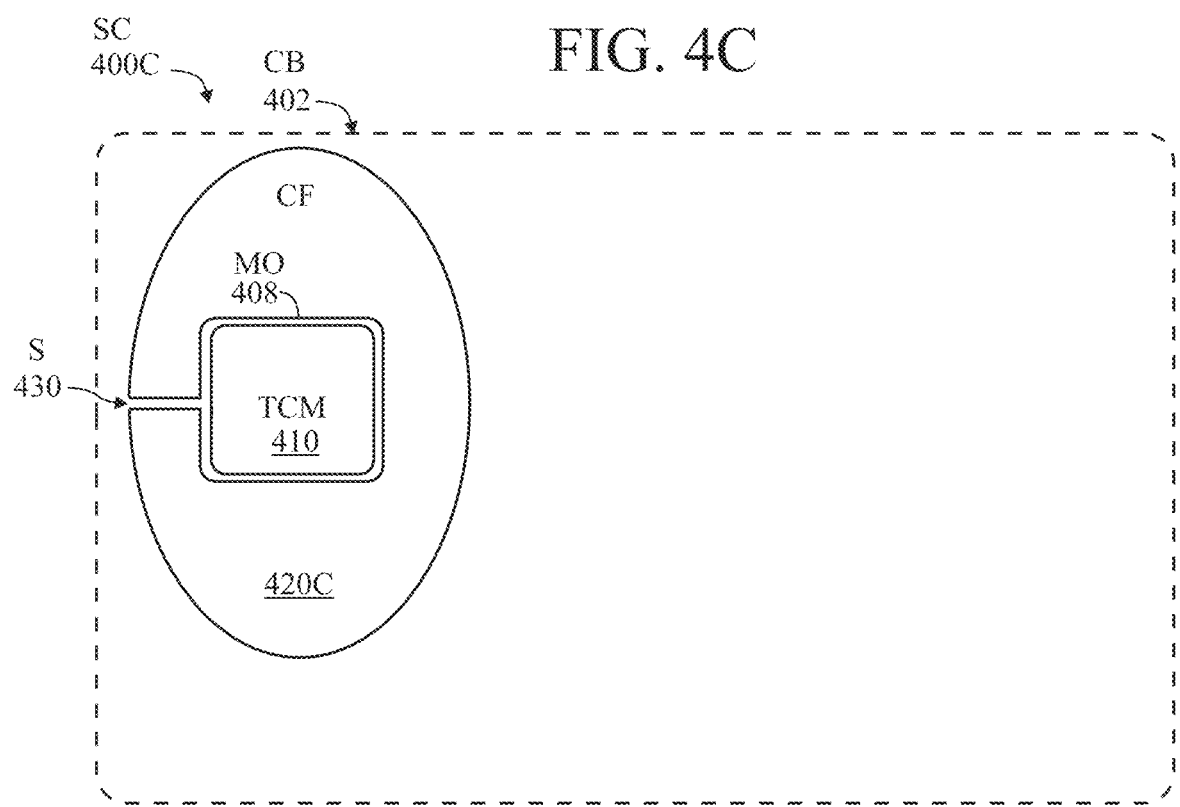

FIG. 4C illustrates an embodiment of a smartcard 400C having a coupling frame (CF) 420C in the form of a ring having an elliptical outer periphery and a rectangular module opening (MO) whereat the transponder chip module (TCM) 410 may be disposed. Here, the coupling frame (CF) nearly completely surrounds the transponder chip module (TCM), except for a slit (S) 430. The slit (S) is shown on the left side of the transponder chip module (TCM), but could extend from any side thereof (more accurately, from any position in the module opening (MO 408). The slit (S) extends from the module opening (MO) to the outer periphery of the coupling frame (CF), and may be very narrow (small width). The coupling frame (CF) in this example is a few times larger than the transponder chip module (TCM), and may cover approximately 20% of the card body (CB) 402. An activation distance of 35 mm was achieved.

Figure 4D:
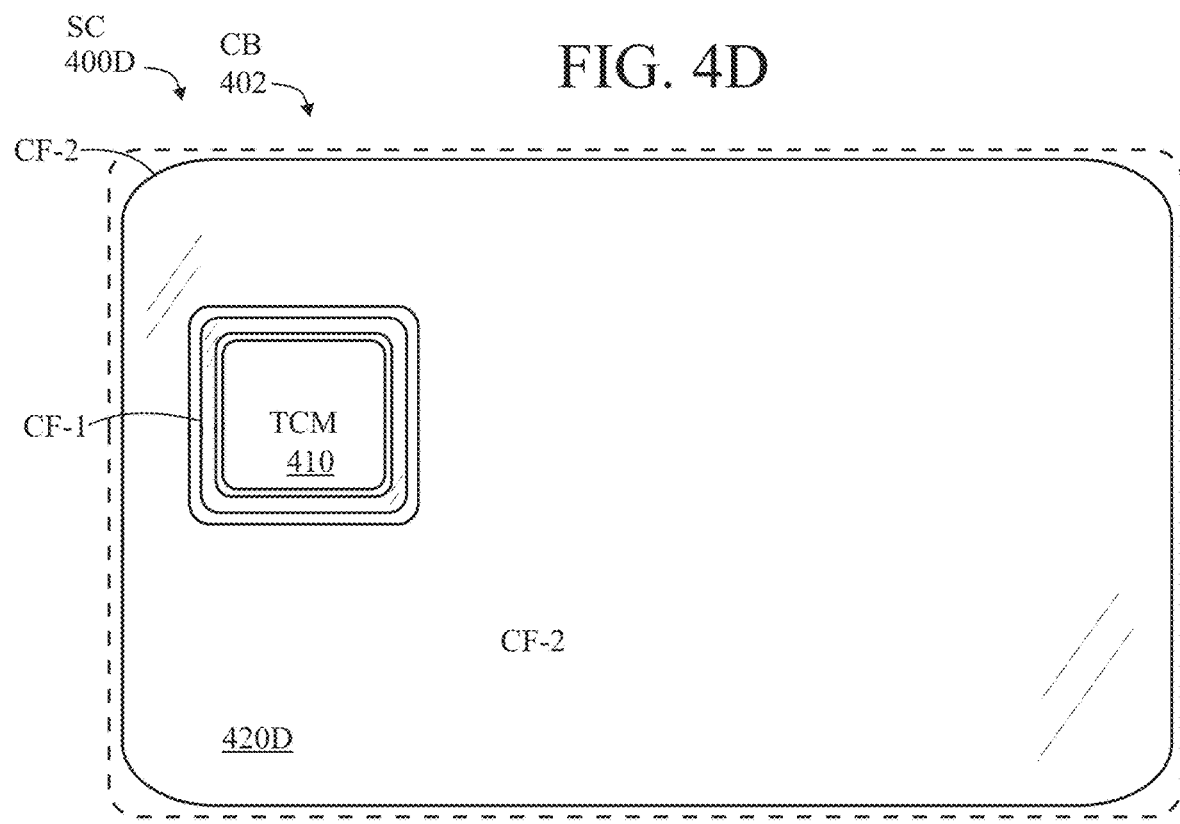
FIG. 4D is a diagram of a smartcard (SC) having an inner coupling frame (CF-1) and an outer coupling frame (CF-2) surrounding a transponder chip module (TCM). Neither coupling frame has a slit.

FIG. 4D illustrates an embodiment of a smartcard 400D having a coupling frame (CF) 420D comprising a first, inner ring-shaped coupling frame (CF-1) disposed around and completely surrounding the transponder chip module (TCM) 410 and an outer coupling frame (CF-2) disposed around and spaced outward from the inner coupling frame (CF-1) and extending substantially to the periphery of the card body (CB) 402. In this embodiment, both of the coupling frames (CF-1, CF-2) are closed loops. This figure shows a first closed loop (no slit) coupling frame disposed around the transponder chip module (TCM), and a second closed loop (no slit) coupling frame (CF-2) disposed substantially concentrically around the first coupling frame (CF-1). The first coupling frame (CF-1) is only slightly larger than the transponder chip module (TCM). The second coupling frame (CF-2) may extend to the top, bottom, left and right edges of the card, covering nearly 100% of the card area (less the module opening MO and the first coupling frame CF-1). This configuration, wherein the coupling frame(s) (CF-1, CF-2) are closed loop (no slits), may not improved activation distance and, in fact, may impair it.

Figure 4E:
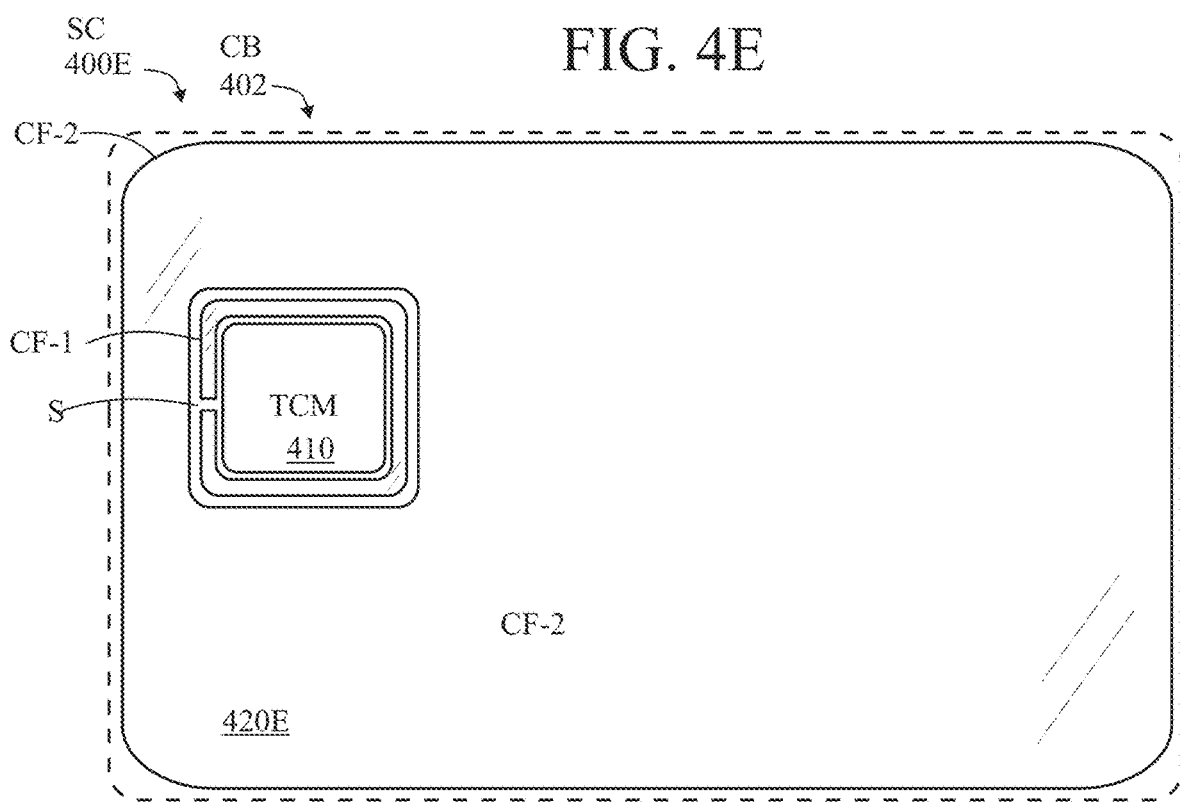
FIG. 4E is a diagram of a smartcard (SC) having an inner coupling frame (CF-1) and an outer coupling frame (CF-2) surrounding a transponder chip module (TCM). The inner coupling frame (CF-1) has a slit (S). The outer coupling frame (CF-2) does not have a slit.

FIG. 4E illustrates an embodiment of a smartcard 400E having a coupling frame (CF) 420E comprising an inner ring-shaped coupling frame (CF-1) disposed around and completely surrounding the transponder chip module (TCM) 410 and an outer coupling frame (CF-2) disposed around and spaced outward from the inner coupling frame (CF-1) and extending substantially to the periphery of the card body (CB) 402. This figure shows a first open loop (with a slit S, 430) coupling frame (CF-1) disposed around the transponder chip module (TCM), and a second closed loop (no slit) coupling frame (CF-2) disposed substantially concentrically around the first coupling frame (CF-1). The first coupling frame (CF-1) is only slightly larger than the transponder chip module (TCM). The second coupling frame (CF-2) may extend to the top, bottom, left and right edges of the card, covering nearly 100% of the card area (less the module opening MO and the first coupling frame CF-1). This configuration, wherein the first coupling frame (CF-1) is open loop (has a slit (S)), and the second coupling frame (CF-2) is closed loop (no slit), may not significantly improve activation distance.

Figure 4F:
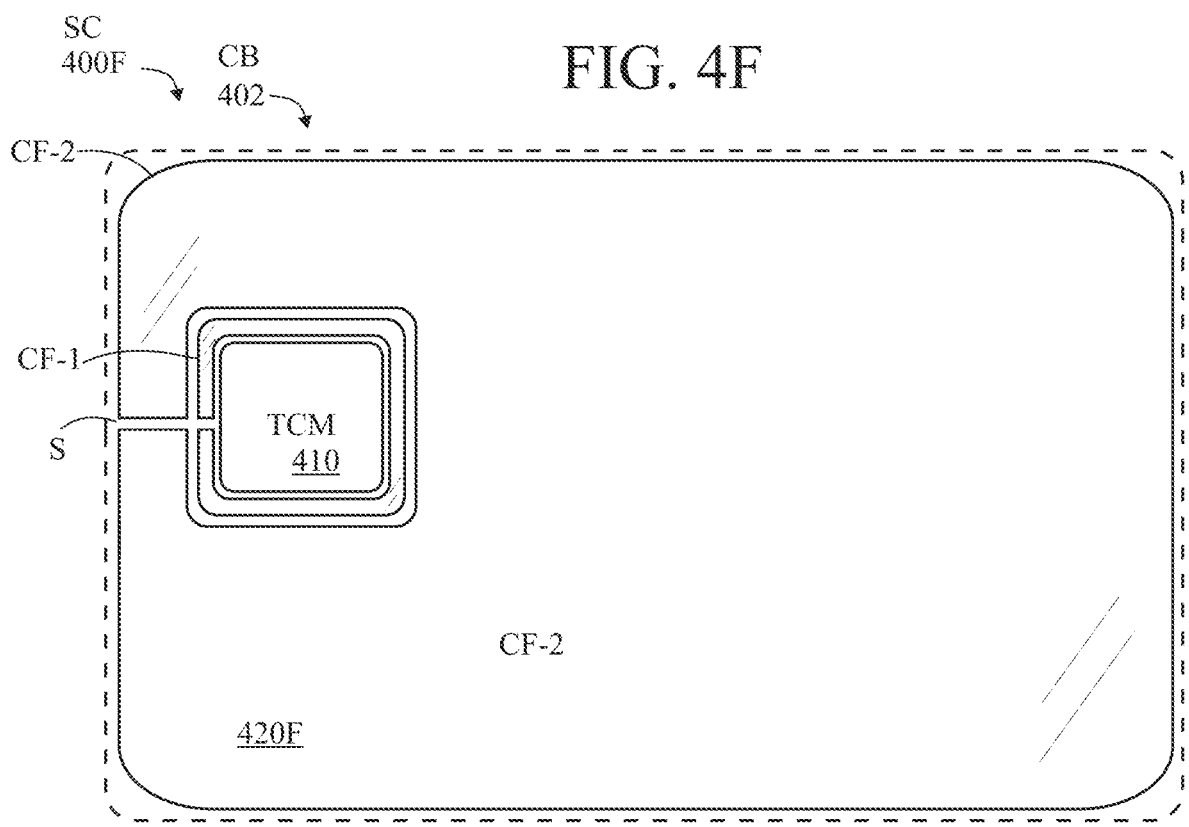
FIG. 4F is a diagram of a smartcard (SC) having an inner coupling frame (CF-1) and an outer coupling frame (CF-2) surrounding a transponder chip module (TCM). Both coupling frames (CF-1, CF-2) have slits (S).

FIG. 4F illustrates an embodiment of a smartcard 400F having a coupling frame (CF) 420F comprising an inner ring-shaped (CF-1) disposed around and completely surrounding the transponder chip module (TCM) 410 and having a slit (S) 430, and an outer coupling frame (CF-2) disposed around and spaced outward from the inner coupling frame (CF-1) and also have a slit and extending substantially to the periphery of the card body (CB) 402. In this embodiment, both of the coupling frames (CF-1, CF-2) are open loops. This figure shows a first open loop (with a slit) coupling frame (CF-1) disposed around the transponder chip module (TCM), and a second open loop (with a slit) coupling frame (CF-2) disposed substantially concentrically around the first coupling frame (CF-1). The first coupling frame (CF-1) is only slightly larger than the transponder chip module (TCM). The second coupling frame (CF-2) may extend to the top, bottom, left and right edges of the card body (CB). The slits (S) in the first and second coupling frames are shown as both being disposed to the left of the transponder chip module (TCM). An activation distance of 36 mm was achieved.

Figure 4G:
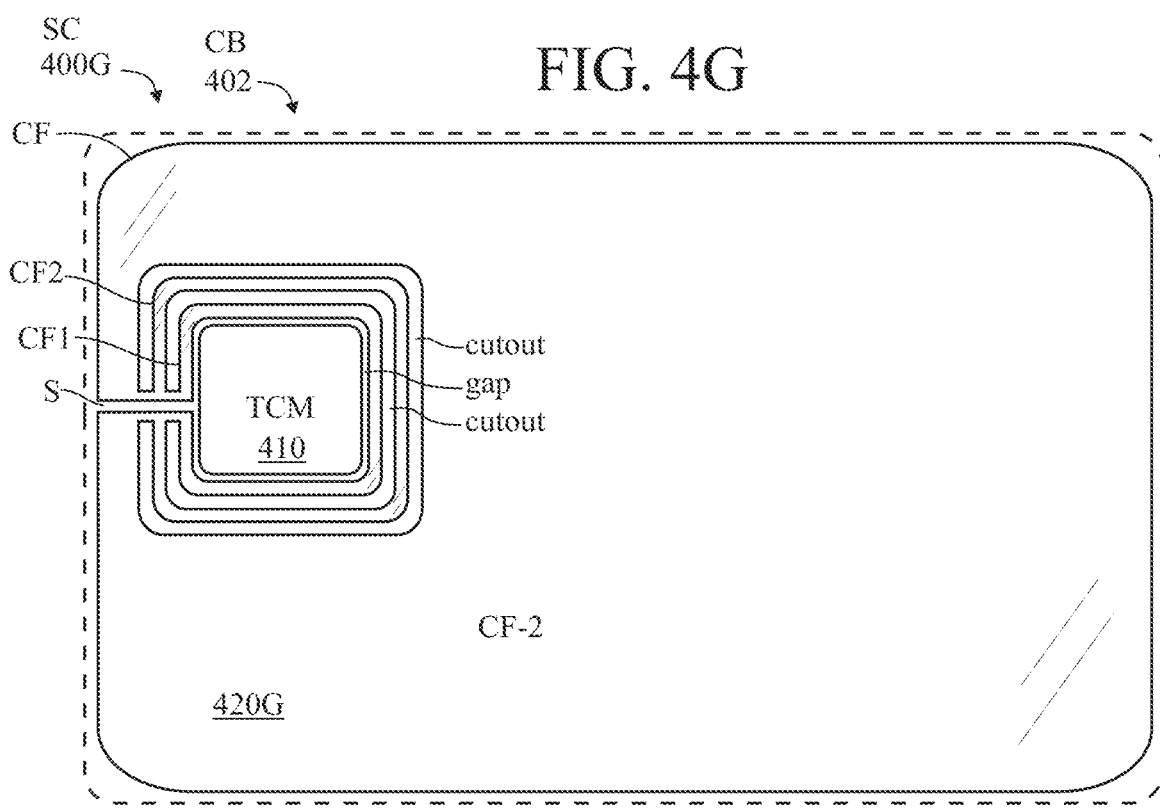
FIG. 4G is a diagram of a smartcard (SC) having a coupling frame (CF) and a number of cutouts establishing different portions (CF1, CF2) of the coupling frame (CF).

FIG. 4G illustrates embodiment of a smartcard 400G having multiple linked open loop coupling frames, with full card size outer frame, in a card body (CB) 402. Alternatively, the overall coupling frame (CF) 420G may be characterized as having a number of ring cutouts in it, concentrically, at increasing distances from the transponder chip module (TCM) 410. A first portion (CF1) of the coupling frame (CF) is disposed nearly fully around the transponder chip module (TCM), separated therefrom by a gap ("gap"). A second portion (CF2) of the coupling frame (CF) is disposed around the first portion (CF1) of the coupling frame (CF), separated therefrom by a ring-shaped cutout ("cutout") nearly fully encircling the transponder chip module (TCM). A second portion (CF2) of the coupling frame (CF) is disposed nearly fully around the first portion (CF1) of the coupling frame (CF), separated therefrom by a ring-shaped cutout ("cutout"). The first coupling frame (CF1) is only slightly larger than the transponder chip module (TCM). The slits (S) 430 in the first and second portions (CF1, CF2) of the coupling frame (CF) are shown as all being disposed to the left of the transponder chip module (TCM). In this example, the ends of the coupling frame portions (CF1, CF2) are connected with one another. (It may be noted that, without the cutouts, thereby being one large coupling frame with a slit, this configuration would resemble the embodiment shown in FIG. 5G.) An activation distance of 38 mm was achieved.

Figure 4H:
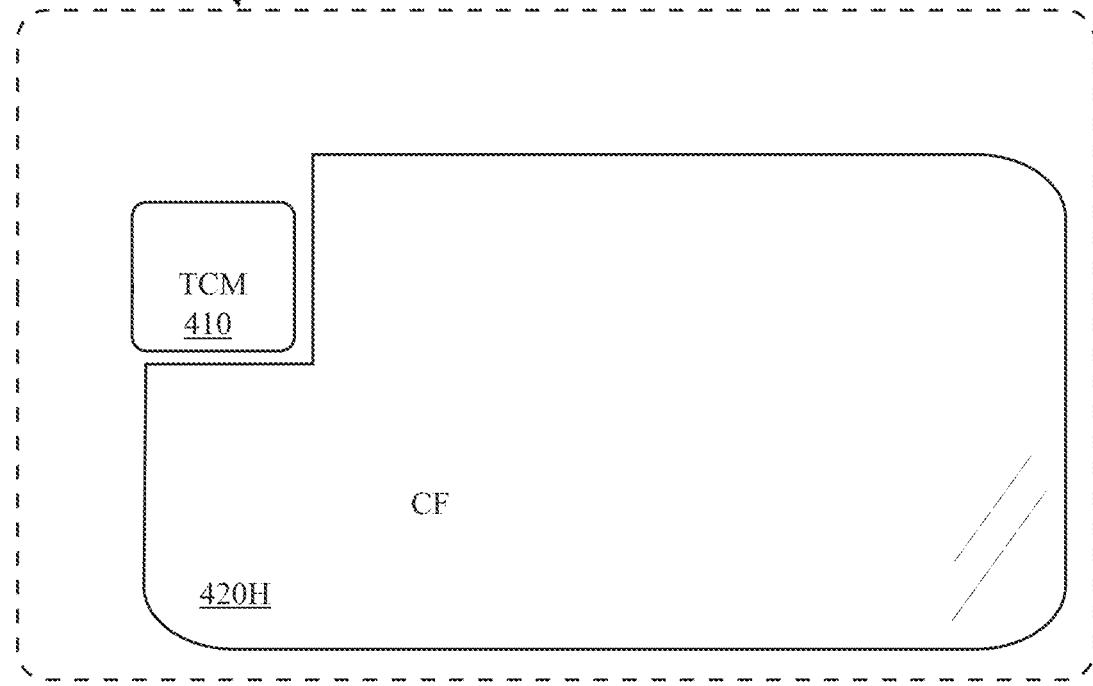
FIG. 4H is a diagram of a smartcard (SC) having a coupling frame (CF) extending from two sides of a transponder chip module (TCM).

FIG. 4H shows an embodiment of smartcard 400H having a coupling frame (CF) 420H made of tungsten or other high density metal or metal alloy, and surrounding only two adjacent sides (or 180°) of a transponder chip module (TCM) 410. Here, the coupling frame (CF) extends from the right (as viewed) edge of the transponder chip module TCM) to the right (as viewed) edge of the card body (CB) 402, and from the bottom (as viewed) edge of the transponder chip module TCM) to the bottom (as viewed) edge of the card body (CB). The coupling frame (CF) may comprise tungsten or other high density metal or metal alloy. An activation distance of 25 mm was achieved.

It may be noted that FIG. 4H bears some resemblance to FIG. 1 of U.S. 61/978,187, which shows a DIF smartcard body with a metal slug and booster antenna. The coupling frame (CF) disclosed herein, substantially surrounding the transponder chip module (TCM), may not require a booster antenna (BA).

Figure 4I:
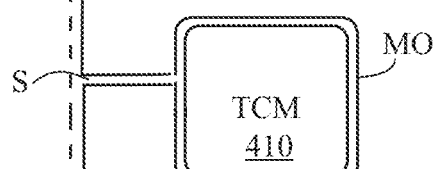
FIG. 4I is a diagram of a smartcard (SC) having a coupling frame (CF) extending from four sides of a module opening (MO) for a transponder chip module (TCM).

FIG. 4I shows an embodiment of smartcard 400I having a coupling frame (CF) 420I made of tungsten or other high density metal or metal alloy, and surrounding all four sides (nearly 360°) of a transponder chip module (TCM) 410. Here, a coupling frame (CF) surrounds the transponder chip module TCM), and has a slit (S) 430 on its left (as viewed) side. The coupling frame (CF) extends from the right (as viewed) edge of the transponder chip module TCM) nearly to the right (as viewed) edge of the card body (CB) 402, from the bottom (as viewed) edge of the transponder chip module TCM) towards the bottom (as viewed) edge of the card body (CB), and from the top (as viewed) edge of the transponder chip module TCM) towards the top (as viewed) edge of the card body (CB), and may cover approximately 60% of the area of the card body (CB). The coupling frame (CF) may comprise tungsten or other high density metal or metal alloy. The coupling frame (CF) has an opening (MO) for the transponder chip module (TCM). A gap between the coupling frame (CF) and the transponder chip module (TCM) should be maintained as small as possible. An activation distance of 35 mm was achieved.

Metal Cards Having Coupling Frame Functionality

FIG. 5A shows a metal layer (ML) which may be a card body 502 of a metal-faced smartcard 500A (or card body 502 of a metal card) modified to function as an open-loop coupling frame (CF) 520A, showing a coupling frame (CF) surrounding three sides (or 270°) of the transponder chip module (TCM) 510. The left side of the transponder chip module (TCM) is not surrounded. Rather, a non-conductive filler ("filler") material may bridge the large slit (S, or slot, or band) between the ends of the coupling frame (CF) to the left (as viewed) of the transponder chip module (TCM). Here, a coupling frame (CF) surrounds three sides (top, bottom and right) of the transponder chip module (TCM) disposed in a module opening (MO) 508. The coupling frame (CF) extends from the right (as viewed) edge of the transponder chip module (TCM) to the right (as viewed) edge of the card body (CB), from the bottom (as viewed) edge of the transponder chip module (TCM) to the bottom (as viewed) edge of the card body (CB), and from the top (as viewed) edge of the transponder chip module (TCM) to the top (as viewed) edge of the card body (CB). In this example, the "slit" (S) 530 is large, extending nearly the height (approximately 10 mm) of the transponder chip module (TCM), and may be referred to as a "slot" or "band". The coupling frame (CF) may comprise tungsten or other high density metal or metal alloy, and may constitute substantially the entire card body (CB). The filler material may have a thickness corresponding to the thickness of the coupling frame (CF), and may comprise a material that may illuminate when the smartcard (SC) is being interrogated by an external reader.

FIG. 5B shows a metal layer (ML) which may be a card body 502 of a metal-faced smartcard 500B (or card body of a metal card) modified to function as an open-loop coupling frame (CF) 520B, showing a coupling frame (CF) surrounding four sides (or nearly 360°) of the transponder chip module (TCM) 510 disposed in a module opening (MO) 508. A slit (S) 530 is disposed through the coupling frame on the left (as viewed) side of the transponder chip module (TCM), and may be filled with a non-conductive filler material ("filler"). Here, a coupling frame (CF) surrounds all four sides (top, bottom, right and left) of the transponder chip module (TCM). The coupling frame (CF) extends from the right (as viewed) edge of the transponder chip module (TCM) to the right (as viewed) edge of the card body (CB), from the bottom (as viewed) edge of the transponder chip module (TCM) to the bottom (as viewed) edge of the card body (CB), and from the top (as viewed) edge of the transponder chip module (TCM) to the top (as viewed) edge of the card body (CB). The portion of the coupling frame (CF) on the left of the transponder chip module (TCM) has a slit, rather than a band (in either case, slit or band, the coupling frame is open loop). The coupling frame (CF) may comprise tungsten or other high density metal or metal alloy, and may constitute substantially the entire card body (CB). The filler material may have a thickness corresponding to the thickness of the coupling frame (CF), and may comprise a material that may illuminate when the smartcard (SC) is being interrogated by an external reader.

A metal card made of steel may exhibit an activation distance of approximately 40 mm with a barely visible slit width of approximately 50 µm. The slit (S) in the coupling frame (CF) can be laser etched, mechanical removed or chemically etched. The thickness of the metal layer (ML) can be from approximately 1 µm to approximately 35 µm, or greater, and may be laminated to a synthetic core (PVC, PC, Paper, PETG, Teslin) etc. A metal card, or plastic card with a metal slug or metal core, may have a metal (layer, body, core or slug) thickness of approximately 300-760 µm.

Note:
The reference numeral "508" was missing from FIGS. 5A,B for the module opening (MO). Compare FIG. 6A, reference numeral "608" for the module opening (MO).

Summarizing the Above, and Some Additional Embodiments and Observations

Metal foils may be integrated into plastic cards and may be arranged to function as a coupling frame (CF). The metal foils may have a metal layer thickness greater than 1 micron which is a fraction of the skin depth thickness of the metal or conductive layer at 13.56 MHz (the frequency of interest is in the range 10-30 MHz). Metal foils with a skin depth thickness of 12 micron have been tested, which have performed in the same manner as a metal substrate with a thickness equal to 0.76 mm (card body thickness).

Metal foils such as holographic metal foils with a thickness of 30 nm may be integrated into plastic cards. These foils may not be appropriate for a coupling frame (CF), but they may add to the aesthetics of the card, without interfering with the electromagnetic field.

The coupling frames (CF) described herein may surround the transponder chip module on all four sides (less the slit S), on three sides or on two sides. It is important that the metal or conductive frame (CF) is an open loop, forming an open circuit around the transponder chip module (TCM). This is achieved by creating a slit which emanates from one or more sides of the module opening (MO) for the transponder chip module (TCM) and extends to the edge of the metal layer (ML) or conductive frame (CF).

The metal foil (or metal layer ML, or metal core, or metal card body) can be any metal or metal alloy such as copper, aluminium, brass, titanium, tungsten, stainless steel. The metal foil may also be substituted with an alternative electrically conducting material or film such as silk screen printed silver ink, vapor deposited metals, graphene, silver nanowires or conductive carbon ink. The metal foil may also be substituted by a perforated metal mesh or wireframe metal mesh.

The technique of capacitive coupling with a slotted metal layer (ML) or coupling frame (CF) may be most advantageous when deployed in conjunction with a transponder chip module (TCM) which has a planar, laser-etched antenna structure (LES). Chemically etched antenna structures on the face down side of a module tape may have a spacing between tracks of 100 µm which may not interact (function) as well with a coupling frame (CF) as a laser-etched antenna structure (LES). Consequently, such antenna modules (AM) with a chemical etched antenna may have a very low activation distance with a reader, such as 1 mm, thereby requiring a booster antenna (BA) in the card body (CB). When the spacing between tracks of the antenna structure (AS) is reduced to 50 µm or 25 µm (and less, such as 20 µm, when plated), the transponder chip module (TCM) can interact well with the coupling frame (CF), and in some applications may function adequately without a coupling frame (CF) (and, indeed, without a booster antenna (BA)). The activation distance for a transponder chip module (TCM) having a laser-etched antenna structure (LES; spacing between tracks of 25 µm) depending on the position over the reader can range from 15 to 20 mm. With the slotted coupling frame, the activation distance increases, with a range from 30 mm to 40 mm.

The antenna structure (AS) of a transponder chip module (TCM), which may be a laser-etched antenna structure (LES), may comprise a rectangular spiral track having approximately 10-12 turns, the width of each track being approximately 100 µm, the spacing between tracks being approximately 25 µm. Chemically-etched antenna structures may have larger feature sizes (e.g., spacing of 100 µm between tracks). The spaces between tracks of a laser-etched antenna structure (LES) may be less than 100 µm, less than 75 µm, less than 50 µm, and less than 25 µm. After plating, the spaces between adjacent tracks of a laser etched antenna module (LES) may be even smaller. To take advantage of the synergy between the coupling frame (CF) and the transponder chip module (TCM) having a planar, etched antenna structure (AS), the distance (gap) from the outer track (outer edge, outer feature) of the antenna structure (AS) and the inner edge (or module opening MO) of the coupling frame (CF) should be less than 300 µm, and more suitably 50 µm. The coupling frame (CF) may overlap an outer feature of the antenna structure (AS), as shown in FIG. 2C.

The slit or slot in the coupling frame (CF) may be very narrow for aesthetic reasons, for example, a mere 50 µm in width. (On average, the diameter of a human hair is 100 µm.)

The slotted (with a slit) coupling frame (CF) may be a single foil which covers the entire area of a card body (CB), partially covers an area of a card body (CB), or the coupling frame (CF) may comprise several metal or conductive layers which are overlapping. A metal foil layer (metal layer of 30 nm) which is transparent to the electromagnetic field may also be part of the card-body stack-up.

The slit in the coupling frame (CF) may be formed by laser ablation, and may extend from one edge of the module opening (MO) for the transponder chip module (TCM) to the outer perimeter of the coupling frame (CF) or metal layer (ML). This slit may completely penetrate (extend completely through) the metal layer (ML) of the coupling frame (CF), but may also/alternatively only extend partially through the metal layer (ML) of the coupling frame (CF). In the case of partial penetration of the slit (S), a thin layer of metal may remain and should be below (less than) the transparency threshold for electromagnetic waves, and less than the skin depth (at the required frequency 13.56 MHz) of the metal used to construct the coupling frame, such that electrical current flows across the slit (or void) are minimized and the performance of the coupling frame (CF) is not impeded. The void may be filled from one side with a polymer, epoxy resin or similar material to mechanically reinforce the metal frame and fill the void.

Using a transponder chip module (TCM) having a suitable antenna structure (AS), such as a laser-etched antenna structure (LES) having small spaces between tracks, in conjunction with the coupling frames (CF) disclosed herein, activation distances of at least 20 mm, including at least 25 mm, at least 30 mm, at least 35 mm, up to 40 mm or more may be achieved, without requiring a booster antenna (BA) in the card body (CB), and even in the case of metal cards (wherein the metal layer ML is provided with a slit so that it can function as a coupling frame CF).

Some Additional Embodiments

FIG. 6A illustrates the front side of a smartcard 600 which may be a metal card (compare FIG. 5B) having a metal layer (ML), which may constitute substantially the entire thickness of the card body (CB) 602. The card body (CB) has a module opening (MO) 608 wherein a transponder chip module (TCM) 610 may be disposed, and a slit (S) 630 extending from the module opening (MO) to the perimeter of the metal layer (ML) so that the metal card body (MCB) may function as a coupling frame (CF), in the manner described hereinabove. The metal layer (ML) (or card body CB, or metal card body MCB) may comprise titanium.

FIG. 6B illustrates the back (reverse) side of the smartcard 600 shown in FIG. 6A. A recessed area 602 may be provided on the reverse side of the card body (CB) to accommodate a magnetic stripe, and may measure approximately 9 mm×84 mm. Another recessed area 604 may be provided on the reverse side of the card body (CB) to accommodate a signature panel, and may measure approximately 9 mm×56 mm. The module opening (MO) is shown in dashed lines, and may measure approximately 11 mm×13 mm (for an 8 contact module).

An additional recessed area 606 may be provided on the reverse side of the card body (CB) to accommodate a switch (SW), such as a slide switch, and may measure 5 mm×20 mm. The switch (SW) may be used to selectively connect/disconnect the ends of the open loop coupling frame (CF) to one another, so that when the ends are connected, the coupling frame (CF) is a closed loop and does not provide the advantages of an open loop coupling frame (CF) as described above. This allows a user to "switch off" the coupling frame feature and its attendant increase in activation distance, which provides more security (an anti-phishing feature) for the user's card.

The switch feature can be integrated into a solid metal card body construction or a plastic card/metal foil card body construction. The switch may comprise a slide switch, a press button switch or the like which can be used to short-circuit the coupling frame (CF) and dampen the function of the transponder chip module (TCM), thereby providing protection against phishing (unauthorized reading of the smartcard). The switch (SW) can also have the function of reinforcing the structure of the card body (CB) around the position of slot or slit, protecting it from damage resulting from bending.

Light Emitting Diode (LED)

Figure 7A:
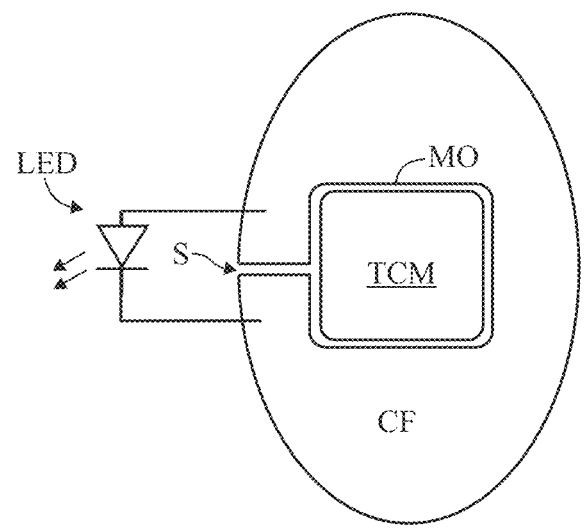
FIG. 7A is a diagram showing incorporating an LED into the smart card (SC), and connecting it to the ends of the coupling frame (CF)
Figure 13A:
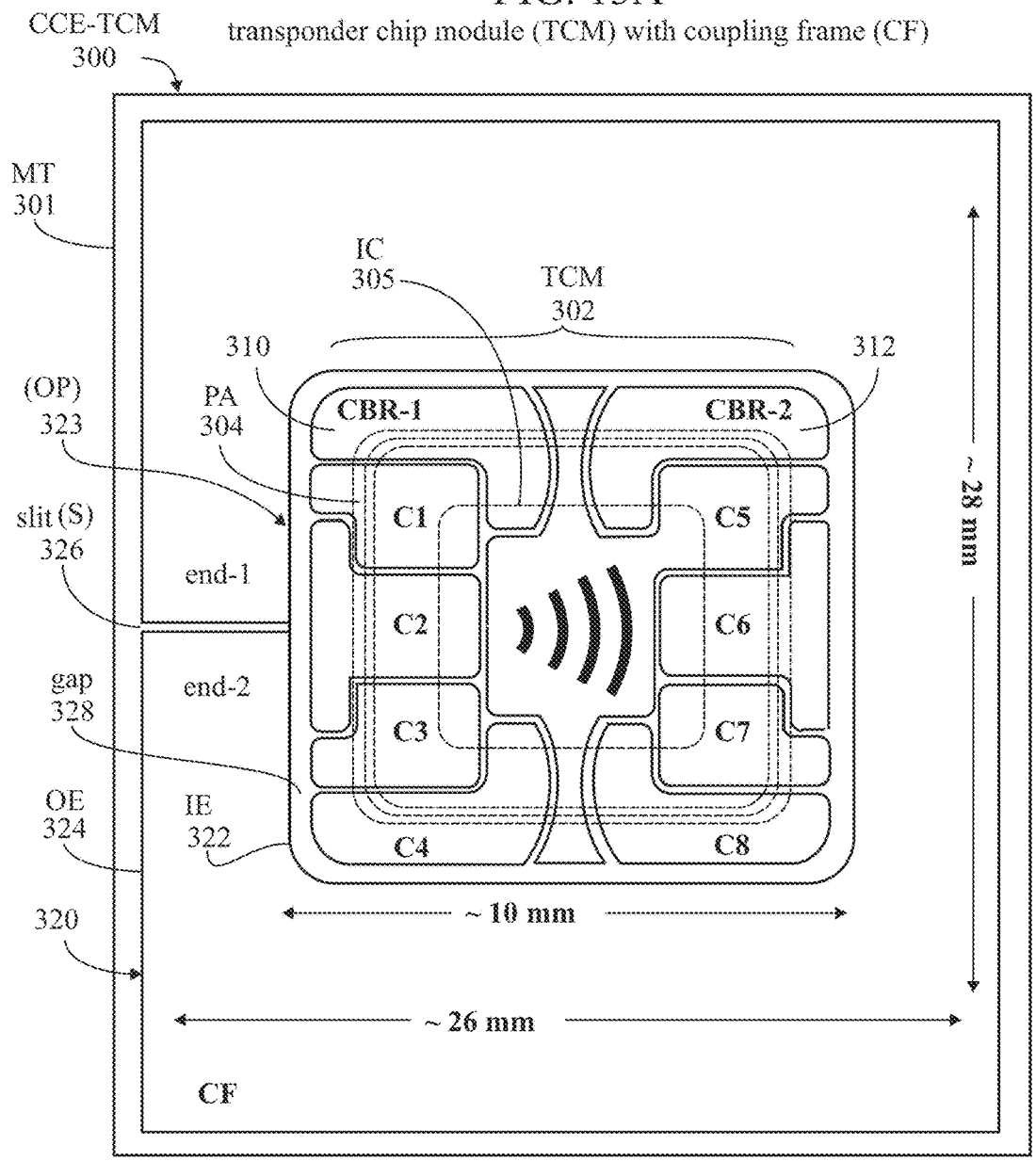
FIG. 13A is a plan view of a capacitive coupling enhanced (CCE) transponder chip module (TCM) which has a coupling frame (CF) incorporated on its module tape (MT).
Figures 1, 13A:
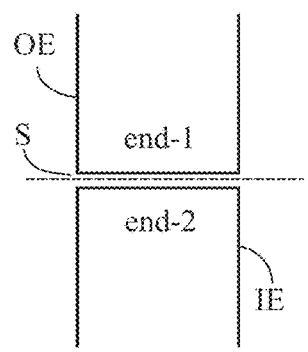
Figures 2, 13A:
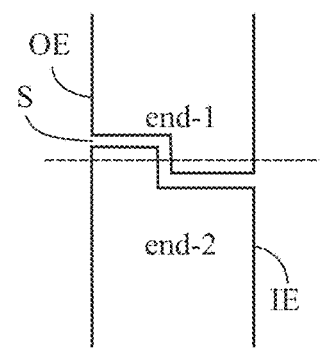

FIG. 7A shows that an LED (light emitting diode), or other or semiconductor optical device, may be connected across the ends of the coupling frame (CF) in the manner disclosed in FIG. 2 of U.S. 61/971,636. See also FIGS. 5, 5A, 5B of U.S. Ser. No. 14/281,876. Here, the LED is shown connected across the opposing ends of an exemplary elliptical coupling frame (CF) similar to that shown in FIG. 4C (card body (CB) omitted, for illustrative clarity)—in other words, the LED is shown as being connected across the slit (S), and may illuminate when the smartcard (SC) is being interrogated by an external reader.

The slit (S) and/or the area beneath and around the transponder chip module (TCM) may be filled with a partially or fully optically transparent material to allow the light emitted by the LED to be visible from any face of the smartcard.

Modifying the Transponder Chip Module (TCM)

Figure 7B:
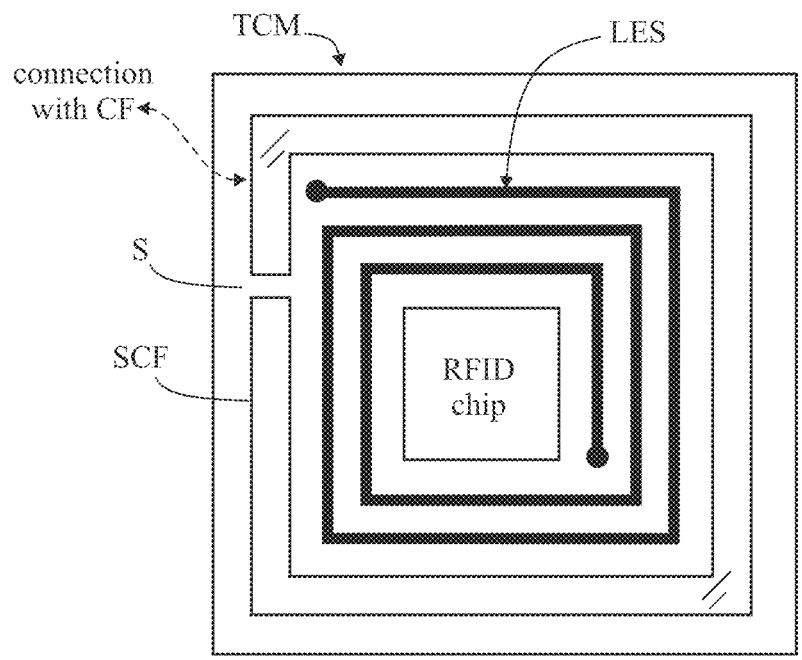
FIG. 7B is a diagram showing incorporating a secondary coupling frame (SCF) in the transponder chip module (TCM) to enhance coupling between the laser-etched antenna structure (LES) of the transponder chip module (TCM) with the coupling frame (CF) in the card body (CB).

The transponder chip module (TCM) may be implanted in a recess area milled in the card body (CB; metal, plastic or plastic/metal foil) and its laser-etched antenna structure (LES) may be positioned as close as possible to the coupling frame (CF), at a minimum with two sides, ideally with four sides surrounded by the coupling frame (CF), as discussed hereinabove. As shown in FIG. 7B, to further improve the proximity of the laser-etched antenna structure (LES) to the coupling frame (CF), a metal rim ("rim") surrounding the laser-etched antenna structure (LES) on the transponder chip module (TCM) may be electrically connected to the coupling frame (CF) using conductive glue, solder, welding, etc. The separation distance from the rim to the antenna can be the width of the laser width, less than 25 µm. The metal rim may be considered to be a secondary coupling frame (SCF), and should be open loop having a slit (S) between its two ends.

The track width on the laser-etched antenna structure (LES) can be varied, from end-to-end, to improve performance, in contrast with an antenna structure having a single (constant) track width. By way of analogy, this could be viewed as more than one antenna, each having a different track width, connected in series with one another. As an example, a first portion of an antenna structure may have a track width of 100 µm, another portion may have a track width of 50 µm. Additional portions may have other track widths. The spacing between tracks may also be varied. For example, the spacing between some tracks may be 25 µm or less, the spacing between some other tracks may be more than 25 µm. The ability to vary track width and spacing may be helpful in fine-tuning the performance of the module, with attendant benefits in activation distance (for example).

The spacing between tracks of 25 µm or less may be achieved by laser etching of the antenna structure (AS) or by some other means.

Contact pads (CP), connection bridges (CBR) and/or isolated metal features formed on the face-up side (contact side) of a double-sided chip carrier tape residing directly over a laser-etched antenna structure (LES) on the face-down side, can be used to increase the amplitude of the resonance curve of the transponder chip module with minimal frequency shift when interrogated by a reader, and without the need to perforate or remove metal for enhanced activation distance. The enhanced performance of the transponder chip module (TCM) by maintaining a metal contact pad arrangement on the face-up side, similar to an arrangement on a standard contact smartcard module, may result in an activation distance with a laser-etched antenna structure (LES) of approximately 2 cm.

Some Additional Disclosure

In the general context of coupling frames any metallized surface or conductive layer which is non-transparent to electromagnetic waves can be used to capacitive couple a transponder chip module (TCM) with a contactless reader. The surface, layer or substrate can be metallized plastic or paper, a metal foil, a metal card, a metal slug in a plastic card body, a casing on a mobile telephone, an enclosure protecting a battery, or any type of metallized housing in or on an RFID enabled device.

To allow the electromagnetic flux lines to propagate through a coupling frame on or in a card body construction, a narrow slit or slot must be milled, eroded or etched through one edge of the metallized substrate to create an open loop. The slit or slot is formed through an edge on the card body nearest the transponder chip module (TCM) in a line (straight, curved or otherwise) and terminates upon penetrating the cavity, recess or window milled through the card body that is used to house or implant the transponder chip module (TCM).

In the case of a metal card body, the addition of the slit or slot connected to the larger opening for the module weakens the structure of the metal card body at that point along either edge of the slit or slot. If left unresolved this weakening or destabilizing of the card edge and module opening could present future quality and reliability issues with cards deployed in the field. For example, a card could bend at one side of the slit or slot and in extreme cases bend in opposite directions. One result of this bending action would be to prevent the card from being inserted into a contact card reader or point of sale (POS) terminal. Also bending at or along the slit or slot might extend along the entire length of the slit or slot until it reaches the installed transponder chip module (TCM) and compromise or weaken the adhesive bond that is used to mount the transponder chip module (TCM) into the metal card body or deform the surface of the transponder chip module (TCM) faceplate.

A number of methods are available to resolve this potential for destabilization or weakening of the card body at the slit or slot. One such method is the application of a epoxy resin system to fill the slit or slot as well as the opening or window created to house the transponder chip module (TCM). After the filling operation, the cured resin would be mechanically leveled and polished to create a uniform planar surface across either side of the metal card body. This resin system could be filled and colored to disguise the slit or slot and/or to match or complement the visual decorative elements of the finished card.

A second method is the application of a separate non-conductive reinforcing structure or plate that bridges or straddles the slit or slot and the opening or window on the backside or front side, or in combination on both sides, of the metal card body when mounted in a cavity milled to the appropriate size and to a depth equal to the thickness of the reinforcing structure plus the thickness of the adhesive layer required to permanently mount this structure. The bond side surface of the reinforcing structure may be mechanically or chemically abraded to promote adhesion to the card body. The milled cavity in the card body could also be abraded to promote adhesion to the non-conductive reinforcing structure or plate.

This non-conductive reinforcing structure, when adhesively mounted in the card body, would add the required structure and rigidity to connect the two sides of the slit or slot together yet still maintain the open loop circuit allowing the flux lines to propagate. The non-conductive reinforcing structure could be printed, engraved or etched with a decorative element such as a logo, trademark, service mark or hologram.

A third method also uses a non-conductive reinforcing structure as described above but in this embodiment the reinforcing structure would also incorporate a single pole micro-switch that would provide the card holder with the ability to disable the contactless function of the transponder chip module (TCM) as required. This feature could provide the cardholder with added security and peace of mind in environments where unauthorized card reading or "phishing" are likely.

In any of these methods for reinforcing the slit or slot and the opening or window milled to accept the transponder chip module (TCM) the reinforcing structure may also be covered by the application of signature panel tape over their location to further disguise them.

Additionally, the TCM may be implanted in the reinforcing structure. The reinforcing structure may be an insert in the metal card body. In this case the coupling frame may be composed of two parts, one part being the metal card body, the second part being the reinforcing structure or a component of the reinforcing structure.

The coupling frame (CF) may be partially or fully transparent, with a visible light transmittance greater than 40%. The electrically conductive material of the coupling frame may comprise indium tin oxide (ITO) or another optically transparent conductor such as a network of silver nanowires, graphene carbon nanotubes, cupro-nickel nanowires, conductive polymeric material or conductive composite. The thickness and/or electrical conductance of the metal or optically transparent conductor is such that the CF is significantly opaque (non-transparent) to the electromagnetic RF field, thus enabling the operation of the coupling frame (CF).

The operation of a CF relies on the presence of a discontinuity, herein described as a slit (S). The discontinuity in the CF may be replaced by an electrically insulating region in the metal, nanomaterial or other conductor. The discontinuity may be formed by a series of perforations. The discontinuity may also be formed by selective chemical (or other) modification of the metal, nanomaterial or other conductor. The chemical modification is such as to form an electrically insulating region on the CF (discontinuity). For example, the discontinuity may be formed by selective oxidation of the CF by deposition (for example by screen printing, inkjet) of a corrosive chemical (for example acid). See, for example US 20100078329.

Coupling frame (CF) with reinforcing structure (RS)

Figure 8:
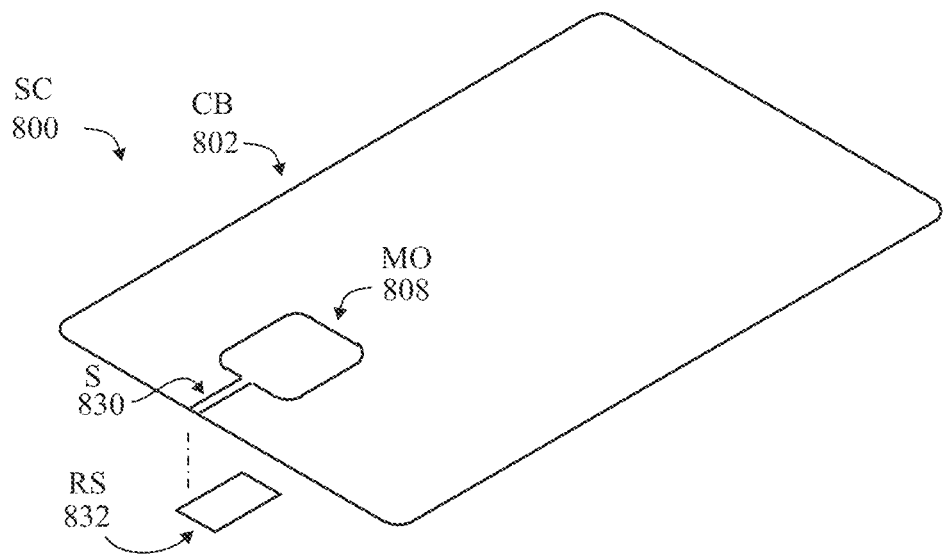
FIGS. 8-11 May Correspond with Figures in US 20150021403

FIG. 8 (compare FIG. 6A) shows a metal smart card (SC) 800 (compare 600) comprising a full metal card body (CB) 802 (compare 602) with an opening (MO) 808 (compare 610) for a transponder chip module (TCM, not shown, compare 610) and a slit (S) 830 (compare 630) extending from the opening (MO) to a periphery of the card body (CB) to allow the flux lines to propagate around the area of the transponder chip module (TCM). The full metal card body (CB) may be formed of an electrically conductive material, such as titanium, may have a thickness of 760 µm, and may act a coupling frame (CF) for capacitive coupling with a contactless reader or point of sale terminal (see FIG. 1). The card body (CB) may comprise conductive nanoparticles.

To reinforce the card body (CB) (or metal layer (ML)) having a slit (S), a reinforcing structure (RS) or plate 832, of a non-conductive material such as plastic or reinforced plastic, may be disposed at (including around and covering) the location (area) of the slit (S) in a recess (R, not shown) on the underside of the card body (CB), and may extend beyond the slit. For example, the slit (S) may be 50 µm wide, the reinforcing structure may be up to or more than 8000 µm wide (approximately the size of a side of the TCM). The reinforcing structure (RS) may have a logo or design. The thickness of the reinforcing structure (and corresponding depth of the recess R on the underside of the card body CB) may be 350 µm.

The opening (MO) may extend completely through the card body (CB) and the transponder chip module (TCM) may extend through the opening (MO) to the underside of the card body (CB) to allow the propagation of the electromagnetic flux lines.

Metal/Plastic Hybrid Card

Figure 9:
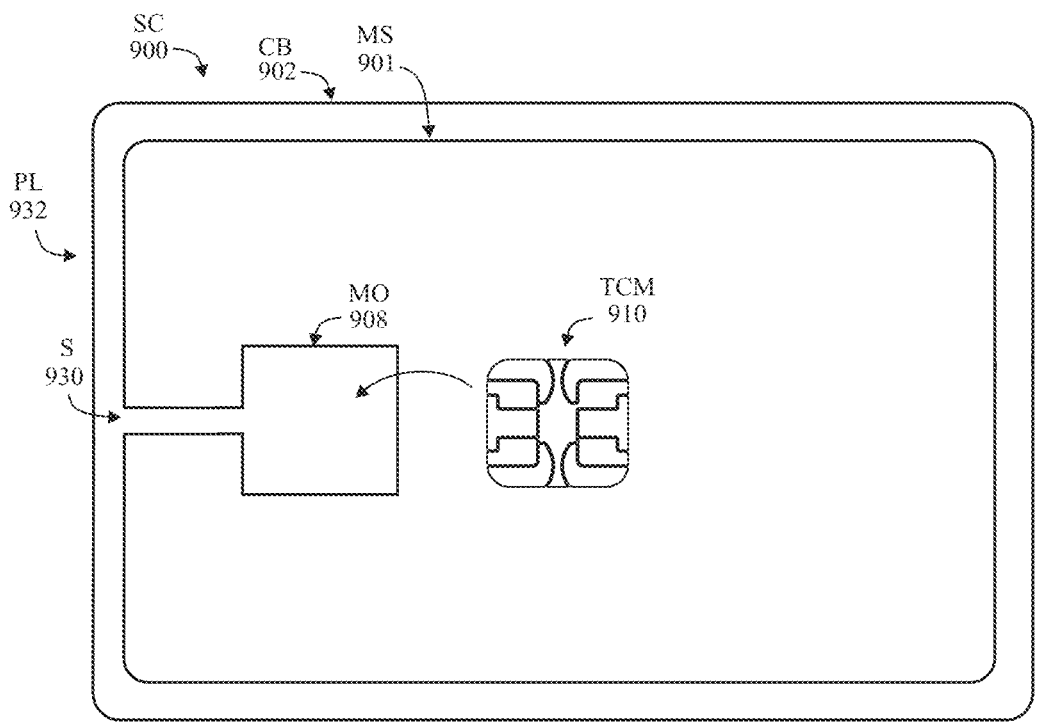

FIG. 9 (compare FIG. 6A) shows a metal/plastic hybrid smart card (SC) 900 (compare 600) comprising a metal slug core (MS) 901 somewhat smaller than the overall card body (CB) 902 (compare 602) with an opening (MO) 908 (compare 610) for a transponder chip module (TCM) 910 (compare 610) and a slit (S) 930 (compare 630) extending from the opening (MO) to a periphery of the card body (CB) to allow the flux lines to propagate around the area of the transponder chip module (TCM). The metal slug of the card body (CB) may be formed of an electrically conductive material, such as titanium, may have a thickness of 200 µm, and may act a coupling frame (CF) for capacitive coupling with a contactless reader or point of sale terminal (see FIG. 1). The metal slug card body (CB) may be laminated to one or more layers (PL) 932 of plastic to create an ISO standard card body. The slit (S) may be filled with plastic. The opening (MO) for the transponder chip module (TCM) may be filled with plastic.

Non-Conductive Strip

In many embodiments described above, the coupling frame (CF) comprises a slit (S) extending from the module opening (MO) to a periphery of the coupling frame (CF), making it "open-loop". The slit (S) may compromise the mechanical integrity of the coupling frame (CF), making it less resistant to twisting. And, if a very small slit (S) is used, it is important to keep the ends of the coupling frame (CF) from touching one another. Incorporating a reinforcing structure (RS) has been described above.

As an alternative to forming (such as by cutting or etching) a slit (S) is to render a comparable area of the conductive layer of the coupling frame (CF) non-conductive. One example of converting a conductive material (such as aluminum or titanium) to be non-conductive is described in US 20100078329. In its simplest form, electrochemical anodic oxidation of selected portions of an initially conductive valve metal (for example, aluminum, titanium, or tantalum) substrate may be performed, resulting in areas (regions) of conductive (starting) material which are geometrically defined and isolated from one another by areas (regions) of anodized (non-conductive, such as aluminum oxide, or alumina) isolation structures.

Figure 10:
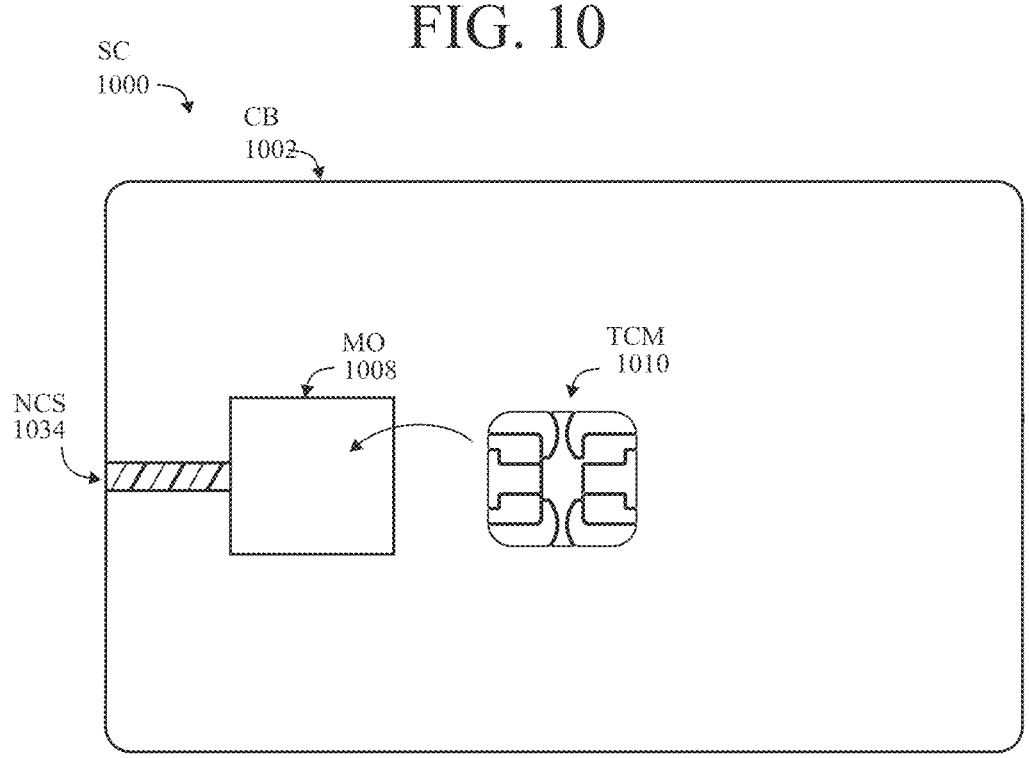

FIG. 10 shows a smart card (SC) 1000 (compare 600) having a metal card body (CB) 1002 (compare 602) with an opening (MO) 1008 (compare 608) for a transponder chip module (TCM) 1010 (compare 610). Here, rather than (as an alternative to) having a slit (S, 630) extending from the opening (MO) to the periphery of the card body (CB), a comparable (or larger) area of the conductive starting material of the card body (CB) may be rendered non-conductive so that there is a non-conductive strip (NCS) 1034 extending from the opening (MO) to the periphery of the card body (CB). Any technique (chemical, laser, other) capable of rendering selected portions of the metal card body (CB) non-conductive may be used to create the non-conductive strip (NCS). The non-conductive strip (NCS) represents a discontinuity in the metal layer (ML) forming the coupling frame (CF) having two ends.

Capacitive Coupling-Enhanced (CCE) Transponder Chip Module (TCM)

At least one coupling frame (CF) may be formed or disposed on a common substrate, such as an epoxy-glass module tape (MT) with at least one of:
   an RFID chip (CM), and
   an antenna structure (AS) which may be a planar antenna (PA) structure,
      which may be laser-etched or chemically etched,
      which may be referred to as a module antenna (MA).

A transponder chip module (TCM), which may be incorporated into a smartcard (SC), may comprise an array of typically 6 or 8 contact pads (CPs) for interfacing with an external reader (e.g., ISO 7816). One or more connection bridges (CBRs) in the transponder chip module (TCM) may be used for making interconnections between components within the transponder chip module (TCM). The contact pads (CPs) and connection bridges (CBRs) may be formed from a common conductive layer on the front (face-up) surface of the transponder chip module (TCM). Other isolated features may be formed from the conductive layer, such as decorative strips or areas where logos may be presented. The transponder chip module (TCM) may have both contact (ISO 7816) and contactless (ISO 14443, 15693) interfaces. See, for example, US 20140104133, particularly FIGS. 1, 1A, 21 and 21A-E thereof.

Some of the concepts disclosed with respect to coupling frames (CF) on the module tape (MT) of a CCE-TCM may be applied to coupling frames (CF) incorporated into the card body (CB) of a smart card (SC), and vice-versa.

Figure 11:
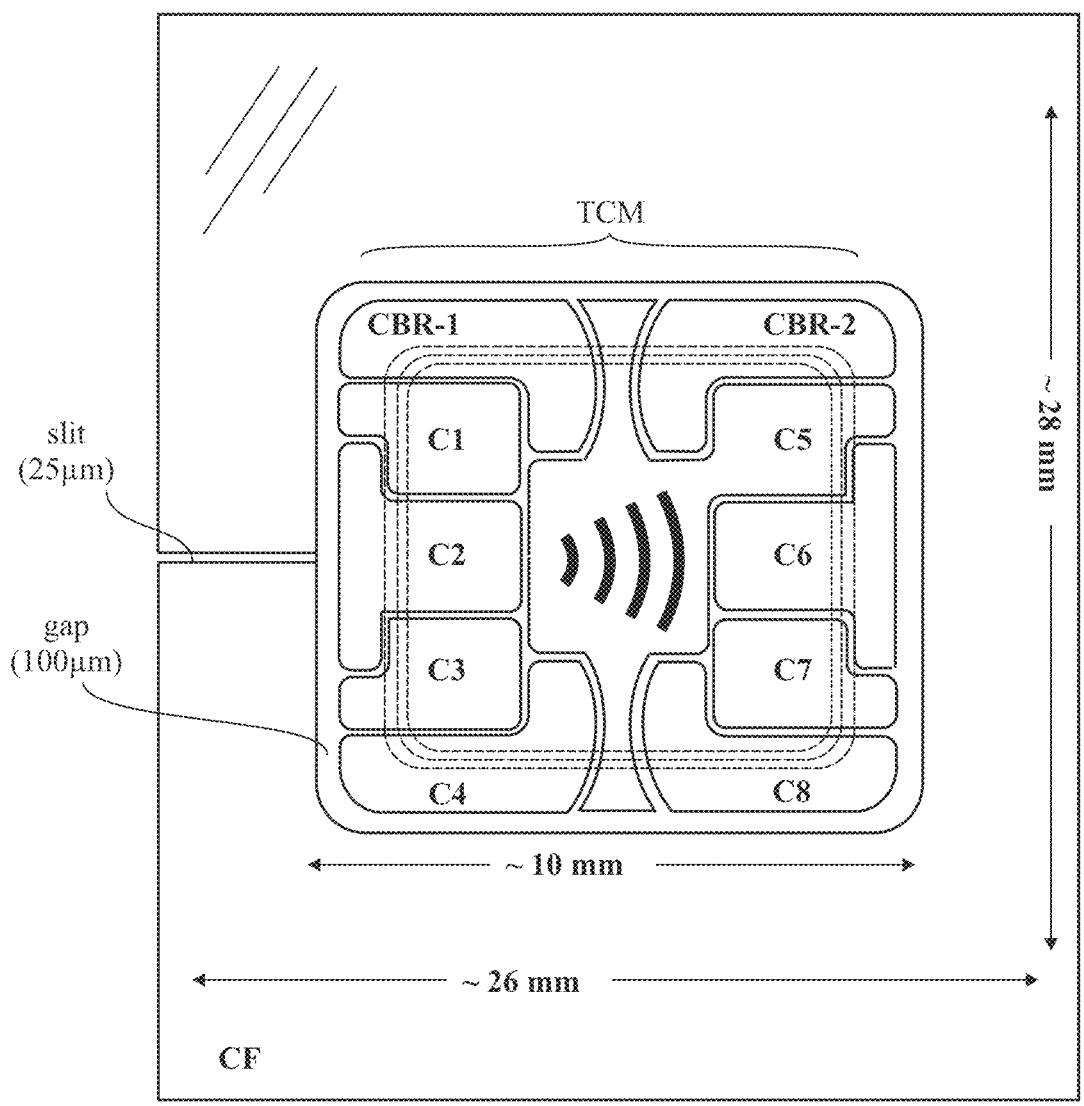

FIG. 11 shows an antenna module (AM) or transponder chip module (TCM) having an array of contact pads (CP1-CP8) and two connection bridges (CBR-1, CBR-2). The contact pads (CP) and connection bridges (CBR) may be disposed on one side (face-up side) of a module tape (MT) or chip carrier tape (CCT) of the Transponder Chip Module (TCM). The transponder chip module (TCM) corresponds generally to the transponder chip module (TCM) shown in FIG. 2A (v1).

A planar antenna (PA) structure may be provided on an opposite (face-down) side of the module tape (MT) or chip carrier tape (CCT) of the Transponder Chip Module (TCM), and is shown only generally in dashed lines. This corresponds generally to the transponder chip module (TCM) shown in FIG. 2A (v2). The planar antenna (PA) structure may be laser-etched. Alternatively, the planar antenna (PA) structure may be chemically etched. Only a few turns (or tracks) of the planar antenna (PA) structure are shown, for illustrative clarity. There may be 10-12 turns. The outer turn of the planar antenna (PA) structure may extend nearly to the periphery of the contact pad array (although it is disposed on the opposite side of the module tape (MT) or chip carrier tape (CCT) from the contact pad array).

A coupling frame (CF) may be disposed on module tape (MT) or chip carrier tape (CCT), and is shown surrounding the contact pads (CP) and connection bridges (CBR). In this example, the coupling frame (CF) is disposed on the same side of the module tape (MT) or chip carrier tape (CCT) as the contact pads (CP) and connection bridges (CBR), and may be formed from the same metal layer (e.g., 18 μm or 35 μm thick copper) that forms the contact pads (CP) and connection bridges (CBR). The contact pads (CP) and connection bridges (CBR) may be referred to as "contact pad array" (CPA).

The outer periphery of the contact pad array (CPA) is shown as being rectangular. An inner edge of the coupling frame (CF) is shown as being rectangular. A gap separates the inner edge of the coupling frame (CF) from the outer periphery of the contact pad array (CPA). The gap may be approximately 100 μm, or less. An outer edge of the coupling frame (CF) may also be rectangular. Some exemplary dimensions (approximate) may be:

contact pad array (CPA), including connection bridges (CBR), 13 mm×13 mm
  area of contact pad array (CPA), 169 mm²
area of the planar antenna (PA) structure, somewhat less than that of the CPA
inner edge of coupling frame, 13.1 mm×13.1 mm
  opening in the coupling frame (CF) for the contact pad array (CPA), 172 mm²
outer edge of coupling frame, 26 mm×28 mm (728 mm²)
  area of coupling frame (CF), 728 mm²-172 mm²=556 mm²

In this example, the coupling frame (CF) has an area which is approximately 3 times larger than the area of the planar antenna (PA) structure.

A slit (or slot, or gap) extends from the inner edge of the coupling frame (CF) to the outer edge thereof, so that the coupling frame (CF) is an open-loop element. In this configuration of a coupling frame (CF) on the module tape (MT), the concept of rendering a portion (or stripe) of the metal layer (ML) forming the coupling frame (CF) non-conductive (non-conductive stripe NCS), rather than making a slit (S) through the metal layer (ML), may be particularly advantageous. Typically, the metal layer (ML) on the module tape (MT) will be copper, which may subsequently be plated.

In FIG. 11,
  all dimensions are approximate (exemplary)
  coupling frame (CF) may be on either side of chip carrier tape (CCT)
  the coupling frame (CF) may be much larger than shown
  a second coupling frame (CF-2) may be disposed on the tape, and connected with the illustrated coupling frame (CF-1)
  a second coupling frame (CF-2) may be disposed on the opposite side of the tape from the illustrated coupling frame (CF-1)

FIG. 11C (of US 2015/0021403, which is reproduced as FIG. 11A herein) shows that the slit n the coupling frame (CF) may be other than straight, such as a zigzag slit or a slit which is becomes wider or narrow along its length.

FIG. 11D (of US 2015/0021403, which is reproduced as FIG. 11B herein) shows that a coupling frame (CF) may have two slits (slit-1, slit-2), each extending from its inner edge to its outer edge, and disposed (for example) on opposite sides of the transponder chip module (TCM). (This may be considered to be two C-shaped coupling frames, with their ends facing each other.)

Some Additional Embodiments

FIGS. 1-7B, above, may reprise some drawings of Ser. No. 14/465,815 filed 21 Aug. 2014

FIGS. 8-11B, above, may reprise some drawings of Ser. No. 14/492,113 filed 22 Sep. 2014.

FIGS. 12-40, below, may reprise some drawings (and description) of one or more of some other "parent" applications from which this application may claim filing date benefit, such as:

US 20150269474, 24 Sep. 2015 (U.S. Pat. No. 1,461,9177 filed 11 Feb. 2015)
  US 20150136858, 21 May 2015 (U.S. Pat. No. 1,455, 1376 filed 24 Nov. 2014)
  US 20160365644, 15 Dec. 2016 (U.S. Pat. No. 1,519, 7795 filed 30 Jun. 2016)
  US 20160110639, 21 Apr. 2016 (U.S. Pat. No. 1,486,2119 filed 22 Sep. 2015)
  US 20170017871, 19 Jan. 2017 (U.S. Pat. No. 1,507,2356 filed 17 Mar. 2016)
  US 20180339503, 29 Nov. 2018 (U.S. Pat. No. 1,596, 9816 filed 3 May 2018)
  US 20170077589, 16 Mar. 2017 (U.S. Pat. No. 1,535, 8138 filed 22 Nov. 2016)
  US 20180341846, 29 Nov. 2018 (U.S. Pat. No. 1,593, 9281 filed 29 Mar. 2018)
  US 20180123221, 03 May 2018 (U.S. Pat. No. 1,566, 2305 filed 28 Jul. 2017)

Some additional embodiments may now be shown and described, and may be found in one or more of the parent cases, as may be noted below. Some relevant text of the parent application publications may be included, with paragraph numbers [####].

Some contrasts or similarities may be noted between some of these embodiments and some of the disclosure or claims of US 20190236434 (CompoSecure; Ser. No. 15/928, 813 filed Mar. 22, 2018; priority of 62/623,936 filed Jan. 30, 2018), and/or other patents or publications.

Some descriptive language may vary between the various parent application publications (and the CompoSecure publication). The following terms may be generally equivalent:
- smartcard . . . . RFID device . . . . (transaction card; CompoSecure)
- metal layer with opening and slit . . . coupling frame
- inner edge of the coupling frame . . . opening in the coupling frame
- outer edge of the coupling frame . . . periphery of the coupling frame
- antenna module . . . transponder chip module US 20140361086 (U.S. Ser. No. 14/465,815 filed, 21 Aug. 2014)

This application (now U.S. Pat. No. 9,475,086), incorporated by reference herein, marked the beginning of "slit technology", wherein a metal layer may be incorporated into a card body of a smart card in a manner compatible with "contactless" operation.

The metal layer typically has an opening for a transponder chip module, and a slit extending from the opening to an outer edge of the metal layer, which is typically coincident with the outer edge of the overall card. The metal layer, thus modified with an opening and a slit, may be referred to as a "coupling frame", and may constitute substantially the entire card body (e.g., metal card body).

Some key points covered in this application may include:
- slit in metal layer or metal card body
- slit from any position in the opening
- coupling frame smaller than card body
- slit does not extend to periphery of the card body
- filling the slit
- module disposed in the opening
- stepped recess This application discloses the following (citations are to numbered paragraphs in the publication, which may be edited for conciseness herein):

FIG. 2C shows an example of a smartcard (SC) 200 with a coupling frame (CF) 220 incorporated into its card body (CB) 202 which has a stepped recess (R). A transponder chip module (TCM) 210 has a laser-etched antenna structure (LES) 212, an outer portion of which may overhang an inner portion of the coupling frame (CF). The dashed line indicates, schematically, either a metal layer in a stackup of a card body, or a substantially entirely metal card body. When "metal layer" is referred to herein, it may refer to such a metal card body.

FIG. 2D shows a transponder chip module (TCM) 210 disposed in the card body (CB) 202m of a metal smartcard (SC) 200m, or metal card (MC), wherein substantially the entire card body (e.g., 760 μm thick) comprises metal, and may be referred to as a metal card body (MCB). For such a metal card (MC), there has to be a non-conductive area behind the transponder chip module (TCM). The transponder chip module (TCM) resides in an opening (CO) 208, in the metal card body (MCB) 202 which may also be referred to as a module opening (MO). The opening (CO), may be prepared by mechanical milling, or laser ablation, and may be at least the size of the laser etched antenna structure (LES) 212, and may be stepped (for an example of a stepped recess/opening, see FIG. 2C) so that a portion of the metal card body (MCB) overlaps (underneath, as viewed) an outer portion of the laser-etched antenna structure (LES).

FIG. 4B illustrates an embodiment of a smartcard 400B having a coupling frame (CF) 420B in the form of a ring having a circular outer periphery and a rectangular module opening (MO) in the metal layer (ML) of the coupling frame (CF) whereat the transponder chip module (TCM) 410 may be disposed. Here, the coupling frame (CF) nearly completely surrounds the transponder chip module (TCM), except for a slit (S) 430. The slit (S) is shown on the right side of the transponder chip module (TCM), but could extend from any side thereof (more accurately, from any position in the module opening (MO 408). The slit (S), or gap between the opposed ends of the coupling frame (CF), is important so that the coupling frame (CF) is not a closed loop, but rather is an open loop. The slit (S) extends from the module opening (MO) to the periphery (outer edge) of the coupling frame (CF), and may be very narrow (small width). The coupling frame (CF) in this example is a few times larger than the transponder chip module (TCM), and may cover approximately 15% of the card body (CB) 402. An activation distance of 33 mm was achieved.

The slit (S) may be much smaller than the module opening (MO). The module opening (MO) is approximately 10×10 mm, depending on the size of the transponder chip module (TCM). The 50 μm size (width) for the slit (S) is approximate, and exemplary. A 50 μm wide slit (S) would be approximately 0.5% of the size of the module opening (MO). The slit may be less than 50% of the size of the module opening (MO), including less than 25%, less than 10%, less than 5% and less than 1% of the size of the module opening (MO). The slit (S) may be filled with a non-conductive material. If the width of the slit (S) is equal to the size of the transponder chip module (TCM), the coupling frame (CF) would be adjacent three sides of the transponder chip module (TCM), as in FIG. 3D, for example. The slit (S) may be formed by laser etching, which is suitable for forming a very narrow (e.g., 50 μm) slit in some materials. Other materials are not amenable to laser etching, and may require conventional mechanical processes to form a wider slit, or slot.

The slit (S) may extend in any direction, from anywhere on the module opening (MO) to the periphery of the metal layer (ML) of the coupling frame (CF), so that the coupling frame (CF) is an open loop, having two ends (or end portions). And, the slit (S) may extend only partially through the metal layer (ML) of the coupling frame (CF), leaving only a very thin layer of metal which is transparent to electromagnetic waves below the slit.

FIG. 4C illustrates an embodiment of a smartcard 400C having a coupling frame (CF) 420C in the form of a ring having an elliptical outer periphery and a rectangular module opening (MO) whereat the transponder chip module (TCM) 410 may be disposed. Here, the coupling frame (CF) nearly completely surrounds the transponder chip module (TCM), except for a slit (S) 430. The slit (S) is shown on the left side of the transponder chip module (TCM), but could extend from any side thereof (more accurately, from any position in the module opening (MO 408). The slit (S) extends from the module opening (MO) to the outer periphery of the coupling frame (CF), and may be very narrow (small width). The coupling frame (CF) in this example is a few times larger than the transponder chip module (TCM), and may cover approximately 20% of the card body (CB) 402. An activation distance of It may be noted, in FIGS. 4B and 4C, and the text associated therewith, that the coupling frames are smaller than the card body, and that the slits in the coupling frames may not extend to the periphery (outer edge) of the card body.

FIG. 5B shows a metal layer (ML) which may be a card body 502 of a metal-faced smartcard 500B (or card body of a metal card) modified to function as an open-loop coupling frame (CF) 520B, showing a coupling frame (CF) surrounding four sides (or nearly 360.degree.) of the transponder chip module (TCM) 510. A slit (S) is disposed through the coupling frame on the left (as viewed) side of the transponder chip module (TCM), and may be filled with a non-conductive filler material ("filler") . . . . The coupling frame (CF) may comprise tungsten or other high density metal or metal alloy. and may constitute substantially the entire card body (CB). The filler material may have a thickness corresponding to the thickness of the coupling frame (CF), and may comprise a material that may illuminate when the smartcard (SC) is being interrogated by an external reader. US 20150021403 (U.S. Ser. No. 14/492,113 filed 22 Sep. 2014)

This application (now U.S. Pat. No. 9,798,968), incorporated by reference herein, picks up where U.S. Ser. No. 14/465,815 left off, expanding on some of the concepts set forth therein. For example:

A metal card body (MCB, CB) or a transaction card with a discontinuous metal layer having a slit (S) or a non-conductive strip (NCS, 1034) extending from a module opening (MO) to a periphery of the card body to function as a coupling frame (CF). (Abstract)

Referring to claim 1 therein:

1. Smartcard comprising:
a metal layer (ML); and
an opening (MO) in the metal layer for receiving a transponder chip module (TCM);
characterized by:
a discontinuity, comprising a slit (S) or a non-conductive stripe (NCS), in the metal layer (ML), extending from the opening to a periphery of the metal layer, whereby the metal layer (ML) comprises an open-loop coupling frame (CF) having two ends.

In claim 2,
a portion of the coupling frame overlaps a portion of an antenna structure (AS) in the transponder chip module.

In claim 3,
the coupling frame extends over substantially the entire area of the smartcard; the metal layer comprises a metal card body (MCB) of a metal smartcard.

In claim 4,
the slit is at least partially filled with an electrically non-conducting material selected from the group consisting of polymer and epoxy resin, reinforced epoxy resin; a reinforcing structure (RS) disposed at a location of the slit (S) to reinforce the metal layer (ML).

In claim 6,
the metal layer comprises a material selected from the group consisting of copper, aluminum, brass, titanium, tungsten, stainless steel, silver, graphene, silver nanowires and conductive carbon ink;

Some key points covered in this application may include:
discontinuity is either a slit (S) or a non-conductive strip (NCS)
coupling frames disposed either in the card body or in the transponder chip module
filling and disguising the slit
reinforcing the slit
coupling frame (metal slug with slit) smaller than card body
two slits extending from module opening This application discloses the following (citations are to numbered paragraphs in the publication, which may be edited for conciseness herein):

FIG. 5B may correspond with FIG. 5B of US 20150021403

FIG. 5B is a diagram of a smartcard (SC) having a coupling frame (CF) extending from four sides of a module opening (MO) for a transponder chip module (TCM), showing a slit (S) extending from the module opening (MO) to a periphery of the coupling frame (CF).

FIG. 5B shows a metal layer (ML) which may be a card body 502 of a metal-faced smartcard 500B (or card body of a metal card) modified to function as an open-loop coupling frame (CF) 520B, showing a coupling frame (CF) surrounding four sides (or nearly 360.degree.) of the transponder chip module (TCM) 510 disposed in a module opening (MO) 508. A slit (S) 530 is disposed through the coupling frame on the left (as viewed) side of the transponder chip module (TCM), and may be filled with a non-conductive filler material ("filler"). Here, a coupling frame (CF) surrounds all four sides (top, bottom, right and left) of the transponder chip module (TCM). The coupling frame (CF) extends from the right (as viewed) edge of the transponder chip module (TCM) to the right (as viewed) edge of the card body (CB), from the bottom (as viewed) edge of the transponder chip module (TCM) to the bottom (as viewed) edge of the card body (CB), and from the top (as viewed) edge of the transponder chip module (TCM) to the top (as viewed) edge of the card body (CB). The portion of the coupling frame (CF) on the left of the transponder chip module (TCM) has a slit, rather than a band (in either case, slit or band, the coupling frame is open loop). The coupling frame (CF) may comprise tungsten or other high density metal or metal alloy. and may constitute substantially the entire card body (CB). The filler material may have a thickness corresponding to the thickness of the coupling frame (CF), and may comprise a material that may illuminate when the smartcard (SC) is being interrogated by an external reader.

The slit in the coupling frame (CF) may be formed by laser ablation, and may extend from one edge of the module opening (MO) for the transponder chip module (TCM) to the outer perimeter of the coupling frame (CF) or metal layer (ML). This slit may completely penetrate (extend completely through) the metal layer (ML) of the coupling frame (CF), but may also/alternatively only extend partially through the metal layer (ML) of the coupling frame (CF). In the case of partial penetration of the slit (S), a thin layer of metal may remain and should be below (less than) the transparency threshold for electromagnetic waves, and less than the skin depth (at the required frequency 13.56 MHz) of the metal used to construct the coupling frame, such that electrical current flows across the slit (or void) are minimized and the performance of the coupling frame (CF) is not impeded. The void may be filled from one side with a polymer, epoxy resin or similar material to mechanically reinforce the metal frame and fill the void.

In the case of a metal card body, the addition of the slit or slot connected to the larger opening for the module weakens the structure of the metal card body at that point along either edge of the slit or slot. If left unresolved this weakening or destabilizing of the card edge and module opening could present future quality and reliability issues with cards deployed in the field. For example, a card could bend at one side of the slit or slot and in extreme cases bend in opposite directions. One result of this bending action would be to prevent the card from being inserted into a contact card reader or point of sale (POS) terminal. Also bending at or along the slit or slot might extend along the entire length of the slit or slot until it reaches the installed transponder chip module (TCM) and compromise or weaken the adhesive bond that is used to mount the transponder chip module (TCM) into the metal card body or deform the surface of the transponder chip module (TCM) faceplate.

A number of methods are available to resolve this potential for destabilization or weakening of the card body at the slit or slot. One such method is the application of a epoxy resin system to fill the slit or slot as well as the opening or window created to house the transponder chip module (TCM). After the filling operation, the cured resin would be mechanically leveled and polished to create a uniform planar surface across either side of the metal card body. This resin system could be filled and colored to disguise the slit or slot and/or to match or complement the visual decorative elements of the finished card.

A second method is the application of a separate non-conductive reinforcing structure or plate that bridges or straddles the slit or slot and the opening or window on the backside or front side, or in combination on both sides, of the metal card body when mounted in a cavity milled to the appropriate size and to a depth equal to the thickness of the reinforcing structure plus the thickness of the adhesive layer required to permanently mount this structure. The bond side surface of the reinforcing structure may be mechanically or chemically abraded to promote adhesion to the card body. The milled cavity in the card body could also be abraded to promote adhesion to the non-conductive reinforcing structure or plate.

This non-conductive reinforcing structure, when adhesively mounted in the card body, would add the required structure and rigidity to connect the two sides of the slit or slot together yet still maintain the open loop circuit allowing the flux lines to propagate. The non-conductive reinforcing structure could be printed, engraved or etched with a decorative element such as a logo, trademark, service mark or hologram.

A third method also uses a non-conductive reinforcing structure as described above but in this embodiment the reinforcing structure would also incorporate a single pole micro-switch that would provide the card holder with the ability to disable the contactless function of the transponder chip module (TCM) as required. This feature could provide the cardholder with added security and peace of mind in environments where unauthorized card reading or "phishing" are likely.

In any of these methods for reinforcing the slit or slot and the opening or window milled to accept the transponder chip module (TCM) the reinforcing structure may also be covered by the application of signature panel tape over their location to further disguise them.

Additionally, the TCM may be implanted in the reinforcing structure. The reinforcing structure may be an insert in the metal card body. In this case the coupling frame may be composed of two parts, one part being the metal card body, the second part being the reinforcing structure or a component of the reinforcing structure.

FIG. 8 of US 20150021403 may correspond with FIG. 8 herein.

FIG. 8 is a diagram, in perspective exploded view, illustrating a full metal card body (CB) with an opening (MO) for a transponder chip module (TCM), and a slit (S) extending from the opening (MO) to a periphery of the card body (CB)

FIG. 8 (compare FIG. 6A) shows a metal smart card (SC) 800 (compare 600) comprising a full metal card body (CB) 802 (compare 602) with an opening (MO) 808 (compare 610) for a transponder chip module (TCM, not shown, compare 610) and a slit (S) 830 (compare 630) extending from the opening (MO) to a periphery of the card body (CB) to allow the flux lines to propagate around the area of the transponder chip module (TCM). The full metal card body (CB) may be formed of an electrically conductive material, such as titanium, may have a thickness of 760 µm, and may act a coupling frame (CF) for capacitive coupling with a contactless reader or point of sale terminal (see FIG. 1). The card body (CB) may comprise conductive nanoparticles.

To reinforce the card body (CB) (or metal layer (ML)) having a slit (S), a reinforcing structure (RS) or plate 832, of a non-conductive material such as plastic or reinforced plastic, may be disposed at (including around and covering) the location (area) of the slit (S) in a recess (R, not shown) on the underside of the card body (CB), and may extend beyond the slit. For example, the slit (S) may be 50 µm wide, the reinforcing structure may be up to or more than 8000 µm wide (approximately the size of a side of the TCM). The reinforcing structure (RS) may have a logo or design. The thickness of the reinforcing structure (and corresponding depth of the recess R on the underside of the card body CB) may be 350 µm. The opening (MO) may extend completely through the card body (CB) and the transponder chip module (TCM) may extend through the opening (MO) to the underside of the card body (CB) to allow the propagation of the electromagnetic flux lines.

FIG. 9 of US 20150021403 may correspond with FIG. 9 herein.

FIG. 9 is a diagram, in plan view, illustrating a metal/plastic hybrid card body (CB) with an opening (MO) for a transponder chip module (TCM), with a metal slug (MS) and one or more plastic layers surrounding the metal slug (MS).

FIG. 9 (compare FIG. 6A) shows a metal/plastic hybrid smart card (SC) 900 (compare 600) comprising a metal slug core (MS) 901 somewhat smaller than the overall card body (CB) 902 (compare 602) with an opening (MO) 908 (compare 610) for a transponder chip module (TCM) 910 (compare 610) and a slit (S) 930 (compare 630) extending from the opening (MO) to a periphery of the card body (CB) to allow the flux lines to propagate around the area of the transponder chip module (TCM). The metal slug of the card body (CB) may be formed of an electrically conductive material, such as titanium, may have a thickness of 200 µm, and may act a coupling frame (CF) for capacitive coupling with a contactless reader or point of sale terminal (see FIG. 1). The metal slug card body (CB) may be laminated to one or more layers (PL) 932 of plastic to create an ISO standard card body. The slit (S) may be filled with plastic. The opening (MO) for the transponder chip module (TCM) may be filled with plastic.

FIG. 10 of US 20150021403 may correspond with FIG. 10 herein.

FIG. 10 is a diagram, in plan view, illustrating a metal card body CB) with an opening (MO) for a transponder chip module (TCM), and a non-conductive strip (NCS) extending from the opening (MO) to a periphery of the card body (CB).

As an alternative to forming (such as by cutting or etching) a slit (S) is to render a comparable area of the conductive layer of the coupling frame (CF) non-conductive. One example of converting a conductive material (such as aluminum or titanium) to be non-conductive is described in US 20100078329. In its simplest form, electrochemical anodic oxidation of selected portions of an initially conductive valve metal (for example, aluminum, titanium, or tantalum) substrate may be performed, resulting in areas (regions) of conductive (starting) material which are geometrically defined and isolated from one another by areas (regions) of anodized (non-conductive, such as aluminum oxide, or alumina) isolation structures.

FIG. 10 shows a smart card (SC) 1000 (compare 600) having a metal card body (CB) 1002 (compare 602) with an opening (MO) 1008 (compare 608) for a transponder chip module (TCM) 1010 (compare 610). Here, rather than (as an alternative to) having a slit (S, 630) extending from the opening (MO) to the periphery of the card body (CB), a comparable (or larger) area of the conductive starting material of the card body (CB) may be rendered non-conductive so that there is a non-conductive strip (NCS) 1034 extending from the opening (MO) to the periphery of the card body (CB). Any technique (chemical, laser, other) capable of rendering selected portions of the metal card body (CB) non-conductive may be used to create the non-conductive strip (NCS). The non-conductive strip (NCS) represents a discontinuity in the metal layer (ML) forming the coupling frame (CF) having two ends.

Some of the concepts disclosed with respect to coupling frames (CF) on the module tape (MT) of a CCE-TCM may be applied to coupling frames (CF) incorporated into the card body (CB) of a smart card (SC), and vice-versa.

Figure 11A:
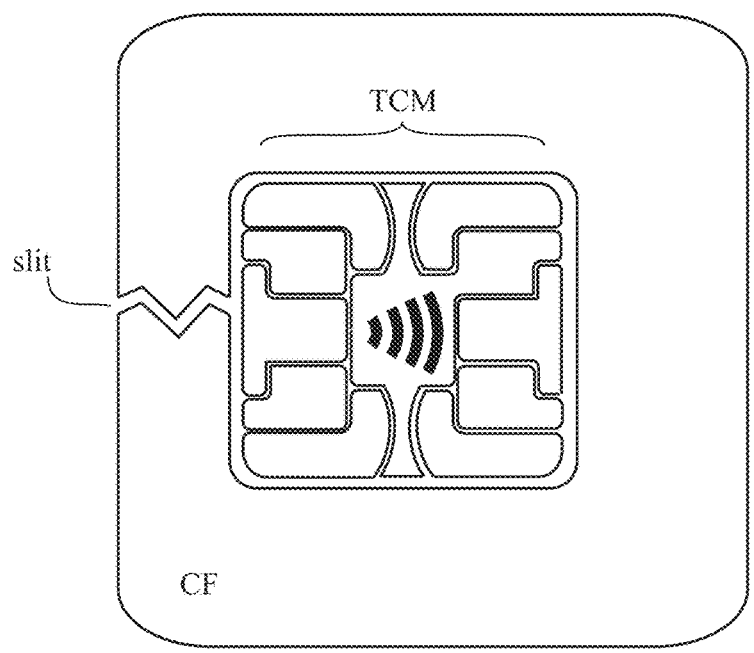
FIGS. 11A-11B are diagrams of some variations of incorporating one or more coupling frames (CF) in the transponder chip module (TCM).

FIGS. 11C,D of US 20150021403 correspond with FIGS. 11A,B herein.

FIGS. 11A-11G are diagrams of some variations of incorporating one or more coupling frames (CF) in the transponder chip module (TCM).

FIG. 11C shows that the slit in the coupling frame (CF) may be other than straight, such as a zig-zag slit or a slit which becomes wider or narrow along its length.

FIG. 11D shows that a coupling frame (CF) may have two slits (slit-1, slit-2), each extending from its inner edge to its outer edge, and disposed (for example) on opposite sides of the transponder chip module (TCM). (This may be considered to be two C-shaped coupling frames, with their ends facing each other.)

US 20150269474 (U.S. Pat. No. 1,461,9177 filed 11 Feb. 2015)

This application (did not issue as a patent), incorporated by reference herein, focused mainly on embodiments of transponder chip modules, and the module antenna, and also presented some embodiments of coupling frames.

Some key points covered in this application may include:
coupling frames in the card body, coupling frames in the module
a diagonal slit is clearly shown
a wide slit This application discloses the following (citations are to numbered paragraphs in the publication, which may be edited for conciseness herein):
These statements appear:
Various techniques may be disclosed herein to improve the construction and performance of transponder chip modules, such as (but not limited to):
coupling frames incorporated into the body of a smart card
coupling frames incorporated into the module tape of the transponder chip module
These statement appear:
FIG. 3A shows an example of a smartcard (SC) 300 with a coupling frame (CF) 320 incorporated into its card body (CB) 302 which has a stepped recess (R). A transponder chip module (TCM) 310 has a planar antenna (PA) which may be a laser-etched antenna structure (LES) 312. The coupling frame (CF) has an opening (MO) 308 for receiving the transponder chip module (TCM) 310. The dashed line indicates, schematically, either a metal layer in a stackup of a card body, or a substantially entirely metal card body (CB).

When "metal layer" is referred to herein, it may refer to such a metal card body. An inner edge of the coupling frame (CF) may overlap some outer turns of the laser-etched antenna structure (LES) in the transponder chip module (TCM). Viewed from another perspective, an outer portion of the planar antenna (PA) may overhang an inner portion of the coupling frame (CF).

FIG. 3B shows a transponder chip module (TCM) 310 disposed in the card body (CB) 302m of a metal smartcard (SC) 300m, or metal card (MC), wherein substantially the entire card body (e.g., 760 μm thick) comprises metal, and may be referred to as a metal card body (MCB). For such a metal card (MC), there has to be a non-conductive area behind the transponder chip module (TCM). The transponder chip module (TCM) resides in an opening (MO) 308, in the metal card body (MCB) 302 which may also be referred to as a module opening (MO). The opening (MO), may be prepared by mechanical milling, or laser ablation, and may be at least the size of the laser etched antenna structure (LES) 312, and may be stepped (for an example of a stepped recess/opening, see FIG. 3A) so that a portion of the metal card body (MCB) overlaps (underneath, as viewed) an outer portion of the laser-etched antenna structure (LES).

This statement appears:
The coupling frame (CF) may be in the form of a ring (such as a rectangular ring) having an opening (OP), an inner edge (IE) which defines the opening, and an outer edge (OE). A discontinuity which may be a slit (S) or a non-conductive stripe (NCS) may extend from the inner edge (IE) or opening (OP) to the outer edge (OE) so that the ring of the coupling frame (CF) is an open loop (discontinuous) conductor having two ends and a gap (which is the slit) there between.

Figure 12A:
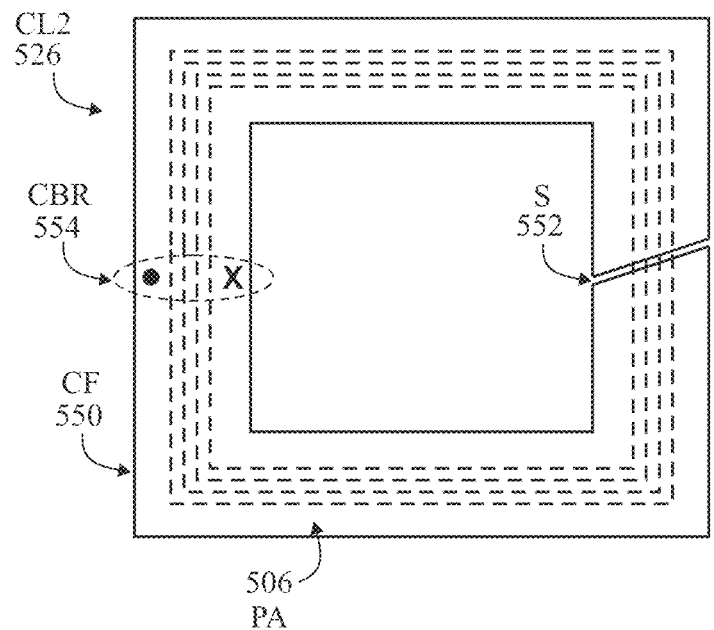
FIG. 12A is a diagram (plan view) of a coupling frame doubling as a connection bridge.

FIG. 5I of US 20150269474 may correspond with FIG. 12A herein.

FIG. 5I is a diagram (plan view) of a coupling frame doubling as a connection bridge.

Figure 12B:
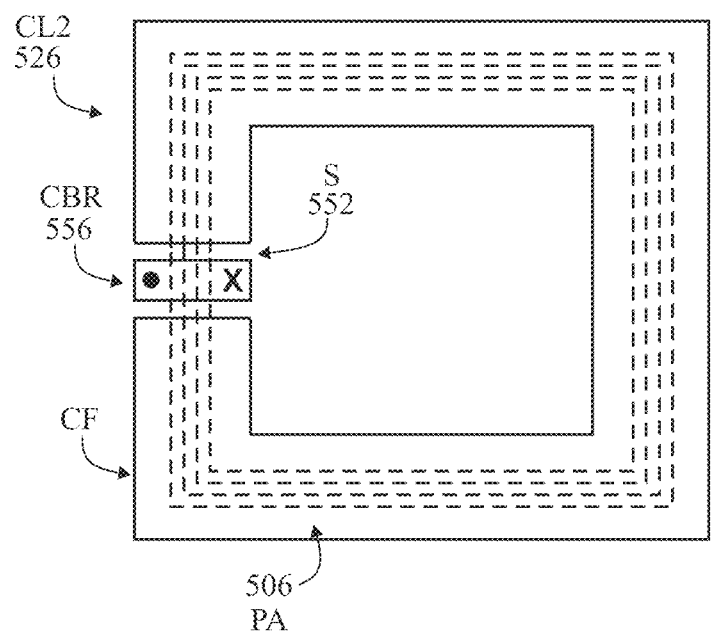
FIG. 12B is a diagram (plan view) of a coupling frame having a connection bridge disposed in its slit (S).

FIG. 5J of US 20150269474 may correspond with FIG. 12B herein.

FIG. 5J is a diagram (plan view) of a coupling frame having a connection bridge disposed in its slit (S).

FIG. 5I shows the conductive layer (CL2) 526 patterned to have a coupling frame (CF) 550 having a slit (S) 552. A portion 554 of the coupling frame may serve as a connection bridge, making a connection from an outer portion (indicated by the dot "•"), to an inner portion (indicated by the "x") thereof, such as was discussed with respect to FIGS. 2 and 2B.

At a glance, it can be seen that the slit 552 in FIG. 5I is clearly diagonal.

FIG. 5J shows that the conductive layer (CL2) 526 may be patterned to have a coupling frame (CF) 550 with a slit (S) 552 which is wide enough (such as approximately 500 μm-1 mm wide) to accommodate a connection bridge (CBR) 556 in the slit. The coupling frame may extend beyond the boundaries of the contact pads 528 and the antenna 506 (such as shown in FIG. 5H).

US 20150136858 (U.S. Ser. No. 14/551,376 filed 24 Nov. 2014)

This application (now U.S. Pat. No. 9,390,364), incorporated by reference herein, focused mainly on embodiments of transponder chip modules, and presented some embodiments of coupling frames.

Some key points covered in this application may include:
clarifies that the ends of the coupling frame define the slit
shows a stepped slit, with two 90° bends
clarifies that inner edge=opening
clarifies that outer edge=periphery This application discloses the following (citations are to numbered paragraphs in the publication, which may be edited for conciseness herein):

This statement appears:

The coupling frame (CF) has an inner edge (IE) 322 defining an opening (OP) 323 in the coupling frame (CF) and has an outer edge (OE, or periphery) 324. A slit (S, or slot, or gap) (S) 326 extends from the inner edge (IE) or opening (OP) of the coupling frame (CF) to the outer edge (OE) thereof, so that the coupling frame (CF) forms an open-loop conductive element ("C" shaped) having two ends (end-1, end-2) separated by the slit (S). The slit (S) may measure approximately 50 μm (between the opposing ends of the coupling frame), or smaller, such as 25 μm or 10 μm. The slit (S) results in the two opposing ends of the coupling frame being closely spaced with one another, so that the coupling frame may nearly completely encircle the transponder chip module (TCM) 302A, and its module antenna (MA).

FIG. 3A of US 20150136858 may correspond with FIG. 13A herein.

FIG. 3A is a plan view of a capacitive coupling enhanced (CCE) transponder chip module (TCM) which has a coupling frame (CF) incorporated on its module tape (MT).

FIGS. 3A-1, 3A-2 of US 20150136858 correspond with FIGS. 13A-1, 13A-2 herein.

FIGS. 3A-1, 3A-2 are detailed views of the ends the coupling frame (CF) shown in FIG. 3A.

The slit (S) in FIG. 3A is shown extending from the opening (OP), which is defined by the inside edge of the coupling frame (CF), to the outside edge thereof, at a position to the left of the transponder chip module (TCM) 304. The slit (S) makes the coupling frame (CF) an open loop—"C" shaped, having two ends. It should be understood that the slit (S) may be located elsewhere, such above the transponder chip module (TCM), to the right of the transponder chip module (TCM), or below the transponder chip module (TCM). It is important that the slit (S) extends anywhere from the inner edge of the coupling frame (CF) to the outer edge thereof, thereby making the coupling frame (CF) a conductive open loop, having two ends. In other words, the coupling frame is a "C", not an "O".

FIG. 3A-1 shows a detail of the two ends of the coupling frame (CF) shown in FIG. 3A. Here, the ends (end-1, end-2) are square and parallel with one another, the coupling frame (CF) having been intersected at a right angle by a straight slit (S). The slit (S) results in two opposing ends of the coupling frame being closely spaced with one another, so that the coupling frame may nearly completely encircle the transponder chip module (TCM) 302A (or 302B, below). The coupling frame (CF) extends nearly entirely around the transponder chip module (TCM)—such as "359°" around it (360° minus the slit S).

FIG. 3A-2 shows a variation of the two ends of the coupling frame (CF) shown in FIG. 3A. Here, the ends (end-1, end-2) are each stepped, the coupling frame (CF) having been intersected by a non-straight slit (S). In this example, the slit (S) is stepped. The coupling frame (CF) extends nearly entirely around the transponder chip module (TCM)—such as "359°" around it (360° minus the slit S). A similar result may accrue with the slit (S) is other than perpendicular to the outer edge (OE) of the coupling frame (CF), for example, extending through the coupling frame (CF) from the outer edge to the inner edge thereof, at a 45° angle. Compare FIG. 3D. The dashed line passing through the ends of the coupling frame indicates that any line perpendicular to an outer edge of the transponder chip module (TCM), or perpendicular to the inner edge (IE) of the coupling frame (CF), will always intersect at least a portion of the coupling frame (CF)—in which case the coupling frame (CF) may be said to completely surround the transponder chip module (TCM) and its module antenna (MA). Compare FIG. 3A wherein the dashed line passes through the slit (S).

As is clearly evident from FIG. 3A-2, the slit is stepped, with two 90° (ninety degree) angles.

An alternative to forming a slit (S) is to render a comparable area of the conductive metal layer (ML) of the coupling frame (CF) non-conductive, providing an electrical discontinuity (rather than a physical slit) to ensure that the coupling frame is open-loop. Such a non-conductive discontinuity may be referred to as a "non-conductive stripe" (NCS).

Figure 13B:
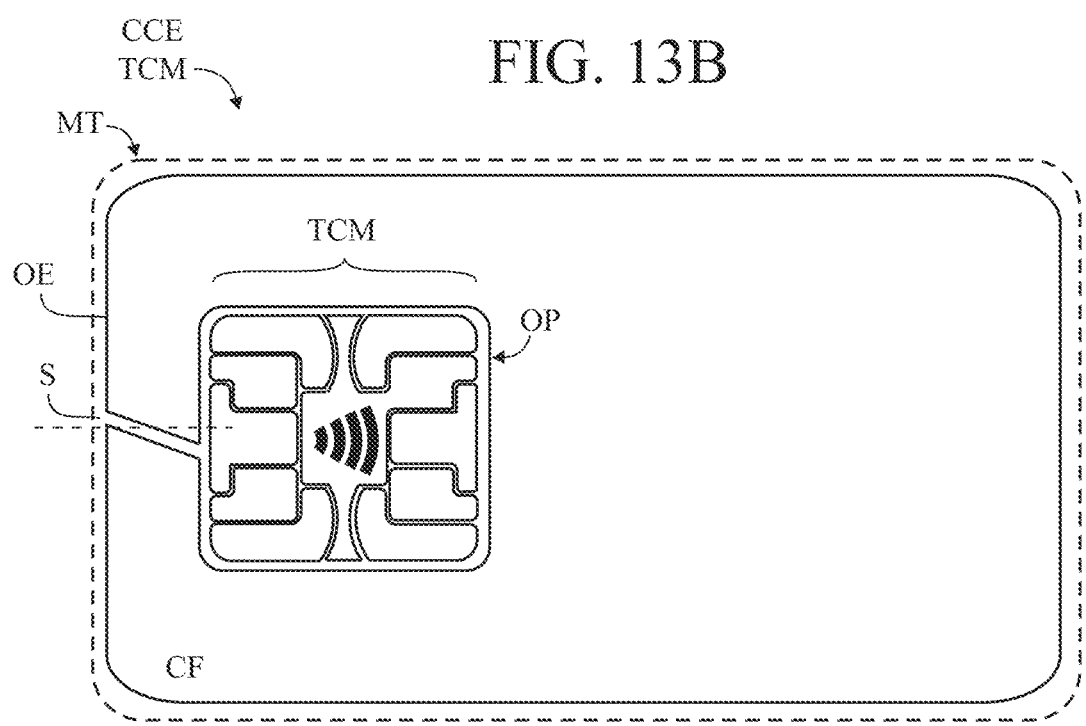
FIGS. 13B-13D are diagram (plan views) of capacitive coupling enhanced (CCE) transponder chip modules (TCM).

FIG. 3D of US 20150136858 may correspond with FIG. 13B herein. This figure is missing from US 20150136858 but appears as FIG. 3D in the issued patent (U.S. Pat. No. 9,390,364)

Figure 13C:
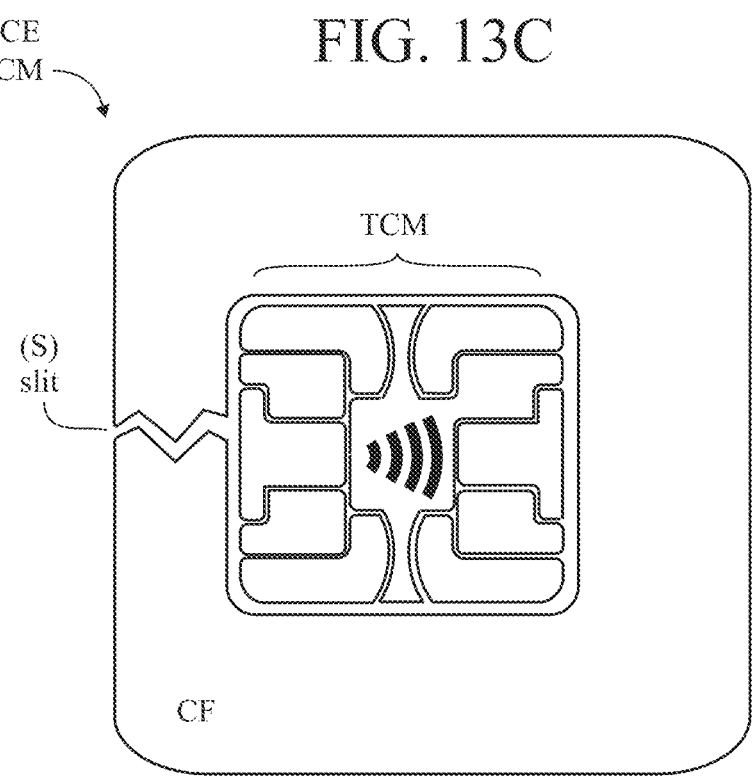

FIG. 3E of US 20150136858 may correspond with FIG. 13C herein.

Figure 13D:
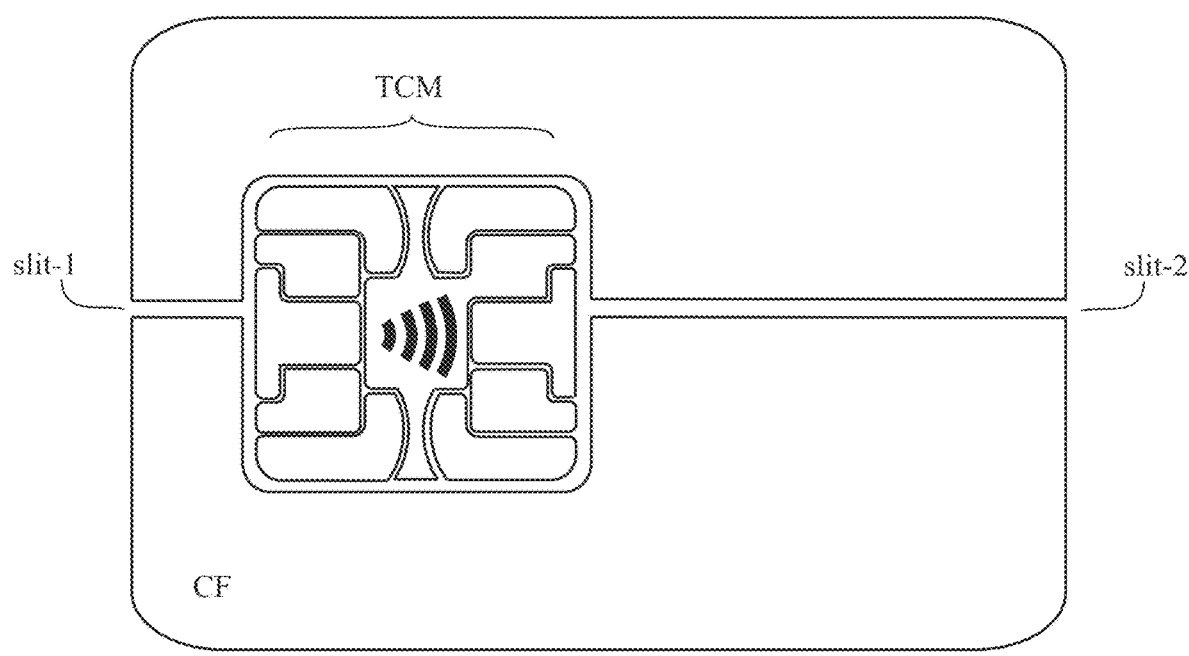

FIG. 3F of US 20150136858 may correspond with FIG. 13D herein.

FIGS. 3D-3I are diagram (plan views) of capacitive coupling enhanced (CCE) transponder chip modules (TCM).

FIG. 3D shows that the coupling frame (CF) may be much wider than the transponder chip module (TCM), such as nearly the entire width of a card body (CB) of a smart card (SC), such as approximately 80 mm wide. The transponder chip module (TCM) is disposed in the opening (OP) of the coupling frame (CF). The module tape (MT) is shown in dashed lines. This figure shows that the slit (S) may extend at an angle other than perpendicular to the outer edge (OE). The dashed line (- - -) passing through the slit (S) illustrates that any line perpendicular to the outer edge (OE) of the coupling frame (CF) will always intersect the coupling frame (CF)—in which case the coupling frame (CF) may be said to completely surround the transponder chip module (TCM) and its module antenna (MA). The module antenna (MA) and RFID chip (IC) are not visible in this view. As mentioned previously, some concepts relating to incorporating a coupling frame (CF) on a module tape (MT) of a capacitive coupling enhanced (CCE) transponder chip module (TCM) may be applied to incorporating a coupling frame (CF) into the card body (CB) of a smart card (SC), generally by substituting "module tape (MT)" for "card body (CB)", and vice-versa.

FIG. 3E shows that the slit in the coupling frame (CF) may be other than straight, such as a zigzag slit or a slit which is becomes wider or narrower along its length.

FIG. 3F shows that a coupling frame (CF) may have two slits (slit-1, slit-2), each extending from its inner edge to its outer edge, and disposed (for example) on opposite sides of the transponder chip module (TCM). (This may be considered to be two C-shaped coupling frames, each surrounding only one side and portions of two adjacent sides of the transponder chip module TCM, with their ends facing each other.) A logo may be printed on or etched into the coupling frame (CF) (see FIG. 3N).

US 20160365644 (U.S. Pat. No. 1,519,7795 filed 30 Jun. 2016)

This application (now U.S. Pat. No. 9,812,782), incorporated by reference herein, discloses, inter alia:
- slit without a module opening
- slit is a cut through a metal layer
- outer edge and inner edge As disclosed therein:

A transponder chip module (TCM) comprises an RFID chip (CM, IC), optionally contact pads (CP), a module antenna (MA), and a coupling frame (CF), all on a common substrate or module tape (MT). The coupling frame (CF) may be in the form of a conductive layer having an outer edge (OE) and a slit (S) or non-conductive stripe (NCS) extending from the outer edge to an inner position thereof which may be a central opening (OP). The coupling frame (CF) may be arranged so that the slit (S) or non-conductive strips (NCS) overlaps at least a portion of the module antenna (MA). Methods and apparatus are disclosed. (Abstract)

Figure 14A:
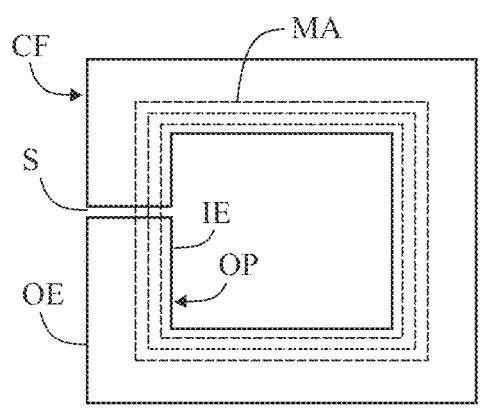
FIG. 14A is a diagram, in plan view, of a coupling frame (CF) having a slit (S) and an opening (OP) in conjunction with a module antenna (MA, PA, LES) of a transponder chip module (TCM, not shown).

This application discloses the following (citations are to numbered paragraphs in the publication, which may be edited for conciseness herein):

FIG. 10C of US 20160365644 may correspond with FIG. 14A herein.

FIG. 10C is a diagram, in plan view, of a coupling frame (CF) having a slit (S) and an opening (OP) in conjunction with a module antenna (MA, PA, LES) of a transponder chip module (TCM, not shown).

Figure 14B:
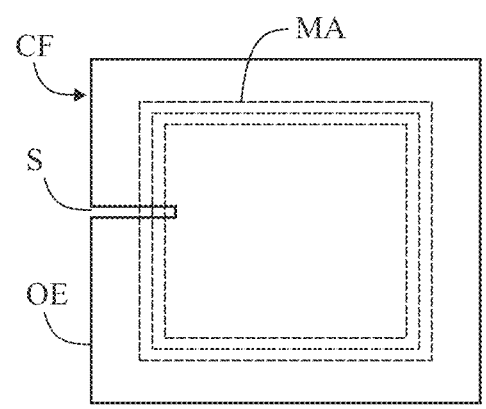
FIG. 14B is a diagram, in plan view, of a coupling frame (CF) having a slit (S) in conjunction with a module antenna (MA, PA, LES) of a transponder chip module (TCM, not shown).

FIG. 10D of US 20160365644 may correspond with FIG. 14B herein.

FIG. 10D is a diagram, in plan view, of a coupling frame (CF) having a slit (S) in conjunction with a module antenna (MA, PA, LES) of a transponder chip module (TCM, not shown).

FIG. 10C is a diagram (plan view) of a coupling frame (CF) (shown in solid lines) having a slit (S), and the slit (S) overlaps at least some outer turns of the module antenna (MA, PA, LES; shown in dashed lines) on at least one side thereof. The slit (S) is shown extending from an outer edge (OE) of the coupling frame (CF) to an inner edge (IE) thereof, the inner edge (IE) being defined by a central opening (OP) in the coupling frame (CF). The slit (S) is shown overlapping (extending over) all of the turns of the module antenna (MA) on one side thereof. The inner edge (IE) of the coupling frame (CF) is shown extending to within the interior of the module antenna (MA). An RFID chip (not shown) may be disposed within the interior of or under the module antenna.

This concept of the slit overlapping the module antenna may be applied to some embodiments, described hereinabove, of the coupling frame being disposed with its inner edge "closely adjacent" to and surrounding the module antenna. The coupling frame may be sized so that the slit in the coupling frame overlaps the module antenna (MA, PA) on at least one side thereof.

It is within the scope of the invention that the opening (OP) in the coupling frame (CF) may be eliminated. Since the opening is defined by the inner edge of the coupling frame (see FIG. 10C), the inner edge (IE) may also be eliminated.

FIG. 10D is a diagram (plan view) of a coupling frame (CF) (shown in solid lines) having a slit (S), and the slit (S) overlaps some outer turns of the module antenna (MA, PA, LES; shown in dashed lines) on at least one side thereof. The slit (S) is shown extending from an outer edge (OE) of the coupling frame (CF) to an inner portion (or interior position) thereof (there is no inner edge or opening in this example). The slit (S) is shown overlapping (extending over) all of the turns of the module antenna (MA) on one side thereof. An RFID chip (not shown) may be disposed within the interior of or under the module antenna.

This concept of the slit overlapping the module antenna, without an inner edge or opening, may be applied to some embodiments of coupling frames described hereinabove, including those (with appropriate modification) showing the coupling frame being disposed with its inner edge "closely adjacent" to and surrounding the module antenna. The coupling frame may be sized and positioned so that the slit in the coupling frame overlaps the module antenna (MA, PA) on at least one side thereof.

Regarding the slit (S), which in some of the embodiments disclosed herein has been described as a cut through a metal layer, the slit (S) is representative of any electrical discontinuity extending from an outer edge (OE) of the conductive surface of the coupling frame (CF) to an inner edge (IE) thereof, or to an inner position thereof in cases (such as FIG. 10D) where there is no inner edge of or central opening within the conductive surface of the coupling frame.

US 20160110639 (U.S. Pat. No. 1,486,2119 filed 22 Sep. 2015)

This application (now U.S. Pat. No. 9,697,459), incorporated by reference herein, discloses, inter alia:
- coupling frame may be a metal layer or a metal card body
- metal card body with a stepped recess
- coupling frame may be a payment object, having a slit
- L-shaped slit
- T-shaped slit
- the coupling frame may be rotated
- hybrid cards
- ceramic inserts
- The coupling frame may be the payment object itself
- A metal jewelry item featuring a slit and functioning as a coupling frame
- moving or rotating the coupling frame As disclosed therein:

[Abstract] RFID devices comprising (i) a transponder chip module (TCM, 1410) having an RFIC (sic) chip (IC) and a module antenna (MA), and (ii) a coupling frame (CF) having an electrical discontinuity comprising a slit (S) or non-conductive stripe (NCS). The coupling frame may be disposed closely adjacent the transponder chip module so that the slit overlaps the module antenna. The RFID device may be a payment object such as a jewelry item having a metal component modified with a slit (S) to function as a coupling frame. The coupling frame may be moved (such as rotated) to position the slit to selectively overlap the module antennas (MA) of one or more transponder chip modules (TCM-1, TCM-2) disposed in the payment object, thereby selectively enhancing (including enabling) contactless communication between a given transponder chip module in the payment object and another RFID device such as an external contactless reader. The coupling frame may be tubular. A card body construction for a metal smart card is disclosed.

Figure 15A:
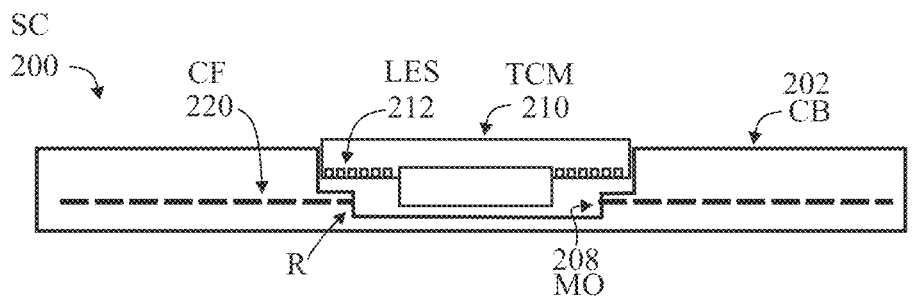
FIG. 15A is a diagram (cross-sectional view) illustrating a coupling frame in a card body of a smart card.

This application discloses the following (citations are to numbered paragraphs in the publication, which may be edited for conciseness herein):

FIG. 2A of US 20160110639 may correspond with FIG. 15A herein.

Figure 15B:
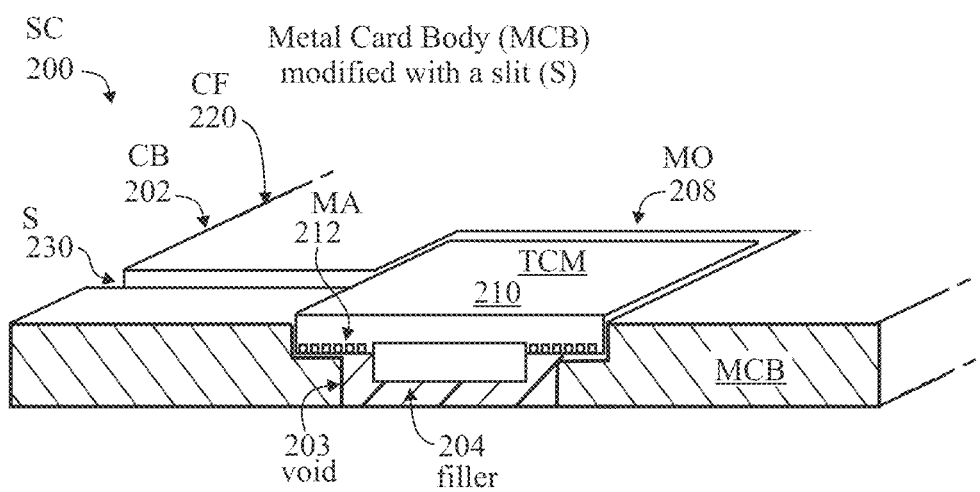
FIG. 15B is a diagram (partial perspective view) illustrating smart card having a metal card body modified to function as a coupling frame.

FIG. 2B of US 20160110639 may correspond with FIG. 15B herein.

FIG. 2A is a diagram (cross-sectional view) illustrating a coupling frame in a card body of a smart card.

FIG. 2B is a diagram (partial perspective view) illustrating smart card having a metal card body modified to function as a coupling frame.

FIG. 2A shows an example of a smart card 200 with a coupling frame (CF) 220 incorporated into its card body (CB) 202 which has a stepped recess (R). A transponder chip module (TCM) 210 has a planar antenna (PA) which may be a laser-etched antenna structure (LES) 212. The coupling frame (CF) has an opening (MO) 208 for receiving the transponder chip module (TCM). The coupling frame (CF) may have a slit (not visible) extending from the opening (MO) to an outer edge of the coupling frame (CF). The dashed line indicates, schematically, that the coupling frame may comprise a metal layer in a stackup of a card body. An inner edge of the coupling frame (CF) may overlap (or underlie) at least some outer turns of the module antenna (MA), which may be a planar antenna (PA) which is laser-etched antenna structure (LES) in the transponder chip module (TCM). Viewed from another perspective, an outer portion of the module antenna (MA may overhang an inner portion of the coupling frame (CF). The coupling frame (CF) may enhance communication between the transponder chip module and another RFID device such as a contactless reader. The transponder chip module may be dual-interface, supporting both contactless and contact communication with external readers.

FIG. 2B illustrates a transponder chip module (TCM) 210 disposed in the card body (CB) 202 of a metal smartcard (SC) 200, or metal card (MC), wherein substantially the entire card body (e.g., 760 μm thick) comprises metal, and may be referred to as a metal card body (MCB). The transponder chip module (TCM) may reside in an opening (MO) 208 extending completely through the card body. The opening may be stepped, having a larger area portion and smaller area portion, as shown. This may result in a void 203 behind the transponder chip module (TCM), and the void may be filled with non-conductive filler 204. In a conventional metal smart card (not having a slit to function as a coupling frame), the void behind the transponder chip module may allow electromagnetic radiation from an external reader to interact with the transponder chip module.

A slit (S) 230 extends from an outer edge of the metal card body (MCB) to the opening (MO) and may overlap (underneath, as viewed) an outer portion of the module antenna (MA) 212 which may be a laser-etched antenna structure (LES). Similarly, a slit may be provided through a metal layer of a hybrid smart card. The slit (S) modifies the metal card body (MCB) or layer, allowing it to operate as a coupling frame 220 to enhance contactless communication with the transponder chip module.

FIG. 2B is illustrative of a coupling frame 220 substantially surrounding a transponder chip module and having an opening to accommodate the transponder chip module.

Although a module opening for the transponder chip module may be shown in the illustrations of this and some other embodiments, it should be understood that many of the techniques described herein may be applicable to coupling frames having a slit, without a module opening. Such coupling frames may not be strictly coplanar with the transponder chip module, but they may be disposed closely adjacent and parallel thereto.

FIG. 3A of US 20160110639 may correspond with FIG. 16A herein.

FIG. 3B of US 20160110639 may correspond with FIG. 16B herein.

FIG. 3A is a diagrammatic view of a front surface of a smart card (SC) which may be a metal card or composite metal card having a slit(S) to function as a coupling frame (CF).

FIG. 3B is a plan view of the back side of the smart card shown in FIG. 3A, showing incorporating a switch to short out the slit (S) in the card body (CB).

FIG. 3A illustrates the front side of a smartcard (SC) 300 which may be a metal card having a metal layer (ML), which may constitute substantially the entire thickness of the card body (CB) 302. The card body (CB) may have a module opening (MO) 308 wherein a transponder chip module (TCM) 310 may be disposed, and a slit (S) 330 extending from the module opening (MO) to the outer perimeter of the metal layer (ML) so that the metal card body (MCB) 302 may function as a coupling frame (CF) 320. The metal layer (ML) (or card body CB, or metal card body MCB) may comprise titanium, and is provided with a slit, slot or gap in the metal to create an open loop coupling frame closely adjacent to and substantially fully surrounding the transponder chip module (TCM).

The slit (S) may overlap at least a portion of the module antenna (MA, not shown) of the transponder chip module. In some examples and embodiments of coupling frames incorporated into RFID devices disclosed herein, there may not need to be an opening (MO) in the coupling frame (CF) for the transponder chip module (TCM).

This concept of modifying a metal element to have a slit (S) to function as a coupling frame (CF) may be applied to other products which may have an antenna module (AM) or transponder chip module (TCM) integrated therewith, such as watches, wearable devices, and the like.

The slit (S) may extend completely (fully) through the metal layer (ML) forming the coupling frame (CF). The slit (S) may extend only partially through the metal layer, and remaining material of the metal layer below the slit (S) may have a thickness below a transparency threshold or skin depth for the metal layer. The slit (S) may have a width which is smaller than the opening. The slit (S) may be at least partially filled with an electrically non-conducting material selected from the group consisting of polymer and epoxy resin, reinforced epoxy resin. A reinforcing structure (RS) may be disposed at a location of the slit (S) to reinforce the metal layer (ML).

An activation distance for a transponder chip module (TCM) disposed in (or under, or above) the opening (MO) of the coupling frame may be at least 20 mm; at least 25 mm; at least 30 mm; at least 35 mm; up to 40 mm; and more than 40 mm.

This FIG. (3A) is illustrative that a Coupling Frame (CF) 320 may be a Metal Layer (ML) or a Metal Card Body (MCB) 302.

FIG. 3B illustrates the back (reverse) side of the smartcard 300 shown in FIG. 3A. A recessed area 302 may be provided on the reverse side of the card body (CB) to accommodate a magnetic stripe, and may measure approximately 9 mm×84 mm. Another recessed area 304 may be provided on the reverse side of the card body (CB) to accommodate a signature panel, and may measure approximately 9 mm×56 mm. The module opening (MO) is shown in dashed lines, and may measure approximately 11 mm×13 mm (for an 8 contact module).

An additional recessed area 306 may be provided on the reverse side of the card body (CB) to accommodate a switch (SW) 324, such as a slide switch, and may measure 5 mm.times.20 mm. The switch (SW) may be used to selectively connect/disconnect the ends of the open loop coupling frame (CF) to one another, so that when the ends are connected, the coupling frame (CF) 320 is a closed loop and does not provide the advantages of an open loop coupling frame (CF) as described above. This allows a user to "switch off" the coupling frame feature and its attendant increase in activation distance, which provides more security (an anti-phishing feature) for the user's card. Shorting out the slit (S) may substantially suppress (including disable) communication between the transponder chip module and another RFID device such as a contactless reader. The switch may comprise any conductive medium (such as a tab or a membrane) capable of selectively short-circuiting the slit. As disclosed herein, a second coupling frame in intimate contact with a first coupling frame can act as a switch, when moved so that it short circuits the slit in the first coupling frame.

The switch feature can be integrated into a solid metal card body construction or a plastic card/metal foil card body construction. The switch may comprise a slide switch, a press button switch or the like which can be used to short-circuit the coupling frame (CF) and dampen the function of the transponder chip module (TCM), thereby providing protection against phishing (unauthorized reading of the smartcard). The switch (SW) can also have the function of reinforcing the structure of the card body (CB) around the position of slot or slit, protecting it from damage resulting from bending.

A switch SW can be incorporated in other RFID devices disclosed herein to short out the slit, slot or gap in the coupling frame. The switch may comprise a slide switch, a press button switch or the like which can be used to short-circuit the coupling frame and dampen the function of the transponder chip module, thereby providing protection against phishing (unauthorized reading of the smartcard). The switch can also have the function of reinforcing the structure of a card body around the position of the slit, protecting it from damage resulting from bending The operation of a coupling frame (CF) benefits from the presence of an electrical discontinuity, herein described as a slit (S), extending into the surface of and across the coupling frame from an outer edge thereof, so that the coupling frame is not a closed loop. The discontinuity in the coupling frame (CF) may be implemented by creating an electrically insulating region in the metal layer, nanomaterial or other conductor of the coupling frame (CF). The discontinuity may be formed by a series of perforations. The discontinuity may also be formed by selective chemical (or other) modification of the metal, nanomaterial or other conductor, resulting in a non-conductive stripe rather than a slit through the surface of the coupling frame. The chemical modification may form an electrically insulating region on the coupling frame (CF) which serves as the discontinuity. For example, the discontinuity may be formed by selective oxidation of the coupling frame (CF) by deposition (for example by screen printing, inkjet) of a corrosive chemical (for example acid). For example, a coupling frame formed from a thin foil of aluminum may have a non-conductive stripe (NCS) formed therein, such as by anodising. See, for example US 20100078329 (Mirsky et al.).

As used herein, "slit" includes any kind of electrical discontinuity or non-conductive path extending from an outer edge of the conductive coupling frame to an inner position thereof, rendering it "open loop". The slit may extend over at least some of the turns of the module antenna (MA) of the transponder chip module (TCM), including all of the turns on one side of the module antenna (MA), and beyond that into the no-man's land in an interior area of the module antenna (MA), and may extend further over some turns of the antenna on other sides of the antenna. The slit may extend to an opening (MO) in the coupling frame (CF) for receiving a transponder chip module (TCM) or the mold mass (MM) thereof.

A discontinuity which is a slit (S) may compromise the mechanical integrity of the otherwise continuous coupling frame, which may necessitate the presence of a backing member (such as a module tape, or inlay substrate). A slit (S) can be filled with a material to restore some of the mechanical integrity to the metal layer of the coupling frame, and may also add to the aesthetic appearance of the coupling frame (if it is visible in the final product). The material may be electroluminescent, so that it changes appearance when the coupling frame (and overall device) is in proximity with an external reader. A patch may extend across the slit of the coupling frame. A discontinuity wherein a narrow region or "stripe" of the metal layer of the otherwise electrically conductive coupling frame is converted (chemically, or otherwise) to a material (such as an oxide of the metal) that is electrically non-conductive may serve the same purpose as the slit, but without compromising the mechanical integrity of the coupling frame. This may be important in situations where the coupling frame comprises a mechanical element of an overall device, such as the housing of a wristwatch.

Other solutions which address restoring mechanical integrity to a coupling frame with a slit are presented herein, and may comprise stacking two or more coupling frames (CF-1, CF-2 . . . CF-n), one atop the other, with one or more insulating layers (such as adhesive, or simply an oxidation layer) therebetween, and with their respective slits (S1, S2 . . . Sn) being oriented differently than one another, such as 90° or 180° apart from one another, so that the slits are not aligned on top of one another. (If the stacked coupling frames were not insulated from each other, they could short out each other's slits, compromising the function of the coupling frames.) Such a laminated construction of an overall coupling frame having multiple (two or more) coupling frame layers may exhibit superior mechanical integrity, and may also contribute to an aesthetic appearance of the overall device. Different materials may be used for the different layers, which may also provide additional benefits.

Figure 16C:
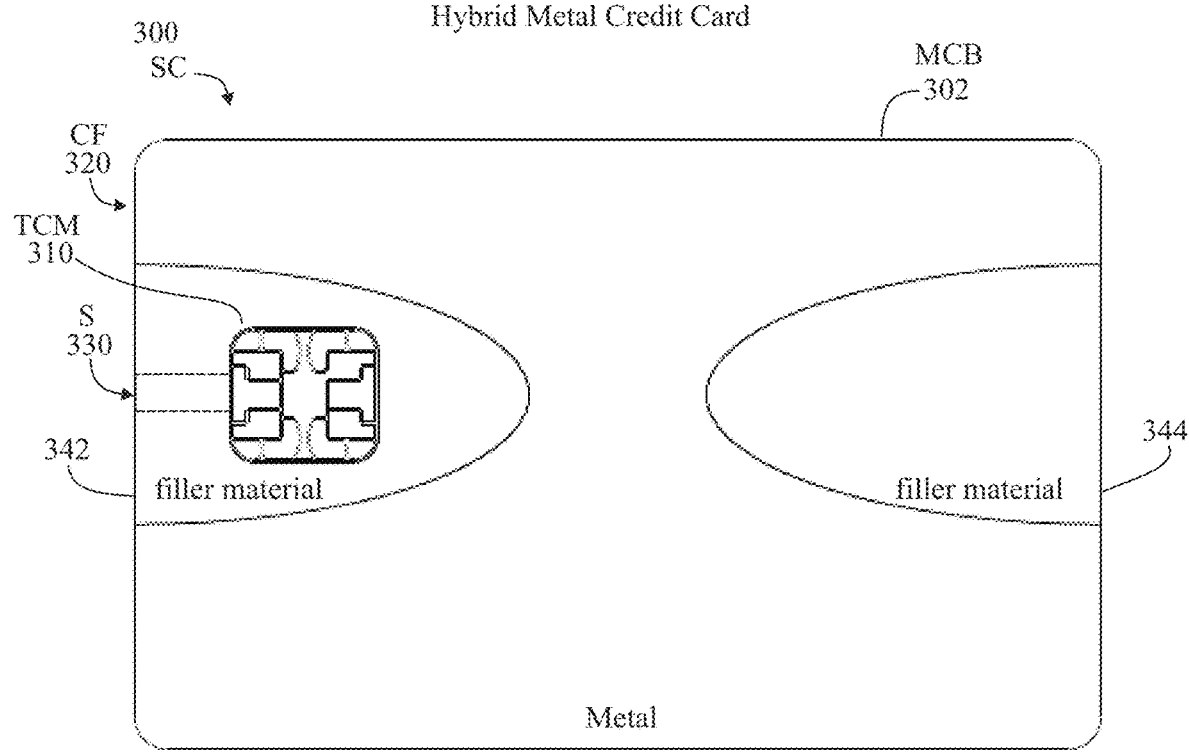
FIG. 16C is a plan view of a hybrid metal smart card, which may be a credit card.

FIG. 3C of US 20160110639 may correspond with FIG. 16C herein.

Figure 16D:
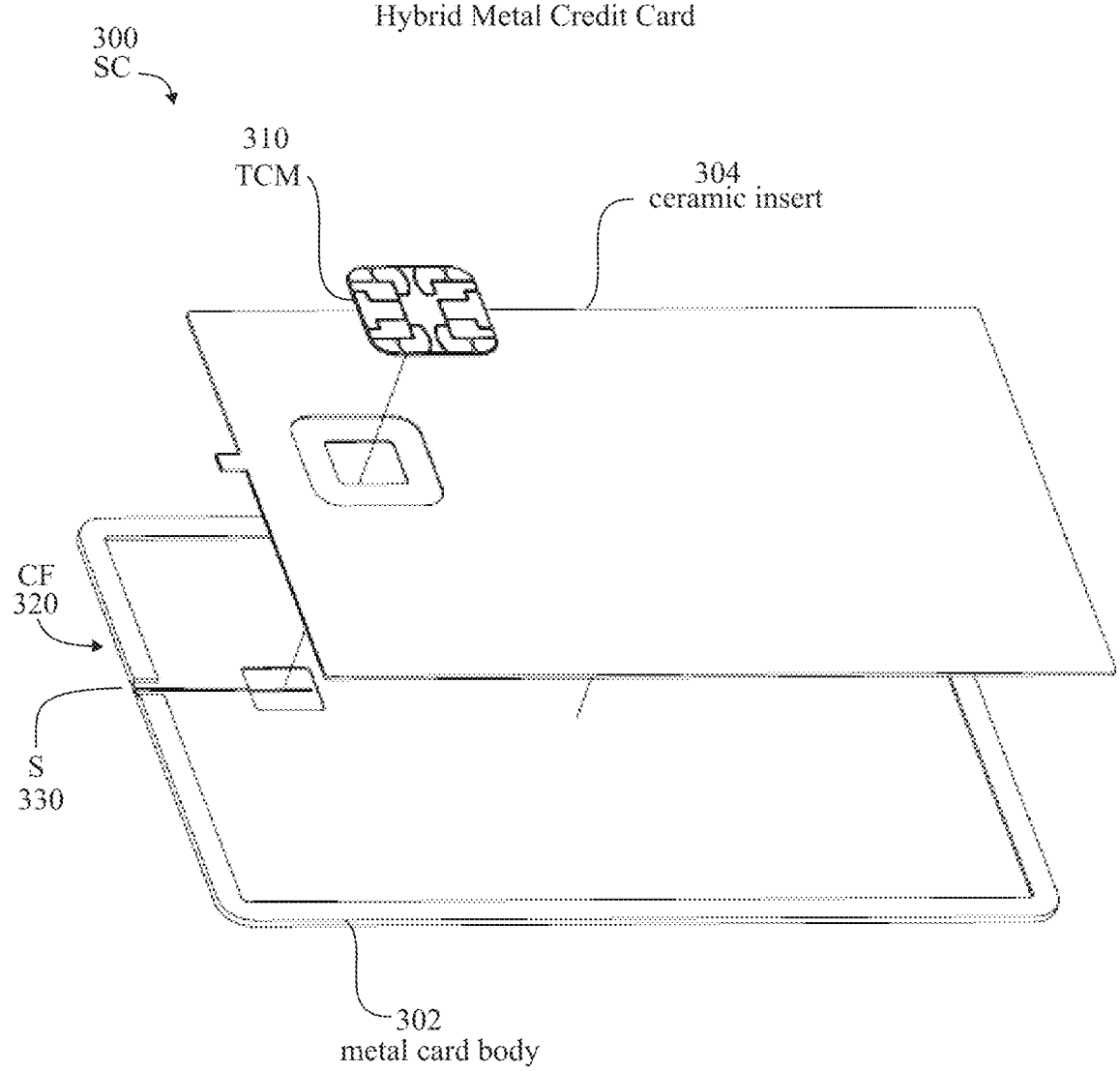
FIG. 16D is a perspective view (exploded) of a hybrid ceramic and metal smart card.

FIG. 3D of US 20160110639 may correspond with FIG. 16D herein.

FIG. 3C is a plan view of a hybrid metal smart card, which may be a credit card.

FIG. 3D is a perspective view (exploded) of a hybrid ceramic and metal smart card.

FIG. 3C illustrates a design of a hybrid metal credit card (or smart card) 300. The card body (CB) 302 is largely composed of metal (and may be referred to as a metal card body MCB), this may be a precious or high density metal such as silver, titanium, tungsten or a high strength metal such as stainless steel, and may comprise a non-precious metal plated with a precious metal. The card body (CB) features a slit (S, dashed lines) 330 extending from an edge of the card body (CB) through the position of the transponder chip module (TCM) 310 so that the slit overlaps the module antenna thereof and the card body (CB) functions as a coupling frame (CF) 320. The metal card body (CB, MCB) may have one or more recesses 342, 344 in the front and/or rear face of the card. These recesses may be filled with implanted or laminated non-conductive filler materials such as ceramic, plastic, glass, wood etc. The filled recesses may be, for example, 50% of the depth of the card thickness.

These filled recesses serve as decorative elements on the card. In particular at the module position they serve to conceal the slit (S) in the card and allow a neat implanting of the module into the card body. In addition, the use of a recess filled with non-conductive material surrounding the transponder chip module may mitigate the effects of electrostatic discharge (ESD) when inserting the card into payment terminals or ATM machines, as the fill material for the recess may have a high dielectric constant and hence protect the transponder chip module from static discharges.

FIG. 3D illustrates a design of a hybrid ceramic and metal smart card (SC) 300. The card body (CB) 302 may be made of solid metal and feature a slit (S) 330 at the position of the transponder chip module (TCM) 310. The card body with slit may function as a coupling frame (CF) 320, with the slit overlapping the module antenna of the transponder chip module. The metal card body may feature a recess that may cover most of the size of the card and extend around the slit position to the periphery of the card. This recess may be filled by gluing or laminating a moulded or cut ceramic insert 304. This allows the card to retain the mechanical strength of the metal (e.g. stainless steel, titanium, tungsten) and have the aesthetic appearance and appeal of a polished ceramic finish.

Figure 17:
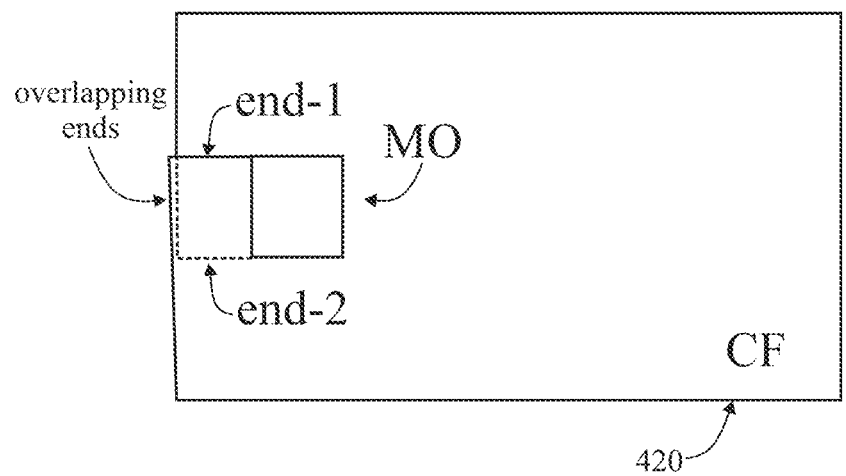

FIG. 4 of US 20160110639 may correspond with FIG. 17 herein.

FIG. 4 is a diagram (plan view) of a coupling frame (CF) for an RFID device such as a smart card, having overlapping ends at the position of the slit.

FIG. 4 is a diagram of a coupling frame CF having an opening MO for a transponder chip module TCM (not shown). Some of the coupling frames described hereinabove have a slit S extending from the opening MO to an outer edge of the coupling frame, between two opposing ends of the coupling frame. Reference may be made to FIGS. 3A, 3A-1, 3A-2 of US 20150136858.

The coupling frame (CF) 420 of FIG. 4 is "open loop", and has two opposing ends (end-1, end-2) which, although originally in manufacture may have been separated by a slit, in the final product are overlapping so that there is no discernable slit. However, electrically, there is still a discontinuity between the two ends, which may be considered to be a slit (or an overlapping slit). The coupling frame could be manufactured from a curved surface so that when it is flattened out, the ends slightly overlap each other. The overlapping portions of the ends may be thinner than the remainder of the coupling frame so that the coupling frame is not thicker in the area of the overlap. The overlapping ends may be electrically isolated from one another by an electrically insulating material, or dielectric. The ends around the slit S of a coupling frame CF may also be connected with one another, such as with a wire.

FIG. 5A of US 20160110639 may correspond with FIG. 18A herein.

FIG. 5B of US 20160110639 may correspond with FIG. 18B herein.

FIGS. 5A,B are two perspective views (front and back) of a metal card body MCB having a cavity (MO) for a transponder chip module (TCM, not shown), and a slit S extending from the cavity to an outer edge of the metal card body.

FIGS. 5A,B are two views (front and back) of a metal card body (MCB) 502 having a cavity (MO) 508 which is an opening for the transponder chip module (not shown) and a slit (S) 530 extending from the cavity to an outer edge of the metal card body. A reinforcing insert 540 is shown inserted into the card body at the position of the slit S.

Reference may be made to FIG. 8 of US 20150021403 which shows a metal smart card (SC) 800 comprising a full metal card body (CB) 802 with an opening (MO) 808 for a transponder chip module (TCM, not shown) and a slit (S) 830 extending from the opening (MO) to a periphery of the card body (CB) to allow the flux lines to propagate around the area of the transponder chip module (TCM). The full metal card body (CB) may be formed of an electrically conductive material, such as titanium, may have a thickness of 760 µm, and may act a coupling frame (CF) for capacitive coupling with a contactless reader or point of sale terminal. The card body (CB) may comprise conductive nanoparticles.

To reinforce the card body (CB) (or metal layer (ML)) having a slit (S), a reinforcing insert (or structure or plate), of a non-conductive material such as plastic or reinforced plastic, may be disposed at (including around and covering) the location (area) of the slit (S) in a recess (R, not shown) on the underside of the card body (CB), and may extend beyond the slit. For example, the slit (S) may be 50 µm wide, the reinforcing structure may be up to or more than 8000 µm wide (approximately the size of a side of the TCM). The reinforcing structure (RS) may have a logo or design. The thickness of the reinforcing structure (and corresponding depth of the recess R on the underside of the card body CB) may be 350 µm. The opening (MO) may extend completely through the card body (CB) and the transponder chip module (TCM) may extend through the opening (MO) to the underside of the card body (CB) to allow the propagation of the electromagnetic flux lines.

FIG. 11A of US 20160110639 may correspond with FIG. 19A herein.

Figure 11B:
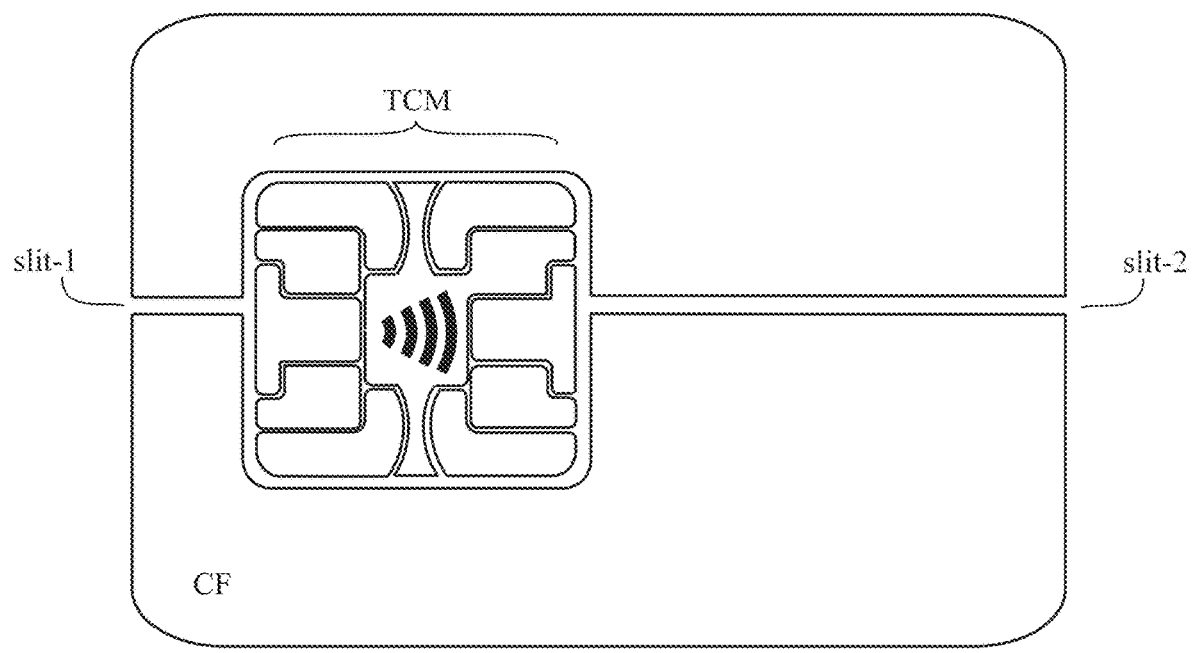

FIG. 11B of US 20160110639 may correspond with FIG. 19B herein.

FIG. 11C of US 20160110639 may correspond with FIG. 19C herein.

FIGS. 11A, B, C are diagrams (plan views) of smart cards (exemplary of payment objects) having a transponder chip module with a coupling frame for capacitively coupling with an external reader, and an LED (or LED module) in the same coupling frame (FIG. 11A), or in a separate coupling frame (FIG. 11B), or connected with an antenna (FIG. 11C).

FIG. 11A shows a smart card (SC), which may have a metal card body (CB) formed with an opening (MO) for a transponder chip module (TCM), a slit (S1) 1130A extending from the opening to an edge (left, as viewed) of the metal care body, turning the card body into a coupling frame (CF) 1120A. The opening MO is at the position prescribed by the ISO standard (near the left edge of the card body (CB).

Another opening (LO) is formed on an opposite side of the metal card body and also has a slit (S2) 1130B extending from the opening to the edge (right, as viewed) of the card body/coupling frame (CB/CF). An LED may be disposed in the opening (LO) and connected to the card body/coupling frame (CB/CF) across the slit (S2).

The dashed line around the coupling frame CF (lower right corner only) is intended to indicate that the coupling frame may be disposed in a plastic card body CB. Alternatively, as discussed herein, a metal card body MCB may be modified to perform as a coupling frame.

This arrangement provides a transponder chip module (TCM) with an LED on opposite sides (left-right) of a card body of a smart card, which may be a metal smart card. In this example, a single coupling frame CF may have enough power to illuminate the LED while still providing enough power to activate and operate the RFID chip in the transponder chip module (TCM).

FIG. 11B shows a smart card (SC) having two coupling frames, and a card body (CB) which may be a metal card body (MCB) comprising a first coupling frame (CF-1) 1120A on the left (as viewed) side of the card body and a second coupling frame (CF-2) 1120B on the right (as viewed) of the card body. The two coupling frames (CF-1, CF-2) may be electrically isolated from one another. A first opening (MO) for a transponder chip module (TCM) may be formed in the left coupling frame (CF-1), with a slit (S1) 1130A extending from the opening (MO) to the left (as viewed) edge of the metal card body, turning the card body into a coupling frame CF. The opening MO may be located at the position prescribed by the ISO standard (near the left edge of the card body).

Another opening (LO) is formed on an opposite side of the metal card body, in the second coupling frame (CF-2) 1120B portion thereof, and similarly has a slit (S2) 1130B extending from the opening (LO) to the right edge (as viewed) of the card body/coupling frame. An LED or LED module (an LED with additional components) may be disposed in the opening (LO) and connected to the coupling frame (CF-2) across the slit (S2).

The first coupling frame CF-1 may have a larger surface area than the second coupling frame CF-2, and may be substantially coplanar with the second coupling frame CF-2.

FIG. 11C shows a smart card (SC) having a single coupling frame (CF) for the transponder chip module (TCM), covering approximately (for example) ⅔ of the surface of the card body (CB). The smart card may have a metal card body CB. An opening (MO) for the transponder chip module (TCM) may be formed in a left side (as viewed) of the card body (CB) which is formed with a slit S extending from the opening (MO) to the left (as viewed) edge of the metal card body (CB) so that the card body (CB) may function as a coupling frame (CF), and enhance, rather than block contactless communication with the transponder chip module (TCM). The opening (MO) may be located at the position prescribed by the ISO standard (near the left edge of the card body).

In this example, an LED (or LED module) is disposed on a separate substrate (LS) which may be comparable, for example, in size and location to CF-2 in FIG. 11B, and which comprises an antenna (ANT) for inductive coupling with an external reader. The LED substrate need not be conductive, and may be a plastic/non-conductive material. (The coupling frames disclosed herein are typically conductive.) The LED is connected to the antenna, and may illuminate when in the RF field of a reader. The antenna may be a planar etched antenna, a wire wound antenna, or any other suitable antenna. An opening (not shown) may be provided in the LED substrate so that the LED is visible from an external surface of the smart card (or other payment object).

Regarding incorporating LEDs into RFID devices such as payment objects, it may be noted that FIG. 7A of US 20140361086 shows incorporating an LED into the smart card (SC), and connecting it to the ends of the coupling frame (CF). See also FIGS. 5, 5A, 5B of US 20140284386 showing LEDs connected to booster antennas.

FIG. 13A of US 20160110639 may correspond with FIG. 20A herein.

FIG. 13B of US 20160110639 may correspond with FIG. 20B herein.

FIG. 13A (perspective view) and 13B (top plan view) shows a payment object in the form of a bracelet having a wristband with an L-shaped slit to function as a coupling frame.

A payment object such as a bracelet may have a slit and function as a coupling frame for a transponder chip module incorporated into the payment object. In the case of non-standard form factor smartcards, or payment objects such as bracelets, it may be desirable to align the module antenna of the transponder chip module in a particular direction. For example in a metal bracelet, the module antenna may be aligned along the circumference of the bracelet. The slit of the coupling frame may describe an arbitrary path extending from one edge of the payment object, and may be straight, or it may have an L-shape or a T-shape. The slit may linear (straight) or non-linear. More than one slit may be used to operate with a given transponder chip module TCM, and multiple slits may used if the payment object (or device) comprises a laminated structure. In this case the individual slits may be offset from one another across the laminated layers of the device to increase the mechanical strength of the device.

In the case of a jewelry item such as fashion metal bracelet, the slit(s) and transponder chip module may be concealed by a non-metallic over mould, epoxy, jewels, lead crystal or other decorative feature, such as a cover. The transponder chip module may be mounted in the inner or outer face (surface) of a fashion metal bracelet and may be located at any position on the bracelet including adjacent to terminated edges or bracelet links. In addition, the transponder chip module TCM may be located inside a link of a bracelet—this could form a modular insert that may be manufactured independently of the main body of the bracelet.

FIG. 13A (perspective view) and 13B (top plan view) illustrates an RFID device, such as a payment object 1300, in the form of a bracelet (or wristband). A transponder chip module (TCM) 1310 having a module antenna may be inserted into a recess in an outer surface of the wristband. A cover plate may cover the recess, with the transponder chip module inside.

An L-shaped slit (S) 1330 is shown extending generally axially from an outer edge of the wristband, to within the recess for the transponder chip module TCM, then continuing in a circumferential direction across the area/recess for the transponder chip module TCM, so that the wristband may function as a coupling frame 1320. The radial portion of the slit S may be very narrow, and the circumferential portion of the slit S may be wider. An L-shaped slit may extend across (overlap) one side of the module antenna, and in "no-man's land" may extend to an adjacent side of the module antenna. An additional slit (not shown) may be disposed on side edge of the wrist band opposite to the radial portion of the slit, for aesthetic purposes (to provide some symmetry).

FIG. 16 of US 20160110639 may correspond with FIG. 21 herein.

FIG. 16 is an illustration of a payment object in the form of a metal charm that is designed to operate as a coupling frame in conjunction with a transponder chip module.

FIG. 16 illustrates an RFID device, such as a payment object, comprising a metal charm designed to operate as a coupling frame in conjunction with a transponder chip module. Notice that a metal component of the charm has a T-shaped slit (S) 1630 to function as a coupling frame (CF) 1620. A transponder chip module (TCM) may be disposed in a recess in the metal component (CF) 1620. The T-shaped slit may extend across (overlap) one side of the module antenna, and in "no-man's land" may extend to adjacent sides of the module antenna.

Figure 22A:
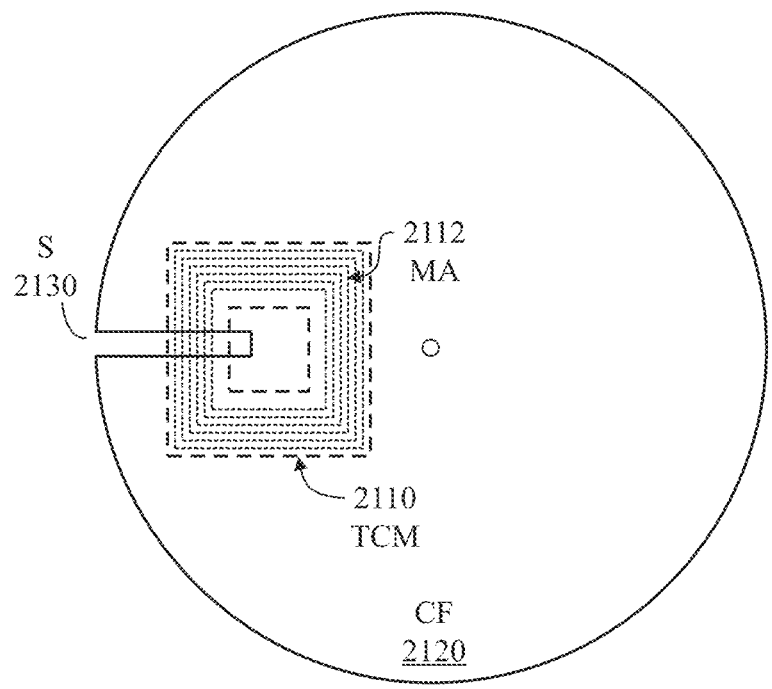
FIG. 22A is a plan view of a coupling frame (CF) and transponder chip module (TCM).

FIG. 21A of US 20160110639 may correspond with FIG. 22A herein.

Figure 22B:
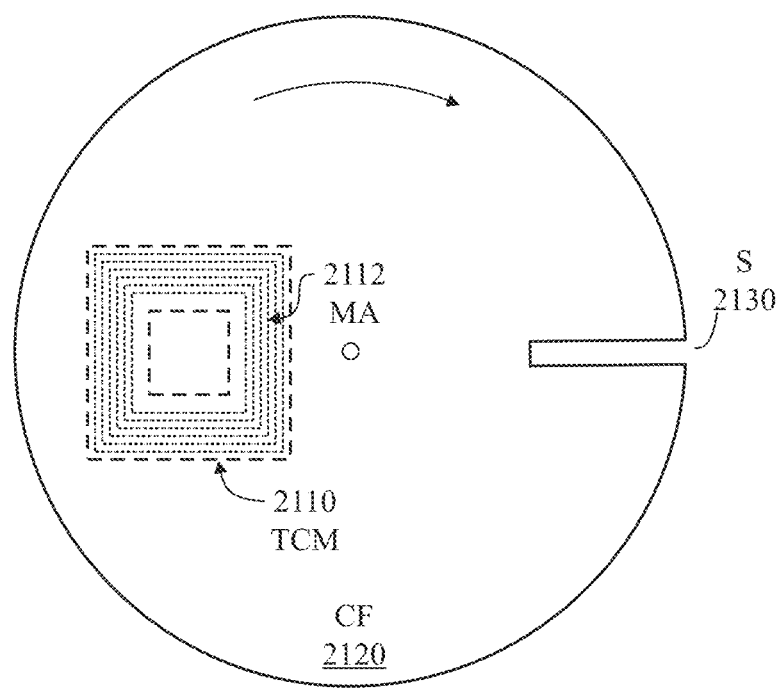
FIG. 22B is a plan view of a coupling frame (CF) and transponder chip module (TCM).

FIG. 21B of US 20160110639 may correspond with FIG. 22B herein.

FIG. 21A is a plan view of a coupling frame (CF) and transponder chip module (TCM).

FIG. 21B is a plan view of a coupling frame (CF) and transponder chip module (TCM).

Figure 22C:
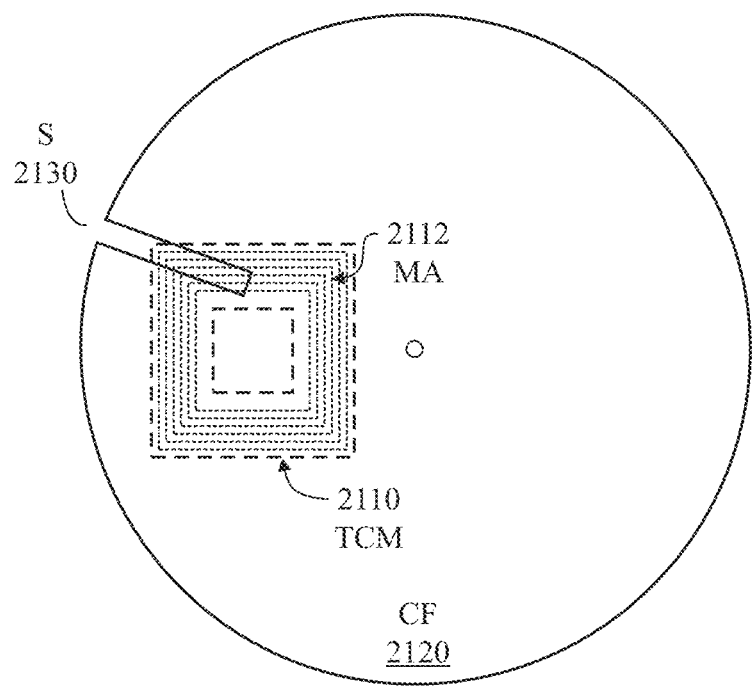
FIG. 22C is a plan view of a coupling frame (CF) and transponder chip module (TCM).

FIG. 22C is new (not expressly disclosed in US 20160110639) and shows the coupling frame of FIG. 21A, partially rotated clockwise, towards the position shown in FIG. 22B. In this position, the slit (S) in the coupling frame (CF) overlaps the module antenna (MA). In this position, the slit is angled (such as 20°) such that its outer end at the periphery of the coupling frame is disposed at a position which is above (rather than astride) the module antenna.

FIGS. 21A,B show an example of a single coupling frame (CF) 2120 disposed over a single transponder chip module (TCM) 2110. These figures clearly show that the coupling frame (CF) may be much larger (in area) than the transponder chip module (TCM). And, in this example, the coupling frame is circular (disc-like). In this variation, the coupling frame (or component of a payment object carrying or functioning as the coupling frame) may be in a first position (FIG. 21A) with the slit (S) 2130 traversing (overlapping) the traces of the module antenna (MA) 2112 to enable communication, and may be rotated to a second position (FIG. 21B) so that the slit (S) does not traverse the traces of the module antenna to disable communication.

As set forth in the claims of US 20160110639:
(2) at least one of the coupling frame and the module antenna is moveable with respect to the other so that communication with the transponder chip module may selectively be enhanced or suppressed
(3) in a first position, the slit of the coupling frame overlaps the module antenna; and in a second position, the silt of the coupling frame does not overlap the module antenna.
(4) the coupling frame can be rotated, toggled, slid, or flipped with respect to the transponder chip module.

FIG. 21B shows the coupling frame CF of FIG. 21A rotated from a first position with the slit overlapping the module antenna (contactless communication enabled), 180 to a second position with the slit distant from and not overlapping (contactless communication disabled) the module antenna.

FIG. 22C is based on FIGS. 21A,B of US 20160110639, and shows the coupling frame partially rotated between a first position (FIG. 21A) and a second position (FIG. 21B).

FIG. 22C is new (not expressly disclosed in US 20160110639) and shows the coupling frame partially rotated to a position where the slit is oriented diagonally (not parallel with a top or bottom edge of the card), and is still overlapping the module antenna to enable contactless communication.

It may readily be observed that, as the coupling frame is being rotated, for example 20 clockwise, that the slit in the coupling frame may extend from the left side of the module opening for the transponder chip module to a position above (higher than) the position of the module antenna.

In the language of claim 1 of US 20190236434 (CompoSecure, '434), "the short side of the card periphery has a region aligned with the first edge of the opening, and the origin is located on periphery outside the aligned region."

1. A transaction card having a card periphery defined by first and second parallel relatively shorter sides and first and second parallel relatively longer sides, the card comprising:
a metal layer having an front surface and a back surface; and
an opening in the metal layer sized to accommodate a transponder chip module, the opening having a first edge parallel and relatively closest to the first short side of the card periphery and aligned with a first section of the card periphery, a second edge parallel and relatively closest to the first long side of the periphery, and a third edge parallel and relatively closest to the second long side of the periphery, the first edge relatively closer to the short side of the periphery than the second edge is to the long side of the periphery, and the second edge relatively closer to the first long side of the periphery than the third edge is to the second long side of the card periphery, the edges of the opening defining corners, and
a discontinuity in the metal layer comprising a gap in the metal layer extending from the front surface to the back surface, the discontinuity defining a path from an origin at the card periphery and terminating at a terminus in the opening, wherein one of the terminus or the origin are located relatively closer to a line defined by the first long side of the periphery than the other.

As best understood, claim 1 of the '434 application may be anticipated by any of the descriptions and/or drawings set forth herein where the slit extends other than horizontally, straight across (left-to-right) the card (i.e., the coupling frame).

See also claim 2 of the '434 application, which states:
2. The transaction card of claim 1, wherein the short side of the card periphery has a region aligned with the first edge of the opening, and the origin is located on periphery outside the aligned region.

Claim 2 of the '434 application may be anticipated by FIG. 22C, and any of the following descriptions of a slit set forth herein, such as:
the slit extends along any direction from the opening to the periphery;
the slit extends from anywhere (or any position) on the inner edge (opening) to anywhere on the outer edge (periphery);
the slit is disposed other than perpendicular to the outer edge (periphery);
the slit is disposed diagonally with respect to the outer edge (periphery); and
the slit is disposed at a 45° angle with respect to the outer edge (periphery).

US 20170017871 (U.S. Pat. No. 1,507,2356 filed 17 Mar. 2016)

This application (now U.S. Pat. No. 9,836,684), incorporated by reference herein, discloses, inter alia:
modifying metal elements to have a slit, applied to other products
slit may be straight, curved or angled, also L-shaped, T-shaped, and the like This application discloses the following (citations are to numbered paragraphs in the publication, which may be edited for conciseness herein):

As disclosed therein:
[Abstract] Smartcards having (i) a metal card body (MCB) with a slit (S) overlapping a module antenna (MA) of a chip module (TCM) or (ii) multiple metal layers (M1, M2, M3) each having a slit (S1, S2, S3) offset or oriented differently than each other. A front metal layer may be continuous (no slit), and may be shielded from underlying metal layers by a shielding layer (SL). Metal backing inserts (MBI) reinforcing the slit(s) may also have a slit (S2) overlapping the module antenna. Diamond like coating filling the slit. Key fobs similarly fabricated. Plastic-Metal-Plastic smart cards and methods of manufacture are disclosed. Such cards may be contactless only, contact only, or may be dual-interface (contact and contactless) cards.

As disclosed therein:

The concept of modifying a metal element to have a slit (S) to function as a coupling frame (CF) may be applied to other products which may have an antenna module (AM) or transponder chip module (TCM) integrated therewith, such as watches, wearable devices, and the like.

The slit (S) may extend completely (fully) through the metal layer (ML) forming the coupling frame (CF). The slit (S) may extend only partially through the metal layer, and remaining material of the metal layer below the slit (S) may have a thickness below a transparency threshold or skin depth for the metal layer. The slit (S) may have a width which is smaller than the opening. The slit (S) may be at least partially filled with an electrically non-conducting material selected from the group consisting of polymer and epoxy resin, reinforced epoxy resin. A reinforcing structure (RS) may be disposed at a location of the slit (S) to reinforce the metal layer (ML).

As disclosed therein:

the coupling frame (CF) has a slit (S) extending from an outer edge to an inner position thereof, and overlaps at least a portion, such as the traces on one side of the module antenna (MA), extending into the trace-free interior area ("no man's land") of the module antenna (MA). The slit (S) may be straight, L-shaped, T-shaped and the like. The width and length of the slit (S) may be established with respect to the dimensions of the no-man's land, and the slit (S) may overlap some turns on other sides of the antenna. (As used herein, "no-man's land" may refer to an area inside a planar antenna which is devoid of antenna tracks. Antenna tracks may be referred to as "windings".)

multiple coupling frames overlapping a transponder chip module (in particular, one of the coupling frames overlapping the tracks of the module antenna (MA)) may be used to form a stack of metal layers in a laminated metal card body, whereby the slit in each of the coupling frames extending from the opening (MO) in the coupling frame to accept the transponder chip module (TCM) may end at a different position, providing mechanical strength in the card body construction. Each frame in the stack of coupling frames is isolated from one another using a dielectric medium.

A first slit S1 may be disposed in a first metal layer (ML1) of the smart card, extending from the left (as viewed) edge thereof to the position of the transponder chip module (TCM), overlapping the left (as viewed) side of the module antenna (MA). The slit S1 may have a width of approximately 50 µm, and may be positioned towards the top of the transponder chip module (TCM), such as approximately 4.5 mm above a centerline (CL) of the transponder chip module (TCM). The slit S1 may be straight, curved, or angled.

Rather than having a slit, a discontinuity in the form of a non-conductive strip may be formed, such as by anodizing corresponding stripe of the metal. See US 20100078329 (Apr. 4, 2010; Mirsky et al.). Also ALOX™ technology (MCL Micro Components Ltd., Israel).

For a solid metal card the slit may be replaced by an electrically isolating track (or non-conductive stripe) within the metal card body formed by, for example, selective anodic oxidation of the metal. This process may be applied to any metal or metal alloy card body that bears an electrically resistive oxide (e.g. aluminium, titanium, magnesium). The surfaces of the card may be masked and a window exposed in the mask by traditional lithographic processes or selective laser etching of the mask layer. The window may define the position, width and shape of the non-conductive stripe. The card body may be then processed to produce an electrically resistive region that runs through the card body as defined by the mask window. In this manner a discontinuity may be defined and form the required electrical discontinuity to permit the function of the card body as a coupling frame. An advantage of this method is that the slit region remains filled with material. This adds mechanical strength to the card body.

To further enhance the mechanical strength of the card in the slit region, the non-conductive strip (NCS) may have a non-linear shape, for example a wave shape. This type of NCS may be covered or colored for decorative effect. In particular, oxides such as aluminium oxide form a porous structure that readily accepts coloring agents. This may be used to selectively color the NCS distinct from the card body. It is noted that the use of these techniques may be applied to laminated metal cards for any of the outer or inner layers of the card.

As described herein, different metal layers of a smart card may have slits oriented in different directions with respect to the overall card body, the slits shown therein originating at an outer edge of the card body and extending to within a position on the card body associated with the transponder chip module (TCM) such that the slit (S) overlaps at least a portion of, such as one side of) the module antenna (MA). Different layers may have slits oriented in different directions (extending from different sides of the card body). Cards having solid metal bodies will now be described.

Figure 23A:
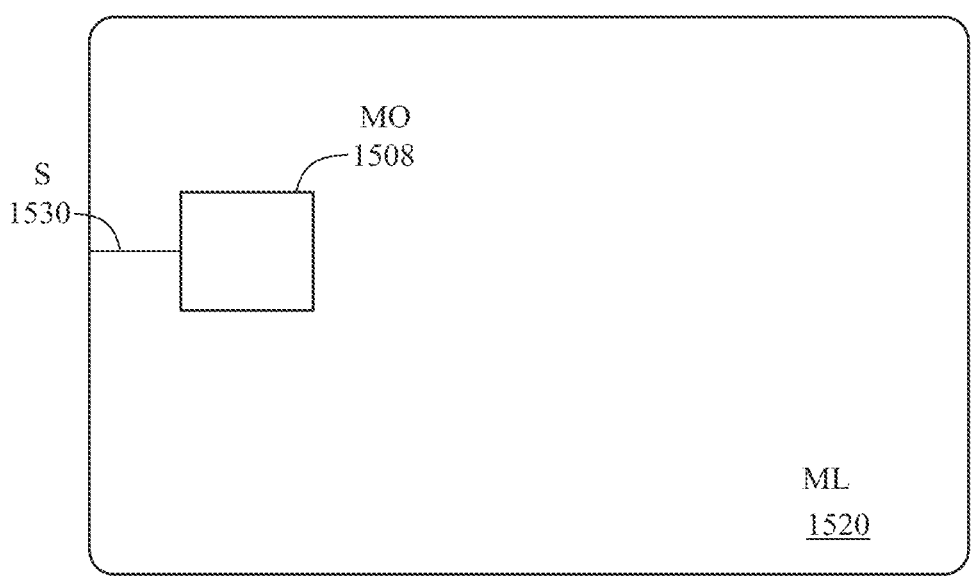
FIG. 23A is a diagram (plan view) showing a typical arrangement of a metal layer (or body) of a smartcard having a slit extending from an outer edge to an opening for a transponder chip module.

FIG. 15A of US 20170017871 may correspond with FIG. 23A herein.

Figure 23B:
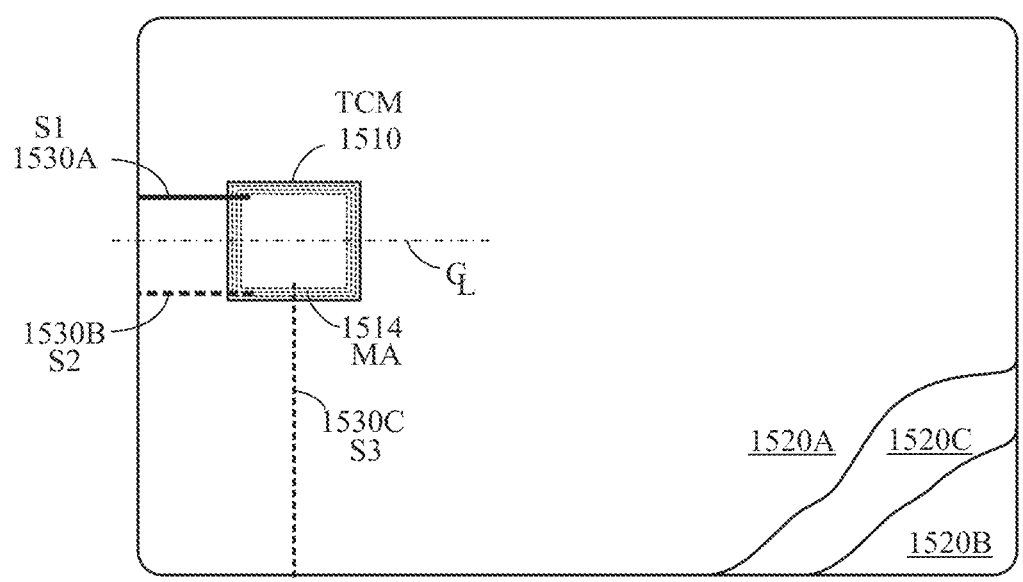
FIG. 23B is a diagram (plan view) showing arrangement where there are two metal layers, each having a slit extending from an outer edge to an opening for a transponder chip module, and the slits are offset from one another.

FIG. 15B of US 20170017871 may correspond with FIG. 23B herein.

FIG. 15A is a diagram (plan view) showing a typical arrangement of a metal layer (or body) of a smartcard having a slit extending from an outer edge to an opening for a transponder chip module.

FIG. 15B is a diagram (plan view) showing arrangement where there are two metal layers, each having a slit extending from an outer edge to an opening for a transponder chip module, and the slits are offset from one another.

Laminated Metal Layer Card Constructions with Multiple Offset Slits

FIG. 15A shows a typical arrangement of a metal layer (ML) 1520 (or metal card body MCB) of a smartcard 1500A having a slit (S) 1530 extending from an outer (left, as viewed) edge to an opening (MO) 1508 for a transponder chip module (TCM, not shown). As discussed herein, the metal layer may not have an opening for the transponder chip module (TCM), and the slit (S) should extend over (overlap) a portion (such as one side of) the module antenna (MA, not shown) of the transponder chip module (TCM). The slit (S) is shown extending from the left (as viewed) side of the smart card to the position of (or opening for) the transponder chip module (TCM). The slit (S) may have a width (vertical dimension in the figure) of approximately 50 µm, and may be positioned approximately halfway up (vertically) the transponder chip module (or opening therefore). The metal layer (ML) may be approximately the same overalls (sic) size as the smart card (SC). The slit (S) enables the metal layer (ML) to function as a coupling frame (CF). The slit (S) represents a mechanical weakness, and may lead to problems when the card is repeatedly flexed.

FIG. 15B is a diagram showing, schematically, an arrangement where there may be two or more metal layers in a smart card (or comparable RFID device), each layer having a slit extending from an outer edge to an opening for (or position of) a transponder chip module (TCM). In this illustration, the module antenna (MA) is indicated by dashed lines. The transponder chip module (TCM) may measure 11.8 mm high (vertical, as viewed)×13.0 mm wide (horizontal, as viewed).

A first slit S1 may be disposed in a first metal layer (ML1) of the smart card, extending from the left (as viewed) edge thereof to the position of the transponder chip module (TCM), overlapping the left (as viewed) side of the module antenna (MA). The slit S1 may have a width of approximately 50 µm, and may be positioned towards the top of the transponder chip module (TCM), such as approximately 4.5 mm above a centerline (CL) of the transponder chip module (TCM). The slit S1 may be straight, curved, or angled.

A second slit S2 may be disposed in a second metal layer (ML2) of the smart card, extending from the left (as viewed) edge thereof to the position of the transponder chip module (TCM), overlapping the left (as viewed) side of the module antenna (MA). The slit S2 may have a width of approximately 50 µm, and may be positioned towards the bottom of the transponder chip module (TCM), such as approximately 4.5 mm below a centerline (CL) of the transponder chip module (TCM). The slit S2 may be straight, curved, or angled. The slits S1 and S2 both extend from the position of the transponder chip module to the left edge of the card, but are offset from one another.

If the first metal layer (ML1) is a top layer of the smartcard (or other device), and the first slit may be visible to a user, a "fake" slit, or trench that does not extend completely through the metal layer (ML1) may be provided at the position of the second slit (S2) for aesthetic purposes. The trench may extend, for example only approximately 5-100 µm into a first (top) metal layer (ML1) that has a thickness of approximately 200-300 µm FIG. 15B also shows a third slit S3, which may be disposed in a third metal layer (ML3) of the smart card, extending from the bottom (as viewed) edge thereof to the position of the transponder chip module (TCM), overlapping the bottom (as viewed) side of the module antenna (MA). The slit S3 may have a width of approximately 50 µm The slit S3 may be straight, curved, or angled.

Other locations for slits in metal layers are possible, such as extending over the right (as viewed) or top (as viewed) sides of the module antenna (MA) from an outer edge of a metal layer, to function as a coupling frame (CF). The third metal layer (ML3) may be disposed between the first metal layer (ML1) and the second metal layer (ML2). Its slit (S3) may not be visible from either the front or back of the card.

The slits S1, S2 and S3 all overlap a portion of the module antenna (MA) 1514, so that the metal layers M1, M2 and M3 may function as coupling frames. When these metal layers are laminated together, there is a non-conductive adhesive therebetween so that the slits do not become electrically shorted out. In subsequent descriptions of laminated card bodies, the second metal layer may be between the first and third metal layers.

In this and in other embodiments, a metal layer or metal card body may have a slit in order to function as a coupling frame. In the case of another metal layer, or a metal backing insert, or the like, which is fixed to the metal layer or metal card body, and which spans the slit, a non-conductive adhesive therebetween prevents the additional metal layer or metal backing insert from shorting the slit. A metal backing insert may have a slit so that it also functions as a coupling frame.

An RFID device such as a smart card or key fob may comprise multiple metal layers, each layer having a slit or discontinuity extending from an outer edge thereof to a position corresponding to the location of a transponder chip module which may be an opening for accepting the transponder chip module, wherein the slit in each layer overlaps a module antenna of the transponder chip module and is located in a different position or orientation than the other slits so that the slits of the various layers are not aligned with one another. A front metal layer may be continuous, not having a slit or discontinuity, and may be shielded from the other metal layers by a shielding layer.

FIG. 16A of US 20170017871 may correspond with FIG. 24A herein.

FIG. 16B of US 20170017871 may correspond with FIG. 24B herein.

FIG. 16A is a diagram (exploded perspective view) of a metal laminated smartcard (RFID device).

FIG. 16B is a diagram (exploded perspective view) of a shielded metal laminated smartcard (RFID device)

Metal Laminated Card

FIG. 16A is a diagrammatic view of a metal laminated smart card (RFID device) 1600A, generally comprising (from top-to-bottom, as viewed):

- an 8 pin transponder chip module (TCM) 1610
- a first, top (front) metal layer (ML1) 1620A which may have a thickness of approximately 300 µm or 320 µm A slit (S1) 1630A is shown extending from the left edge of the card to an opening (MO) 1608A for the transponder chip module (TCM). The front layer may comprise titanium.
- a layer of non-conductive adhesive 1622 which may have a thickness of approximately 20 µm (if the front layer is 320 µm). A thicker layer (40 µm) or two 20 µm layers of adhesive may be used if the front layer is 300 µm).
- a second, middle (inter-) metal layer (ML2) 1620B which may have a thickness of approximately 200 µm A slit (S2) 1630B is shown extending from the bottom edge of the card to an opening (MO) 1608B for the transponder chip module (TCM). The inter-layer may comprise titanium.
- a layer of non-conductive adhesive 1624 which may have a thickness of approximately 20 µm
- a third, bottom metal layer (ML3) 1620C which may have a thickness of approximately 200 µm A slit (S3) 1630C is shown extending from the left edge of the card to the opening for the transponder chip module (TCM). The bottom layer may comprise titanium.

a module cover (MC) 1616 which may comprise a non-conductive material such as ceramic having a thickness of approximately 200 μm may be inserted into the opening in the bottom metal layer (ML3).

The bottom metal layer ML3 may not have an opening MO, but rather may simply have a position defined for the transponder chip module, and the slit S3 may extend into the position to overlap the module antenna. The cover (MC) may not be required.

Slits Front and Back

The slits on the front and back sides may have a width of approximately 50 micron. The slits may be narrower, down to 25 approximately micron or below by use of laser cutting. By defining a narrow slit, the slit may remain open (unfilled) and become discreet. In addition, depending on the material used as a coupling frame within laminated metal card, the slit may have different widths on each side the coupling frame. This is due to the nature of laser cutting of the material whereby a taper may be formed. The face of the coupling frame incident to the laser beam will normally develop a wider slit relative the exit face, therefore the slit may have a tapered cross sectional profile. The slits S1 and S2 both extend from the position of the transponder chip module to the left edge of the card, but are offset from one another.

Preventing Shorting of the Slits

Use of extremely narrow slits may present technical problems with electrical shorting of the slit by debris from the laser process, this may define a minimum width of slit for a given thickness of metal in a laminated metal card (e.g. minimum slit width of 50 micron for a 300 micron thick metal coupling frame). An additional consideration is electrical shorting of the slit during use of the card.

In order to prevent electrical shorting of the slit, the coupling frame may be coated in a non-conductive material. This coating may also cover the exposed surfaces of the slit and thereby prevent electrical shorting by materials or fluids that may ingress into the slit. For example a diamond-like-carbon (DLC) coating that is electrically insulating may be applied to a thickness in the range 1-10 micron as a decorative surface finish. The applied coating may also be selected/designed to reduce the overall width of the slit. For example a slit of 25 micron width with overall 4 micron DLC coating may be reduced in width to approximately 17 micron after coating.

Shielded Laminated Smartcard

FIG. 16B shows a shielded, laminated metal laminated shielded card (SC) 1600B having two coupling frame metal layers and a front face (ML1) which is a continuous metal layer (no slit). Some of the metal layers are the same (or similar) to those shown in the construction of FIG. 16A. Notably different, however, is that the top metal layer (ML1) does not have a slit (there is no "S1" in this embodiment). The second metal layer (ML2) has a slit (S2), and the third metal layer (ML3) has a slit (S3), as in the construction of FIG. 16A, and the various layers may be held together (laminated) with layers of adhesive, as shown. The dimensions of the various layers may be similar to those in the construction of FIG. 16A.

The front face (ML1) 1620A, as shown, does not have a slit, and may interact with the reader electromagnetic field and produce induced eddy currents within its body. These eddy currents will normally produce a counter-field resulting in reduction or blocking of the communication between the transponder chip module and reader. To offset this, a shielding layer (SL) 1640 of suitably chosen magnetic material may be placed between the front continuous metal layer and the coupling frame layers (ML2, ML3) of the card. A layer of adhesive 1622 having a thickness of 20 μm may be disposed between the front metal layer ML1 and the shielding layer SL. A layer of adhesive 1623 having a thickness of 20 μm may be disposed between the shielding layer SL and the second metal layer ML2.

The front metal layer (ML1) may have a thickness of 200 μm, rather than 300 μm (or 320 μm) as in the construction of FIG. 16A. The shielding layer (SL) may have a thickness of approximately 50-200 μm, such as 100 μm (which was gained by making the front layer thinner than in the construction of FIG. 16A). In this manner the coupling frames will be shielded from the attenuating front metal layer and continue to function in conjunction with the transponder chip module (TCM).

Other elements of the FIG. 16B embodiment, such as the second metal layer ML2 and third metal layer ML3 may be substantially similar or identical to corresponding (similarly numbered) elements in the embodiment of FIG. 16A. Generally, the top metal layer ML1 of FIG. 16A is replaced by a metal layer ML1 without a slit and a shielding layer SL.

The module antenna (MA) of the transponder chip module (TCM) may reside in a plane that lies below the continuous front metal layer (ML1). The module antenna (MA) may be surrounded on all edges (sides) by magnetic shielding material (not shown) to reduce the attenuation from eddy currents in the front metal layer (ML1). In this manner the performance of the magnetic shielding material may be maximized and the coupling of the transponder chip module (TCM) with the coupling frame layers (ML2, ML3) may be improved FIG. 18A of US 20170017871 may correspond with FIG. 25A herein.

FIG. 18B of US 20170017871 may correspond with FIG. 25B herein.

FIG. 18A is a diagrammatic view (cross-sectional view) of a metal layer or card body with a slit.

FIG. 18B is a diagrammatic view (cross-sectional view) of the metal layer or card body of FIG. 18A after coating.

Tapered Slits

FIG. 18A shows a metal layer (ML) or metal card body (MCB) 1820 into which a slit (S) 1830 may be laser-cut. For example, a laser cut slit in a 300 μm thick metal layer, which may serve as a card body, may be tapered, exhibiting a narrower width, such as 25 μm on one side (which may be visible to a user) and wider, such as 55 μm, on the other side.

FIG. 18A (sic) shows that a subsequent pulsed vapor deposition (PVD) of diamond-like carbon (DLC) coating 1832 may be applied to the card body as a decorative or protective later. By tuning the thickness of the applied coating, the width of the slit and its appearance may be concealed further. For example, application of a 6 μm DLC coating to a metal card bearing a slit of 25 μm width may result in an apparent slit widths of approximately 44 μm on one side and 12-13 μm on the other side, after coating.

FIG. 19A of US 20170017871 may correspond with FIG. 26A herein.

FIG. 19B of US 20170017871 may correspond with FIG. 26B herein.

FIG. 19C of US 20170017871 may correspond with FIG. 26C herein.

FIG. 19A is a diagrammatic view (perspective exploded view) of a solid metal card (RFID device).

FIG. 19B is a diagrammatic view (perspective exploded view) of a solid metal card (RFID device).

FIG. 19C is a diagrammatic view (perspective exploded view) of a solid metal card (RFID device).

Solid Metal Card (Version 1)

FIG. 19A is a diagrammatic view (perspective exploded) of a solid metal card (RFID device) 1900A, generally comprising:

- an 8 pin transponder chip module (TCM) 1910 (The module does not form part of the card body per se, rather it is disposed in the card body)
- a metal card body (MCB) 1920 which may have an overall thickness of approximately 800 µm A slit (S1) 1930 is shown extending from the left edge of the card to an opening (MO) 1908 for the transponder chip module (TCM). The metal card body (MCB) may comprise titanium. The metal card body may be milled out, or thinned, from the back of the card, so that an area ("slit area") to the left of the module opening and including the slit S1 is recessed and may have a thickness of only approximately 400 µm The titanium card body may be DLC black coated after milling.
- a metal backing insert (MBI) 1950 or plate which may have a thickness of approximately 360 µm and corresponding in size to the milled area (recess) on the back of the card body. The MBI spans the slit (S1) and reinforces the card at the slit area. The metal backing insert (MBI) may comprise titanium, and may be DLC black coated. A layer of adhesive 1932 which may have a thickness of approximately 20 µm may secure the metal backing insert (MBI) into the milled recess in the slit area.
- a module cover (MC) 1916 which may comprise a non-conductive material such as ceramic having a thickness of approximately 200 µm may be inserted into the module opening in the back of the card body and may be secured (retained) therein by a layer of adhesive 1934 which may have a thickness of approximately 20 µm The module cover may be metal, but this is not recommended.

Solid Metal Card (Version 2)

FIG. 19B is a diagrammatic view (perspective exploded) of a solid metal card (RFID device) 1900B which may share some features and elements with the metal card 1900A. More particularly, the metal card 1900B may generally comprise:

- an 8 pin transponder chip module (TCM) 1910. (The module does not form part of the card body per se, rather it is disposed in the card body)
- a metal card body (MCB) 1920 which may have an overall thickness of approximately 800 µm A slit (S1) 1930 is shown extending from the left edge of the card to an opening (MO) 1908 for the transponder chip module (TCM). The metal card body (MCB) may comprise titanium. The metal card body may be milled out, or thinned, from the back of the card, so that an area ("slit area") to the left of the module opening and including the slit S1 is recessed and may have a thickness of only approximately 400 µm The titanium card body may be DLC black coated after milling.
- the MCB may be formed as two metal layers, such as 400 µm thick each. A top one of the metal layers may have a slit (S) in a slit area. A bottom one of the layers may be cut-out in the area of the silt in the top layer to accept a metal backing insert (MBI), such as described hereinbelow.

In this embodiment, the back of the card may be further milled so that the thinned area surrounding the slit (S1) may extend further to the area of the transponder chip module (TCM), including surrounding the module opening. The thinned area on the back side of the card may be referred to as a "recessed area".

- a metal backing insert (MBI) 1950 or plate which may have a thickness of approximately 360 µm and corresponding in size to the milled area (recess) on the back of the card body. The metal backing insert (MBI) may comprise tungsten or steel, and may be DLC black coated. A layer of adhesive 1932 which may have a thickness of approximately 20 µm may secure the metal backing insert (MBI) into the milled recess in the slit area. The MBI spans the slit (S1) and reinforces the card at the slit area.

In this embodiment, the metal backing insert (MBI) is larger than the MBI of the FIG. 19A embodiment, and covers not only the slit area but also the transponder area. The MBI may be provided with a module opening (MO) 1958, and may be provided with a slit (S2) 1952 extending from an edge of the MBI to the module opening. The slit S2 is shown extending to the right of the module opening MO, but it could as well extend upward or downward, but preferably not to the left. Note that the MBI is oriented in the card so that the slit (S2) does not extend to an edge of the card body, rather it is located in a central area of the card body.

- a module cover (MC) 1916 which may comprise ceramic having a thickness of approximately 200 µm may be inserted into the module opening in the back of the card body and may be secured (retained) therein by a layer of adhesive 1936 which may have a thickness of approximately 20 µm This embodiment would seem to provide the best mechanical stability at the area of the slit S1, resisting flexing of the card. The metal backing insert (MBI) spans the slit S1, and may be approximately half the thickness of the overall card.

The metal card body may comprise two layers, each approximately 400 µm A top layer may have the slit (S1), and the bottom layer may have an open area (corresponding to the aforementioned milled-out area) for accepting the metal backing insert (MBI).

The slit (S2) in the metal backing layer MBI is shown extending to the right, opposite from the slit (S1), but it may extend up or down, preferably not to the left—in other words, in any direction other than the slit (S1).

Generally, in various embodiments disclosed herein, there may be a "main" slit (S, S1) extending from an opening (MO) in a metal layer to the left edge of the smart card, the left edge typically being the nearest edge to the transponder chip module (TCM). Additional slits (S2, S3) in other metal layers or elements (such as MBI) may extend from the opening (MO) in other directions, such as up, down or two the right. The general idea is that, if you have more than one slit, they should be either offset from one another (if extending in the same direction, such as S1 and S2 in FIG. 15B), or simply oriented differently (e.g., left or right or up or down) from one another to minimize compromising the mechanical integrity of the card. And, in some solid metal body embodiments, rather than having one card body (e.g., 800 µm thick), two metal layers (each 400 µm thick) can be joined to form the overall metal card body (MCB).

Solid Metal Card (Version 3)

FIG. 19C is a diagrammatic view (perspective exploded) of a solid metal card (RFID device) 1900C, generally comprising:

- an 8 pin transponder chip module (TCM) 1910 (The module does not form part of the card body per se, rather it is disposed in the card body)
- a metal card body (MCB) 1920 which may have an overall thickness of approximately 800 µm A slit (S1) 1930 is shown extending from the left edge of the card to an opening (MO) 1908 for the transponder chip module (TCM). The metal card body (MCB) may comprise titanium. The metal card body may be milled out, or thinned, from the back of the card, so that an area ("slit area") to the left of the module opening and including the slit S1 is recessed and may have a thickness of only approximately 400 µm The titanium card body may be DLC black coated after milling.

In this embodiment, the back of the card may be further milled so that the thinned area surrounding the slit (S1) may extend further to the area of the transponder chip module (TCM), including surrounding the module opening. The thinned area on the back side of the card may be referred to as a "recessed area".

- a metal backing insert (MBI) 1950 or plate which may have a thickness of approximately 360 µm and corresponding in size to the milled area (recess) on the back of the card body. The metal backing insert (MBI) may comprise tungsten or steel, and may be DLC black coated. A layer of adhesive 1932 which may have a thickness of approximately 20 µm may secure the metal backing insert (MBI) into the milled recess in the slit area. The MBI spans the slit (S1) and reinforces the card at the slit area. The slit S2 in the MBI is shown extending in the opposite direction from the slit S1, in the manner of the MBI in FIG. 19B, but does not have an opening.

In this embodiment, the metal backing insert (MBI) is larger than the MBI of the FIG. 22A embodiment, and covers not only the slit area but also the transponder area. In this embodiment, the MBI may be provided without a module opening, and may be provided with a slit (S2) 1952 extending from an edge of the MBI to a position at the interior of the MBI so that the slit is under a portion of (and overlaps) the module antenna. Note that the MBI is oriented in the card so that the slit (S2) extends to an edge of the card body.

In this embodiment, a separate module cover (MC) is not needed since the MBI covers the module opening in the card.

FIG. 20A of US 20170017871 may correspond with FIG. 27A herein.

FIG. 20B of US 20170017871 may correspond with FIG. 27B herein.

FIG. 20A is a diagram (exploded perspective view) of a DIF "Plastic-Metal-Plastic" Hybrid Card, before lamination. A chip module is shown for insertion into the card.

FIG. 20B is a diagram (exploded perspective view) of an alternate construction for a DIF "Plastic-Metal-Plastic" Hybrid Card, before lamination.

FIG. 20A is a diagrammatic view of a DIF "Plastic-Metal-Plastic" Hybrid Card (RFID device), before lamination, generally comprising (from top-to-bottom, as viewed):

- an 8 pin chip module 2010 which may be a transponder chip module (TCM). The chip module may be single interface (contact only), or dual-interface (contact and contactless). In the later case (dual interface), the chip module may be a transponder chip module having a module antenna. (A module antenna is not required in a contact only module.) In the main, a chip module which is a transponder chip module will be described, as exemplary.
- a front clear overlay (plastic) layer 2062 which may have a thickness of approximately 50 µm A recess or opening (shown in dashed lines "module recess") for accepting the module may be milled in this layer, after final lamination.
- a front (plastic) printed core layer 2064 (displaying the logo "AMATECH") which may have a thickness of approximately 125 µm A recess or opening (shown in dashed lines) for accepting the module may be milled in this layer, after final lamination.
- the front clear overlay film with adhesive backing and front printed core may be adhesively attached together in sheet format and may constitute a front (plastic) subassembly (or plastic layer assembly) 2060.
- a layer of adhesive 2022 which may have a thickness of approximately 20 µm
- a metal layer (ML) (or metal core) 2020 which may have a thickness of approximately 400 µm and which may be provided with an opening (MO) 2008 which may be a stepped recess extending through the metal layer. The metal layer may have a slit S (or a non-conductive stripe NCS) 2030 extending from the opening to an outer edge thereof so that the metal layer may function as a coupling frame (for a contactless interface). The metal layer or core may consist of several metal layers with slits. The slit is not necessary for a contact only chip module. The recess may be stepped, having a larger portion extending 100 µm into the metal layer, for a module tape of the chip module, and a smaller portion extending the rest of the way (additional 300 µm) through the metal layer for a mold mass of the chip module. This may ensure (in the case of contactless functionality) that the coupling frame appropriately overlaps the module antenna of the transponder chip module. The metal layer (ML) may comprise two metal layers, each having a thickness of approximately 200 µm See FIG. 20B).
- The opening MO 2008 in the metal layer ML 2020 may be filled with a plastic slug 2026.
- a layer of adhesive 2024 which may have a thickness of approximately 20 µm
- a rear printed core 2074 which may have a thickness of approximately 125 µm An opening or recess for the chip module may not be required in this layer.
- a rear clear overlay 2072 which may have a thickness of approximately 50 µm An opening or recess for the chip module may not be required in this layer.
- a magnetic stripe may be disposed on the bottom (as viewed) surface of the rear clear overlay.
- the rear clear overlay film with adhesive backing and rear printed core (including magnetic stripe) may be attached together and may constitute a rear (plastic) subassembly (or plastic layer assembly) 2070.

Card-size front and rear face subassemblies (plastic layer assemblies) may be pre-pressed against the adhesive layers and the metal core or coupling frame to form a card blank.

FIG. 20B is a diagrammatic view of an alternate construction of a DIF "Plastic-Metal-Plastic" Hybrid Card (RFID device) 2000B, before lamination. Generally, this embodiment differs from that of FIG. 20A in that the single metal layer (ML) 2020 having a thickness of approximately 400 µm is replaced by two metal layers (ML1, ML2) 2020A, 2020B each having a thickness of approximately 200 µm There is a layer 2023 of adhesive between the two metal layers ML1 and ML2. More particularly, the card may comprise (from top-to-bottom, as viewed):
- a front clear overlay (plastic) layer 2062 which may have a thickness of approximately 50 µm A recess or opening (shown in dashed lines "module recess") for accepting the module may be milled in this layer, after final lamination.
- a front (plastic) printed core layer 2064 (displaying the logo "AMATECH") which may have a thickness of approximately 125 µm A recess or opening (shown in dashed lines) for accepting the module may be milled in this layer, after final lamination.
- the front clear overlay film with adhesive backing and front printed core may be adhesively attached together in sheet format and may constitute a front (plastic) subassembly (or plastic layer assembly) 2060.
- a layer of adhesive 2022 which may have a thickness of approximately 20 µm
- a first metal layer (ML1) 2020A which may have a thickness of approximately 200 µm and which may be provided with an opening (MO) 2008A extending through the metal layer. The metal layer may have a slit S (or a non-conductive stripe NCS) 2030A extending from the opening to an outer edge thereof so that the metal layer may function as a coupling frame (for a contactless interface).
- a layer of adhesive 2023 which may have a thickness of approximately 20 µm
- a second metal layer (ML1) 2020B which may have a thickness of approximately 200 µm and which may be provided with an opening (MO) 2008B extending through the metal layer. The metal layer may have a slit S (or a non-conductive stripe NCS) 2030B extending from the opening to an outer edge thereof so that the metal layer may function as a coupling frame (for a contactless interface).
- The openings MO 2008A and 200b in the metal layers ML1 2020A and ML2 2020B may be aligned with one another, and may be filled with a plastic slug 2026.
- a layer of adhesive 2024 which may have a thickness of approximately 20 µm
- a rear printed core 2074 which may have a thickness of approximately 125 µm An opening or recess for the chip module may not be required in this layer.
- a rear clear overlay 2072 which may have a thickness of approximately 50 µm An opening or recess for the chip module may not be required in this layer.
- a magnetic stripe may be disposed on the bottom (as viewed) surface of the rear clear overlay.
- the rear clear overlay film with adhesive backing and rear printed core (including magnetic stripe) may be attached together and may constitute a rear (plastic) subassembly (or plastic layer assembly) 2070.

US 20180339503 (U.S. Pat. No. 1,596,9816 filed 3 May 2018)

This application (now U.S. Pat. No. 10,518,518), incorporated by reference herein, discloses:

[Abstract] Smartcards with metal layers manufactured according to various techniques disclosed herein. One or more metal layers of a smartcard stackup may be provided with slits overlapping at least a portion of a module antenna in an associated transponder chip module disposed in the smartcard so that the metal layer functions as a coupling frame. One or more metal layers may be pre-laminated with plastic layers to form a metal core or clad subassembly for a smartcard, and outer printed and/or overlay plastic layers may be laminated to the front and/or back of the metal core. Front and back overlays may be provided. Various constructions of and manufacturing techniques (including temperature, time, and pressure regimes for laminating) for smartcards are disclosed herein.

The claims are illustrative, some of which are reproduced here:

1. A method of manufacturing a smartcard having a card body, comprising:
   providing a portion of the card body as a subassembly having two metal layers and a dielectric layer disposed between and joined by laminating to the two metal layers;
   wherein:
   at least one of the two metal layers is a coupling frame having a slit (S) or non-conductive stripe (NCS) extending from an outer edge of the metal layer to an inner position thereof, and the slit (S) is disposed to overlap at least a portion of a module antenna (MA) of a transponder chip module (TCM) disposed in the smartcard.

2. The method of claim 1, further comprising:
   providing front and back overlays for the subassembly; and
   laminating the overlays to the subassembly to form a card body for the smartcard.

5. The method of claim 2, further comprising:
   providing front and back printed core layers between the front and back overlays, respectively, and the subassembly; and
   laminating the front and back printed core layers together with the front and back overlays.

13. The method of claim 1, wherein:
    the card body and the metal layer conform to ID-1 format for smartcards.

14. The method of claim 1, wherein:
    the transponder chip module is a dual-interface module having a contact pad array (CPA) disposed on a face-up side thereof for interfacing with a contact reader in a contact mode (ISO 7816).

7. Smartcard having at least contactless capability comprising:
   a transponder chip module having an RFID chip and a module antenna connected to the RFID chip;
   a coupling frame comprising a first metal layer having a slit or non-conductive stripe extending from an outer edge of the metal layer to an inner position thereof, wherein the slit or non-conductive stripe is disposed to overlap at least a portion of the module antenna; and
   at least one plastic layer including an adhesive layer laminated to at least one side of the metal layer.

8. The smartcard of claim 7, further comprising:
   a second metal layer having a slit or non-conductive stripe extending from an outer edge of the metal layer to an inner position thereof, and wherein the slit or non-conductive stripe is disposed to overlap at least a portion of the module antenna; and
   a dielectric layer disposed between the two metal layers.

9. The smartcard of claim 8, further comprising:
   plastic layers disposed on outer surfaces of the two metal layers.

16. The smartcard of claim 8, wherein:
    the second metal layer conforms to ID-1 format for smartcards.

15. The smartcard of claim 7, wherein:
the first metal layer conforms to ID-1 format for smartcards.
17. The smartcard of claim 7, wherein:
the transponder chip module is a dual-interface module having a contact pad array (CPA) disposed on a face-up side thereof for interfacing with a contact reader in a contact mode (ISO 7816).

This application discloses the following (citations are to numbered paragraphs in the publication, which may be edited for conciseness herein):

FIG. 5B of US 20180339503 may correspond with FIG. 28 herein.

FIG. 5B is a partially exploded close-up diagrammatic view of a plastic-metal-plastic hybrid smartcard featuring a metal core having two coupling frames (CFs), one coupling frame (CF1) with slit (S) and module opening (MO) and the second coupling frame (CF2) with an extended slit (S2) as part of a lamination subassembly (SAS).

FIG. 5B is a close-up partially exploded diagram of the construction shown in FIG. 5A. It is noted that the opening for the transponder chip module (TCM) 501 typically requires two recesses. The depth of the recess P1 (516) may be typically set to the total substrate thickness of the transponder chip module (TCM) 501 plus an allowance for an adhesive layer (not shown). Consequently the depth of the recess P1 (516) may be in the range 100 μm to 200 μm. In this case the recess P1 (516) may penetrate some or all of the layers OL (502), PCL (503), IPL (504), AL (505) and CF2 (510). A second recess P2 (517) is provided to accommodate the chip (IC), wire bonds and mold mass of the transponder chip module (TCM) 501. This second recess P2 (517) may partially or completely penetrate the second coupling frame (CF2) 510 as shown and may be formed at any stage including prior to lamination of the subassembly (SAS), after lamination of the subassembly (SAS) or after lamination of the printed core layers (PCLs) and outer layers (OLs) to the SAS.

The slit (S2) 511 is shown as an extended slit, whose width in this case varies along its length. In the region around the windings of module antenna (MA) of the transponder chip module (TCM) 501 the slit (S2) 511 may overlap or run adjacent to or in close proximity. This permits optimum overlap of the extended slit (S2) 511 and the windings of the module antenna (MA). A feature of the invention is that the slit (S2) 511 describes a nearly complete loop that permits passage of alternating electromagnetic fields though the coupling frames (CF1 506 and CF2 510) and transponder chip module (TCM) 501. In particular the shape of the extended slit (S2) 511 is such as to direct eddy currents induced in the second coupling frame (CF2) 506 into close proximity with the module antenna (MA) and into the same direction or sense, locally around the transponder chip module (TCM) 501 area, as the induced eddy current paths in the first coupling frame (CF1) 506. The design as shown permits a region of solid metal to reside over the void usually formed by the creation of a module opening (MO) in a coupling frame (CF); cross reference FIG. 4A, module opening (MO2) 411. This inventive step has a distinct advantage in that the inner plastic layer (IPL) 513 is largely supported during lamination to form a subassembly (SAS). This support also extends to the second lamination stage and allows the rear printed core layer (PCL) 514 and rear outer layer (OL) 515 to be supported during lamination. This support helps prevents local ingress or distortion of the plastic layers around the location of the transponder chip module (TCM) 501 during lamination and prevents the formation of a visible defect or depression on the rear of the card.

As is evident from FIG. 5B, the slit (S2) 511 in the coupling frame (CF2) 510 describes a path having 3×90° bends.

FIG. 6B of US 20180339503 may correspond with FIG. 29 herein.

FIG. 6B is a partially exploded diagrammatic view of the layers of a plastic-metal-plastic hybrid smartcard featuring a metal core having two coupling frames (CFs) with slit (S) and module openings (MOs) as part of a lamination subassembly (SAS).

FIG. 6B is a partially exploded side-on (cross-sectional) view of the construction shown in FIG. 6A showing the following features: [0307] A front clear plastic overlay (OL) 602 which may have a thickness of approximately 50 μm. [0308] A front plastic printed core layer (PCL) 603 which may have thickness typically in the range 75 μm to 125 μm.

An inner plastic layer (IPL) 604 which may be a plastic layer with thickness typically in the range 20 μm to 100 μm. The inner plastic layer (IPL) 604 may be pre-coated with adhesive (not shown) on one side to facilitate bonding to the first coupling frame (CF) 605. An adhesive layer (AL) 608 bonding the coupling frames (CF1) 605 and (CF2) 609. The second inner plastic layer (IPL) 612 may be pre-coated with adhesive on one side for bonding the coupling frame (CF2) 609. These layers may be laminated in one lamination step to form a subassembly (SAS) 615. In an alternative implementation of the assembly adhesive may be pre-applied to the any of surfaces of the coupling frames (CF1, CF2) to enable a facile preparation of the subassembly (SAS) 615. In particular the use of adhesive-coated coupling frames (CF1, CF2) enables the replacement of the adhesive layer (AL) 608 with a single sheet of plastic in order to serve as a dielectric separator. The IPL layers 604 and 612 may be omitted, in which case the subassembly would comprise only the coupling frames 605 and 609 and the adhesive layer 608.

A rear plastic printed core layer (PCL) 613 which may have thickness typically in the range 75 μm to 125 μm.

A rear clear plastic overlay (OL) 614 which may have a thickness of approximately 50 μm.

To complete the card body construction with the upper and lower printed graphics, it is merely necessary to laminate the printed stock and overlay directly to the pre-laminated plastic-metal-plastic inlay. Because the plastic layers of the pre-laminate had undergone shrinkage, the lamination of the print stock to this pre-shrunk material results in little or no distortion of the printed graphic layer(s). And it is also not necessary to pre-laminate the printed stock and overlay as set-out in the teachings of U.S. Pat. No. 8,672,232.

U.S. Pat. No. 8,672,232 (Mar. 18, 2014; Herslow) discloses a combination card of metal and plastic, and is directed to laminating temperatures.

FIG. 7 of US 20180339503 may correspond with FIG. 30 herein.

FIG. 7 is a cross sectional view of a metal layer (ML) with slit (S) which has been laminated to adjacent layers of a smartcard stack using adhesive layers, showing a magnified view of the region near the slit (S).

FIG. 7 illustrates a metal layer (ML) 702 within a metal hybrid smartcard. The metal features a slit (S) 704 that enables it to function as a coupling frame (CF). An exemplary width of the slit (S) may be of the order of 100 to 200 micron in a metal layer (ML) of thickness 200 micron. To facilitate lamination of the metal to adjacent layers of plastic or other materials within the smartcard stack, an adhesive layer (AL) 701 may be deposited on the metal layer or placed in film form between the metal layer and adjacent plastic layers. A second similar adhesive layer (AL) 703 may be used if the metal is laminated on both sides to other layers. Alternatively the adhesive layers (AL) may be replaced by plastic or other materials that may bond to the metal or chemically treated metal surface during lamination. The lamination process may heat the adhesive layer (AL) above its melting temperature or glass transition temperature, in doing so enabling a flow or creep of adhesive 705 into the slit defined in the metal layer (ML). In this manner the slit may be partially or fully filled by the region of adhesive creep 705. This adhesive creep 705 may serve to stabilize the slit mechanically and prevent ingress of foreign particles and water into the slit.

US 20170077589 (U.S. Pat. No. 1,535,8138 filed 22 Nov. 2016)

This application (now U.S. Pat. No. 9,960,476), incorporated by reference herein, discloses:

[Abstract] A conductive coupling frame (CF) or a discontinuous metal layer disposed surrounding and closely adjacent a transponder chip module (TCM), and substantially coplanar with an antenna structure (AS, CES, LES) in the transponder chip module (TCM). A metal card body (MCB, CB) or a transaction card with a discontinuous metal layer having a slit (S), extending from an inner end to a periphery of the metal layer, and not terminating in a distinct opening sized to accommodate a transponder chip module (TCM).

This application discloses the following (citations are to numbered paragraphs in the publication, which may be edited for conciseness herein):

FIG. 5 (A,B,C) of US 20170077589 may correspond with FIG. 31 (A,B,C) herein.

FIG. 5 (A,B,C) is a diagram, in cross-section (exploded, and partially perspective), of a smartcard showing a lay-up (or stacking) of layers for a smart card construction. Under that are two exploded perspective views of the smartcard. A transponder chip module (TCM) for inserting in openings (or recesses) in the layers of the smartcard is shown.

FIG. 5

A transponder chip module (TCM) is shown positioned above a smart card body comprising:

a card front layer a metal interlayer having a slit to function as a coupling frame a card rear layer This construction uses a 300 μm front layer with opening for the TCM. The front layer may be made from non-conductive or electromagnetic transparent materials.

The metal interlayer (coupling frame) has thickness in the range 100 μm to 150 μm and features a slit of width typically greater than 200 μm extending from the edge of the metal interlayer to the opening for the TCM. The opening in the interlayer dictates the overlap of the interlayer with the module antenna (MA) and is optimised to maximise the RF performance of the card when communicating with a reader. The metal interlayer acts as a reinforcing structure for the card and can be chosen to increase the weight of the card by using a high density metal or metal alloy. The use of an optimally designed slit and cavity in the metal interlayer enhances the performance of the TCM by coupling induced eddy currents in the interlayer to the module antenna (MA).

The rear layer may have a thickness of 300 μm and features an optional recess to accommodate the structures on the rear side of the TCM that include the IC, wire bond connections and encapsulation. Depending on the design thickness of the TCM a recess in the rear layer may be omitted. Not shown are adhesive layers between each layer with thickness typically in the range 10 μm to 25 μm.

In the coupling frame layers shown herein (FIGS. 5, 6, 7), the opening in the coupling frame layer is typically smaller than the opening in the top (front layer) to ensure that the slit in the coupling frame overlaps the module antenna in the transponder chip module. Compare FIGS. 2A,2B, which more clearly show how the transponder chip module has a larger portion with the module antenna at the front (top) of the card, below which is a smaller portion (mold mass encapsulating the RFID chip). The transponder chip module may be shown only generally in FIGS. 5, 6, 7.

FIG. 6 (A,B,C) of US 20170077589 may correspond with FIG. 32 (A,B,C) herein.

FIG. 6 (A,B,C) is a diagram, in cross-section (exploded, and partially perspective), of a smartcard showing a lay-up (or stacking) of layers for a smart card construction. Under that are two exploded perspective views of the smartcard. A transponder chip module (TCM) for inserting in openings (or recesses) in the layers of the smartcard is shown.

FIG. 6

This construction features a 200 μm front layer.

The structure features two metal interlayers (coupling frames) each with thickness in the range 100 μm to 150 μm and features a slit of width typically greater than 200 μm extending from the edge of the metal interlayer to the opening for the TCM.

The front layer and metal interlayer 1 feature an opening to accommodate the TCM. Metal interlayer 2 features an opening that allows for the overlap of the interlayer with the module antenna (MA) and is optimised to maximise the RF performance of the card when communicating with a reader. The two interlayers may be laminated to each other prior to assembly of the remainder of the card. The two interlayers may be made from different metals in order to optimise the properties (e.g. stiffness, weight) of the two interlayers when laminated together.

Metal Layer 1 is not a coupling frame, it is a metal (stiffening) layer with an opening for the transponder chip module.

Metal Layer 2, is a coupling frame, with a slit, and an opening which allows overlap of the slit with the module antenna of the transponder chip module (or antenna module).

The rear layer may have a thickness 200 micron. Depending on the design thickness of the TCM a recess in the rear layer may be omitted. Not shown are adhesive layers between each layer with thickness typically in the range 10 μm to 25 μm.

FIG. 7 (A,B,C) of US 20170077589 may correspond with FIG. 33 (A,B,C) herein.

FIG. 7 (A,B,C) is a diagram, in cross-section (exploded, and partially perspective), of a smartcard showing a lay-up (or stacking) of layers for a smart card construction. Under that are two exploded perspective views of the smartcard. A transponder chip module (TCM) for inserting in openings (or recesses) in the layers of the smartcard is shown.

FIGS. 7A-C [0213-0218] insert in the rear layer

FIG. 7

This construction may feature a 300 μm front layer made from a non-conductive or electromagnetic transparent material.

The structure features one metal interlayer (coupling frame) with thickness 200 μm and features a slit of width typically greater than 200 µm extending from the edge of the metal interlayer to the opening for the TCM.

The front layer features an opening to accommodate the larger, top portion of the TCM.

The metal interlayer features a smaller opening allowing for overlap of the slit in the interlayer with the module antenna (MA) and is optimised to maximise the RF performance of the card when communicating with a reader.

The rear of the card is composed of metal and has thickness 200 micron. The rear layer may feature a cut-out at the module position that is filled by an insert made of non-conductive or electromagnetic transparent material. Depending on the design thickness of the TCM a recess in the rear insert may be omitted. Not shown are adhesive layers between each layer with thickness typically in the range 10 µm to 25 µm.

US 20180341846 (U.S. Pat. No. 1,593,9281 filed 29 Mar. 2018)

This application (not yet issued), incorporated by reference herein, discloses:

[Abstract] A metal smartcard (SC) having a transponder chip module (TCM) with a module antenna (MA), and a card body (CB) comprising two discontinuous metal layers (ML), each layer having a slit (S) overlapping the module antenna, the slits being oriented differently than one another. One metal layer can be a front card body (FCB, CF1), and the other layer may be a rear card body (RCB, CF2) having a magnetic stripe (MS) and a signature panel (SP).

This application discloses the following (citations are to numbered paragraphs in the publication, which may be edited for conciseness herein):

FIGS. 5A,B of US 20180341846 correspond with FIGS. 34A,B herein.

FIG. 5A is a diagram (perspective view) illustrating an assembly of a metal smart card composed primarily of two coupling frames (CF) with slits (S) which omits a module opening (MO) in the rear of the smart card.

FIG. 5B is a diagram (rear view) illustrating the shape and features of the rear card body (RCB) featuring an extended slit (S) and recesses to accommodate a magnetic stripe (MS) and signature panel (SP).

FIGS. 6A,B of US 20180341846 correspond with FIGS. 35A,B herein.

FIG. 6A is a diagram (perspective view) illustrating an assembly of a metal smart card composed primarily of two coupling frames (CF) with parallel slits (S) which omits a module opening (MO) in the rear of the smart card.

FIG. 6B is a diagram (rear view) of the rear of a metal smart card featuring a rear card body (RCB) panel containing an extended slit (S) and recesses to accommodate a magnetic stripe (MS) and signature panel (SP).

Slits with multiple 90 degree corners

FIG. 5A,B [0139-0142] slit S2 507 with 4×90°

FIG. 6A,B [0143-0144] slit S2 607 with 3×90°

FIG. 5A illustrates an exploded view of a similar construction to that shown in FIG. 4A and FIG. 4B with similar layout of transponder chip module (TCM) 501, front card body (FCB) 502, first slit (S1) 504, module opening (MO) 503 and adhesive film (AF) 505. The design does not necessarily feature an insert at the module position. The rear card body (RCB) 506 may comprise a second slit (S2) 507 and accommodates the magnetic stripe (MS) 508 and signature panel (SP) 509.

FIG. 5B shows the outer face of the rear card body (RCB) 506. The panel shown features a magnetic strip recess (MSR) 510 and a signature panel recess (SPR) 511. The rear card body does (RCB) 506 not feature a module opening (MO) as described previously. Instead, the design features an extended slit (S2) 507 which runs inwards from an edge of the rear card body (RCB) 506 panel that is internal to the metal smart card and describes a loop around an area overlapping the module antenna (MA) of the transponder chip module (TCM) 501.

The second slit (S2) 507 is formed, such as as-shown, to leaves an area of solid metal behind the transponder chip module (TCM) 501 instead of a module opening (MO). The second slit (S2) 507 in this manner may enable the rear card body (RCB) 506 to function as a coupling frame (CF) by directing induced eddy currents around the module antenna (MA) and permitting inductive coupling. In addition, the design of the second slit (S2) 507 in this manner eliminates the need for an insert or other fill material to cover a module opening (MO) and prevents the occurrence of a potential weak spot in the card body behind the transponder chip module (TCM) 501.

The slit (S2) 507 may describe any shape, including spiral, in order to optimise the overlap of the coupling frame with a given module antenna (MA). The slit (S2) 507 may have varying width along its length, e.g. it may begin at the edge of the panel at a width of 100 µm and widen when in proximity to the module antenna (MA) to 300 µm in order to increase the radio frequency communication performance of the device. The slits (S1, 504; S2, 507) may be filled with resin or other material to prevent ingress of liquid or debris during use of the card. The slit (S2) 507 may also be concealed by placement of a security hologram, logo or other feature.

It is evident from looking at FIG. 5B that the slit 507 describes a path that makes 4 (four) 90° (ninety degree) bends.

FIG. 6A shows an exploded view of a variation of a solid metal dual interface card. In this case the first slit (S1) 604 of the front card body (FCB) 602 runs parallel to the second slit (S2) 607 of the rear card body (RCB) 606 but is off-set in position such that the slits do not overlap, thereby increasing the mechanical stability of the card near the position of the transponder chip module (TCM) 601. The configuration shown may apply equally to a rear card body (RCB) 606 panel that includes a module opening (MO) and second slit (S2).

FIG. 6B shows a rear view of the assembled solid metal dual interface card, excluding the magnetic stripe (MS) 608 and signature panel (SP) 609. The offsetting of the positions of the slits (S1) 604 and (S2) 607 is shown, such that the slits do not overlap. The rear card body (RCB) 606 fits into a pocket milled, etched, stamped or otherwise formed in the rear side of the front card body (FCB) 602. The pocket may allow the rear card body (RCB) 606 to be wrapped around its perimeter by a frame from the front card body (FCB) 602. This frame may serve a role in stabilising the front card body (FCB) 602 during production of the pocket. For example, if the pocket is formed by a milling tool stress on the metal layer (ML) comprising the front card body (FCB) 602 may cause permanent warping. The presence of the frame as shown in FIG. 6B may add rigidity and stability to the front card body (FCB) 602 and to the overall card assembly.

In order to assist milling of the pocket, particularly in the case where the size of the rear card body (RCB) 606 occupies a significant portion (e.g. >25%) of the area of the card, an easily machined metal or metal alloy may be chosen for some or all of the card construction. This could include various alloys of stainless steel or aluminium alloys such as duralumin.

An additional benefit to using a metal alloy relates to the reading and writing of data to the high coercivity magnetic stripe (MS) 608. Placing the magnetic stripe on top of a non-magnetic metal or metal alloy (e.g. 300 series stainless steel, aluminium, aluminium alloys, titanium) results in reduced data corruption and problems reading data using conventional magnetic stripe readers.

US 20180123221 (U.S. Pat. No. 1,566,2305 filed 28 Jul. 2017)

This application (now U.S. Ser. No. 10/193,211), incorporated by reference herein, discloses:

[Abstract] Coupling frames comprising a conductive (metal) surface with a slit (S) or non-conductive stripe (NCS) extending from an outer edge to an inner position thereof, and overlapping a transponder device. A coupling frame with slit for coupling with an inductive or capacitive device (inductor or capacitor) may be used at any ISM frequency band to concentrate surface current around the slit. The coupling frame can be tuned to operate at a frequency of interested by introducing a resistive, inductive or capacitive element. The resonance frequency of the coupling frame can be matched to that of the transponder chip module to achieve optimum performance. Coupling frames with or without a transponder device may be integrated, overlapping, stacked or placed adjacent to one another to enhance system performance. Multiple coupling frames may be electrically isolated from one another by the application of a dielectric coating such [as] Diamond Like Carbon (DLC).

This application discloses the following (citations are to numbered paragraphs in the publication, which may be edited for conciseness herein):

FIG. 23 of US 20180123221 may correspond with FIG. 36 herein.

FIG. 24 of US 20180123221 may correspond with FIG. 37 herein.

FIG. 25 of US 20180123221 may correspond with FIG. 38 herein.

FIG. 26 of US 20180123221 may correspond with FIG. 39 herein.

FIG. 27 of US 20180123221 may correspond with FIG. 40 herein.

FIG. 23 shows an unloaded coupling frame tuned by the introduction of a capacitor across the slit.

FIG. 24 shows a coupling frame with the slit protruding from the window opening (cut-out) to the right perimeter edge and a capacitor connected across the slit at a nodis (sic) tapping position.

FIG. 25 shows a coupling frame with a slit protruding from the window up (cut-out) to the right perimeter edge with a capacitor connected at the end of the slit.

FIG. 26 shows an ID-1 format coupling frame illustrating connection points for capacitor.

FIG. 27 shows an RFID device consisting of stack of ID-1 format coupling frames, with capacitor on one coupling frame.

The entire system of the inductive micro-coil in the transponder chip module and coupling frame may be modeled as two tightly coupled RLC oscillator circuits. The frame circuit resonates at .about.2.4 GHz (dependent on the dimensions of the slit and opening), which renders the dispersion at 13.56 MHz rather weak. The resonant response of the combined oscillator system is dominated by the effective parameters of the transponder chip module, i.e. the parasitic coil resistance of the micro-coil, the self inductance of the micro-coil and the front-end capacitance (capacitance between the frame and micro-coil, and the RFID chip input capacitance). Therefore, if the resonance frequency of the coupling frame could be shifted downwards by introducing additional capacitance to the oscillator circuit of the frame, the two networks would be better matched, resulting in greater activation distance.

At first glance, a likely position to introduce (connect) a capacitor to the coupling frame might be at the position of the slit on the left hand side. FIG. 23 shows a hatched area representing a capacitor connected across the slit. The connected capacitor, having a capacitance in the range of 1 to 5 nF, drives the resonance frequency of the unloaded coupling frame down close to the operating frequency of the system at 13.56 MHz.

FIG. 23: Unloaded coupling frame tuned by the introduction of a capacitor across the slit.

A different approach resulting in a significant performance benefit is to increase the length of the slit (width 1 mm) and control the position along the slit where the capacitor(s) is connected as shown in FIG. 24. The location and value of the capacitor influences the resonance frequency of the frame. By moving the capacitor closer to the window opening, the RF increases significantly. This permits the use of a coupling frame with slit at any ISM frequency band to concentrate surface current around the opening of the slit when in the presence of an electromagnetic field, and balance the frequency with the operating frequency of the transponder by introducing a capacitive device.

FIG. 24: Coupling frame with the slit protruding from the window opening (cut-out) to the right perimeter edge and a capacitor connected across the slit at a center-tapping position.

The length of the slit extending from the window opening to the right edge or any edge of the ID1 card size format, the tapping position of the capacitive device and the value of the capacitor allows for proper regulation of the tuning.

In certain circumstances, optimum performance can be achieved by placing and connecting the capacitor at the end of the slit on the right hand perimeter edge, as shown in FIG. 25.

It should be noted when a transponder chip module is overlapping the coupling frame at the position of the window opening, the two RLC circuits influence each other, resulting for example in double resonant peaks, an RF shift and or a change in signal amplitude. This means the resistive, inductive and capacitive elements of the transponder chip module may also need to be adapted to achieve optimum performance at the target frequency (slightly higher than 13.56 MHz, at 14.00 MHz.+−.0.3 MHz).

The length of the slit can be increased by running it in a zigzag, sine-wave or S-bend fashion across the coupling frame or by routing the slit in some other substantially non-linear path through the coupling frame.

FIG. 25: Coupling frame with a slit protruding from the window up (cut-out) to the right perimeter edge with a capacitor connected at the end of the slit.

In US 20150021403 a light emitting diode (LED) is shown connected across a coupling frame, as illustrated in FIG. 7A. It is suggested that other semiconductor optical device, may be connected across the ends of the coupling frame (CF). The LED is shown connected across the opposing ends of an exemplary elliptical coupling frame (CF) as an illustrative example, however, other conducting, semiconducting or dielectric components could equally be connected.

More precisely, FIG. 7A of U.S. Pat. No. 9,475,086 shows that an LED (light emitting diode), or other or semiconductor optical device, may be connected across the ends of the coupling frame (CF) in the manner disclosed in FIG. 2 of U.S. 61/971,636. See also FIGS. 5, 54 (sic "5A"), 5B of U.S. Ser. No. 14/281,876.

Another aspect of this invention relates to the use of a capacitive device (capacitor) connected across an elongated slit in a coupling frame (CF) at different positions in order to effect a controlled change in the resonance frequency of the coupling frame. Control of the resonant characteristics of the coupling frame (CF) in this manner may be used to improve the inductive coupling of eddy currents in the coupling frame to an active or passive RFID device.

Coupling Frames—ID1

In one aspect of this invention the coupling frame (CF) may be in the size of an ID-1 format card or similar shape with cavity (C) or opening (MO) and a slit (S) extending from the cavity (C) or opening (MO) to the perimeter of the coupling frame. A capacitor or other device may be connected to the coupling frame across a variety of positions with respect to the module and slit (S). FIG. 26 below illustrates a selection of the positions that may be chosen, as an example, for the connection of the capacitor.

The points are spaced 10 mm apart in this example. It is noted that the slit (S) may extend along any direction from the module position to the edge of the coupling frame and may take any linear or non-linear path shape.

FIG. 26: ID-1 format coupling frame illustrating connection points for capacitor.

In an exemplary case a 5.1 nF capacitor may be connected across the slit (S) using each of the seven points shown in FIG. 26. Without connection of a capacitor the coupling frame itself, as shown in FIG. 26, features a resonance frequency of approximately 2.4 GHz. Upon connection of the capacitor across position 1 the resonance frequency of the coupling frame, in this example, may be approximately 11.2 MHz. It is noted that when the same capacitor is instead connected across position 2 the resonance frequency of the coupling frame may be approximately 11.5 MHz, at position 3 the resonance frequency may be approximately 12.5 MHz. This trend of increasing resonance frequency continues for each sequential change in position until position 7 with a resonance frequency of approximately 17 MHz. It is noted that controlling the position of the capacitor enables a degree of tuning of the resonance frequency of the coupling frame. In an extension of the exemplary case a transponder chip module (TCM) with suitably designed module antenna (MA), suitable overlap between module antenna (MA) and coupling frame (CF) cavity or opening (MO) and suitable chip (IC) may be tested in conjunction with the coupling frame (CF) and capacitor system. In this case it is observed that the system features two resonant peaks, one pertaining to the transponder chip module (TCM) and one to the coupling frame (CF).

The resonance frequencies of the two observed peaks in this case may be different from the resonance frequencies of the individual TCM and CF. This is due to the coupling of the two electrical circuits under application of an oscillating electromagnetic field from a reader antenna. It is noted that the selection of various connection points for the capacitor, as illustrated in FIG. 26, can be used to shift the frequency value of both of the observed resonance peaks. In general, it is expected that maximum communication performance of the overall system may be achieved by an optimum set of peak resonance values. This corresponds to maximum signal coupling between the RFID system described and the reader antenna at the given operating frequency of the reader antenna (e.g. 13.56 MHz).

A plurality of coupling frames may be used in the RFID device, one or more of which may have a capacitor or other device connected across their slits. When a device with coupling frame and capacitor, as shown earlier in FIG. 26, is placed in proximity with one or more other coupling frames, each of which featuring a slit (S), it is observed that the overall resonance frequency of the system may be marginally shifted with respect to the coupling frame with capacitor alone. This marginal shift may be, for example, of the order of 0.1 to 0.6 MHz for a device operating at 13.6 MHz. In addition, it is observed that the performance of the device is largely unaffected by the placement of additional coupling frames in close proximity. It is also noted that the slits (S) of the respective coupling frames need not overlap and that the coupling frames may be of different sizes. As an example FIG. 27 illustrates an ID-1 format metal card built from three metal coupling frames (CF1, CF2, CF3) laminated together with adhesive and bearing a suitable transponder chip module (TCM) to form an ID-1 format smartcard. Each coupling frame features a slit (S1, S2, S3) which are shown as not overlapping. The second coupling frame (CF2) features a recess and a capacitor connected across its slit (S2). This may be positioned along the length of the slit (S2). The two other coupling frames (CF1, CF3) when laminated to CF2 conceal the presence of the capacitor and give a mechanically stable card body that can support the transponder chip module (TCM). Optionally, a non-conductive cover or other suitable structure (not shown) may be used to conceal the cavity/opening on the third coupling frame (CF3) and/or any visible slits. The principles of the design may be applied to any smartcard format and may be applied to smartcards featuring metal cores with laminated plastic front and rear faces. In this example the coupling frames (CF1, CF2 and CF3) are electrically isolated from each other, it is also considered that the coupling frames may be electrically connected to each other.

Nonlinear Slit Shapes

Figure 41:
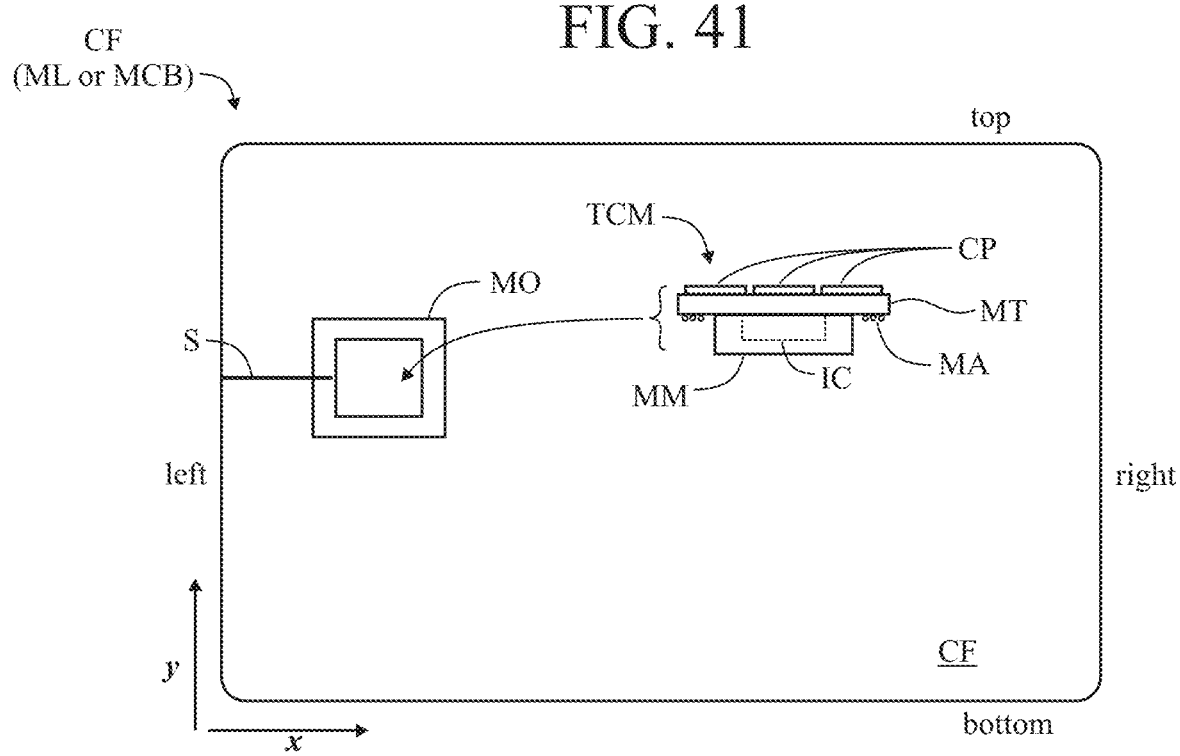

FIG. 41 is comparable to FIG. 23A (above), and shows a coupling frame (CF) which may be a metal layer (ML) or a metal card body (MCB) having a module opening (MO) for a transponder chip module (TCM) and a slit (S) extending from the module opening to a peripheral edge of the coupling frame (CF, which may be a metal layer ML in a stackup of various layers, or an entire metal card body MCB).

In this, and some other figures, the module opening (MO) may be shown as a "stepped recess" having two portions, as follows:
  (i) an outer, upper, larger (in area) portion for accommodating a typically larger (in area) portion of a "conventional" transponder chip module (TCM) having a module tape (MT) with contact pads (CP) on its top side (surface) and an antenna (MA) on its bottom side, and
  (ii) an inner, lower, smaller (in area) portion for accommodating a typically smaller (in area) portion of the transponder chip module having a mold mass (MM) covering and protecting the RFID chip (IC) and connections on the bottom side (surface) of the module tape.

The inner portion of a stepped module opening may be concentric with the outer portion, and may have the same or a different shape than the outer portion, as discussed hereinbelow. The depths of the outer and inner portions of a stepped recess module opening are typically different than one another, and should be sufficient to receive the corresponding portion (tape/contact pads/antenna and RFID chip/mold mass, respectively) of the transponder chip module being located in the module opening.

The slit (S) is shown extending to the inner portion of the stepped recess module opening, which would facilitate the slit (S) extending under (i.e., overlapping) at least a portion of the module antenna (MA). Compare FIG. 2C.

FIG. 41 shows the coupling frame in plan view, and also shows the transponder chip module in cross-sectional view. Regarding the transponder chip module, or antenna module (AM), see for example FIGS. 1, 2C, 2D.

In FIG. 41, the transponder chip module may be shown "magnified" (out-of-scale with the coupling frame) so that some of its elements may more clearly be seen. As is indicated by the arrow, the transponder chip module is inserted into the module opening which is sized appropriately to receive the transponder chip module.

The transponder chip module may generally comprise:
 a first (top) portion comprising a module tape (MT) and contact pads (CP) disposed on a front (top) surface of the module tape and a module antenna (MA) disposed on a back (bottom) surface of the module tape; and
 a second (bottom) portion comprising an RFID chip (IC), connections (typically wire bonds, not shown), and a mold mass (MM) covering the RFID chip and connections, all disposed on the back surface of the module tape.

As is shown, the first (top) portion of the transponder chip module may be relatively larger in area (size) than the second (bottom) portion which is relatively smaller in area (size).

It should be understood that the module opening (or recess) may be "stepped" in that it may have two portions, shown as two "concentric" rectangles in the figure:
 a first portion (the outer rectangle in the figure) which is sized to accommodate the first (larger) portion of the transponder chip module; and
 a second portion (the inner rectangle in the figure) which is sized to accommodate the second (smaller) portion of the transponder chip module.

In some cases, of course, a module opening in a single metal layer of a card body stackup may have a simple opening, such as just large enough to accept the second (bottom) portion of the transponder chip module.

Various techniques are disclosed in the previous patents for making a stepped recess to accommodate the comparably stepped shape of the transponder chip module, and no more attention need be directed to this nuance.

Generally, the slit may extend from an outer edge of the coupling frame to the second (smaller, "inner") portion of the module opening so that the slit (S) overlaps (extends under) the module antenna (MA) of the transponder chip module (TCM). For brevity sake, the slit may be described as extending from the outer edge, or perimeter of the coupling frame simply to the module opening, or vice-versa (i.e., from the module opening to the outer edge of the coupling frame). (Note that the module opening may be considered to be an inner edge of the coupling frame.)

FIG. 41 also shows "x" and "y" axes which may be used to clarify some descriptions of slit locations. Generally, the term "vertical" may be used to describe positions along the "y" axis, and the term "horizontal" may be used to describe positions along the "x" axis. And, the terms "left", "right", "top" and "bottom" may be used to describe various edges of the coupling frame and/or module opening.

The coupling frame has a left edge, a right edge, a top edge, and a bottom edge.

The module opening has a left edge, a right edge, a top edge, and a bottom edge.

The coupling frame has a periphery, or outer edge.

The module opening may be referred to as an inner edge of the coupling frame.

Figure 41A:
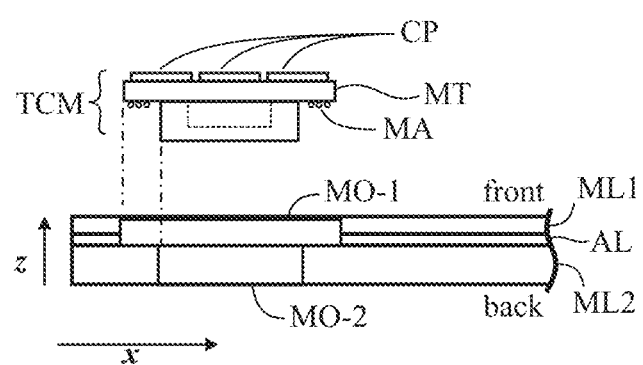
FIG. 41A is a diagram (cross-sectional view) of the coupling frame (CF) and transponder chip module (TCM) of FIG. 41.

FIG. 41A shows a "z" axis, which would be useful in describing the thickness of the coupling frame and/or card body, as well as the thickness of the transponder chip module.

FIG. 41A is a (partial) cross-sectional view (partially exploded) of a coupling frame (CF) and a transponder chip module, (TCM) similar to FIG. 41. See also FIGS. 2C, D (above), which show:
 (2C) a smartcard (SC) having a card body (CB) which may be a lamination of plastic layers and a metal layer (ML) formed (with a slit and module opening) to function as a coupling frame (CF), and which shows that the coupling frame (slit not visible) extends under the module antenna (LES, MA) of the transponder chip module; and
 (2D) a smartcard (SC) wherein the card body is a metal card body (MCB), and which more clearly shows the slit (although it is not shown in this figure that the coupling frame overlaps the module antenna (LES, MA) in the transponder chip module.

See also FIGS. 15A,B which show:
 FIG. 15A is similar (if not identical) to FIG. 2A; and
 FIG. 15B shows more clearly the overlap of the metal card body coupling frame and the module antenna (although the slit is only partially visible).

In FIG. 41A, the card body (CB) comprises a stackup of two metal layers (ML1, ML2) each having a module opening (MO-1, MO-2) and a slit (S1, S2, not visible) extending from the module opening to a periphery (outer edge) of the metal layer—and since the metal layers are substantially the same size as the card body, it may be said that the slits extend to the periphery of the card body (this would, of course be the case for a metal card body).

Recall that a first (top) portion of the transponder chip module may be relatively larger in area (size) than a second (bottom) portion which is relatively smaller in area (size), and that the overall module opening (or recess) may be "stepped" in that it has two portions:
 a first portion which is sized to accommodate the first (larger) portion of the transponder chip module; and
 a second portion which is sized to accommodate the second (smaller) portion of the transponder chip module.

Hence, the module opening (MO-1) in the top metal layer (ML1) is larger than the module opening (MO-2) in the bottom metal layer (ML1), resulting in a "stepped" module opening or recess for receiving the transponder chip module.

In this simplified illustration, it is evident that the slit (not visible) in the bottom metal layer (ML2) will extend under (overlap) the module antenna (MA) of the transponder chip module.

In this view, the slit in the top metal layer (ML1) may not overlap the module antenna.

An adhesive layer (AL) is shown between the two metal layers (ML1, ML2). Compare, for example, FIG. 24A which shows an adhesive layer 1622 between two metal layers 1620A and 1620B, and also shows an adhesive layer 1624 between the metal layer 1620B and a third metal layer 1620C.

The smartcard may have plastic printed layers and the like (not shown) disposed on its front and back surfaces. And, of course, the contact pads (CP) should be exposed on the front surface of the card to allow for a contact interface (such as is typical with ATMs and Point of Sale terminals).

FIGS. 1-40 and the descriptions thereof, are from Ser. No. 16/742,903 filed 14 Jan. 2020, with the exception of FIG. 1A which has been added and refers back to US 20150136858. FIG. 1A is "lifted" from ISO-7816, and is included only for reference, it is not "inventive".

In FIGS. 1-40, various locations, orientations angles, etc. of slits in coupling frames were described, and some of them were shown. For example, FIG. 11A shows a zig-zag slit, and FIG. 12A shows an angled slit. Collectively, these variations (including straight but angled) may all be referred to herein as "slit shapes". Some additional slit shapes will be shown and described.

FIGS. 42A-F, 43A-F, 44A-X show various slit shapes, and may include for example some slit shapes described in the claims of Ser. No. 16/742,903, such as (referring to claims 18 and 20 therein):
  in claim 18 . . .
  the slit is straight;
  the slit extends along any direction from the opening to the periphery;
  the slit extends from anywhere (or any position) on the inner edge (opening) to anywhere on the outer edge (periphery);
  the slit is disposed other than perpendicular to the outer edge (periphery); the slit is disposed diagonally with respect to the outer edge (periphery); and the slit is disposed at a 45° angle with respect to the outer edge (periphery).
  in claim 20 . . .
  wherein the slit is characterized by at least one of:
  at least a portion of the slit is other than straight;
  at least a portion of the slit is curved, or angled;
  at least a portion of the slit extends in a substantially non-linear path;
  at least a portion of the slit has a non-linear shape;
  at least a portion of the slit has a wave shape;
  at least a portion of the slit extends in a zigzag, sine-wave or S-bend path;
  at least a portion of the slit describes any shape, including spiral;
  at least a portion of the slit becomes wider or narrow along its length;
  at least a portion of the slit is L-shaped;
  at least a portion of the slit is T-shaped;
  at least a portion of the slit is stepped, with at least two 90 angles;
  the slit describes a path having 3×90° bends; and the slit describes a path having 4×90° bends.
Some variations on "slit shapes" may include straight slits extending from anywhere (or any position) on the inner edge (opening) of the coupling frame to anywhere on the outer edge (periphery) of the coupling frame. Although straight, these variations may be included in the "category" of "slit shapes".

The following figures (FIG. 42, et seq), may show a coupling frame (CF) of a smart card.
  The coupling frame may be a single metal layer of a card body in a stackup of a metal layer and plastic layers. See, for example, FIG. 27A (ML, 2020).
  The coupling frame may comprise an entire metal card body. See, for example, FIG. 2D.

In either case, the coupling frame may extend substantially from edge-to-edge of the card body—in other words, it may be substantially the same size as the card body. The coupling frames are shown having a module opening (MO) for receiving a transponder chip module (not shown), and a slit (S) extending from the opening to an outer edge (or periphery) of the coupling frame.

A smart card may also comprise two or more coupling frames disposed one above the other, with an insulating layer or dielectric therebetween so that a given coupling frame does not short out the slit of another coupling frame in the "stackup". See, for example, FIGS. 23B, 24A, 24B. One or more of the coupling frames may extend substantially from edge-to-edge of the card body.

Before proceeding to describe various slit shapes, it should be understood that a slit is an example of an electrical discontinuity. A nonconductive stripe (NCS) is another example of a discontinuity. Generally, any description of slit may be applied to a description of nonconductive stripes.
Some Straight Slit Shapes FIG. 41 showed a simple, basic, straight slit (S) extending horizontally (parallel to the x-axis) from the left side of the module opening (MO) to the left side (edge, periphery) of the coupling frame CF). The slit may extend from a vertical midpoint of the left edge of the module opening to the perimeter (outer edge) of the coupling frame.

FIGS. 42A-F show some different slit shapes, locations and/or orientations. The transponder chip module may not be shown. These illustrations may be smaller than FIG. 41, and some of the legends ("left", "right", "x", "y", etc.) may be omitted, for illustrative clarity. These "caveats" may apply to subsequent figures described in the descriptions below.

First a few words about the relationship between the module opening and the coupling frame.
  The module openings shown herein may be defined by four (inner) edges of the coupling frame—a left (inner) edge, a right (inner) edge, a top (inner) edge and a bottom (inner) edge.
  The coupling frames shown herein may have four (outer) edges—a left (outer) edge, a right (outer) edge, a top (outer) edge and a bottom (outer) edge.
  The four left, right, top and bottom (inner) edges of the module openings may be parallel with corresponding four left, right, top and bottom (outer) edges of the coupling frame.
  The module openings and coupling frames may both be rectangular, with rounded edges.

One or more of FIGS. 42A-F may illustrate some examples of:
  the slit (S) may extend along any direction from the opening to the periphery.
  the slit extends from anywhere (or any position) on the inner edge (opening) to anywhere on the outer edge (periphery);
  the slit is disposed other than perpendicular to the outer edge (periphery);
  the slit is disposed diagonally with respect to the outer edge (periphery); and
  the slit is disposed at a 45° angle with respect to the outer edge (periphery).

Figure 42A:
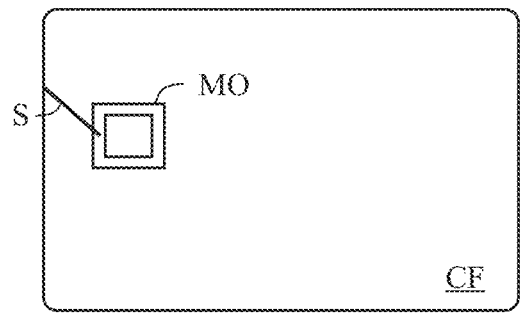
FIGS. 42A-F are diagrams (plan view) of coupling frames (CF) having slits (S) that are straight and which extend at various angles from various positions of the module openings (MO).

In FIG. 42A, the slit (S) is shown extending at an angle, other than perpendicular (i.e., diagonally), such as at a 45° angle upward, from the left edge of the module opening to the left outer edge (periphery) of the coupling frame.

Figure 42B:
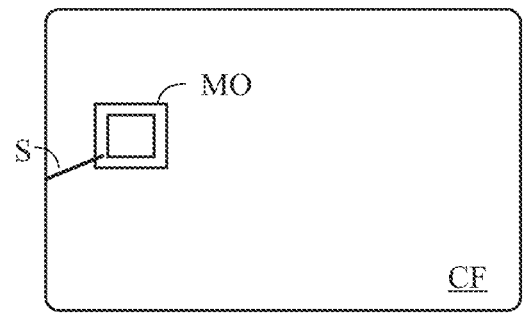

In FIG. 42B, the slit (S) is shown extending at an angle, other than perpendicular (i.e., diagonally), such as at a 45° angle downward, from the left edge of the module opening to the left outer edge (periphery) of the coupling frame.

Figure 42C:
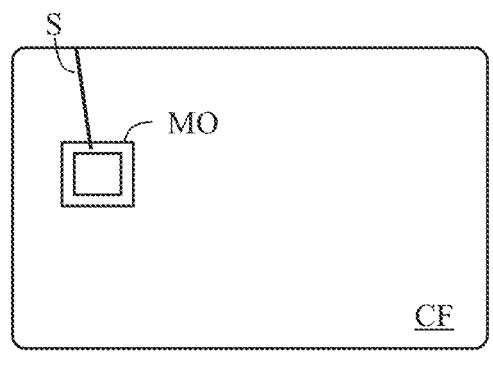

In FIG. 42C, the slit (S) is shown extending at an angle, other than perpendicular (i.e., diagonally), from the top edge of the module opening to the top outer edge (periphery) of the coupling frame.

Figure 42D:
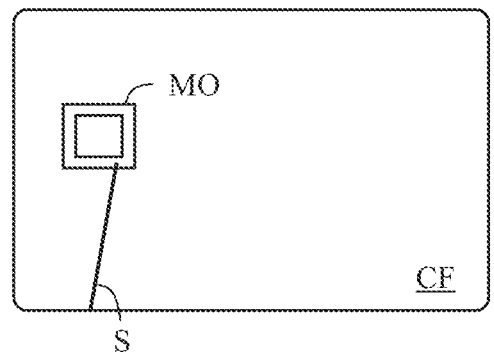

In FIG. 42D, the slit (S) is shown extending at an angle, other than perpendicular (i.e., diagonally), from the bottom edge of the module opening to the bottom outer edge (periphery) of the coupling frame.

Figure 42E:
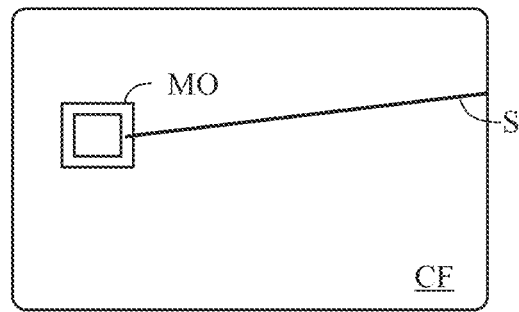

In FIG. 42E, the slit (S) is shown extending at an angle, other than perpendicular (i.e., diagonally), from the right edge of the module opening to the right outer edge (periphery) of the coupling frame.

Figure 42F:
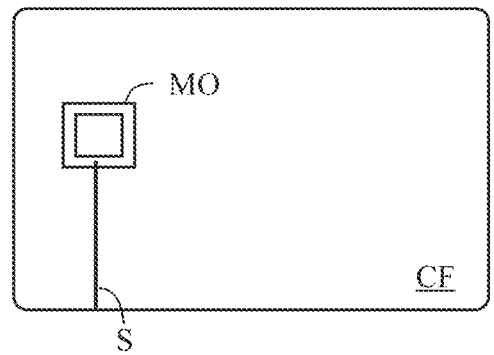

In FIG. 42F, the slit (S) is shown extending from the bottom edge of the module opening, at an angle which is perpendicular to the bottom outer edge (periphery) of the coupling frame, to the bottom outer edge (periphery) of the coupling frame.

In FIGS. 42A-F, the slits (S) have been illustrated as being straight (rather than curved, etc.). However, it should be understood that the slit (S) may be other than straight, such as curved, etc. Some examples of slits which are not straight may be shown in some of the following drawings (FIG. 43, et seq.).

While, many more examples could be envisioned, and shown, one of ordinary skill in the art to which the invention most nearly pertains will readily appreciate that the examples shown are illustrative of many more variations in slit orientation and location.

FIGS. 43A-F show some non-linear (other than straight) slit shapes, locations and/or orientations. The transponder chip module may not be shown. These illustrations may be smaller than FIG. 41, and some of the legends ("left", "right", "x", "y", etc.) may be omitted, for illustrative clarity.

In the following figures, a "simplified" module opening (MO) is shown, which may be either (or both) of the upper (larger) portion of an overall stepped opening (or recess) and the lower (smaller) portion of the overall stepped recess. In all of the figures, a rectangular coupling frame (CF) is shown, which may be a layer (or layers) of a card stackup, or a metal card body. Slits (S) are shown extending from the module opening (defined by an inner edge of the coupling frame) to an outer edge (periphery) of the coupling frame.

Figure 43A:
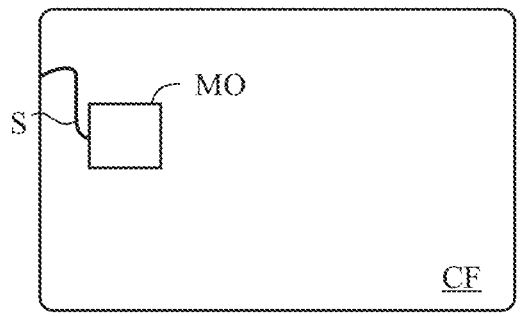
FIGS. 43A-F are diagrams (plan view) of coupling frames (CF) having slits (S) with shapes which are not straight, and the slits are shown extending in various directions from various positions of the module openings (MO).

In FIG. 43A, at least a portion of the slit (S) is other than straight (extends in a substantially non-linear path), including at least a portion of the slit is curved, has a wave shape, sine-wave or S-bend path. The slit extends from a left edge of the module opening (MO) to a left edge of the coupling frame (CF).

Figure 43B:
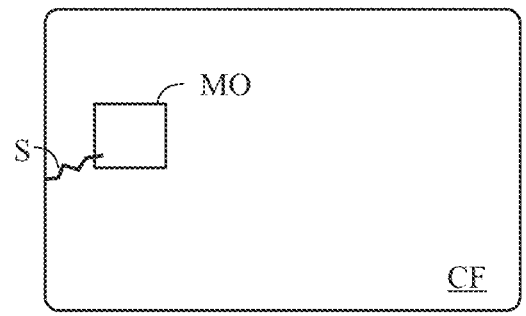

In FIG. 43B, at least a portion of the slit (S) has a zigzag shape. The slit extends from a left edge of the module opening (MO) to a left edge of the coupling frame (CF).

Figure 43C:
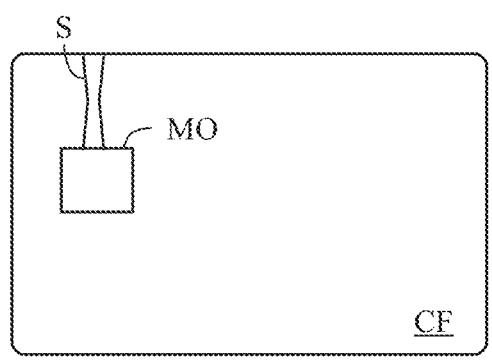

In FIG. 43C, at least a portion of the slit (S) becomes wider or narrow along its length. The ends of the slit are shown to be wider than the middle of the slit, the resulting "taper" being exaggerated, for illustrative clarity. The slit extends from a top edge of the module opening (MO) to a top edge of the coupling frame (CF).

Figure 43D:
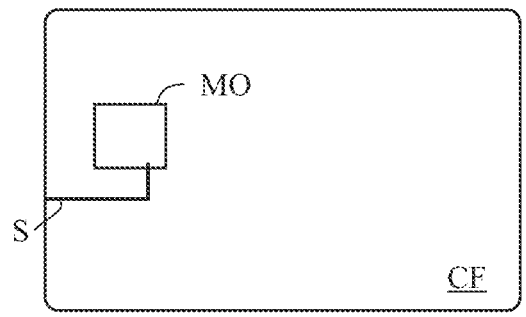

In FIG. 43D, at least a portion of the slit (S) is L-shaped. The slit extends from a bottom edge of the module opening (MO) to a left edge of the coupling frame (CF).

Figure 43E:
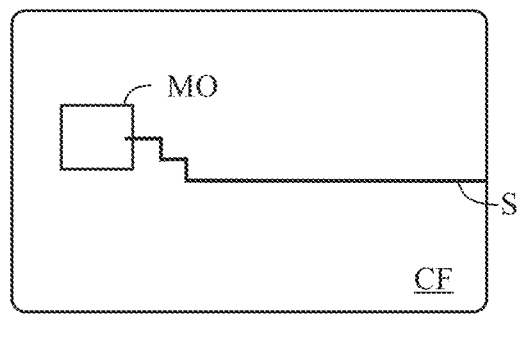

In FIG. 43E, at least a portion of the slit (S) is stepped, with at least two 90 angles, including 3×90° bends and 4×90° bends. The slit extends from a right edge of the module opening (MO) to a right edge of the coupling frame (CF).

Figure 43F:
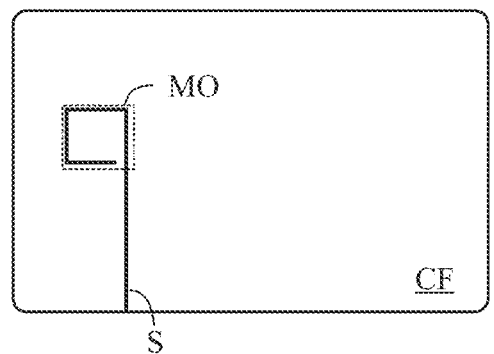

In FIG. 43F, the slit wraps at least halfway, including three-quarters of the way, including 90% of the way around an area of the coupling frame which would "normally" have a module opening for receiving a transponder chip module. The area enclosed by the wrap-around slit corresponds with (is a substitute for) the opening, and the resulting metal layer may function as a coupling frame. Since there is no opening, the module cannot fit into this coupling frame, it may be disposed immediately above the wrap-around slit. The area of the non-existent opening is shown in dashed lines. Compare FIG. 34B. The slit extends from an area corresponding with a module opening (MO) to a bottom edge of the coupling frame (CF).

Some More Slit Shapes

Figure 44A:
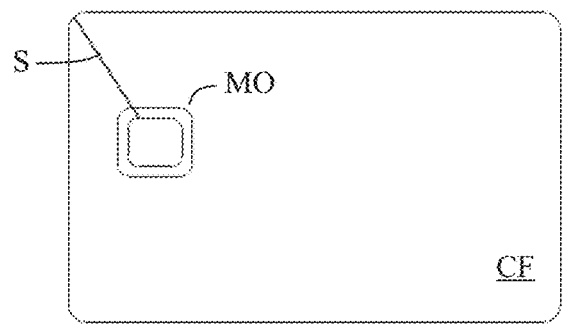
FIGS. 44A-X are diagrams (plan view) of coupling frames (CF) having slits (S) of various shapes, extending in various directions from various positions of the module openings (MO).
Figure 44B:
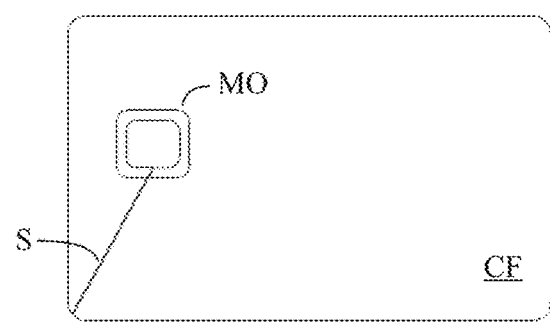
Figure 44C:
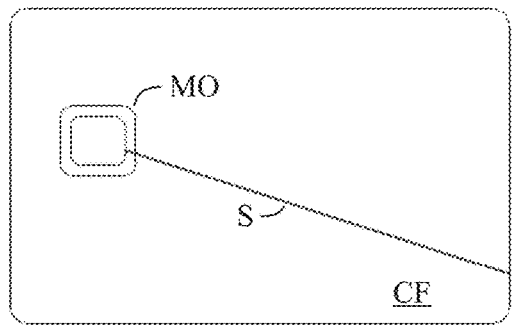
Figure 44D:
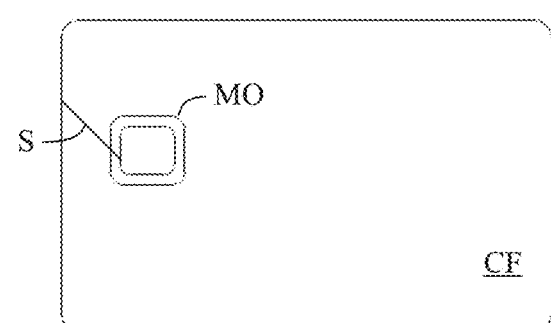
Figure 44E:
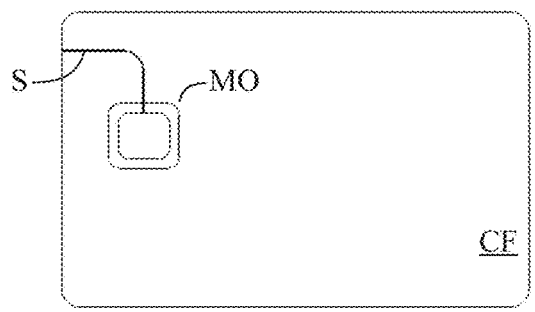
Figure 44F:
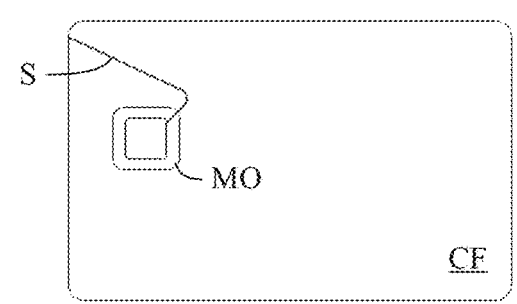
Figure 44G:
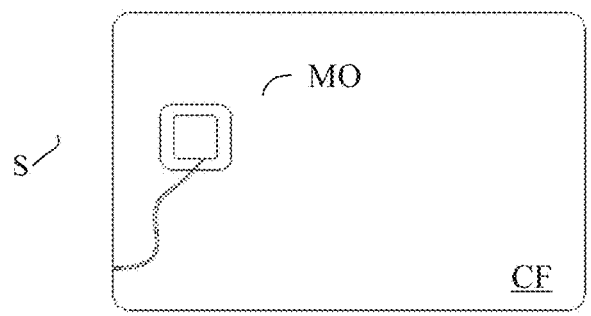
Figure 44H:
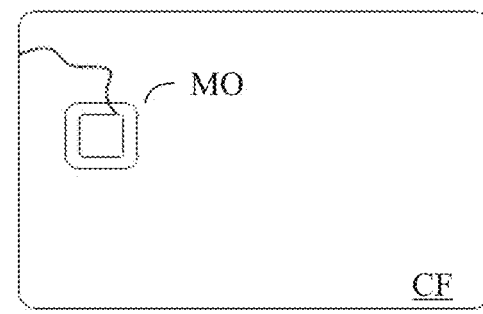
Figure 44I:
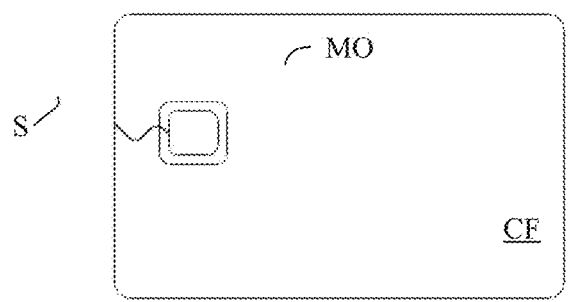
Figure 44J:
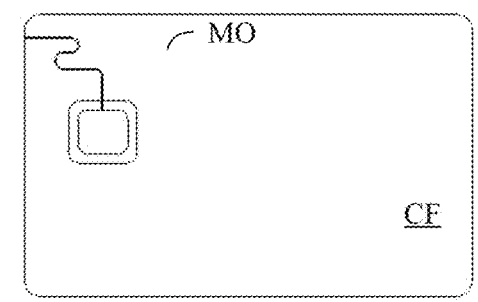
Figure 44K:
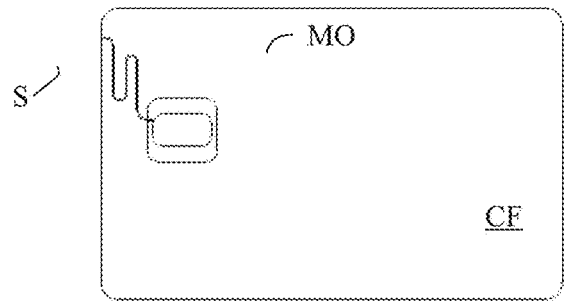
Figure 44L:
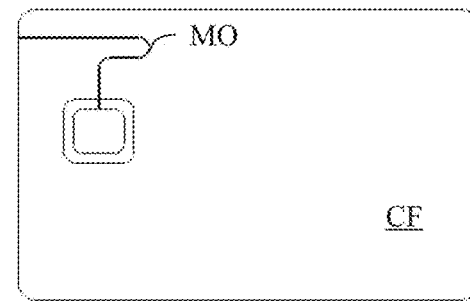
Figure 44M:
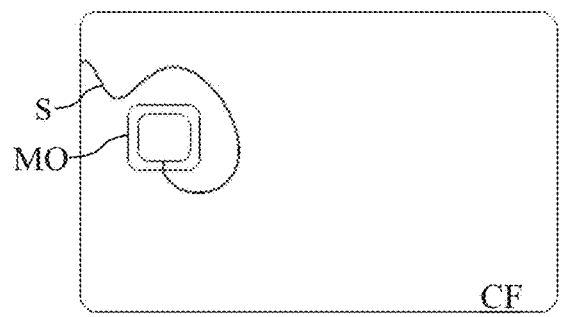
Figure 44N:
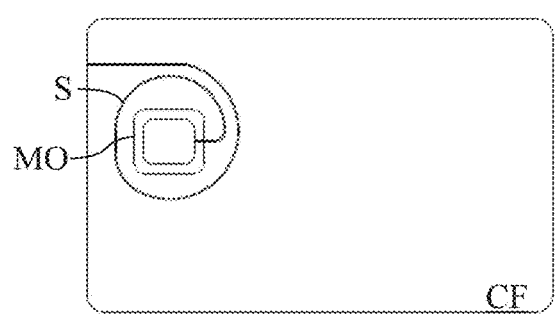
Figure 44O:
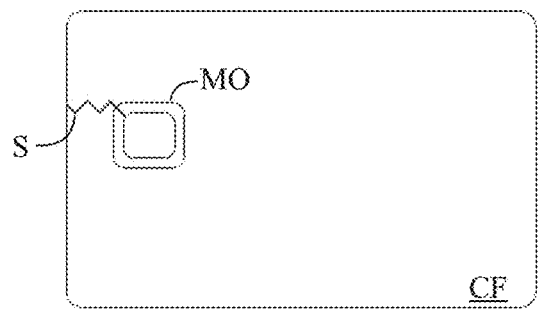
Figure 44P:
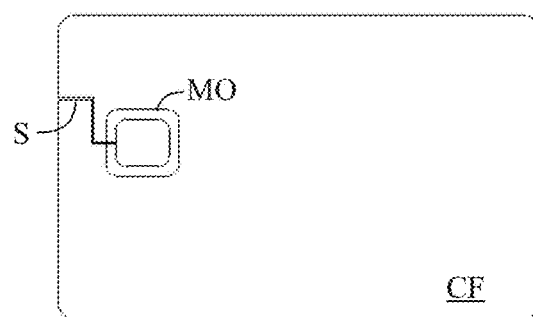
Figure 44Q:
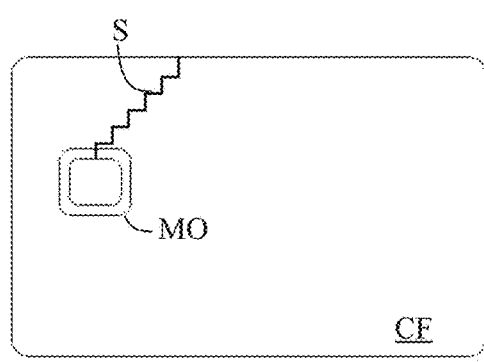
Figure 44R:
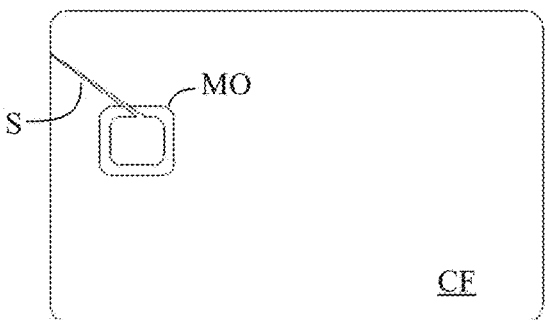
Figure 44S:
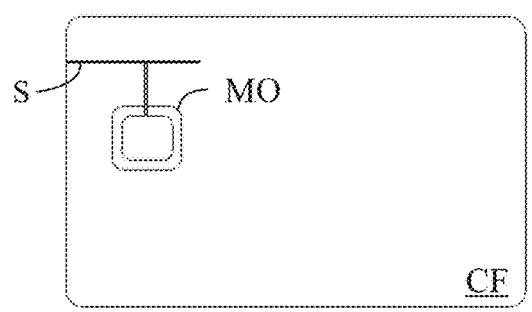
Figure 44T:
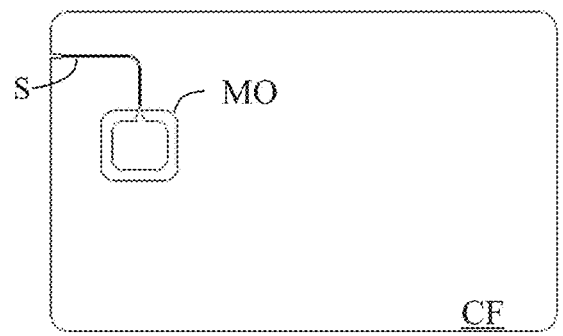
Figure 44U:
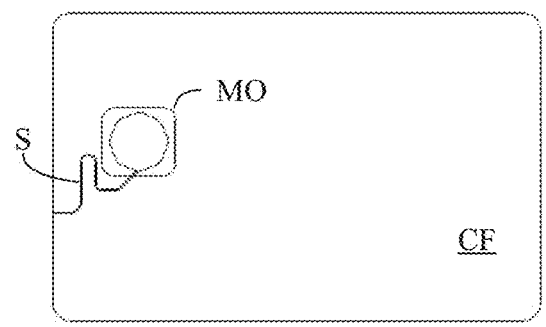
Figure 44V:
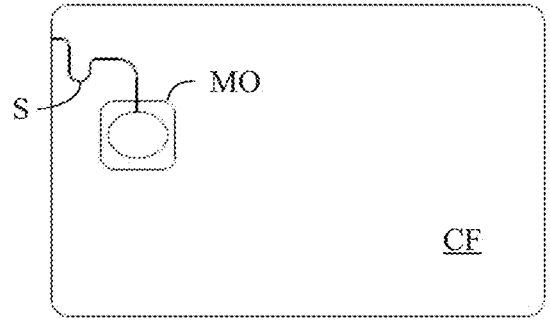
Figure 44W:
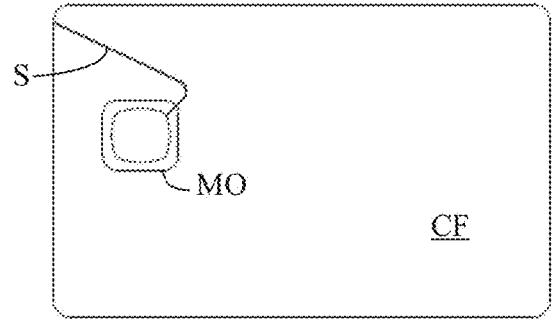
Figure 44X:
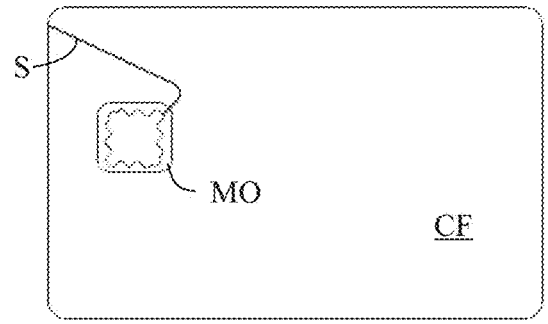

FIGS. 44A-X show some additional slit shapes, locations and orientations

In FIG. 44A, a straight slit (S) is shown extending from a top edge of the module opening to a top-left corner of the outer edge of the coupling frame. The module opening is shown, in this and other figures, as a stepped recess.

In FIG. 44B, a straight slit (S) is shown extending from a bottom edge of the module opening to a bottom-left corner of the outer edge of the coupling frame.

In FIG. 44C, a straight slit (S) is shown extending from a right edge of the module opening to a right outer edge of the coupling frame.

In FIG. 44D, a straight slit (S) is shown extending from a left edge of the module opening to a left outer edge of the coupling frame.

FIGS. 44A-D, and other figures herein, are illustrative that the slit (S) may extend from anywhere in the opening (MO) to anywhere on the perimeter (outer edge) of the coupling frame (CF).

In FIG. 44E, a slit (S) is shown extending vertically upward from a top edge of the module opening, then making a ~90° bend to the left, and continuing to a left outer edge of the coupling frame. The slit (S) features a radius at the bend point, this radius can have any dimensional value or could be omitted to leave a sharp (in this case 90°) bend.

In FIG. 44F, a slit (S) is shown extending diagonally upward from a top right edge of the module opening, then making an acute angle bend to the left, and continuing diagonally upward to a top-left corner of the outer edge of the coupling frame.

In FIG. 44G, a slit (S) is shown extending from a bottom edge of the module opening to a left outer edge of the coupling frame, near the bottom-left corner of the coupling frame. The slit follows a "meandering" path having a few bends (curves).

In FIG. 44H, a slit (S) is shown extending from a top edge of the module opening to a left outer edge of the coupling frame, near the top-left corner of the coupling frame. The slit follows a "meandering" path having a few bends (curves).

In FIG. 44I, a slit (S) is shown extending from a top edge of the module opening to a left outer edge of the coupling frame. The slit follows a "meandering" path having a few bends (curves). The geometry of this slit (S) is illustrative of a sinusoidal path.

In FIG. 44J, a slit (S) is shown extending from a top edge of the module opening to a left outer edge of the coupling frame, near the top-left corner of the coupling frame. The slit follows a "meandering" path having a few sharp bends (switchbacks).

In FIG. 44K, a slit (S) is shown extending from a left edge of the module opening to a left outer edge of the coupling frame, near the top-left corner of the coupling frame. The slit follows a "meandering" path having a few sharp bends (switchbacks).

In FIG. 44L, a slit (S) is shown extending from a top edge of the module opening to a left outer edge of the coupling frame, near the top-left corner of the coupling frame. The slit starts upward, then makes a turn to the right, then makes a U-turn towards the left outer edge of the coupling frame. Depending on the radius of the U-turn, the path of slit (S) may be considered to be a "T-shape".

In FIG. 44M, a slit (S) is shown extending from a bottom edge of the module opening to a left outer edge of the coupling frame. The slit starts downward from the module opening, then makes a counter-clockwise curved path around the right and top edges of the module opening, then meanders to the left outer edge of the coupling frame.

In FIG. 44N, a slit (S) is shown extending from a right edge of the module opening to a left outer edge of the coupling frame. The slit starts to the right from the module opening, then completely circles the module opening in a counter-clockwise direction, then continues to left outer edge of the coupling frame. This is an example of a "spiral" slit in a coupling frame.

In FIG. 44O, a slit (S) is shown extending from a top-left corner of the module opening to a left outer edge of the coupling frame, following a zig-zag (sawtooth) path.

In FIG. 44P, a slit (S) is shown extending from a left edge of the module opening to a left outer edge of the coupling frame, following a path with two 90 bends In FIG. 44Q, a slit (S) is shown extending from a top edge of the module opening to a top outer edge of the coupling frame, following a staircase-type path with multiple 90° bends.

In FIG. 44R, a slit (S) is shown extending from a top edge of the module opening to a left outer edge of the coupling frame. The slit is tapered, being wider at the module opening and narrower at the outer edge of the coupling frame.

In FIG. 44S, a slit (S) is shown extending from a top edge of the module opening, upward, then a first portion of the slit continues to a left outer edge of the coupling frame, and a second portion of the slit extends towards the right outer edge of the coupling frame. This is an example of a "T-shaped" slit in a coupling frame. Alternatively, there are two slits, one extending upward from a top edge of the module opening, then turning left to the left outer edge of the coupling frame, and another extending upward from a top edge of the module opening, then turning right to the right outer edge of the coupling frame.

In FIG. 44T, a slit (S) is shown extending from a top edge of the module opening, upward, then making a left turn and continuing to the left outer edge of the coupling frame. End portions of the slit, at the module opening and at the periphery of the coupling frame, are wider than the remaining portion of the slit. This is an example of an "L-shaped" slit in a coupling frame.

In FIG. 44U, a slit (S) is shown extending from a bottom edge of the module opening to a left outer edge of the coupling frame. The slit follows a meandering (non-linear) path, including one switchback. The module opening is a stepped recess. An upper (wider) portion of the stepped recess is shown as being rectangular, and a lower portion of the stepped recess is shown having a non-rectangular shape (hexagonal with rounded corners). This demonstrates that non-linear slits may be combined with non-rectangular module openings.

In FIG. 44V, a slit (S) is shown extending from a top edge of the module opening to a top outer edge of the coupling frame, near a top-left corner thereof. The slit follows a meandering path. The module opening is a stepped recess. An upper (wider) portion of the stepped recess is shown as being rectangular, and a lower portion of the stepped recess is shown having a non-rectangular shape (elliptical).

In FIG. 44W, a slit (S) is shown extending from a top-right corner of the module opening to a left outer edge of the coupling frame, near a top-left corner thereof. The slit follows a path similar to that shown in FIG. 44F. The module opening is a stepped recess. An upper (wider) portion of the stepped recess is shown as being rectangular. A lower portion of the stepped recess is shown having a non-rectangular shape corresponding to a series of consecutive arcs.

In FIG. 44X, a slit (S) is shown extending from a top-right corner of the module opening to a left outer edge of the coupling frame, near the top-left corner of the coupling frame. The slit follows path similar to that shown in FIG. 44F. The module opening is a stepped recess. An upper (wider) portion of the stepped recess is shown as being rectangular, and a lower portion of the stepped recess is shown having a non-rectangular (and very irregular) shape.

There have thus been shown several examples of coupling frames having slits extending from anywhere in the opening to anywhere on the perimeter of the coupling frame, as well as slits having curves, bends and angles, switchbacks, U-turns, etc. These variations are applicable to coupling frames which are one or more metal layers in a stackup of a smartcard, as well as to metal card bodies for a smartcard.

US 20190236434

Attention is directed to US 20190236434 (2019 Aug. 1; Lowe; Composecure; aka '434 publication) entitled DI CAPACITIVE EMBEDDED METAL CARD, filed as Ser. No. 15/928,813 on Mar. 22, 2018, claiming benefit of 62/623,936 filed Jan. 30, 2018. The "DI" in the title may refer to dual-interface (contact and contactless). And, the descriptions therein may be limited to smartcards (referred to therein as "transaction cards") having a metal card body rather than a metal layer in a stackup including plastic layers. Several "variations" of slit shapes are shown therein.

U.S. Ser. No. 16/742,903 filed 14 Jan. 2020 is "parent" to this application, and claims filing date benefit (aka priority) from several earlier-filed (parent) applications, including U.S. Ser. No. 14/465,815 filed 21 Aug. 2014, and others (see "Cross-Reference to Related Applications", above).

The claims of the '434 publication have a later effective filing date than the claims of parent application U.S. Ser. No. 16/742,903 filed 14 Jan. 2020, and some (many, if not all) of the claims of the present application. Thus, many (if not all) of the slit shapes disclosed (and claimed) in the '434 publication may be anticipated (not novel/new) or suggested (rendered obvious) by the teachings of the parent applications to this application. For example, consider the following slit shapes shown in the '434 publication.

In the following figures, only the relevant portions (such as a "quadrant", or corner portion) of some figures of the '434 publication may be reproduced herein, for illustrative clarity, and the descriptions presented herein will be very "abbreviated", fuller descriptions being available in the '434 publication. Sometimes a "FIG. ##A" view is used. Sometimes a "FIG. ##C" view is used.

Figure 45A:
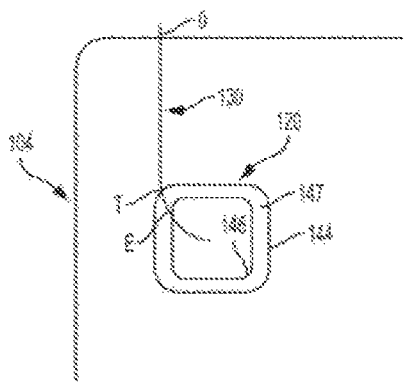
FIGS. 45A-X are diagrams (plan view) of metal layers having rectangular openings and discontinuities of various shapes, and are "imported" from US 2019/0236434.

FIG. 45A may bear some resemblance to FIG. 1A of the '434 publication, and shows a slit extending from a top-left corner of the opening, vertically, to a top side of the card periphery. See also FIG. 2 of the '434 publication.

Figure 45B:
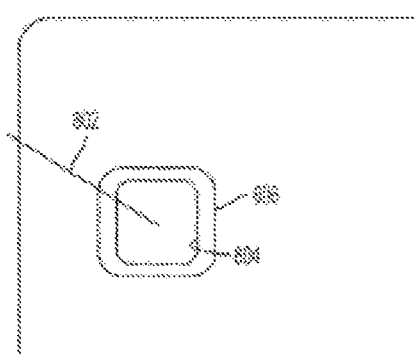

FIG. 45B may bear some resemblance to FIG. 8A of the '434 publication, and shows a slit extending from near a top-left corner of the opening, at an upward angle, to the left side of the card periphery.

Figure 45C:
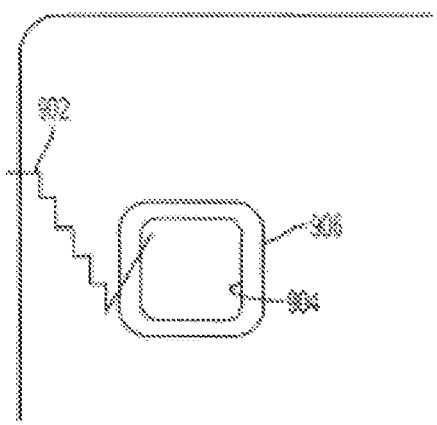

FIG. 45C may bear some resemblance to FIG. 9A of the '434 publication, and shows a slit extending from a left side of the opening, at an upward angle with many 90-degree bends (like a staircase), to the left side of the card periphery.

Figure 45D:
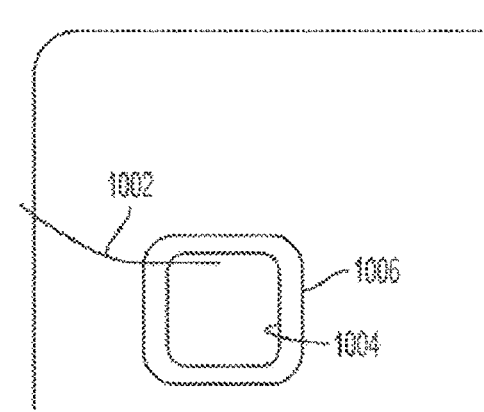

FIG. 45D may bear some resemblance to FIG. 10A of the '434 publication, and shows a slit extending from a top-left corner of the opening, curving at an upward angle, to the left side of the card periphery.

Figure 45E:
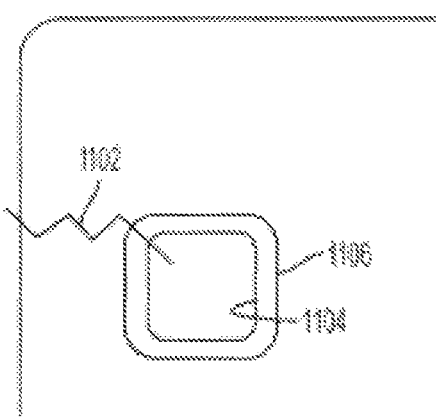

FIG. 45E may bear some resemblance to FIG. 11A of the '434 publication, and shows a slit extending from a top-left corner of the opening, in a zig-zag manner (like saw teeth), to the left side of the card periphery.

Figure 45F:
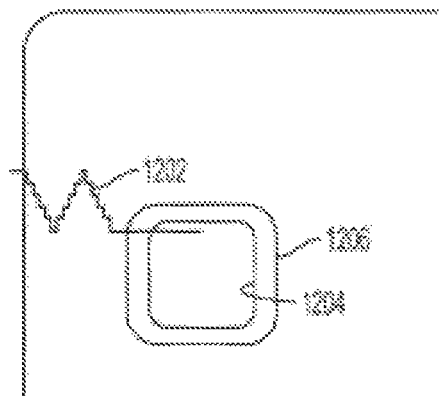

FIG. 45F may bear some resemblance to FIG. 12A of the '434 publication, and shows a slit extending from near a top-left corner of the opening, in a zig-zag manner (like saw teeth), to the left side of the card periphery.

Figure 45G:
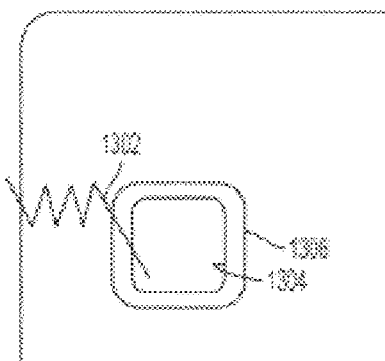

FIG. 45G may bear some resemblance to FIG. 13A of the '434 publication, and shows a slit extending from near a top-left corner of the opening, in a zig-zag manner (like saw teeth), to the left side of the card periphery.

Figure 45H:
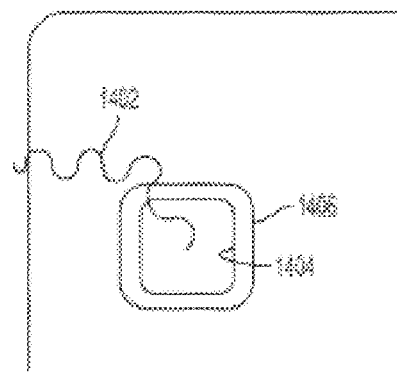

FIG. 45H may bear some resemblance to FIG. 14A of the '434 publication, and shows a slit extending from near a top-left corner of the opening, in a wavy pattern, to the left side of the card periphery.

Figure 45I:
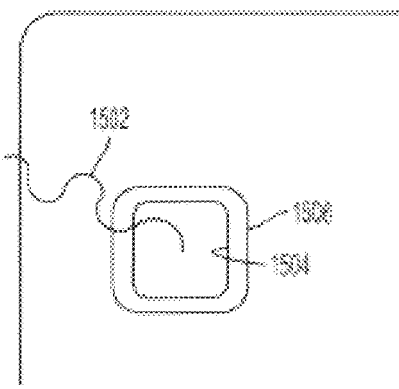

FIG. 45I may bear some resemblance to FIG. 15A of the '434 publication, and shows a slit extending from near the top of the left edge of the opening, in a wavy pattern, to the left side of the card periphery.

Figure 45J:
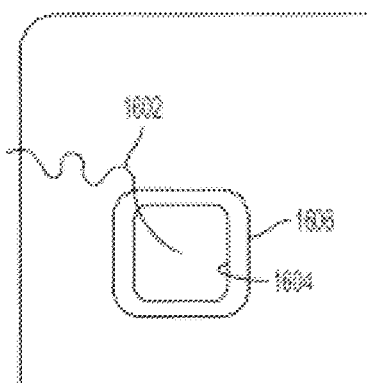

FIG. 45J may bear some resemblance to FIG. 16A of the '434 publication, and shows a slit extending from near a top-left corner of the opening, in a wavy pattern, to the left side of the card periphery.

Figure 45K:
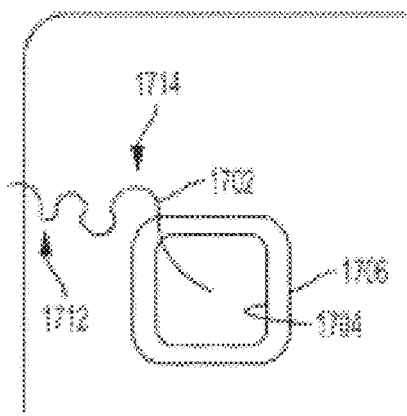

FIG. 45K may bear some resemblance to FIG. 17A of the '434 publication, and shows a slit extending from near a top-left corner of the opening, in a wavy pattern, to the left side of the card periphery.

Figure 45L:
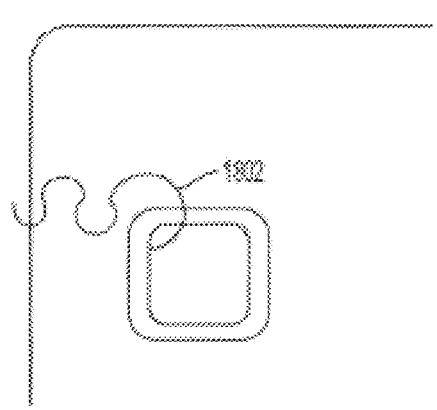

FIG. 45L may bear some resemblance to FIG. 18A of the '434 publication, and shows a slit extending from near a top-left corner of the opening, in a curly pattern, to the left side of the card periphery.

Figure 45M:
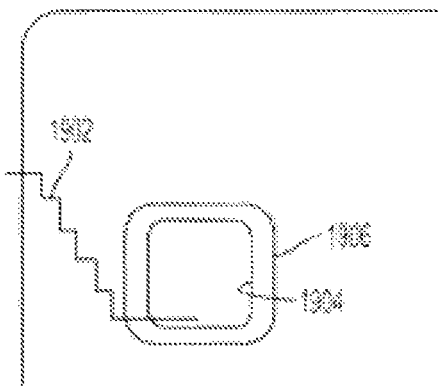

FIG. 45M may bear some resemblance to FIG. 19A of the '434 publication, and shows a slit extending from a top-left corner of the opening, at an upward angle with many 90-degree bends (like a staircase), to the left side of the card periphery.

Figure 45N:
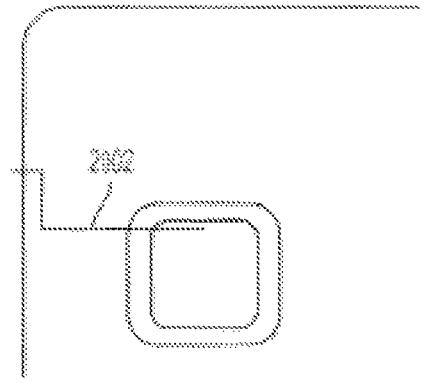

FIG. 45N may bear some resemblance to FIG. 20A of the '434 publication, and shows a slit extending from a top-left corner of the opening, horizontally with two 90-degree bends, to the left side of the card periphery.

Figure 45O:
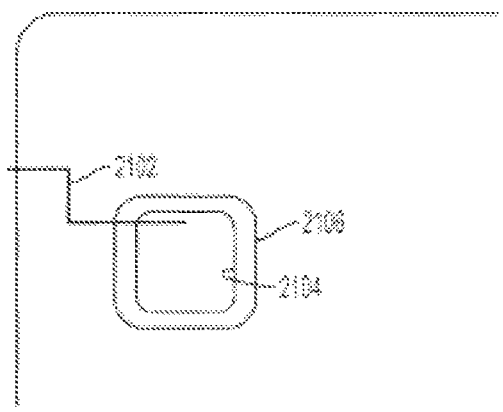

FIG. 45O may bear some resemblance to FIG. 21A of the '434 publication, and shows a slit extending from a top-left corner of the opening, horizontally with two 90-degree bends, to the left side of the card periphery.

Figure 45P:
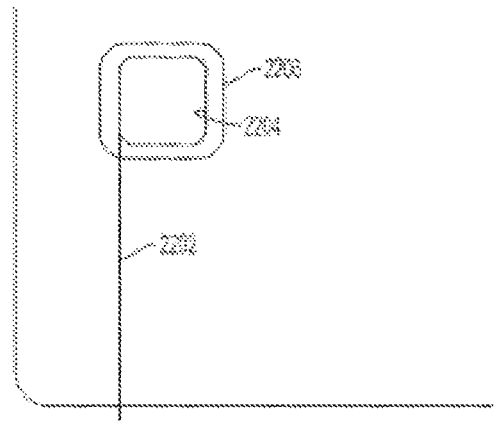

FIG. 45P may bear some resemblance to FIG. 22A of the '434 publication, and shows a slit extending from a bottom-left corner of the opening, vertically downward, to the bottom side of the card periphery.

Figure 45Q:
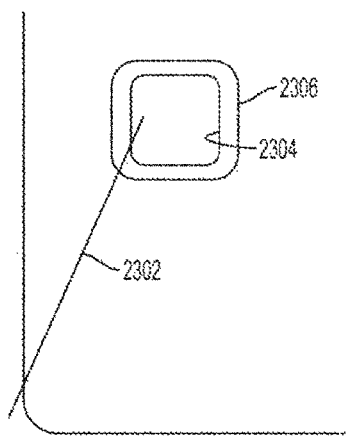

FIG. 45Q may bear some resemblance to FIG. 23A of the '434 publication, and shows a slit extending from a bottom-left corner of the opening, diagonally downward, to the left side of the card periphery.

Figure 45R:
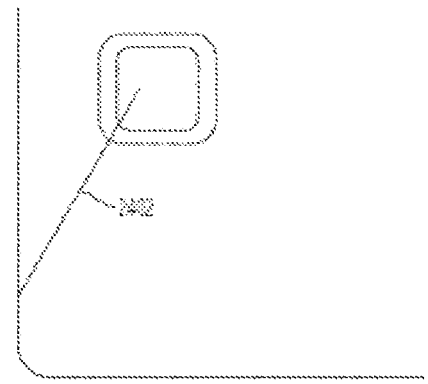

FIG. 45R may bear some resemblance to FIG. 24A of the '434 publication, and shows a slit extending from a bottom-left corner of the opening, diagonally downward, to the left side of the card periphery.

Figure 45S:
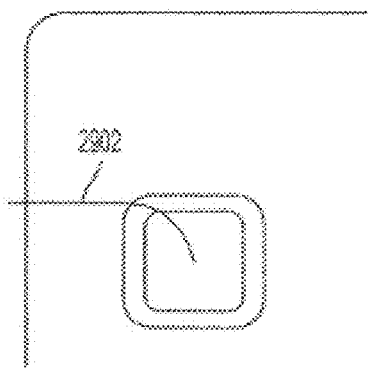

FIG. 45S may bear some resemblance to FIG. 29A of the '434 publication, and shows a slit extending from a top-left corner of the opening, horizontally, to the left side of the card periphery.

Figure 45T:
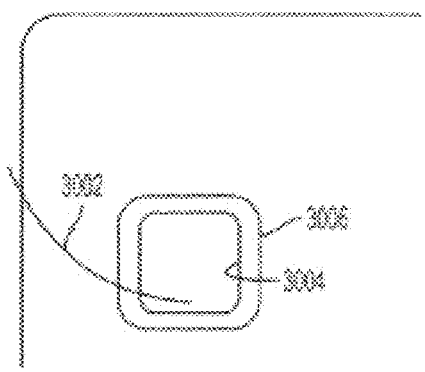

FIG. 45T may bear some resemblance to FIG. 30A of the '434 publication, and shows a slit extending from a bottom-left corner of the opening, in an arc, to the left side of the card periphery.

Figure 45U:
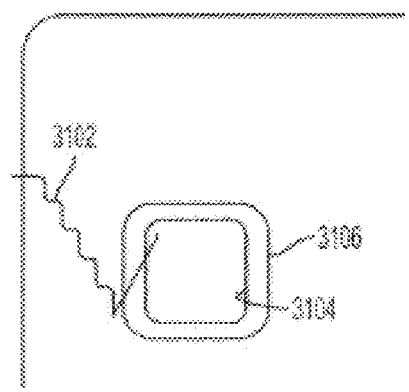

FIG. 45U may bear some resemblance to FIG. 31A of the '434 publication, and shows a slit extending from a left edge of the opening, upward in a staircase manner, to the left side of the card periphery.

FIGS. 25, 26, 27, 28 of the '434 publication show some other arrangements of slits, such as the following.

Figure 45V:
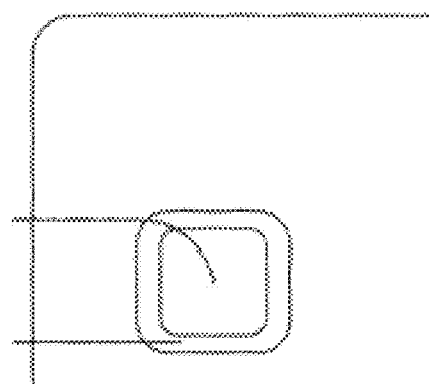

FIG. 45V may bear some resemblance to FIG. 28A of the '434 publication, and shows a slit extending from a top-left corner of the opening, horizontally, to the left side of the card periphery. Compare FIG. 45S. This figure also shows another slit extending from a bottom-left corner of the opening, horizontally, to the left side of the card periphery.

Figure 45W:
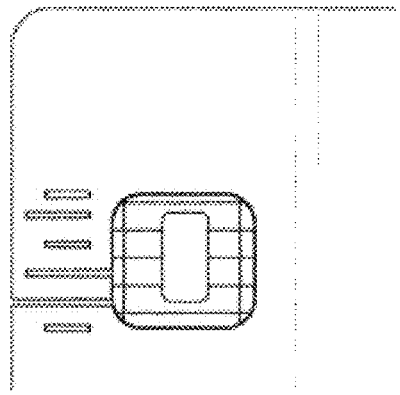

FIG. 45W may bear some resemblance to FIG. 25C of the '434 publication, and shows a number of slits, one of which extends from a left edge of the opening, horizontally, to the left side of the card periphery. Another slit extends from the left edge of the opening, horizontally, partially to the left side of the card periphery. Some other slits extend between the left edge of the opening, horizontally towards the left side of the card periphery, without reaching either one.

Figure 45X:
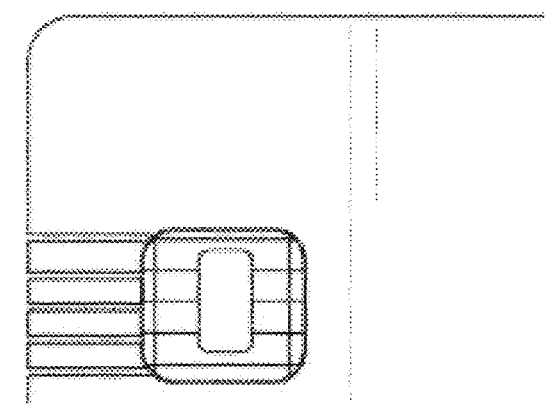

FIG. 45X may bear some resemblance to FIG. 27C of the '434 publication, and shows a number (5) of slits extending from the left edge of the opening, horizontally, to the left side of the card periphery. FIG. 26C of the '434 publication shows a number (3) of slits extending from the left edge of the opening, horizontally, to the left side of the card periphery.

The '434 publication also shows that a cards may have a pocket for receiving a reinforcing tab for See FIGS. 35A-E therein. This is discussed below, at FIG. 48.

WO 2019/173455

Reference is made to WO 2019/173455 (2019 Dec. 9; X-card; priority of U.S. 62/639,535, 7 Mar. 2018; aka '455 publication) which shows a large non-rectangular cutout, and a sinuous line discontinuity. As noted therein:

(57) Abstract: A card core includes a body defining a cutout and a discontinuity. The cutout includes an opening in the body defined by an edge and the discontinuity includes a channel defined by the body extending from an outer surface of the body to the cutout.

FIG. 1 illustrates a front view of a card core of a dual interface card defining a cutout and a sinuous line discontinuity, in accordance with some embodiments.

The cutout of the '455 publication may be analogous to the module openings disclosed herein. The line discontinuity of the '455 publication may be analogous to the slits disclosed herein.

Figure 46A:
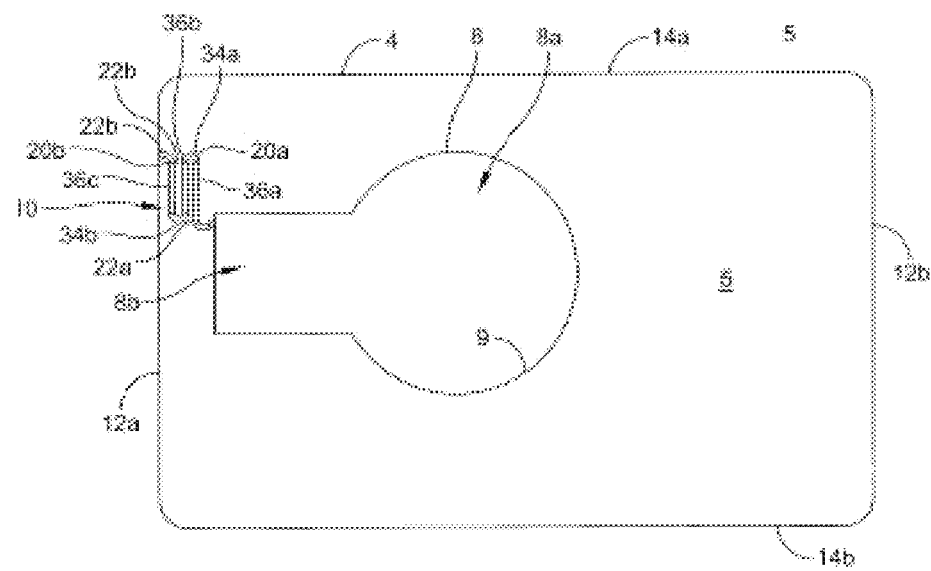
FIG. 46A is a diagram (plan view) of a metal card, from WO 2019/173455.

FIG. 46A corresponds with FIG. 1 of the '455 publication and shows a sinuous sit shape. For a detailed description thereof, see the '455 publication.

Figure 46B:
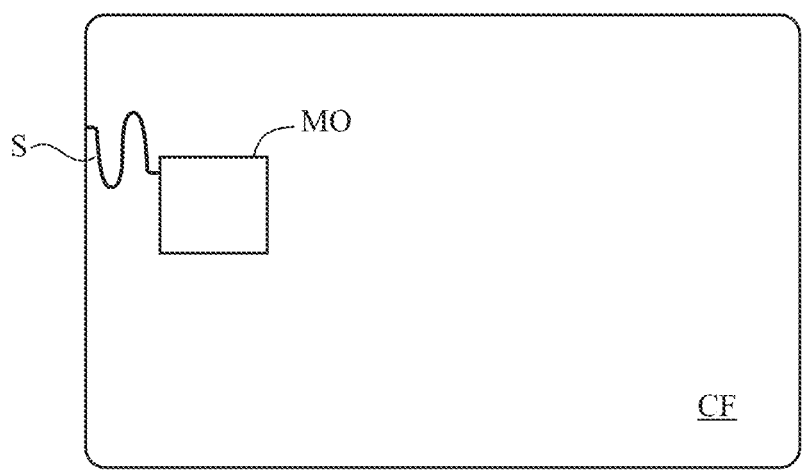
FIG. 46B is a diagram (plan view) of a coupling frame (CF) having a rectangular module opening (MO) and a sinuous slit (S).

Generally, the cutout 8 shown (and described) therein includes a first portion 8a defined by a circular cutout (opening) in the body 4 and a second portion 8b defined by a square cutout in the body 4. [0020] In Applicant's opinion, the cutout 8 could be described as a "keyhole" shaped cutout. And, it is evident that the cutout 8 has four edges—three from the square portion (which is missing one of its sides), and a fourth which is the circumference of a sector of a circle (comparable to a pizza from which one slice has been removed.) The cutout may also be described as a circular opening adjoining, intersecting, merging with, or replacing one side of a square opening FIG. 46B is a diagram (plan view) of a coupling frame (CF) having a module opening (MO) and a slit (S) following a sinuous path from a left edge of the module opening to a left edge of the coupling frame, according to an embodiment of the invention. Compare the "wavy" slit shown in FIG. 43A.

Card Stackups With Two or More Coupling Frames

Some smartcards, such as shown in FIG. 23B may comprise two or more metal layers having slits and functioning as coupling frames.

A smartcard having one or more metal layers may also have plastic layers, front and back, as shown for example in FIG. 27A.

Figure 47A:
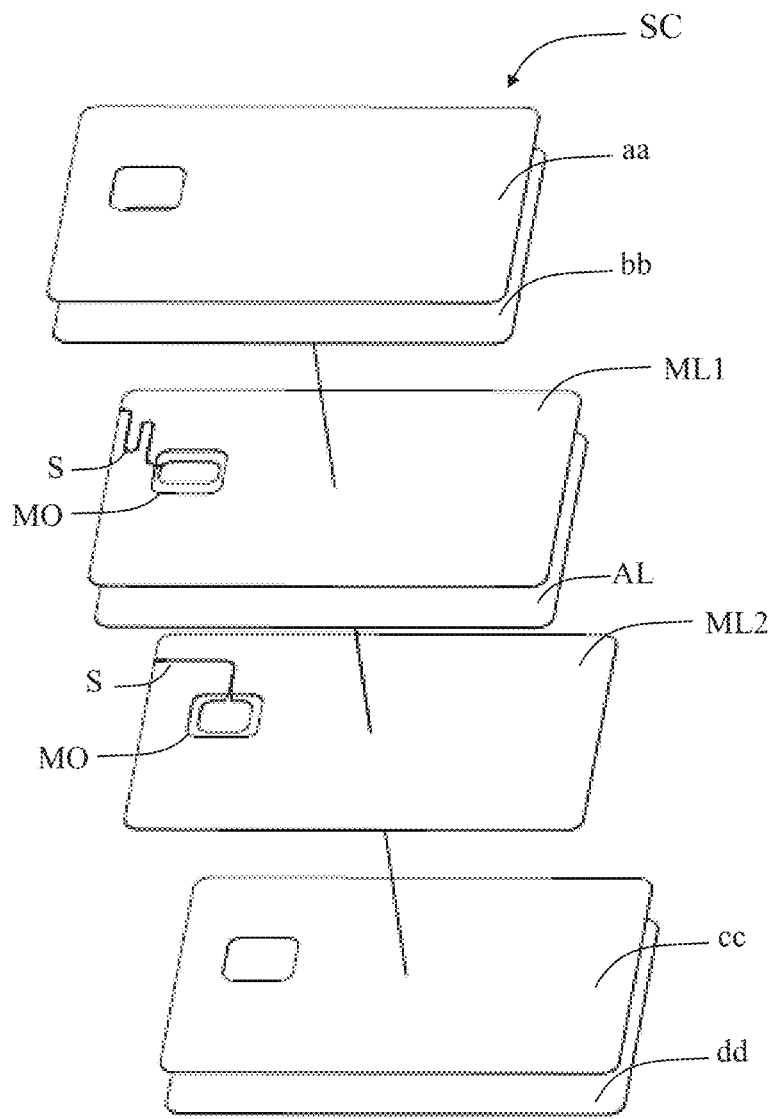
FIG. 47A is a diagram (perspective view, exploded) of a smartcard having two metal layers with rectangular module openings and slits to function as coupling frames.

FIG. 47A shows a construction (stackup) of a smartcard having two metal layers (M1, M2). The view is an exploded perspective view, prior to laminating the various layers shown. The smartcard may comprise, in the following order:
- a top (front) plastic layer, such as a front clear overlay (aa)
- a top (front) plastic layer, such as a front printed core (bb)
- a first metal layer (M1) having a module opening (MO) and a slit (S)
- an adhesive layer (AL)
- a second metal layer (M1) having a module opening (MO) and a slit (S)
- a bottom (rear) . . . plastic layer, such as a rear printed core (cc)
- a bottom (rear) plastic layer, such as a rear clear overlay (dd)

The slits in the two metal layers (M1, M2) may be different than one another, and may be any of the slit shapes disclosed herein.

The module openings in the two metal layers (M1, M2) may be different than one another, and may be any of the module opening shapes disclosed herein.

It should be understood that a given one of the metal layers (i.e., coupling frames) in these constructions may have one shape of slit (such as straight, including diagonal), while another one of the metal layers (i.e., coupling frames) in these constructions may have another shape of slit (such as curved, staircase, etc.). And, the module opening in one layer may be rectangular, while the module opening in another layer may be non-rectangular. This is indicative of the numerous "combinations" of coupling frames that may be present in a given smartcard.

Figure 47B:
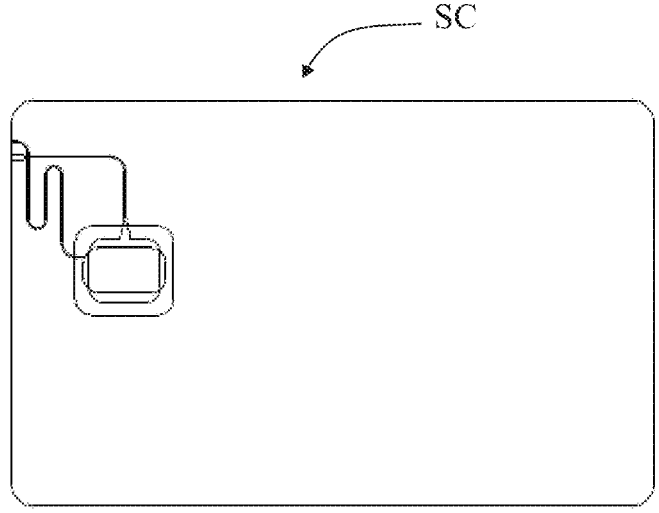
FIG. 47B is a diagram (plan view) of the smartcard of FIG. 47A.

FIG. 47B shows (plan view) the smartcard of FIG. 47A, after lamination. In this front view, the slit in the bottom metal layer (M2) is visible, although in reality the slit in the bottom metal layer would be hidden.

Reinforcing the Slit

As mentioned above, the slit (S) may compromise the mechanical integrity of the coupling frame (CF), making it less resistant to twisting. Incorporating a reinforcing structure (RS, 832) is described with reference to FIG. 8.

FIG. 8 (above) shows a metal smart card (SC) 800 comprising a full metal card body (CB) 802 with an opening (MO) 808 for a transponder chip module (TCM, not shown) and a slit (S) 830 extending from the opening (MO) to a periphery of the card body (CB).

To reinforce the card body (CB) (or metal layer (ML)) having a slit (S), a reinforcing structure (RS) or plate 832, of a non-conductive material such as plastic or reinforced plastic, may be disposed at (including around and covering) the location (area) of the slit (S) in a recess (R, not shown) on the underside of the card body (CB), and may extend beyond the slit.

See also FIGS. 18A,B, FIGS. 26A,B,C, and FIG. 33B.

The '434 publication shows that a card may have a pocket for receiving a reinforcing tab for See FIGS. 35A-E therein.

Figure 48:
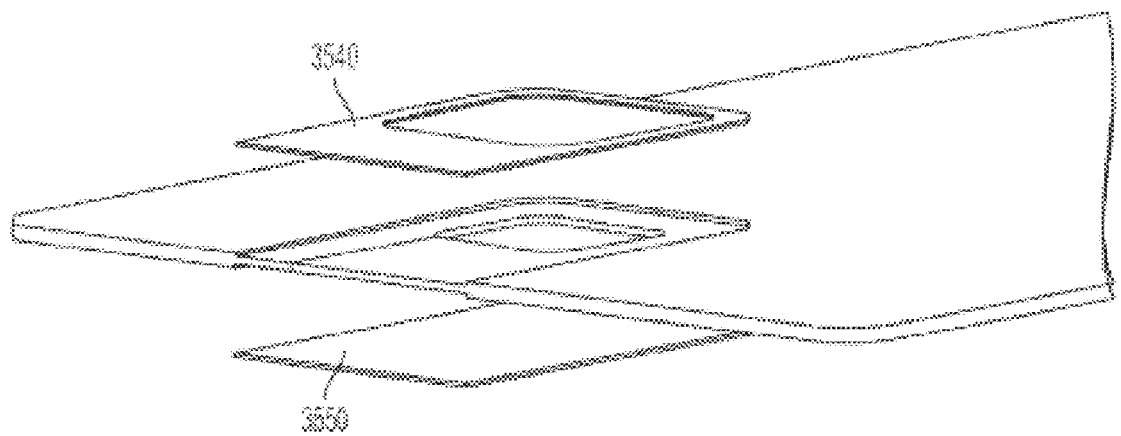

FIG. 48 may bear some resemblance to FIG. 35C of the '434 publication, and shows the following:

Yet another embodiment of strengthening a section of a card having a discontinuity comprises providing a supporting tab overlying and/or underlying the discontinuity, such as for card 3500 depicted in FIGS. 35A-E . . . . Pockets 3510, 3512 on opposite sides of the card, both of which of which have an area that is less than the area of the metal layer, are depicted as the same size as one another in the figures, but can be different sizes. Non-metal inserts 3540, 3550, such as ceramic or plastic, are placed into the pockets 3510, 3512.

Claim 31 of the '434 publication recites a ceramic insert disposed in a pocket having a periphery smaller than the periphery of the metal layer.

As mentioned above, FIG. 8 may correspond with FIG. 8 of US 20150021403 published 22 Jan. 2015 (Ser. No. 14/492,113 filed 22 Sep. 2014). The '434 publication is based on 62/623,936 filed Jan. 30, 2018.

Non-Rectangular Module Openings

In the various examples set forth above, the module opening has always been shown as being rectangular. This is conventional, and is driven in part by the conventional shape (rectangular) of the chip module.

Typically, the card body of a smartcard will be rectangular, having two short sides and two long sides. An "ID-1" size card may measure 85.60 mm×53.98 mm. See ISO-7816 and ISO/IEC 7810. And, a metal layer or metal card body, such as discussed above, will typically extend edge-to-edge in the card body and will thus be rectangular, having similar ID-1 dimensions.

The module opening is for installing a transponder chip module into the card body, hence their locations should be the same. The location of the chip module, more particularly the location of the contact pads on the chip module, vis-à-vis the periphery of the card body, is governed by ISO 7816. See, for example, FIG. 1A above, which corresponds with FIG. 1A of US 20150136858. The module openings (i.e., transponder locations, more specifically contact pad locations) in the various drawings presented herein may not conform exactly to those specifications. Nevertheless, they are illustrative.

The '434 publication, particularly claim 1 thereof, specifies that the opening shown therein has three edges that are parallel to corresponding three sides of the card periphery, as follows:

an opening in the metal layer sized to accommodate a transponder chip module, the opening having a first edge parallel and relatively closest to the first short side of the card periphery and aligned with a first section of the card periphery, a second edge parallel and relatively closest to the first long side of the (card) periphery, and a third edge parallel and relatively closest to the second long side of the (card) periphery, the first edge relatively closer to the short side of the (card) periphery than the second edge is to the long side of the (card) periphery, and the second edge relatively closer to the first long side of the (card) periphery than the third edge is to the second long side of the card periphery, the edges of the opening defining corners . . . .

This claim is clearly and unambiguously limited to an opening that has (at least) three edges which are parallel to corresponding (at least) three sides of the card periphery. The figures in the '434 publication show an opening which is rectangular, or square. There is no disclosure or suggestion of an opening with any other shape, although rectangle with one side skewed (not parallel to the opposite side) would also "theoretically" fit within the constraints set forth in claim 1 of the '434 publication. More particularly (claim 1), the first edge of the opening is parallel to the first short side of the card periphery;

the second edge of the opening is parallel to the first long side of the (card) periphery; and the third edge of the opening is parallel to the second long side of the (card) periphery The card periphery has four sides. The first long side of the card periphery is parallel with the second long side of the card periphery. The first short side of the card periphery is parallel with a second short side (not specified in the claim) of the card periphery.

The opening is always shown as being rectangular, having four edges. There is no specific mention in the '434 publication of the relation of the fourth edge of the opening to the sides of the card periphery, but the fourth edge is always shown as being parallel to the second short side of the card periphery.

In the '434 publication, the opening 120, as depicted, is a stepped pocket opening that defines an overall area having an outer boundary 144 and an inner boundary 146. An upper portion (open to the front surface of the card) of the stepped pocket opening has an open area defined by the outer boundary 144. A lower portion of the pocket (open to the back surface of the card) has an area defined by inner boundary 146, wherein the area of the lower portion of the pocket is less than the area of the upper portion of the pocket. [0064]

The upper and lower portions of the stepped pocket opening are consistently shown throughout the figures as being rectangular (albeit with rounded edges).

For purposes of the discussion that follows, a stepped pocket opening having an upper portion and a lower portion may be referred to simply as the "opening", which is how it was treated in claim 1 of the '434 publication.

It is within the scope of the invention set forth herein that the module opening may have a shape which is other than rectangular (non-rectangular, or not a rectangle), such as, but not limited to:

round, circle, oval
rhombus, diamond shaped, parallelogram
triangle, truncated triangle
trapezoid
polygons, whether regular or irregular, having more than four sides
other shapes, which may include generally rectangular, but formed with arcs so that none of the edges of the opening are parallel with any sides of the periphery of the coupling frame
variations of the above Recall that claim 1 of the '434 publication requires three edges of the opening to be parallel with corresponding three sides of the card periphery (and, inherently, a fourth edge of the opening to be parallel with a fourth side of the card periphery).

Some of the opening shapes disclosed herein may have:
fewer than four edges (or sides), such as round, circle, oval, triangle
more than four edges (sides)
no straight edges (or sides), such as round, circle, oval
Some of the opening shapes disclosed herein may have:
some straight edges (or sides), without at least one edge being parallel to the periphery (outer edge) of the metal layer (coupling frame)
some straight edges (or sides), without at least two edges being parallel to the periphery (outer edge) of the metal layer (coupling frame)
some straight edges (or sides), without at least three edges being parallel to the periphery (outer edge) of the metal layer (coupling frame)
Some of these opening shapes may have:
one straight edge which is not parallel to another edge of the opening
two straight edges, none of which is parallel to another edge of the opening
three straight edges, none of which is parallel to another edge of the opening Thus, for a typical rectangular card body, the non-rectangular opening shapes disclosed herein would clearly fall outside of the limitations set forth in claim 1 of the '434 publication.

The non-rectangular module openings disclosed herein may be illustrated in a coupling frame (metal layer) which is substantially the same size and shape as the overall card body—i.e., rectangular, with rounded edges.

The non-rectangular module openings disclosed herein may be shown with straight slits extending from the module opening to the periphery (outer edge) of the coupling frame. It is within the scope of the invention that that non-straight slits such as shown in FIGS. 43A-E (and elsewhere) could be used in conjunction (combined) with the non-rectangular module openings shown herein, and of these various combinations of slits and module openings may be applicable to:
a coupling frame which is a metal layer in a card,
a coupling frame which is a metal card body, and
a card construction with a stackup of two or more coupling frames.

In the following figures, a "simplified" module opening (MO) is shown, which may be either (or both) of the upper (larger) portion of an overall stepped opening (or recess) and the lower (smaller) portion of the overall stepped recess. And, for simplicity and clarity, only a "simple" straight slit (S) may be shown extending to or slightly into the opening, at various positions of the opening. In all of the figures, a rectangular coupling frame (CF) is shown, which may be a layer (or layers) of a card stackup, or a metal card body. The module openings will be described as having "edges" which may "sides" of the geometric shapes being described.

Some comments may be presented herein as to whether the claim(s) of the '434 publication "read on" the embodiments shown and described herein. In patent law, to "read on" means to literally describe an element of an invention. Thus, a patent is infringed if the patent's claims read on (literally describe) all of the elements of the infringing device.

Figure 49A:
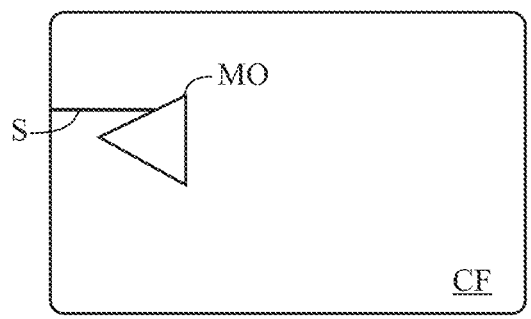
FIGS. 49A-F are diagrams (plan view) of coupling frames (CF) having non-rectangular module openings (MO) of various shapes, according to some embodiments of the invention.

FIG. 49A shows a coupling frame having a triangular module opening having three edges (three sides). The triangular opening is oriented such that it has one (right) edge (side) parallel to one (right) side (outer edge, periphery) of the coupling frame. The other two edges (sides) of the triangular opening are not parallel to any of the outer edges of the coupling frame. The triangular opening may be oriented other than as shown so that, for example, none of its three sides are parallel to any of the four outer edges (sides of the periphery) of the coupling frame. Thus, the claim(s) of the '434 publication do not "read on" this triangular module opening. (The triangular opening falls outside of the limitations of the claims in the '434 publication.)

The triangle may be truncated, such by cutting its left (as viewed) apex to be parallel to the left side of the card periphery, in which case two edges of the module opening may be parallel to two opposite (left and right) outer edges of the coupling frame (or card) periphery. A truncated triangle may be a trapezoid, such as may be shown in FIG. 49F.

Note that the relationship between the sides, or edges of the module opening vis-à-vis the outer edges of the coupling frame are being discussed herein, rather than (in stark contrast with) a relationship between an opening and sides of the card periphery as set forth in the '434 publication. As will be evident from FIG. 50, discussed below, it is not a "given" that the outer edges of the coupling frame are "identical" with outer edges (sides of the periphery) of the card body, although for a metal card body this may be the case.

Figure 49B:
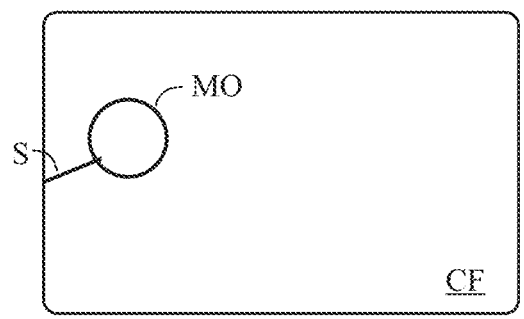

FIG. 49B shows a coupling frame having a round module opening, which is shown as a circle. The circular opening has a only one "edge", which is an inner edge of the coupling frame, and that edge is not parallel with any of the outer edges of the coupling frame. Thus, the claim(s) of the '434 publication do not "read on" this round/circular module opening.

Figure 49C:
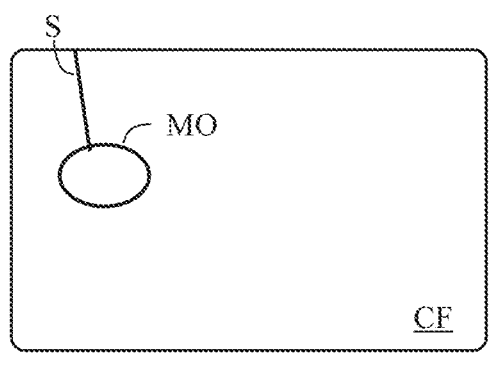

FIG. 49C shows a coupling frame having an oval module opening. The oval opening has a only one "edge", and that edge is not parallel with any of the outer edges of the coupling frame (or card) periphery. Thus, the claim(s) of the '434 publication do not "read on" this oval module opening.

The oval opening is shown with its long axis parallel with the long side (outer edge) of the coupling frame, and its short axis parallel with the short side (outer edge) of the coupling frame. The oval opening may be oriented other than as shown so that, for example, none of its axes are parallel to any of the outer edges of the coupling frame.

Figure 49D:
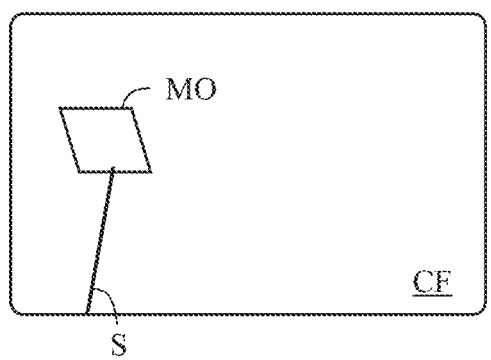

FIG. 49D shows a coupling frame having a parallelogram or rhombus-shaped module opening. Oriented as shown, the opening may have a maximum of two edges (top and bottom) parallel to the two long sides (outer edges) of the coupling frame. In another orientation, no edges may be parallel to any of the outer edges of the coupling frame. Thus, the claim(s) of the '434 publication do not "read on" this oval module opening.

Figure 49E:
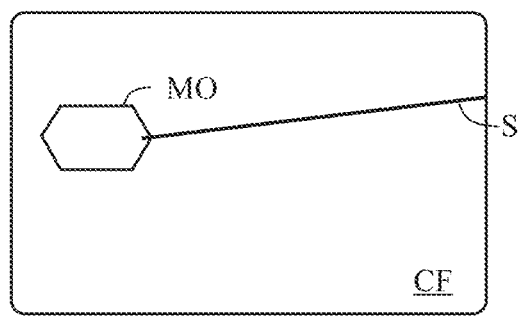

FIG. 49E shows a coupling frame having an elongated (in the x-axis) hexagon-shaped module opening. (This is an example of an irregular polygon having more than four sides.) In this orientation, only two edges of the opening are parallel with two outer edges of the coupling frame. In another orientation, no edges may be parallel to any of the outer edges of the coupling frame. Thus, the claim(s) of the '434 publication do not "read on" this hexagonal module opening.

Figure 49F:
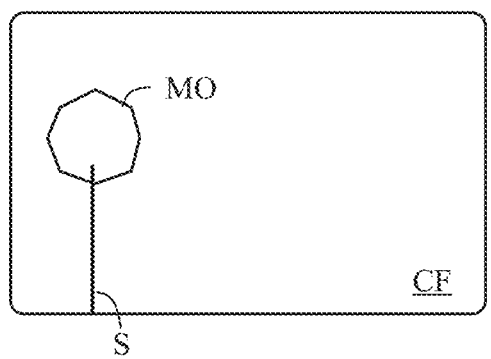

FIG. 49F shows a coupling frame having an octagon-shaped opening. (This is an example of a regular polygon having more than four sides.) In this orientation, none of the edges of the opening are parallel with any of the outer edges of the coupling frame. Thus, the claim(s) of the '434 publication do not "read on" this hexagonal module opening. In another orientation, and for a regular octagon with a certain orientation, four (of the eight) sides of the octagonal module opening could be parallel with the four outer edges of the coupling frame.

Many other shapes for module openings may be incorporated into a coupling frame, including star shapes, teardrop shapes, and some "arbitrary" logo shapes, to name but a few. The transponder chip module disposed in the module opening need not be the same shape as the module opening, as long as the module opening is big enough to accommodate the transponder chip module. And, it is not mandatory that the module opening "mimic" the shape of the transponder chip module. In other words, a conventional rectangular chip module may be disposed in an appropriately-sized round module opening (FIG. 49B).

FIG. 1 of WO 2019/173455 (see FIG. 46A herein) discloses a void or cutout 8 that may include multiple portions each having separate geometries. For example, the cutout 8 includes a first portion 8a defined by a circular cutout (opening) in the body 4 and a second portion 8b defined by a square cutout in the body 4, although it will be appreciated that each of the cutout portions 8a, 8b may have any suitable geometry. [0020].

The circular plus square cutout 8 referenced in the '455 publication has four edges. It is not immediately apparent (or clear) what is meant by "suitable" geometry. However, FIGS. 2 and 3, and the descriptions thereof, may provide some insight. For example, FIGS. 2 and 3 illustrate having a plurality of circuit elements positioned within the cutout. Each portion of the cutout may be sized and configured to receive a circuit element therein. Each portion of the cutout defines an opening such that a circuit element positioned within the cutout can effectively electromagnetically isolated from the surrounding material of the body. For example, the first circuit element is positioned within the first cutout portion such that a gap is maintained between the edge of the cutout and the outer edge of the first circuit element. [0022, 0031, 0032]

Apparently, a "suitable" geometry for the cutout (which may be analogous to the module openings described herein), would be one that is suitable to accommodate a plurality of circuit elements (not specified) positioned within the cutout, while electromagnetically isolating the circuit elements from the surrounding material of the body. This seems rather vague, and does not provide any useful insight into or precedent for the various shapes for module openings that are disclosed herein.

As mentioned above, the opening (8) in the '455 publication has four edges—three from the square portion and a fourth from the sector of a circle. It is plain and simple that the '455 publication discloses a cutout having four edges, and does not disclose or suggest anything other than that. It does not suggest a module opening having fewer than four edges. It does not suggest a module opening having more than four edges. And, it is worth mentioning here that, although the claims of the '434 publication are limited to a module opening having three edges parallel with corresponding three sides of the card periphery, there is no teaching or suggestion in the '434 publication of having a module opening that is anything other than rectangular, having four edges.

The claims of the '455 publication itself do not specify the shape of the cutout 8, focusing more on the shape (e.g., sinuous) of the line discontinuity. It would appear that the claim(s) of the '434 publication do not "read on" this circular+square opening.

Some Additional Variations and Considerations

Figure 50:
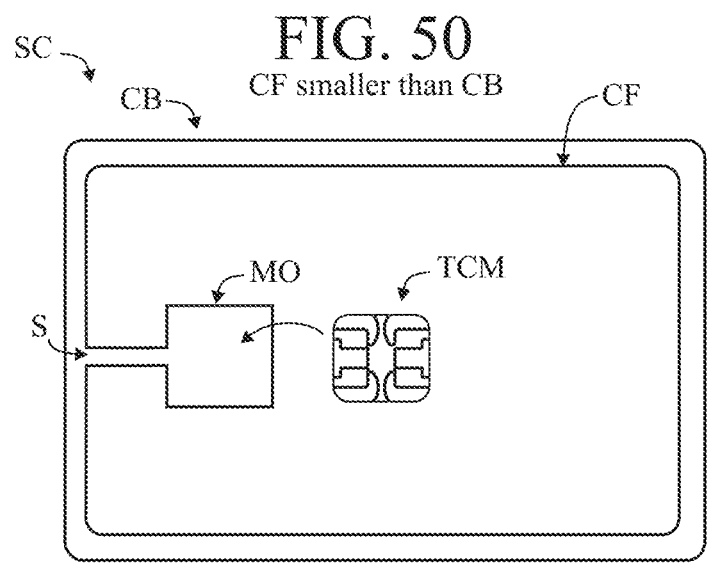

FIG. 50 shows a smartcard (SC) having a card body (CB), and rectangular coupling frame (CF) with a rectangular module opening (MO). Compare FIG. 41. Compare also FIG. 9.

FIG. 50 shows a metal/plastic hybrid smart card (SC) comprising a coupling frame (CF) that is somewhat smaller than the card body (CB) with an opening (MO) for a transponder chip module (TCM) and a slit (S) extending from the opening (MO) to a periphery of the card body (CB). For example, the overall card body may measure 85.60 mm×53.98 mm (ISO standard), and the coupling frame may measure 80 mm×50 mm. In this example, both the card body and the coupling frame are rectangular, with rounded edges. The coupling frame may be recessed into and laminated to a layer of plastic forming the card body.

The coupling frame may be only slightly smaller than the card body, such as 1-4 mm, including 2-3 mm smaller, all around.

The '434 publication discloses a card having a metal layer wherein a gap in the metal layer defines a path from the card periphery to the opening.

In the smartcard of FIG. 50, the slit does NOT extend from the module opening to the periphery of the card. It extends only to the periphery of the coupling frame. Thus, the claim(s) of the '434 publication may not "read on" this card construction.

Rectangular, Skewed Module Opening

Figure 51:
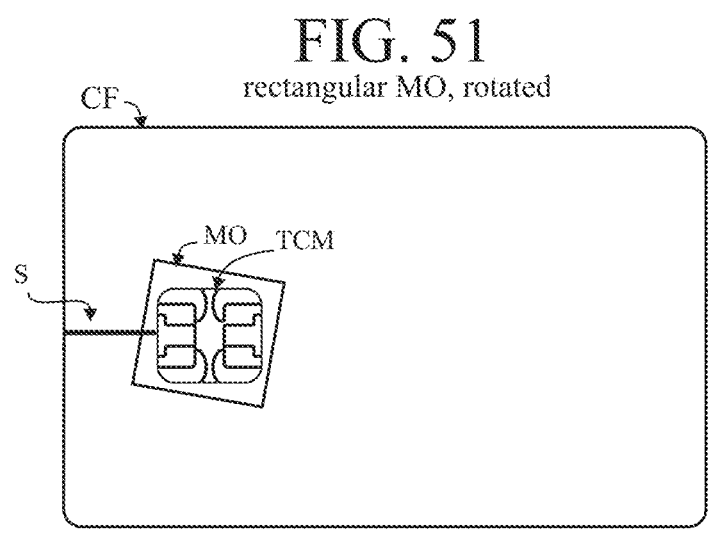
FIG. 51 is a diagram (plan view) of a smartcard (SC) having a rectangular coupling frame (CF) with a rectangular module opening, the edges of which are not parallel to sides of the periphery of the coupling frame, according to an embodiment of the invention.

FIG. 51 is a diagram (plan view) of a smartcard (SC) having a generally rectangular coupling frame (CF) with a generally rectangular module opening (MO), and a slit (S) extending from an edge of the module opening to the periphery of the coupling frame.

As used herein, "generally rectangular" refers to rectangular, but with radiussed (curved, soft) corners (as is common with credit cards, etc.) and, when referring to "rectangular", this may be taken to include "generally rectangular".

The slit is shown as a straight slit extending from an edge of the module opening near (such as closest to) the left side of the coupling frame periphery, for illustrative clarity. It should be understood that the slit may be any of the slits described herein, extending from anywhere on any edge of the module opening to anywhere on any side of the periphery of the coupling frame, as may have been described herein.

Note that in both of FIGS. 50 and 51, a "simple" rectangular module opening (MO) is shown.

In FIG. 50, the slit is very clearly shown extending from the (left) periphery of the coupling frame to the (left) edge of the module opening. The "simple" rectangular module opening which is shown in this, and other figures (for example FIGS. 49A-F) may be representative of the inner, lower, smaller (in area) portion of a stepped recess for accommodating a typically smaller (in area) portion of the transponder chip module having a mold mass (MM) covering and protecting the RFID chip (IC) and connections on the bottom side (surface) of the module tape. Compare FIG. 41, and the accompanying explanation of "stepped recess".

In FIG. 51, the slit is shown extending from the (left) periphery of the coupling frame past the (left) edge of the module opening, to the transponder chip module. And, the slit may extend under the module tape of the transponder chip module to the inner, lower, smaller (in area) portion (not shown) of the stepped recess so that the slit (S) may extend under, and overlap at least a portion of the module antenna (MA). Compare FIG. 2C.

The module opening shown in FIG. 51 is rectangular, but it has been rotated 10 clockwise from its "normal" orientation. Compare FIG. 41 which shows a rectangular module opening, the four edges of which are aligned parallel with corresponding four edges of the coupling frame.

The module opening shown in FIG. 51 may have a rectangular shape, but it may be "skewed" (rotated) so that not all four edges of the (rectangular) opening are parallel with the corresponding four sides of the periphery of the (rectangular) coupling frame. Indeed, not a single one of the edges of the opening are parallel with any side of the periphery of the coupling frame.

As used herein, "skewed" includes rotated at least 1°, at least 5°, at least 10°, at least 20° at least 30°, and at least 45°. If a rectangle is a square, anything over 45° is a bit redundant. (A square rotated 60° may be essentially the same as a square rotated 30°.) The rotation should be enough that a casual observer would notice that the (rectangular) opening is not "correctly" aligned with the (rectangular) coupling frame or card body—in other words, that it is skewed.

It should be evident that such a skewed module opening may need to be enlarged (larger than "normal") to accommodate a "normal" transponder chip module (TCM) which is installed in its "normal" orientation, not skewed, and that some of the area of the module opening may appear be "wasted". Recall, however, that an LED may be connected to the coupling frame, and the slit (S) and/or an area beneath and around the transponder chip module (TCM) may be filled with a material which allows light emitted by the LED to be visible to a user of the smartcard, such as when the card is presented to a POS terminal and a contactless connection has been made therewith. The LED need not be connected to the coupling frame, it could be connected to or be a part of the transponder chip module itself.

Alternatively, the transponder chip module may be modified to have the same shape and orientation as the module opening, substantially "filling" the opening, with the caveat that the contact pads should be located to conform with ISO 7816, as shown in FIG. 1A.

The concept of having a module opening which may have a shape that is different than the shape of the transponder chip module may be applied to any of the module opening shapes disclosed herein, and any of the module opening shapes disclosed herein may be rotated in the manner that the module opening shown in FIG. 51 has been rotated, with the result that few, if any, edges of the module opening are parallel to any sides of the periphery of the coupling frame. And, it may be observed that the claims of the '434 publication do not read on a module opening having fewer than 3 edges parallel with corresponding 3 sides of the periphery of the card. The non-rectangular opening shapes disclosed herein are exemplary of that, as well as the skewed rectangular opening shape.

Figure 52:
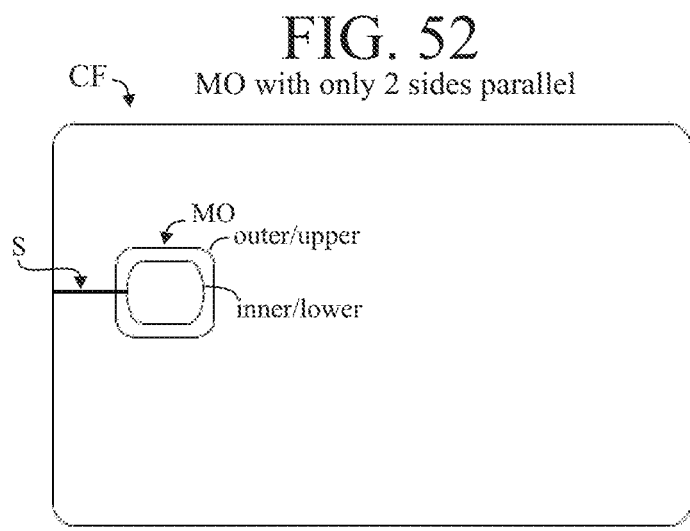
FIG. 52 is a diagram (plan view) of a coupling frame (CF) having a non-rectangular module opening (MO) having only two sides parallel to the edges of the smartcard.

FIG. 52 shows a module opening (i.e., the inner portion of the illustrated "stepped recess") having its top and bottom (two opposite) edges parallel to corresponding two sides of the periphery of the coupling frame, and two "rounded" edges that (since they are not straight/linear) are not parallel to the other corresponding two sides of the periphery of the coupling frame. The slit is shown as a straight slit extending from an edge of the module opening near (such as closest to) the left side of the coupling frame periphery, for illustrative clarity. This constitutes a non-rectangular opening. It may be observed that the claims of the '434 publication do not read on this module opening design. Even if the module opening were rotated 90 degrees, there would still be only two edges parallel to two corresponding sides of the periphery of the coupling frame.

The module opening shown in FIG. 52 is reminiscent of the module opening shown in FIG. 49E, in that the shape of the module opening has several edges (sides), two opposite ones of which are straight (linear) and parallel with corresponding two opposite sides of the periphery of the coupling frame. This concept can be extended to many other shapes, including module openings having two adjacent sides (edges) which are straight (linear) and which are parallel with corresponding two adjacent sides of the periphery of the coupling frame. One of ordinary skill in the art will realize that there can be innumerable variations on this "theme" of having fewer than three edges of the module opening parallel with three sides of the coupling frame, as required by the claims of the '434 publication.

Therefore, it appears that any of the following module openings in a coupling frame of a smartcard may be novel and non-obvious, and may also avoid being "read upon" by claims of any patent granting from the '434 publication:

non-rectangular module opening shapes (excluding the shape shown in FIG. 46A), (note that the shape of the cutout 8 in WO 2019/173455 is described as having a first portion 8a defined by a circular opening in the body 4 and a second portion 8b defined by a square opening in the body 4)

rectangular module opening shapes that are skewed with respect to the periphery of the coupling frame (or card body), and module openings having fewer than 3 edges parallel with corresponding 3 sides of the periphery of the coupling frame (or card body). Note that the opening shown in FIG. 46A (source WO 20190173455) has three edges parallel with corresponding 3 sides of the periphery of the coupling frame (or card body).

Abstract of Ser. No. 16/742,903 filed 14 Jan. 2020

A smartcard (SC) having at least a contactless interface, such as having a dual interface transponder chip module (TCM) with a chip (IC), a module antenna (MA) for the contactless interface, and contact pads (CP) for a contact interface. Metal layers (ML) may have openings (MO) for receiving the module, and slits (S) or nonconductive stripes (NCS) extending to the openings, thereby forming coupling frames (CF). A card body (CB) for the smartcard may comprise two such metal layers (front and rear coupling frames) separated by a layer of non-conductive (dielectric) material. A front face card layer and a rear face card layer may complete a multiple coupling frame stack-up for a smartcard. Various slit designs (configurations, geometries) are described and illustrated. The slit may be filled. The slit may be reinforced.

While the invention(s) has/have been described with respect to a limited number of embodiments, these should not be construed as limitations on the scope of the invention(s), but rather as examples of some of the embodiments. Those skilled in the art may envision other possible variations, modifications, and implementations that are also within the scope of the invention(s), based on the disclosure(s) set forth herein.

What is claimed is:
1. Coupling frame for a smartcard, comprising:
a generally rectangular metal layer having a periphery with four sides;
an opening (MO) in the metal layer for receiving at least a portion of a transponder chip module (TCM), wherein the opening has at least one edge; and
a slit (S) which is representative of any electrical discontinuity extending through the metal layer extending from anywhere in the opening to anywhere on the periphery of the metal layer so that the metal layer functions as a coupling frame (CF);
wherein the opening has at least one of the following features, shapes or orientations:
the opening is non-rectangular, exclusive of (not including) an opening comprising a circular opening adjoining a square opening;
the opening is rectangular, and is skewed with respect to the periphery of the metal layer; and
the opening has fewer than 3 edges parallel with corresponding 3 sides of the periphery of the metal layer.

2. The coupling frame of claim 1, wherein:
at least a portion of the slit follows a path which is non-linear, curved or angled, wavy, zigzag, sine-wave, S-shaped, spiral, L-shaped, T-shaped, stepped, has at least two 90° angles, has at least three or four 90° bends, or becomes wider or narrow along its length.

3. The coupling frame of claim 1, wherein:
the opening is non-rectangular having a shape selected from the group consisting of triangle, circle, oval, slot, ellipse, rhombus, parallelogram, hexagon, and octagon.

4. The coupling frame of claim 1, wherein:
the metal layer extends from edge-to-edge of the smartcard.

5. The coupling frame of claim 1, wherein:
the coupling frame extends over substantially the entire area of the smartcard.

6. The coupling frame of claim 1, wherein:
the slit and the opening are arranged so that the slit overlaps at least a portion of a module antenna (MA) of the transponder chip module.

7. The coupling frame of claim 1, wherein:
the metal layer constitutes an entire metal card body (MCB) of a metal smartcard.

8. The coupling frame of claim 1, wherein:
the opening comprises a stepped recess.

9. The coupling frame of claim 1, wherein:
the transponder chip module is dual-interface (contact and contactless).

10. The coupling frame of claim 1, wherein at least one of:
the metal layer comprises a material selected from the group consisting of copper, aluminum, brass, titanium, tungsten, stainless steel, silver, graphene, silver nanowires and conductive carbon ink;
the metal layer comprises a precious or high density metal selected from the group consisting of silver, titanium, tungsten or a high strength metal such as stainless steel;
the metal layer comprises a metal alloy; and
the metal layer comprises a non-precious metal plated with a precious metal.

11. The coupling frame of claim 1, wherein:
there are a plurality of metal layers, and the opening of one metal layer has a shape which is different than the opening of another other metal layer.

12. The coupling frame of claim 1, wherein:
there are a plurality of metal layers, and the slit (S) of one metal layer has a shape which is different than the slit (S) of another metal layer.

13. The coupling frame of claim 1, wherein:
there are two metal layers (M1, M2), and the opening of one metal layer has a shape which is different than the opening of the other metal layer.

14. The coupling frame of claim 1, wherein the coupling frame is part of a smartcard, and further comprising:
an LED disposed in the smartcard; and
a filler material disposed in the slit or in an area around the transponder chip module (TCM), which allows light emitted by an LED within the smartcard to be visible to a user of the smartcard.

15. A smartcard comprising:
at least one metal layer having a periphery, an opening (MO) for receiving at least a portion of a transponder chip module (TCM), and a slit (S) extending from the opening to the periphery of the metal layer so that the metal layer functions as a coupling frame (CF);
wherein:
the slit and opening are arranged so that the slit overlaps at least a portion of a module antenna (MA) of the transponder chip module; and
wherein the opening has at least one of the following features, shapes or orientations:
the opening is non-rectangular, exclusive of (not including) an opening comprising a circular opening adjoining a square opening;
the opening is a polygon having more than four edges;
the opening is rectangular, and is skewed with respect to the periphery of the metal layer; and
the opening has fewer than 3 edges parallel with corresponding 3 sides of the periphery of the metal layer.

* * * * *